US 7,174,301 B2

(12) United States Patent
Florance et al.

(10) Patent No.: US 7,174,301 B2
(45) Date of Patent: Feb. 6, 2007

(54) SYSTEM AND METHOD FOR ACCESSING GEOGRAPHIC-BASED DATA

(75) Inventors: Andrew C. Florance, Chevy Chase, MD (US); Robert Evatt, San Diego, CA (US); Deborah Hofman, Carlsbad, CA (US); John Choi, San Diego, CA (US)

(73) Assignee: Costar Group, Inc., Bethesda, MD (US)

( * ) Notice: Subject to any disclaimer, the term of this patent is extended or adjusted under 35 U.S.C. 154(b) by 0 days.

(21) Appl. No.: 10/657,275

(22) Filed: Sep. 9, 2003

(65) Prior Publication Data

US 2004/0128215 A1    Jul. 1, 2004

Related U.S. Application Data

(63) Continuation-in-part of application No. 10/256,197, filed on Sep. 27, 2002, which is a continuation-in-part of application No. 09/973,703, filed on Oct. 11, 2001, which is a continuation-in-part of application No. 09/693,988, filed on Oct. 23, 2000, now Pat. No. 6,871,140.

(51) Int. Cl.
  *G06Q 99/00* (2006.01)
  *G06Q 30/00* (2006.01)
(52) U.S. Cl. .............................. 705/1; 705/26; 705/28; 705/6; 701/207; 342/350; 340/995.14
(58) Field of Classification Search .................. 705/26, 705/27, 1, 6, 28; 701/207; 342/350; 340/995.14
See application file for complete search history.

(56) References Cited

U.S. PATENT DOCUMENTS 4,635,136 A * 1/1987 Ciampa et al. ............... 386/64

(Continued)

FOREIGN PATENT DOCUMENTS

EP    0 902 381    3/1999

(Continued)

OTHER PUBLICATIONS

GB Search Report, Jan. 18, 2002.

(Continued)

*Primary Examiner*—F. Zeender
(74) *Attorney, Agent, or Firm*—Michael Bednarek; Paul, Hastings, Janofsky & Walker LLP

(57) ABSTRACT

A system and method for creating a unified commercial real estate data model through collection, distribution and use of information in connection with commercial real estate and for creating a web-based marketplace that facilitates the efficient and secure buying, selling, and leasing of commercial properties. The invention provides a digital marketplace in which the members of the commercial real estate and related business community can continuously interact and facilitate transactions by efficiently exchanging accurate and standardized information. An embodiment provides a system and method for providing communication and analytical tools that interface with a commercial real estate database and support commercial real estate transactions between parties. These communication and analytical tools can include: 1) a survey tool; 2) a commercial real estate transaction tool; 3) a tour scheduling tool; 4) an activity summary tool; 5) a tool for analyzing commercial real estate data; and 6) a map search tool.

20 Claims, 128 Drawing Sheets

U.S. PATENT DOCUMENTS

| | | | |
|---|---|---|---|
| 4,713,761 A | 12/1987 | Sharpe et al. | |
| 4,870,576 A * | 9/1989 | Tornetta | 705/1 |
| 4,891,761 A | 1/1990 | Gray et al. | |
| 4,974,170 A | 11/1990 | Bouve et al. | |
| 5,032,989 A * | 7/1991 | Tornetta | 705/1 |
| 5,185,857 A * | 2/1993 | Rozmanith et al. | 715/507 |
| 5,214,757 A | 5/1993 | Mauney et al. | |
| 5,222,018 A | 6/1993 | Sharpe et al. | |
| 5,289,572 A | 2/1994 | Yano et al. | |
| 5,381,338 A | 1/1995 | Wysocki et al. | |
| 5,396,431 A | 3/1995 | Shimizu et al. | |
| 5,414,838 A | 5/1995 | Kolton et al. | |
| 5,420,405 A | 5/1995 | Chasek | |
| 5,424,951 A | 6/1995 | Nobe et al. | |
| 5,543,789 A | 8/1996 | Behr et al. | |
| 5,584,025 A | 12/1996 | Keithley et al. | |
| 5,664,115 A | 9/1997 | Fraser | |
| 5,680,305 A | 10/1997 | Apgar, IV | |
| 5,682,525 A | 10/1997 | Bouve et al. | |
| 5,717,737 A | 2/1998 | Doviak et al. | |
| 5,724,524 A | 3/1998 | Hunt et al. | |
| 5,794,216 A * | 8/1998 | Brown | 705/27 |
| 5,802,492 A | 9/1998 | DeLorme et al. | |
| 5,841,443 A * | 11/1998 | Einkauf | 345/586 |
| 5,966,135 A * | 10/1999 | Roy et al. | 345/619 |
| 5,978,804 A * | 11/1999 | Dietzman | 707/10 |
| 6,026,375 A | 2/2000 | Hall et al. | |
| 6,038,522 A | 3/2000 | Manson et al. | |
| 6,199,014 B1 | 3/2001 | Walker et al. | |
| 6,337,693 B1 * | 1/2002 | Roy et al. | 345/619 |
| 6,339,745 B1 | 1/2002 | Novik | |
| 6,385,541 B1 | 5/2002 | Blumberg et al. | |
| 6,401,068 B1 | 6/2002 | Cherveny et al. | |
| 6,674,849 B1 * | 1/2004 | Froeberg | 379/201.06 |
| 6,678,663 B1 * | 1/2004 | Mayo | 705/14 |
| 6,836,270 B2 * | 12/2004 | Du | 345/419 |
| 2004/0044696 A1 | 3/2004 | Frost | |

FOREIGN PATENT DOCUMENTS

| | | |
|---|---|---|
| WO | WO 98/59506 | 12/1998 |
| WO | WO 99/49404 | 9/1999 |
| WO | WO 99/56144 | 11/1999 |
| WO | WO 00/04476 | 1/2000 |
| WO | WO 00/49530 | 8/2000 |
| WO | WO 00/75843 | 12/2000 |
| WO | WO 01/11513 | 2/2001 |
| WO | WO 01/16768 | 3/2001 |
| WO | WO 01/48643 | 7/2001 |
| WO | WO 01/63528 | 8/2001 |
| WO | WO 2004/042494 | 5/2004 |

OTHER PUBLICATIONS

GB Search Report, Mar. 26, 2003.
http://dc.internet.com/news/article.php/408601.
http://www.costar.com/products/exchange.
http://news.stockselector.com/newsarticle.asp?symbol=CSGP&article=21129490.
"LoopNet," www.loopnet.com.
"Arc/Info," www.esri.com/software/arcgis/arcinfo/.
"Arc View," www.rockware.com/catalog/pages/arcview.html.
"Map Info," www.mapinfo.com.
"The GIS Primer," www.innovativegis.com/basis/primer/organ.html.
"Department of Environment Quality," www.environmentalresponse.utah.gov/map/toolbar.htm.
GB Search Report, Apr. 2, 2004.
"The Touring Machine," http://www1.cs.columbia.edu/graphics/projects/mars/touring.html.

* cited by examiner

INVESTMENT SALES

- Is this the right type of property?
- Do we invest in properties in this area?
  - Is this building leased up enough?
  - When do the tenants leases expire?
  - Are these good credit tenants?
  - Does this building have enough income?
  - When these tenants lease roll will I get good rents?
  - Does this market have a low vacancy rate such that I can re-lease quickly?
  - When I have to re-lease, who will my competitors be?
  - Based on other sales in this area is this a fair price?
  - What multiple of revenues are other buildings selling for?
  - Can I get reasonable financing for this property?
  - Will you accept an offer of $35 million?
  - Will you accept these legal terms of sale?
  - Did my engineers find structural or environmental flaws?

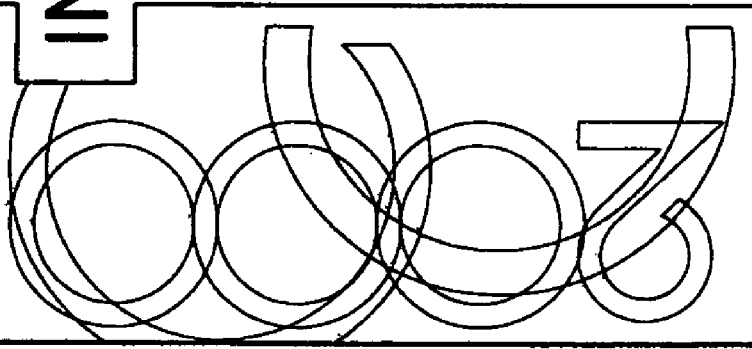

FIG. 8

OUR REVENUE MODEL o Subscription Service, similar to CoStar.

o Banner advertising revenue.

o Lender referral fees.

o Buyer/Seller matching Fees.

o Click through revenue.

o Enhanced listings fees.

o Cost savings on comps.com data collection.

| Professional Profile - Microsoft Internet Explorer | □□⊠ |

| File Edit View Favorite Tools Help |

COSTAR EXCHANGE

Professional Profile

Lookup
New Search
Saved Searches
Add Listing
Alerts
Profile
Buyer Match
Forms/Contracts
Demo
FAQ
Help Your Professional Profile will help us customize your interactive experience on this site. Please fill it out completely. Enter any information you believe helps us to accurately reflect your professional background in commercial real estate.

All information is confidential. Your profile will be shared only with your approval when you request Propriety Listing Information or submit capabilities indentification. Please read privacy policy for more details.

Thank You.

First Name: Quentin
Last Name: Foster
Title:
Company:
E-mail Address:
Telephone:
Fax:

Address 1:
Address 2:
City:
State:
Zip:

Principal: ●
Broker: ○
Other CRE Professional: ○
Memberships: CCIM ▼
Property Interest: ☐ Office  ☐ Industrial
 ☐ Multi-Family  ☐ Hospitality
 ☐ Retail  ☐ Land  ☐ Other Location Interests:

Transaction Range ($): [ ] to [ ]

Purchase Structure: ● Leveraged  ○ Cash

Transaction History: Please summarize up to 10 key transactions you have been involved in during the past two years.
Include for each:
property value, type, city and closing date(s).
(e.g. $4,500,000 Office, LA, 3/99)

I'm interested in: ☐ Subscription Membership
 ☐ Listing Properties in Exchange
 ☐ Banner Advertising Submit Done | ○Internet

CoSTAR EXCHANGE

Confidential
Manhattan, NY
Class A Office Building Offered at $205,000,000

2 of 257
Next
Back
Results
Remove
Print
New Search

Proprietary Listing Information

Request Pending

Your request for access to the listing information on this property has been sent to the Listing entity.

A response is expected shortly.

Thank You,
CoStar Exchange

CoSTAR EXCHANGE

Property Look Up Results List

Exchange Home
Print Results
New Lookup

| Address | City | St | Pric | SF Size | Price/S | Cap | Type |
|---|---|---|---|---|---|---|---|
| 1287 Central Park Plz | O'Fallon | IL | $12,500,000 | 141,728 | $88 | | Retail |
| 520 S Lafayette Park Pl | Los Angeles | CA | $6,200,000 | 88,649 | $67 | | Office |
| 16350 Park 10 Pl | Houston | TX | $5,071,220 | 43,712 | $63 | | Office |
| 8701 Park Place Blvd | Houston | TX | $5,000,000 | 148,000 | $34 | | Indust |
| 16350 Park 10 Pl | Houston | TX | $4,878,650 | 68,394 | $71 | | Office |
| 790 Park Pl | Long Beach | | $3,200,000 | | $44 | | Indust |
| 5121 Parkway Plaza Blvd | Charlotte | NC | $2,550,100 | 23,000 | $111 | | Office |
| 6-9 Park Pl | | NJ | $875,000 | 28,000 | $31 | | Indust |
| 1975 Park Pl N | Atlanta | GA | $600,000 | 10,352 | $58 | | Office |
| 727 Park Place | Green Oak Two | MI | $525,000 | 11,400 | $46 | | Indust |
| 950 Park Pl N | Atlanta | GA | $450,000 | 6,000 | $75 | | Office |
| Park Pl | Kissimmee | FL | | | | | Land |
| 1021 Park Pl | Wilmington | DE | $279,900 | 2,000 | $140 | | Office |
| 1367 Monier Park Pl | Rancho Cordova | CA | $250,000 | 5,000 | $5 | | Indust |
| 46 Park Pl | Branford | CT | $225,000 | | | | Land |
| 17358 Monier Park Pl | Rancho Cordova | CA | $213,75 | 3,750 | $5 | | Indust |
| 1801 Park Court Pl | Santa Ana | CA | $107,20 | 13,400 | | | Land |
| Park Plaza Dr | Cerritos | CA | | | | | Land |
| Cherry Park Dr @ Copperfi... | Houston | TX | | | | | Land |
| Park Plaza Dr | Cerritos | CA | | | | | Land |

| CoStar Exchange - Market Search - Microsoft Internet Explorer | | | | | □|□|× |
|---|---|---|---|---|---|
| File Edit View Favorite Tools Help | | | | | |

CoSTAR EXCHANGE — Search Step 4 Size — 38,711 Update Count Matching Properties

| Home | New Search | Saved Search | Results | Help | Get Results › |
|---|---|---|---|---|---|

Specify the market conditions you want CoStar Exchange to find.

1. Property
2. Location
3. Price
4. Size
5. Market
6. Results
QC

Vacancy & Absorption

| | | | | |
|---|---|---|---|---|
| Vacancy Rate | In Region | [ ] | To [ ] | % |
| | In Submarket | [ ] | To [ ] | % |
| Point Increase Last 12 Months | In Region | [ ] | To [ ] | |
| | In Submarket | [ ] | To [ ] | |
| Point Decrease Last 12 Months | In Region | [ ] | To [ ] | |
| | In Submarket | [ ] | To [ ] | |
| 12 Months Gross Absorption | In Region | [ ] | To [ ] | SF |
| | In Submarket | [ ] | To [ ] | SF |
| 12 Months Net Absorption | In Region | [ ] | To [ ] | SF |
| | In Submarket | [ ] | To [ ] | SF |
| Asking Rental Rates/SF | | ⊙ Annual  ○ Monthly | | |
| | In Region | $[ ] | To [ ] | |
| | In Submarket | $[ ] | To [ ] | |

Inventory Ratios

| | | | | |
|---|---|---|---|---|
| Ratio of Net Absorption/Inventory | In Region | [ ] | To [ ] | |
| | In Submarket | [ ] | To [ ] | |
| Ratio of Gross Absorption/Inv | In Region | [ ] | To [ ] | |
| | In Submarket | [ ] | To [ ] | |
| Ratio of Under Construction/Inv | In Region | [ ] | To [ ] | |
| | In Submarket | [ ] | To [ ] | |

Inventory

| | | | | |
|---|---|---|---|---|
| Total Building Inventory SF | In Region | [ ] | To [ ] | |
| | In Submarket | [ ] | To [ ] | |
| Average Building Size SF | In Region | [ ] | To [ ] | |
| | In Submarket | [ ] | To [ ] | |
| Number of Buildings | In Region | [ ] | To [ ] | |
| | In Submarket | [ ] | To [ ] | |
| Under Construction SF | In Region | [ ] | To [ ] | |
| | In Submarket | [ ] | To [ ] | |

□ Done                    ○ Internet

FIG.50

CoSTAR EXCHANGE

Your Search Results
More than 250 properties found

| Address | City | St | Price | SF Size | Price/SF | Cap | Class |
|---|---|---|---|---|---|---|---|
| 1355 Peachtree St NE | Atlanta | GA | $37,000,000 | 344,974 | $107 | | A |
| 680 Murphy Ave SW | Atlanta | GA | $20,000,000 | 1,100,000 | $18 | 5.00 | C |
| 1775 The Exchange SE | Atlanta | GA | $12,000,000 | 97,708 | $123 | 8.00 | B |
| 1170 Howell Mill Rd NW | Atlanta | GA | $10,000,000 | 210,000 | $48 | | |
| 6250 Shiloh Rd | Alpharetta | GA | $8,240,000 | 71,644 | $115 | | B |
| 5801 Peachtree Dunwo... | Atlanta | GA | $5,550,000 | 44,342 | $124 | | D |
| 1409 Peachtree St NE | Atlanta | GA | $5,510,000 | 22,231 | $247 | | D |
| 1389 Peachtree St NE | Atlanta | GA | $4,975,000 | 42,000 | $118 | | D |
| 2115 Monroe Dr NE | Atlanta | GA | $4,500,000 | 86,000 | $52 | | B |
| 1775 Water Pl SE | Atlanta | GA | $3,400,000 | 125,000 | $26 | | |
| 1439 Peachtree St NE | Atlanta | GA | $3,400,000 | 39,790 | $85 | | C |
| 10 Nobel Ct | Alpharetta | GA | $3,800,000 | 44,777 | $85 | | |
| 133 Luckie St NW | Atlanta | GA | $3,400,000 | 47,000 | $72 | | B |

Too many records were selected.
Only first 250 records are shown.

Home
1. Property
2. Location
3. Price
4. Size
5. Market
6. Results
Print
QC

FIG. 51

COSTAR EXCHANGE of
▷ Next
◁ Back
△ Results
☐ Remove
☐ Print
☆ New Search

9911 West Pico Blvd
CenturyParkCenter
LosAngeles, California
ClassAOfficeBuildingof282,000SFOfferedat$49,500,000

| Overview | Financial | Tenants | Market | Comps | Map |

Investment Summary

| | | | |
|---|---|---|---|
| Price: | $49,500,000 | Building Size: | 282,000SF |
| Price/SF: | $175.98 | Land Area: | 16,560SF |
| Cap Rate: | 8.52% | Year Built: | 1973, Renov 1987 |
| Percent Leased: | 96.0% | Sales Status: | UnderContract |

Building

Highlights

The property offers upside potential in the rental income. It has maintained historically high occupancy of 90% or greater. Credit tenants account for 65% of the leased space and included Source Capital and several others. The building was completely renovated in 1987 at a cost of over $6,000,000.

Lobby

Property Description

| | | | |
|---|---|---|---|
| Building Size: | 282,000SF | Building Class: | Class A |
| Number of Floors: | 16 | Land Area: | 16,560SF |
| Typical Floor Size: | 13,200SF | Lot Dimensions: | 120x180 |
| Core Factor: | 11.4% | Building FAR: | 13.2 |
| Elevators: | 4 | Zoning: | LAC2-IVL&0 |
| Percent Leased: | 96.0% | Parking Ratio: | 3.8:1000SF |
| Available Space: | 55,731SF | Open Parking: | 350 |
| Vacant Space: | 23,000SF | Covered Parking: | 722 |
| Number Tenants: | 33 | Parking Spaces: | 1,072 |
| Avg Tenant Size: | 8,545SF | Parking Rates: | $120Reserved |

Floor Plan

▷ Tenants enjoy ocean views and mountain views from all floors. The property is conveniently located between Century Park East and Roxbury Drive.

Aerial

Assessment Values

| | | | |
|---|---|---|---|
| Assmt Land: | $24,150,000 | Property Tax Rate: | 1.023% |
| Assmt Improvements: | $10,350,000 | Annual Property Tax: | $560,000 |
| Total Assmt: | $34,500,000 | Property Tax/SF: | $2.01 |

Location

Metro Market: Los Angeles
County: Los Angeles
Submarket: West Los Angeles
Zip Code: 90035

Map

Map Book/Page: 41-C-15
Block/Lot: NotSpecified
Parcel Number: 413-01-297

▷ Comments about the location will go here

CONT.FROM FIG. 53A

| Downloads | Building Team |
|---|---|
| Financial | Property Manager: Arden Realty<br>Developer: NoSpecified<br>Architect: GenslerAssoc<br>CoStar Contact: Andrew Harris<br>(301)917-1970 (phone)<br>(800)603-1301 (fax) |
| Risk & Sensibility | |
| Pro Forma Income | |
| Cash Flow Assumption | Transaction Guidelines |
| 10 Yr Cash Flow Schedule | Sales Status: UnderContract<br>Marketing: October7,1999-December14,1999<br>Final Offers: January15,2000<br>Contract Signing: February15,2000<br>Closing: April15,2000<br><br>Active on Exchange: October28,1999<br>Last Update: November11,1999<br>Days on Market: 38 |
| Tenant | |
| Rent Roll | |
| Other Tenant Info | |
| PIX Tour | |
| Pico & Elm | Presented By |
| Lobby | BeitlerRealtyServices    BarryBeitler<br>825S.Barrington            310-820-2955(phone)<br>LosAngeles,CA90025   310-820-2956(fax)<br><br>www.beitler.com |

FIG.53B

| □Office Financial - Microsoft Internet Explorer | _ □ ✕ |
|---|---|
| File Edit View Favorite Tools Help | |

CoStar Exchange

2 of 257

▷ Next
◁ Back
⌃ Results
▭ Remove
▫ Print
☆ New Search

9911 West Pico Blvd.
Century Park Center
LosAngeles, California
A 282,000 SF Office Building Offered at $49,500,000

| Overview | Financial | Tenants | Market | Comps | Map |
|---|---|---|---|---|---|

Financial Overview

| Price: | $49,500,000 | Use: | Income Property |
|---|---|---|---|
| Price/SF: | $175.98 | Cap Rate: | 8.52% |

Financial Worksheet

Change a field in the worksheet and click "calculate" to refresh the section with new numbers.

| Down Payment: | $2,308,150 | Price: $ | 20,000,000 |
|---|---|---|---|
| New Loan: | $20,000,000.00 | Cap Rate: | 5.00 % |
| Net Operating Income: | $1,000,000 | Down Payment: | 30 % |
| Loan Payment: | $520,012 | Interest Rate: | 0.00 % |
| Pre-Tax Cash Flow: | $172,433 | Loan Term: | 30 |
| | | | Calculate |

Income & Expense

| Gross Income: | $6,627,000 | Taxes: | $560,000 |
|---|---|---|---|
| Other Income: | $1,405,000 | Insurance: | $109,784 |
| Vacancy Allowance: | $(401,600) | Utilities: | $871,090 |
| Operating Expenses: | ($3,418,200) | Wages: | $423,691 |
| Net Operating Income: | $4,218,200 | Maintenance: | $409,000 |
| Loan Payment: | $(3,381,948) | Management: | $275,000 |
| Pre-Tax Cash Flow: | $836,252 | Misc/Reserves: | $813,635 |
| Current Asking Rent/SF: | $26.10 | Total Est Expenses: | ($3,412,200) |
| Est Average Rent/SF: | $23.50 | Est Expenses/SF: | $12.10 |

Existing Financing

| Lender: | First Union | Existing Loan: | $925,000 |
|---|---|---|---|
| Loan Payment: | $88,368 | Interest Rate: | 8.0 |
| Due Date: | November 1, 2027 | Loan Term: | 30 |

□Done   ○Internet

FIG. 54

| Office Tenants - Microsoft Internet Explorer | | | | | | |
|---|---|---|---|---|---|---|
| File Edit View Favorite Tools Help | | | | | | |

CoStar Exchange

2 of 257
▷ Next
◁ Back
⌃ Results
▭ Remove
▭ Print
☆ New Search

9911 West Pico Blvd.
Century Park Center
Los Angeles, California
A 282,000 SF Office Building Offered at $49,500,000

| Overview | Financial | Tenants | Market | Comps | Map |
|---|---|---|---|---|---|

Tenant information provided by CoStar Tenant

Tenants Tracked

| Suite | Tenant | Occupancy SF | Bldg % | Industry | Expires | Est Rent |
|---|---|---|---|---|---|---|
| 102 | Tenant Healthcare | 30,688 | 10.9% | Health | 1/2/03 | $21.00 |
| 205 | Micromedia New England Corporation | 13,850 | 4.9% | Media | | |
| 550 | Source Capital | 13,841 | 4.9% | Financial | | |
| 110 | US Post Office | | | Government | | |
| 200 | 24 Hour Fitness | | | Retail | | |
| 300 | Hoover & Chase Attorneys | | | Legal | | |
| 920 | Eagle Financial | | | Legal | | |
| 1600 | Mario's Nightclub | | | Service | | |

| | | | |
|---|---|---|---|
| Tenant Subtotals: | 74,880 | 26.5% | |
| Unspecified Tenants: | 147,389 | 52.3% | |
| Vacant Space: | 55,731 | 19.8% | |
| Building Total: | 282,000 | 100.0% | |

Tenant Analysis

| | | | |
|---|---|---|---|
| Tenants in Building: | 33 | Percent Occupied: | 96.0% |
| Average Tenant Size: | 8,554 SF | Est Rollover Next 12 Months: | 25,450 SF |
| Average Lease Term: | 31 Months | Est Rollover next 36 Months: | 36,500 SF |
| Est Average Rent/SF: | $23.50 | Current Asking Rent/SF | $26.10 |

Tenant Notes

Any tenant notes will go here and if there are none, this section will be supressed.

FIG. 55

Office Market - Microsoft Internet Explorer

File  Edit  View  Favorite  Tools  Help

COSTAR EXCHANGE 2 of 257
Next
Back
Results
Remove
Print
New Search

9911 West Pico Blvd.
Century Park Center
Los Angeles, California
A 282,000 SF Office Building Offered at $49,500,000

Overview | Financial | Tenants | Market | Comps | Map

Market information provided by CoStar Property

Size Vacancy

|  | Subject Property | Class A Office Properties West LA | Office Properties West LA | Office Properties Los Angeles |
|---|---|---|---|---|
| Number of Buildings: | 1 | 320 | 1,268 | 7,225 |
| Total Rentable Space: | 282,000 SF | 42,084,970 SF | 61,790,134 SF | 338,590,353 SF |
| Average Building Size: | 282,000 SF | 131,515 SF | 48,731 SF | 46,864 SF |
| Average Tenant Size: | 8,545 SF | 7,500 SF | 7,105 SF | 6,642 SF |
| Average Building Age: | 26 YRS | 21 YRS | 19 YRS | 17 YRS |
| Percent Leased: | 96.0% | 94.6% | 91.0% | 85.8% |
| # Available Spaces: | 12 | 854 | 1426 | 9,476 |
| Available Space: | 23,000 SF | 4,372,598 SF | 7,836,351 SF | 58,802,084 SF |
| Avg Available Space: | 23,000 SF | 36,500 SF | 21,500 SF | 22,000 SF |
| Vacant Space: | 23,000 SF | 2,932,402 SF | 4,483,173 SF | 42,846,930 SF |
| Avg Vacant Space: | 23,000 SF | 35,000 SF | 24,500 SF | 23,000 SF |
| Vacancy Rate: | 8.20% | 5.40% | 6.20% | 11.75% |
| Vacancy YAG: | 4.60% | 8.70% | 8.50% | 13.20% |
| Vacancy Rate vs YAG: | -3.60 | +3.30 | +2.30 | +1.55 |

Inventory/Absorption

|  | Subject Property | Class A Office Properties West LA | Office Properties West LA | Office Properties Los Angeles |
|---|---|---|---|---|
| Total Existing Space: | 282,000 SF | 40,290,320 SF | 59,711,779 SF | 326,853,331 SF |
| Under Construction: | 0 | 1,135,000 SF | 1,193,000 SF | 3,783,310 SF |
| Renovation: | 0 | 391,328 SF | 559,972 SF | 1,718,345 SF |
| Proposed: | 0 | 268,322 SF | 325,383 SF | 6,235,367 SF |
| Total Rentable Space: | 282,000 SF | 42,084,970 SF | 61,790,134 SF | 338,590,353 SF |
| 12 Months Gross Absp: | 40,174 SF | 3,698,607 SF | 15,811,532 SF | 24,260,592 SF |
| 12 Months Net Absp: | 15,656 SF | 848,195 SF | 3,604,829 SF | 2,302,255 SF |

Price/Rate

|  | Subject Property | Class A Office Properties West LA | Office Properties West LA | Office Properties Los Angeles |
|---|---|---|---|---|
| Avg Asking Price/SF: | $175.98 | $181.90 | $128.60 | $101.55 |
| Avg Asking Rents: | $26.10 | $30.60 | $30.36 | $28.25 |
| Avg Asking Rents YAG: | $28.10 | $34.85 | $32.57 | $29.85 |
| Rent Change vs YAG: | +$2.00 | +$3.45 | +$2.51 | +1.16 |

Updated October 28, 1999

FIG.56

CoSTAR GROUP

Product & Services    Corporate Info    Support    Contact Us    Site Map

Building Questionnaires

Please select the type of property you wish to profile in CoStar Property:

If you prefer to fax your questionnaire, click on the link to download the corresponding form in PDF format*.

- For Lease Properties
  - Office
  - Industrial

- Office
  - Industrial

- For Sale Properties
  - *Coming Soon!*

*Please note:* Data that is submitted by this questionnaire will be transmitted to CoStar Group's Research Division for entry into CoStar Property. This does not submit data directly into CoStar Property. For more information, please contact CoStar Group at info@costargroup.com.

Home    Products & Services    Corporate Info    Support    Contact Us    Site Map Terms of Use    Privacy Policy    Photo Restrictions    Contact Us

Loss/Core Factor
%

Elevator
☐ Passenger #
☐ Freight #

Suite Level Information >>>   [Clear]

Home    Products & Services    Corporate Info    Support    Contact Us    Site Map Terms of Use    Privacy Policy    Photo Restrictions    Contact Us

FIG.61

CoSTAR GROUP Product & Services  Corporate Info  Support  Contact Us  Site Map

Office Building Questionnaire Suite Level Information

Page 2 of 6

Floor  Suite
BSMT  [  ]  [  ]

Square Feet Available
Total         Smallest
[Is Divisible ▾] [  ]   [  ]

Max Contiguous on Floor
[  ]

Space Type:     Space Use:
⦿ Relet/Direct   ⦿ Office
○ New            ○ Office/Retail
○ Sublet         ○ Retail
                 ○ Medical Rent/SF ○ Annually ○ Monthly
$ [  ] To $ [  ]

Services
[  ▾]

Occupancy
[  ▾] 120 Days  [▾]/[▾]

Lease Term or
Sublet Through Date
[  ]

Suite Notes:
[                    ]
[       ◀   ▮   ▶    ]

[Cancel]   [<< Basic Building Info]   [Clear]   [Save Suite Info]   [Listing Contacts >>]

Home   Products & Services   Corporate Info   Support   Contact Us   Site Map

Terms of Use   Privacy Policy   Photo Restrictions   Contact Us

CoSTAR GROUP   Product & Services   Corporate Info   Support   Contact Us   Site Map

Office Building Questionnaire   Suite Level Information   Page 2 of 6

| Floor | Suite | Square Feet Available Total (Not Divisible) | Max Contiguous on Floor | Space Type: Relet/Direct | Space Use: Office |
|---|---|---|---|---|---|
| LBBY | | 5,000 | 2,500 | | |

Rent/SF   Services
To        Occupancy 120 Days   Lease Term or Sublet Through Date
Suite Notes:

---

| Floor | Suite | Square Feet Available Total | Smallest | Max Contiguous on Floor | Space Type: ● Relet/Direct ○ New ○ Sublet | Space Use: ● Office ○ Office/Retail ○ Retail ○ Medical |
|---|---|---|---|---|---|---|
| BSMT ▸ | | Is Divsble ▸ | | | | |

Rent/SF ○ Annually ○ Monthly  Services   Occupancy
$ [ ] To $ [ ]                              ▸ 120 Days     ▸ [ ] / ▸ [ ]   Lease Term or Sublet through Date
Suite Notes:

◂ ▸

Space Summary:
Total SF Available: 5,000    Total Contiguous
Min. Contiguous Available: 5,000    in Building: [ ]
Max. Contiguous Available: 2,500

[ Cancel ]   [ << Basic Building Info ]   [ Clear ]   [ Save Suite Info ]   [ Listing Contacts >> ]

FIG.64

CoSTAR GROUP

Office Building Questionnaire    Building Team

Product & Services    Corporate Info    Support    Contact Us    Site Map

Page 4 of 6

Owner

Address

City, State, ZIP

Phone No.    Ext

Architect    Web Address

Phone No.    Ext

Developer    Web Address

Phone No.    Ext

[Cancel]    << Listing Contacts

Management Company

Address

City, State, ZIP

Phone No.    Ext

Property Manager

Phone No.    Ext

Asset Manager

Phone No.    Ext

On-Site Management
○ Yes  ○ No

REIT Owned
○ Yes  ○ No

[Clear]    Features/Mkt Notes >>

Home    Products & Services    Corporate Info    Support    Contact Us    Site Map Terms of Use    Privacy Policy    Photo Restrictions    Contact Us

CoSTAR GROUP

Product & Services   Corporate Info   Support   Contact Us   Site Map

Office Building Questionnaire   Major Tenants

Page 6 of 6

| # | Major Tenant Name | Square Feet |
|---|---|---|
| 1. | [          ] | [     ] [Add] |

[Cancel] [<<Amenities/Mkt Notes]            [Clear] [Submit Questionnaire]

Home   Products & Services   Corporate Info   Support   Contact Us   Site Map

Terms of Use   Privacy Policy   Photo Restrictions   Contact Us

FIG.67

| CoSTAR GROUP | Product & Services | Corporate Info | Support | Contact Us | Site Map |

Thank You!

Thank you for submitting your office questionnaire!

A CoStar Group research analyst will be contacting you shortly.

Please keep this tracking number for your records: 602

Click here to return to the CoStar home page

| Home | Products & Services | Corporate Info | Support | Contact Us | Site Map |

Terms of Use        Privacy Policy        Photo Restrictions        Contact Us

| Address | Leasing Company | Use | Floor | Suite | SF Avail/Divide ? | Rent/Service |
|---|---|---|---|---|---|---|
| 3 Bethesda Metro Ctr | Realty Management Co | Office | P SUBWY | B | 4,155 | $35/fs |
| 3 Bethesda Metro Ctr | Realty Management Co | Office | P 8th | | 5,600 | $35/fs |
| 3 Bethesda Metro Ctr | Gittleson Zuppas Comr | Office | P 8th | 850 | 5,584 | $35/fs |
| 7900-7920 Norfolk Ave | Douglas Development | Office | E 7th | | 8,046 Y | $29/fs |
| 7700 Old Georgetown I | Insignia/ESG, Inc. | Retail | P 1st | | 6,000 | $18/nnn |
| 7700 Old Georgetown I | The Fred Ezra Compai | Office | P 5th | | 5,000-21,343 Y | $35/fs |
| 7735 Old Georgetown I | CB Richard Ellis | Office | P LL | | 5,546 | Negotiable/fs |
| 7735 Old Georgetown I | CB Richard Ellis | Office | E 6th | | 10,373 Y | Negotiable/fs |
| 7735 Old Georgetown I | CB Richard Ellis | Office | E 7th | | 10,373 Y | Negotiable/fs |
| 7735 Old Georgetown I | CB Richard Ellis | Office | E 8th | | 10,373 Y | Negotiable/fs |
| 7735 Old Georgetown I | CB Richard Ellis | Office | E 9th | | 10,373 Y | Negotiable/fs |
| 7735 Old Georgetown I | Transwestern Commer | Office | E 10th | | 10,373 Y | Negotiable/fs |
| 7735 Old Georgetown I | The Fred Ezra Compai | Office | P 12th | | 5,350 | $30.50/fs |
| 7200 Wisconsin Ave | TrizecHahn | Retail | P 5th | 501 | 5,000-13,042 Y | $32/fs |
| 7475 Wisconsin Ave | TrizecHahn | Retail | P LL | 006 | 2,711 | $25/nnn |
| 7475 Wisconsin Ave | Trammell Crow Compa | Office | P 1st | 100 | 2,548 | $46/nnn |
| 7600 Wisconsin Ave | | Office | P 7th | | 3,000-7,000 Y | Negotiable/ne |

8602

8604 Select All | 8606 Unselect All | 8608 Continue | Cancel

FIG. 86

Enter the space requirements that will be emailed to targeted list of brokers.

Type  ⦿ Office  ○ Industrial  ○ Flex — 8700

Total SF     [5,500]   Contiguous on One Floor
Term         [5]       Years
Rent $/SF/Yr [$32.00]
Required By  [6/01/2001]  MM/DD/YYYY
Location(s)  [Bethesda/Chevy Chase]

Comments: [                    ] — 8704

Please Respond Back By [4/15/2001] MM/DD/YYYY
                          8702

[Email]                                    [Cancel]
 8706

FIG. 87

Click any of the rows in the Transaction Summary table to view the Tour and Proposal details.

Transaction Summary — 9002

| Status | Type | SF | Space | Req By | Locations | Responses | |
|---|---|---|---|---|---|---|---|
| Oracle | Office | 5,000 | One Floor | 6/1/01 | Bethesda | 4 | View Details |
| IBM | Office | 10,000 | One Floor | 9/20/01 | Bethesda | 2 | View Details |
| SmithTech | Flex | 7,000 | One Floor | 7/1/01 | Bethesda | 7 | View Details |
| JLS Law | Office | 15,000 | One Bldg | 10/1/01 | Bethesda | 1 | View Details |
| Mack Truck | Industrial | 23,000 | One Bldg | 6/20/01 | Bethesda | 3 | View Details |

Tour Schedule - 4 locations were scheduled for a tour 5/1/01 starting at 2 Bethesda Metro Ctr. — 9004

| Tour Order | Broker | Company | Tour Time | Travel Time | Location | Address | |
|---|---|---|---|---|---|---|---|
| ① | Steve Dealer | CB Richard | 30 min | 15 min | Bethesda | 7735 Old Georgetown | View Details |
| ② | Bob Smith | Trammell | 30 min | 15 min | Bethesda | 1234 Wisconsin Ave | View Details |
| ③ | Ed Jones | Insignia | 60 min | 10 min | Bethesda | 4559 Norfolk Ave | View Details |
| ④ | Paul James | Marcus & | 20 min | 20 min | Bethesda | 98821 Easton Rd | View Details |

Tour Start Time: 9:00 A.M.   Tour End Time: 12:30

Proposal Stage - 3 requests for a proposal were emailed on 5/15/01 — 9006

| Send Proposal | Broker | Company | SF | Space | Avail By | Location | Address | Proposal Status |
|---|---|---|---|---|---|---|---|---|
| ☐ | Steve Dealer | CB Richard | 5,000 | One Floor | 8/1/01 | Bethesda | 7735 Old Georgetown | Not Sent |
| ☑ | Bob Smith | Trammell | 5,200 | One Floor | Vacant | Bethesda | 1234 Wisconsin Ave | Negotiate |
| ☑ | Ed Jones | Insignia | 6,000 | One Floor | 7/15/01 | Bethesda | 4559 Norfolk Ave | Approved |
| ☑ | Paul James | Marcus & | 5,550 | One Floor | 8/1/01 | Bethesda | 98821 Easton Rd | No Response |

9008  9000

[Create New Email Blast]  [Tour Scheduler]  [Proposals]  [Cancel]

FIG. 90

Enter the terms for which your tenant is interested. Those terms will then be Emailed to the Landlord Representative as part of your request Type  ● Office ○ Industrial ○ Flex Total SF       [ 5,500 ]  Contiguous on One Floor
Term           [ 5 ]      Years
Rent $/SF/Yr   [ $32.00 ]
Required By    [ 6/01/2001 ]  MM/DD/YYYY
Parking        [ 4/1000 ]
TI's           [ $25/SF ]

Comments:

My Tenant is motivated to and anxious to move in by June 1, 2001. Please keep In mind that Oracle is a great tenant to have in your building and holds the Highest of credit ratings.

Please respond by the end of the week. Thanks

Will Response Back By [ 4/29/2001 ]  MM/DD/YYYY

[ Send RFP ]  9102                                    [ Cancel ]

FIG. 91

Oracle Proposal Comparison

| | 7475 Wisconsin Ave<br>Bethesda, MD | 3 Bethesda Metro<br>Bethesda, MD | 2 Bethesda Metro<br>Bethesda, MD |
|---|---|---|---|
| SF Available | 5300 | 6000 | 5500 |
| Floor / Suite | 1030 | 300 | 1500 |
| Occupancy | Vacant | July 1, 2001 | June 1, 2001 |
| Rent/SF/Year | $32.50 Full Service | $30.00 Full Service | $33.00 Full Service |
| Escalation | 2.75% per year | 2.25% per year | 2.00% |
| Term | 5 Years | 3 Years | 5 Years |
| Renewal Option | Yes | Yes | Yes |
| Parking Ratio | 4.5/1000 | 5/1000 | 4/1000 |
| Parking Fee | $75 per month | $100 per month | $85 per month |
| Tenant Improvements | $15.50 per SF | $18.00 per SF | $22.00 per SF |
| Additional Storage | 500 SF | No | 1000 SF |
| Comments: | | | |
| | Respond | Respond | Respond |

Figure 96:
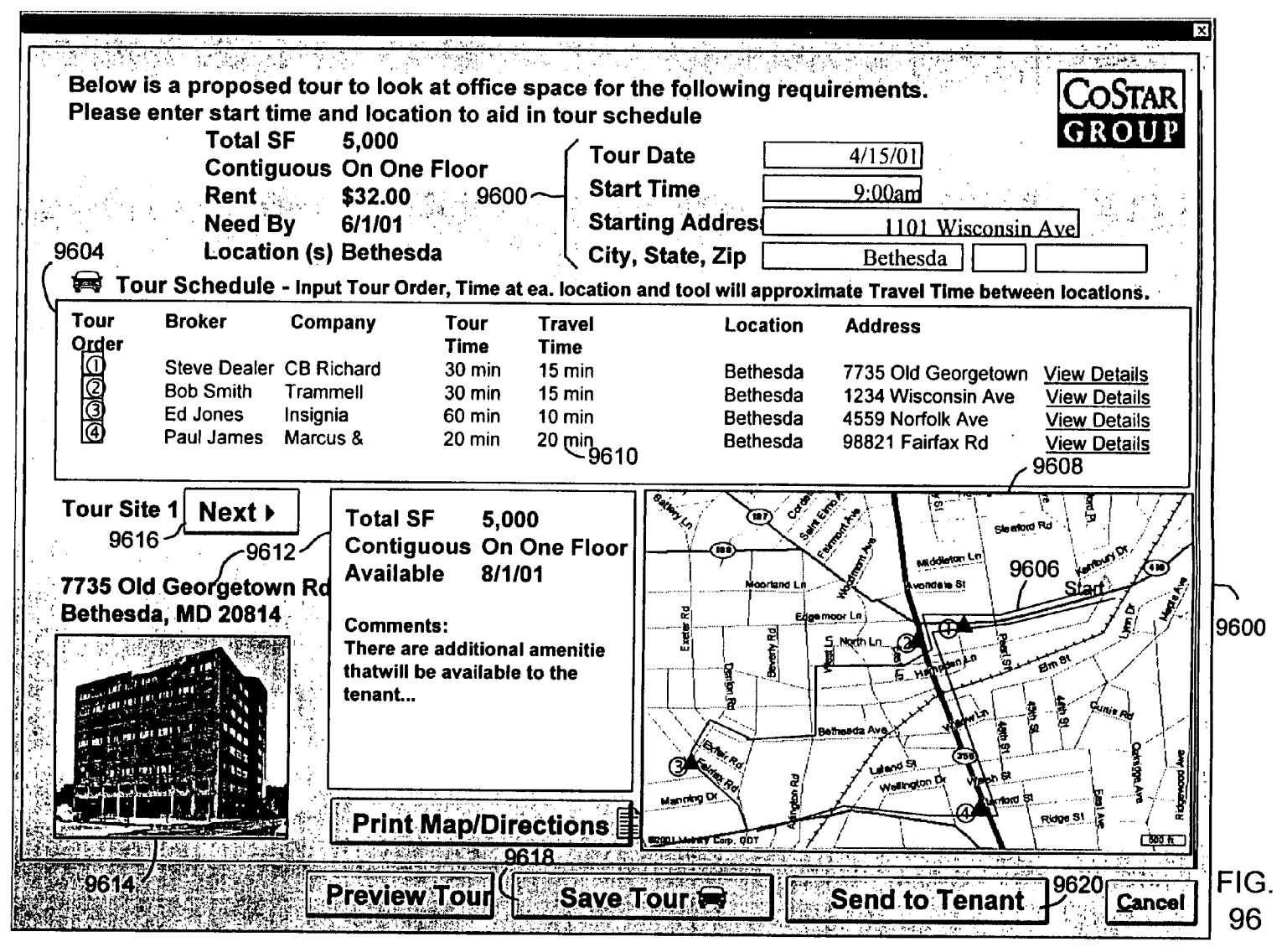

Below is a proposed tour to look at office space for the following requirements.
Please enter start time and location to aid in tour schedule Total SF         5,000
Contiguous    On One Floor
Rent              $32.00    9600
Need By         6/1/01
Location (s)   Bethesda Tour Date         4/15/01
Start Time        9:00am
Starting Address      1101 Wisconsin Ave
City, State, Zip         Bethesda

9604

Tour Schedule - Input Tour Order, Time at ea. location and tool will approximate Travel Time between locations.

| Tour Order | Broker | Company | Tour Time | Travel Time | Location | Address | |
|---|---|---|---|---|---|---|---|
| ① | Steve Dealer | CB Richard | 30 min | 15 min | Bethesda | 7735 Old Georgetown | View Details |
| ② | Bob Smith | Trammell | 30 min | 15 min | Bethesda | 1234 Wisconsin Ave | View Details |
| ③ | Ed Jones | Insignia | 60 min | 10 min | Bethesda | 4559 Norfolk Ave | View Details |
| ④ | Paul James | Marcus & | 20 min | 20 min | Bethesda | 98821 Fairfax Rd | View Details |

9610                                                                                                     9608

Tour Site 1  Next ▶
9616                       9612

7735 Old Georgetown Rd
Bethesda, MD 20814

Total SF         5,000
Contiguous On One Floor
Available        8/1/01

Comments:
There are additional amenitie
thatwill be available to the
tenant...

9614                                         9618

Print Map/Directions

Preview Tour    Save Tour    Send to Tenant    Cancel
                                                          9620

ORACLE® Space Tour

CB Richard Ellis
NAVIGATING A NEW WORLD
prepared by Steve Dealer

Tom,
Lets meet at my office at 9am on Friday April 15th. For your convenience, you will find the buildings that we are going to see listed below. For more information, click on the building image and you will see additional information along w/ floor plans and lobby shots. You can also click on the Map It button to the left to plot all the building locations. I look forward to seeing you this Friday and please feel free to send this link along to any other party in your organization that might be interested in looking at the subject properties.

Survey Criteria:
Bethesda/Chevy Chase
5,000-10,000sf avail
June 1, 2001 Occupancy
$31-$35 per square foot

Map It! — 9802
Show all properties on a map.

| Sort by: | Annual Rent | Space Available | Tour Time | Tour Location | Proposal Status |
|---|---|---|---|---|---|
|  | Building Type: Office<br>Annual Rent: $29.00<br>Comments: The tenant will also have access to the following building amenities: | Space Available: 15,500<br>Space Contig: : On One Floor | Tour Time: 9:30 6/15/01 | Location: 3492 Pender Dr. | City: Fairfax, VA |
|  | Building Type: Office<br>Annual Rent: $31.00<br>Comments: This building is centrally located to mass transit and freeway access. | Space Available: 14,000<br>Space Contig: : On One Floor | Tour Time: 9:30 6/15/01 | Location: 2557 Ellington Dr. | City: Fairfax, VA |
|  | Building Type: Office<br>Annual Rent: $32.00<br>Comments: If the tenant commits to 4+ years, the TI will be $X/SF | Space Available: 14,700<br>Space Contig: : On One Floor | Tour Time: 10:00 6/15/01 | Location: 987 Random Hills Rd | City: Fairfax, VA |
|  | Building Type: Office<br>Annual Rent: $30.00<br>Comments: Several other negotiation points will need to be discussed in person. | Space Available: 15,200<br>Space Contig: : On One Floor | Tour Time: 10:30 6/15/01 | Location: 3492 Ridgetop Rd. | City: Fairfax, VA |

ORACLE Space Tour — prepared by Steve Dealer

CB Richard Ellis
NAVIGATING A NEW WORLD

View All Properties For Lease | Email Property Information

85 Enterprise
Bldg C • Aliso Viejo, CA 92656
Neighborhood: Laguna County: Orange ◀ Previous Property | Next Property ▶

For more information contact:
John Griffin  949-851-5100
Max Wang  949-851-5100

Property

Property Description

| | | | |
|---|---|---|---|
| Building Type: | Office | Space Available: | 53,620 SF |
| Building Class: | Premiere | Annual Rent: | $28.20/SF |
| Building Size: | 114,148 SF | Typical Floor Size: | 28,500 SF |
| Year Built: | 2000 | % Leased: | 100% |
| Stories: | 4 | Elevators: | 2 |
| Parking: | Free Covered Parking at a ratio of 4 per 1,000 sf available, Free Surface Parking at a ratio of 4 per 1,000 sf available | | |
| Amenities: | Conferencing Facility, Courtyard, Day Care, Exercise Facilities, High-Speed Internet, Banking, Golf Course, Hotel, Restaurant | | |

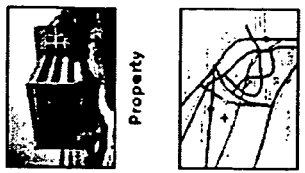
Locational Map

Typical Floor Plan

Available Space

| Floor | Space Available | Occupancy | Floor(s) | Lease Length | Use | Annual Rent |
|---|---|---|---|---|---|---|
| View 1st Floor | 53,620 SF | Vacant | 1,2 | 3 - 5 years Sublet | Office | $28.20/SF/Full Service |

Major Tenants

| Tenant | Floor(s) | Industry | Occupancy |
|---|---|---|---|
| buy.com | | | 50% |
| Kyowa Hakko, USA | 4 | Manufacturing | 1% |
| HR Link Group, Inc | 4p | | |

Map This Property

CoStar Property Query - Microsoft Internet Explorer

Address: http://property.costar.com/Property/Analytics/results_analytics_history.htm

CoStar PROPERTY®  ACME COMMERCIAL REAL DETAIL

- home page
- print
- add properties
- edit criteria
- save survey
- edit results
- lookup property
- new search
- my surveys
- update space
- help
- feedback

Results: 172 Buildings / 305 Spaces

| analytics view | summary | building view | snapshot | map view | history | forecast | deals | news |

Historical Timeline  Quarterly ▼  Overview ▼       graph                                show groupings / hide groupings

| Period | | Existing | | | | Delivered | | | Under Const | | Quoted Rate |
|---|---|---|---|---|---|---|---|---|---|---|---|
| | # Bldgs | Total RBA | Vacant SF | Vacancy | Net Absorb | # Bldgs | Total RBA | | # Bldgs | Total RBA | |
| 2002 2Q | 172 | 11,358,293 | 1,726,233 | 15.20% | -26,196 | 1 | 39,258 | | 2 | 77,000 | $17.45 |
| 2002 1Q | 172 | 11,358,293 | 1,551,614 | 13.66% | -146,914 | 3 | 143,000 | | 3 | 116,258 | $17.25 |
| 2001 4Q | 172 | 11,358,293 | 1,256,609 | 11.06% | -13,224 | 1 | 55,000 | | 6 | 256,258 | $19.74 |
| 2001 3Q | 171 | 11,117,070 | 958,000 | 8.62% | 438,876 | 3 | 39,258 | | 2 | 77,000 | $17.45 |
| 2001 2Q | 170 | 10,420,570 | 663,801 | 6.37% | 21,908 | 1 | 143,000 | | 3 | 116,258 | $17.25 |
| 2001 1Q | 169 | 10,408,210 | 698,390 | 0.00% | 61,513 | 3 | 55,000 | | 6 | 256,258 | $19.74 |
| 2000 4Q | 168 | 10,272,368 | 581,787 | 5.66% | 208,080 | 3 | 55,000 | | 6 | 256,258 | $19.74 |
| 2000 3Q | 167 | 10,075,351 | 589,687 | 5.85% | 89,343 | 1 | 143,000 | | 2 | 77,000 | $17.45 |
| 2000 2Q | 167 | 10,075,351 | 678,553 | 6.73% | 163,963 | 3 | 55,000 | | 3 | 116,258 | $17.25 |
| 2000 1Q | 167 | 10,075,351 | 832,865 | 8.27% | 2,376 | 3 | 55,000 | | 6 | 256,258 | $19.74 |
| 1999 4Q | 166 | 10,026,256 | 775,165 | 7.73% | 63,506 | 3 | 55,000 | | 6 | 256,258 | $19.74 |
| 1999 3Q | 166 | 10,026,256 | 857,054 | 8.55% | 61,215 | 1 | 39,258 | | 2 | 77,000 | $17.45 |
| 1999 2Q | 164 | 9,692,938 | 588,472 | 6.07% | -19,988 | 3 | 143,000 | | 3 | 116,258 | $17.25 |
| 1999 1Q | 164 | 9,692,938 | 569,644 | 5.88% | 24,225 | 3 | 55,000 | | 6 | 256,258 | $19.74 |
| 1998 4Q | 478 | 8,398,221 | 1,156,365 | 13.8% | 73,713 | 1 | 39,258 | | 2 | 77,000 | $17.45 |
| 1998 3Q | 482 | 8,580,789 | 1,375,098 | 15.8% | (19,495) | 3 | 143,000 | | 3 | 116,258 | $17.25 |
| 1998 2Q | 481 | 8,541,221 | 1,298,343 | 15.2% | 1,022 | 3 | 55,000 | | 6 | 256,258 | $19.74 |
| 1998 1Q | 478 | 8,398,221 | 1,156,365 | 13.8% | 73,713 | 3 | 55,000 | | 6 | 256,258 | $19.74 |

FIG. 12b
Map/Database Retrieval Methodology
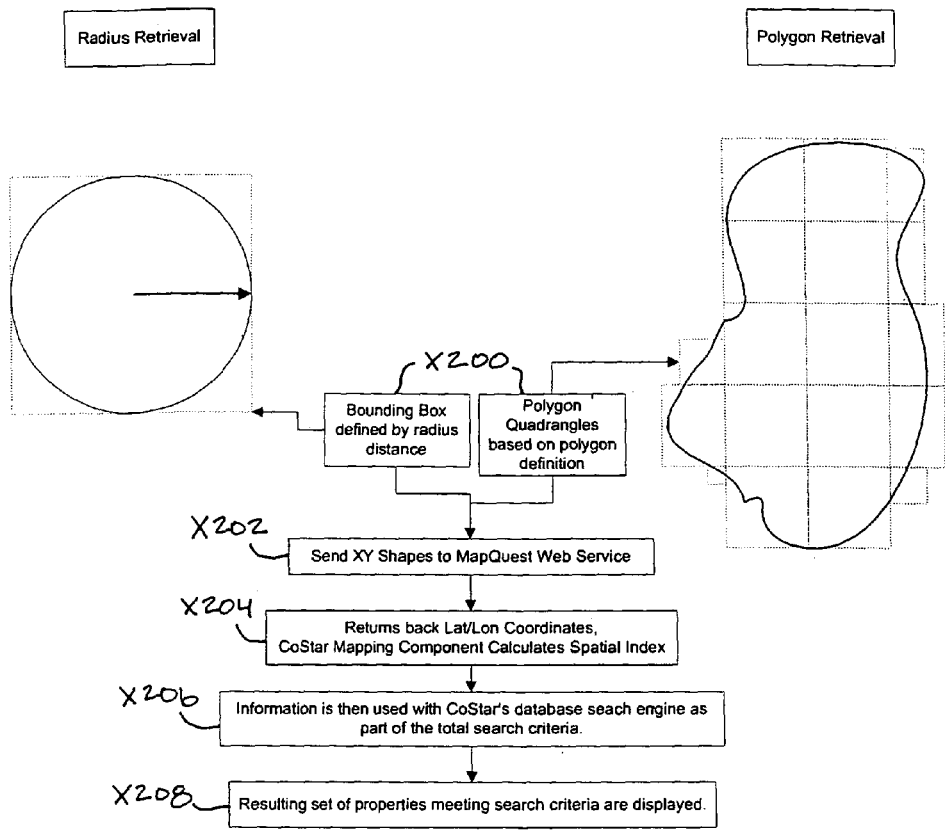
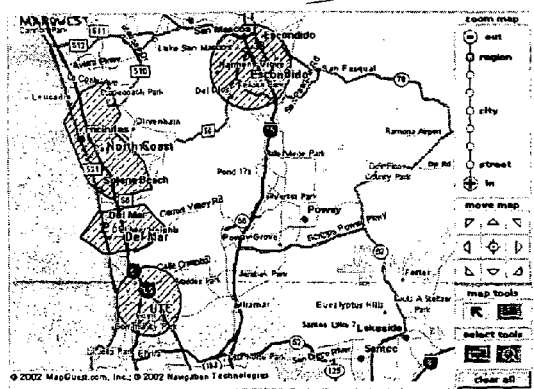

SYSTEM AND METHOD FOR ACCESSING GEOGRAPHIC-BASED DATA

This application is a continuation-in-part of application Ser. No. 10/256,197, filed Sep. 27, 2002, which is a continuation-in-part of application Ser. No. 09/973,703, filed Oct. 11, 2001, which is a continuation-in-part of application Ser. No. 09/693,988, filed Oct. 23, 2000 now U.S. Pat. No. 6,871,140.

BACKGROUND

1. Field of the Invention

The present invention broadly relates to the field of electronic commerce and global network information management services, and particularly, to a system and method for creating a unified commercial real estate data model through collection, distribution and use of information in connection with commercial real estate and web-based information systems that facilitate the buying and selling of commercial real estate. More specifically, the present invention relates to a system and method for providing communication and analytical tools that interface with a commercial real estate database and support commercial real estate transactions between parties. These communication and analytical tools include: 1) a survey tool; 2) a commercial real estate transaction tool; 3) a tour scheduling tool; 4) an activity summary tool; 5) a tool for analyzing commercial real estate data; and 6) a map search tool.

With respect to the map search tool, the present invention provides a system and method for providing, through a single integrated interface, remote access to integrated databases containing, for example, commercial real estate data, and for remote access to applications that manipulate the data in the integrated databases. Specifically, the present invention relates to the retrieval of geographic-based data from the databases using shapes drawn on a map, or alternatively on an aerial photograph.

2. Background of the Invention

Whether measured in terms of variety, volume, or value of transactions, the market for commercial real estate information is vast. In 1998, the U.S. commercial real estate market had: hundreds of thousand of leasing transactions, with an aggregate value of more than $200 billion, and had tens of thousands of sales transactions, with an aggregate value of $285 billion. In the same year, lenders, provided tens of thousands of commercial real estate loans, with an aggregate net value of more than $110 billion, according to the Federal Reserve Board. F. W. Dodge reports that during 1998, construction commenced on 766 million square feet of commercial properties with an aggregate value of $52 billion. Finally, vendors made $10 billion in sales to tenants who were moving to new facilities, according to the Corporate Realty Design and Management Institute.

Despite its enormous size, the real estate industry in many ways is a backwater. In the current market, real estate brokers perform various functions. To begin with, individuals, institutions, and owner/users buy and sell buildings. The aggregate sales value of commercial properties sold in the United States in one year is about $285 billion, according to a Federal Reserve estimate. Most transactions occur through the use of a commercial real estate broker, whose job is to list the asset for sale, disseminate the correct information, respond to questions and requests for specific information, attempt to create an auction atmosphere, and complete and close a sale. Brokers typically receive between 1% and 6% of the sales value of the property, with the lower commission rates corresponding to higher sales values.

Below a level of, about, $5 million, sales are typically locally sourced to local users or individuals or small institutions. Beyond $5 million and, more acutely, past $10 million, the market becomes more regional as the buyer base narrows. Above $25 million, the market becomes institutional in the sense that the potential buyers are REITs, pension funds, advisors, or corporations. At this level the market becomes national and, to some extent, international. It is critically important to limit the dissemination of information in this context.

In addition, every building that is not owner occupied must be leased. Brokers usually take one side of the transaction as either the listing broker or the tenant rep. Listing brokers list the space for the property owner and attempt to drum up interest in the space with flyers and information packages. Brokers also typically specialize in a type of property and in a region, so their added value is in knowing who is most likely to want a specific space for lease. Tenant representatives usually represent the tenant and are specifically looking for space for expansion or to enter a new market. Tenant representatives consolidate all the listing information from the listing brokers in a market for a specific type of space, conform the package, and help the user make an informed decision. Many individual brokers do both.

The real estate industry is so large and fragmented that, historically, there has been no meaningful national research. Research that does exist is typically local or regional in nature, frequently limited to occupancy and rental rate information, and most of the time only marginally accurate. From market to market, different data was kept by the administrative assistant for a couple of local brokers, who would then hold that out as proprietary knowledge in that particular market. Ten years ago, this was out of date; by today's standards, it is completely useless. With the trend towards much more liquid real estate markets and the dominance of large regional and national tenants and capital providers, the need for accurate national data has become acute.

At present, however, transaction costs are high, and information is non-standardized as states, cities, and local communities all have their own rules and regulations. To add to the milieu of confusion, investors and owners frequently have different tax statuses, so comparisons are never apples-to-apples. Brokers typically use this to their advantage—their pitch becomes "I am the only one that knows all this stuff, and if you don't use me, what you don't know can hurt you." A helpful way to think about this would be to imagine that each securities brokerage firm maintained its own exchange, instead of them all feeding the NYSE and NASDAQ. Clients would have little chance of getting the best execution since there would be a closed market only. To some extent, real estate has operated this way historically, except that each of the brokerage firms referred to these closed networks as "proprietary information."

Over the past 15 years, however, a new class of investors and users has opened up the business. National institutional owners like the REITs and large ERISA managers like Jones Lang LaSalle have created a need for standardized, reliable information and processes. This, in turn, has led to a mass consolidation among the smaller local and regional brokers. This trend toward a national information standard is becoming more powerful. The old model of the local power broker is being replaced by a single-point-of-contact model for national real estate companies, in which client needs are met with just one relationship. The only way a small brokerage firm can level the field is by having access to the same information as the larger brokers.

It has been long demonstrated in other contexts, e.g., the securities industry, that distributed information improves market efficiency. In the securities industry each broker has a system on their desk that gives them access to standardized, accurate securities pricing information. Largely, information is collected by the exchanges and consolidated into a standard system of quotes and news. The vendors of the information try to figure out the best way to graphically present the information and to price the data feed to maximize revenue. For the most part, the major quote and information providers are all providing the same thing. The present invention relates to a way of applying this approach to real estate information. By centralizing and standardizing the information, it has made it much more user friendly and, hence, valuable. It has created a digital exchange with itself as the sponsor.

To facilitate transactions, industry participants must have extensive, accurate, and current information. Members of the commercial real estate and related business community require daily access to current data such as rental rates, vacancy rates, tenant movements, supply, new construction, absorption rates, and other important market developments to carry out their businesses effectively. Such data collection is time-consuming, as shown by a 1996 study, which found that commercial real estate professionals spent 40% of their workday collecting and analyzing information on the real estate market. Therefore, there is a need for a unified commercial real estate data model to develop an efficient marketplace, where members of the commercial real estate and related business community can exchange information, evaluate opportunities using national standardized data, and interact with each other on a continuous basis.

The parties involved in the commercial real estate and related business community that require extensive information, include: sales and leasing brokers; property owners; property management firms; design and construction firms; real estate developers; real estate investment trusts; investment banks; commercial banks; investors and asset managers; government agencies; mortgage-backed security issuers; appraisers; media; tenant vendors; building services vendors; communications providers; insurance companies and institutional advisors.

The commercial real estate related business community has yet to develop an efficient marketplace because of the fragmented approach to gathering and exchanging information within the marketplace, i.e., the lack of a unified data model. Various organizations, including hundreds of brokerage firms, directory publishers, and local research companies, have attempted to collect data on specific territories and to develop software to analyze the information they have independently gathered. This fragmented approach resulted in duplication of effort in the collection and analysis of information, excessive internal cost, non-standardized data with varying degrees of accuracy and comprehensiveness, and a large information gap.

The creation of an efficient digital marketplace for commercial real estate requires a unified data model—an infrastructure of a national, standardized database, accurate and comprehensive research capabilities, and intensive, real-time participant interaction. The global information network or Internet can help maximize interaction among participants in a marketplace. The Internet has emerged as a mass communications and commerce medium enabling millions of people worldwide to share information, create communities among individuals with similar interests, and conduct business electronically. International Data Corporation projects that the number of Internet users will grow from 100 million in 1998 to 320 million in 2002. In addition to its emergence as a mass communications medium, the Internet has features and functions that are unavailable in traditional media, which enable users to: communicate or access enormous amounts of information at low cost and without geographic limitation; access dynamic and interactive content on a real-time basis; and communicate and interact instantaneously with a single individual or with entire groups of individuals.

Along with the impressive overall growth of the Internet, business-to-business usage is also growing rapidly, as businesses are increasingly leveraging the Internet's ability to reach clients globally, deliver personalized content, and open new distribution channels. Forrester Research projects business-to-business electronic commerce to grow from $17 billion in 1998 to $327 billion in 2002.

It is in this context that there remains a need for a system and method for creating a unified commercial real estate data model through collection, distribution and use of information in connection with commercial real estate and web-based information systems that facilitate the buying and selling of commercial real estate. The collection, distribution, and use of information would preferably include the ability to search all commercial real estate data, across multiple markets, geographic regions, brokerage listings, and data categories and types. The desired system and method would also preferably indicate the timeliness and reliability of the information, and would present the information through intuitive, convenient user interfaces.

The present invention also relates to a method and system for listing and brokering a commercial real estate and its financial derivatives. An underlying principle of commodities, equities, or bond trading is that the asset sought to be traded have an intrinsic value which can be determined, usually by a market exchange, and that that value will shift based upon the vagaries of the market. The determination of market value can be aided by systems such as that described in U.S. Pat. No. 4,713,761, System for Centralized Processing of Accounting and Payment Functions, issued Dec. 15, 1987 to Sharpe et al., and in U.S. Pat. No. 5,222,018, also for a System for Centralized Processing of Accounting and Payment Functions, and issued Jun. 22, 1993 to Sharpe et al. These systems merely provide a revenue or cost value, which can then be used by analysts in determining a market value for the listed commodity. The ability to extract historical financial and market information, and to evaluate shifts due to events that pressure those markets, has been addressed by such art as U.S. Pat. No. 5,414,838 for A System for Extracting Historical Market Information with Condition and Attributed Windows, issued May 9, 1995 to Kolton et al. Again, the element of speed in reacting to the vagaries of the market provides the asset trading markets with winners and losers on a day to day basis. Transaction time for financial markets has been addressed by such art as U.S. Pat. No. 5,420,405 for a Secure, Automated Transaction System that Supports an Electronic Currency Operating in Mixed Debit and Credit Modes, issued to Norman E. Chasek on May 30, 1995.

U.S. Pat. No. 5,724,524 to Hunt, et al. describes a Method and System for Listing, Brokering, and Exchanging Carrier Capacity in which listing, brokering, and exchanging a commodity requires identifying a plurality of characteristics of the particular commodity, and then entering those characteristics into the database of a data processing system utilizing a real-time clock. An exchange market for the commodity is established based upon a pre-selected set of its characteristics. After a market price for the commodity has been set, a class (or classes) of financial derivatives is established together with a financial exchange market for those derivatives. The characteristics of the derivatives comprise: a common descriptive link between varied commodity types; a contract length that runs from the purchase date of the contract to the performance date for the commodity; and, a contract price.

In the context of commercial real estate, there has heretofore been insufficient reliable information to create derivatives based on the commercial real estate market. It is an object of the present invention to provide a system and method that support the creation of financial derivatives for commercial real estate. More specifically, it is an object of the present invention to shift the financial burden of long-term leases through the financial markets by providing an opportunity to hedge against the future. While the landlords would have to guarantee that capacity will be available at a time when it is required, the financial burden of the landlords will be minimized by making capital available up front in exchange for capacity later. A further object of the present invention is to provide the financial markets with an ability to trade commercial real estate space as a tangible commodity by providing the method and means for doing so.

There is also a need in the prior art for real-time remote access to geographic-based data, such as commercial real estate data. In addition, there is a need for an intuitive and convenient tool for searching and accessing the geographic-based data.

As used herein, "Commercial Real Estate" means any real property, including, without limitation, office, retail and industrial rental space, a building, and multiple buildings for use by a business entity, or one or more facilities or buildings that a business entity occupies for the purpose of conducting its operations on a routine and ongoing basis.

"Market" means a geographic region, e.g., the Washington, D.C. metropolitan area, that includes all buildings or potential buildings available for business occupancy, with boundaries that are consistent with U.S. Census standards and that are generally accepted definitions of metropolitan areas.

"Submarket" means a geographic area as a subset of a Market and that includes buildings or potential buildings available for business occupancy, with boundaries generally accepted by local real estate professionals.

"Grade" means the designated quality of real estate on a relative scale of quality, based primarily upon a generally accepted classification structure, such as Class A, B or C properties. Real estate experts familiar with the classification systems and with generally accepted standards can provide this "grade" designation.

"Rent" means the annual amount paid by a business entity for rights to occupy real estate.

"Vacancy Rate" means the percentage of square feet that is offered for lease in a market, submarket, or building.

"Absorption" means the net reduction in vacant square feet over a defined period (typically, twelve-months) resulting from new tenants, new construction, and lease terminations.

"Comparable Real Estate" means real estate that is approximately equivalent in Rent, Grade, Use, and/or location to the business entity's Real Estate.

"Area" means an indicator of economic attractiveness of the submarket where the real estate is located; and it is based, for example, upon rents, vacancy, absorption rate, and/or other measures of economic attractiveness of a submarket.

"Risk" means an indicator of the financial, market and environmental exposure of real estate and of the financial, market and environmental risks associated with the employees and the business entity's occupancy in the real estate.

"Owner" or "Owner's representative" means anyone acting on behalf of an owner, including for example the owner's broker, the owner's property manager, and the owner herself.

"Seller" or "Seller's representative" means anyone acting on behalf of a seller or potential seller, including for example the seller's broker, the seller's property manager, and the seller herself. The seller represented by the seller or seller's representative includes potential sellers and those actually selling.

"Buyer" or "Buyer's representative" means anyone acting on behalf of a buyer or potential buyer, including for example the buyer's broker and the buyer himself. The buyer represented by the buyer or buyer's representative includes potential buyers and those actually buying.

"Confidentiality agreement" means a legal, binding contract requiring parties to the agreement to treat certain information as private and not for publication. For example, in the context of real estate, a confidential agreement requires that a buyer keep a property listing confidential in return for viewing the property listing. As used herein, "non-disclosure agreement" is synonymous with "confidentiality agreement." Executing and submitting confidentiality and non-disclosure agreements can occur, for example, by clicking-through an "accept" button for an agreement posted online or by exchanging electronic documents having electronic signatures.

SUMMARY OF THE INVENTION

An object of the present invention is to provide a system and method for creating a unified commercial real estate data model through collection, distribution and use of information in connection with commercial real estate and a web-based marketplace that facilitates the buying and selling of commercial properties.

Another object of the present invention is to provide a web-based information distribution system that supports the efficient and secure buying and selling of commercial properties.

The present invention provides a unified, robust, and unbiased Internet marketplace for commercial real estate. The system has access to databases containing independent and comparable data on commercial real estate, which are continuously assembled and updated by professional researchers. The system includes a database detailing office and industrial space in the subject market that is comprehensive, accurate, and up-to-date. The system also includes a tenant information database of information about tenants that allows users to identify and target the most likely tenants to lease space and determine the underlying demand for commercial real estate in their market.

This broker-centric model of the present invention enables sellers to reach a larger and more qualified universe of buyers, and enables buyers to more quickly and effectively find and evaluate commercial properties for sale by instantly referencing correlating web-based information. The present invention features properties for sale, including correlating content on comparable sales, for-lease space availability, commercial real estate inventory and market statistics, tenant information, and an image library of building photographs, floor plans, aerials, and maps. It also includes background information on buyers, sellers, lenders, owners, principals, and service providers.

The system of the present invention allows real estate buyers to review potential deals through a search engine that matches properties for sale with buyers' investment criteria. The system speeds up the commercial buying process and does what electronic trading of securities through NASDAQ did for the over-the-counter market by creating an open, efficient market for commercial real estate.

Currently, sellers of a property hire a broker to market the building. Usually that broker shows the building to a limited number of prospective buyers, institutions, or private buyers with whom the broker has some personal connection. The system of the present invention site allows sellers and their brokers to advertise a building for sale to a much broader audience, but in a controlled manner: buyers have to prove they are serious and have the resources to buy the property before they can see any in-depth details.

At the same time, buyers can input various criteria such as price, size, location, and desired vacancy rates and receive a list of available properties. When a seller shows a prospective buyer a package of information about the property, the buyer can independently verify statistics about the building like rent rolls, tenant base, and comparable sales prices for similar buildings in the market by trawling through the system's databases, which are compiled by researchers.

By acting as an independent collecting information through independent researchers, the system short-circuits the buyer's analysis process on any given property. In this way, the system eliminates the need to expend time, money, and effort only to find out that data provided by the seller was misleading.

In the currently preferred embodiment, the service is free for sellers and their brokers, while buyers and their brokers pays a subscription on a sliding scale from $250 a month up to $20,000 a month, depending on the size of the buying entities.

The system provides an interactive marketplace that enables brokers to reach a larger and more qualified universe of buyers and sellers faster, thus helping them complete transactions more rapidly, efficiently and cost effectively—through the Internet. The system is capable of providing information on thousands of properties for sale, including correlating content on comparable sales, for-lease space availability, commercial real estate inventory and market statistics, tenant information, and an image library of building photographs, floor plans, aerials, and maps. The system can also provide background information on buyers, sellers, lenders, owners, principals, and service providers.

The present invention provides a digital marketplace in which the members of the commercial real estate and related business community can continuously interact and facilitate transactions by efficiently exchanging accurate and standardized information.

The system of the present invention also facilitates mortgage lending. In particular, since reliable information concerning all factors needed to evaluate a commercial loan application, e.g., the building characteristics and the information concerning prospective borrowers, are accessible to the system or maintained within the system, the system facilitates matching borrowers with lenders. Alternatively, the system lists all available lenders, either generally or only those lenders that are willing to lend money for a particular property. The borrower can click on a particular lender and obtain information or submit information for loan pre-approval.

The system of the present invention provides enough information to allow lenders to actually underwrite a property. Based on the property information, the lender is able to commit to a particular loan regardless of who is buying the property, subject only to verification of credit information. The system allows a lender to offer better terms to a strong borrower. Lenders recognize the value of such a system, but, as yet, have been unable to create suitable automated underwriter systems that pull in discrete, disparate data fields and create massive automated valuation underwriting. Lacking the unified data model, lenders heretofore have had to pull data from various systems making it extremely expensive to underwrite a property. As such, lenders, to reduce costs, have had to be very selective in choosing systems from which to pull data.

There are three levels associated with underwriting properties and with establishing an underwriting marketplace. The first level involves simply providing quotes and information on loan programs and then matching that to people's requests. The second level involves 'soft quotes'—in which the system provides enough property information for lenders to provide a commitment of loan quotes on a non-request basis. This second level allows lenders to proactively market loans instead of responding back to requests for information.

The third level is refinancing. The system and method of the present invention make it possible for lenders to send pre-approved loans to the owner of any building, whether or not the owner is seeking to sell or refinance. Most owners are not currently marketing their property for sale or refinancing. However, owners may still be receptive to profitable offers. The unified data model of the system of the present invention allows lenders to go into the broad universe of all the properties stored on the database of the present invention and create a pre-approved credit line or a pre-approved loan for these different properties. Moreover, for certain properties, the unified data model of the system of the present invention has enough information to underwrite the loan. The system of the present invention has enough information to actually submit pre-approved offers and provide soft quotes. In contrast, without the unified data model and system of the present invention, the expense of underwriting loans is so large that lenders cannot process loans for under a certain amount. The invention therefore allows lenders to considerably increase their loan volume and brings much liquidity to the marketplace. Everyone is able to find out the best possible loan that one could obtain on his property.

As a further aspect of the present invention, a lending product is provided on the system that lists every lender that the system tracks. The present invention enables customers to click on a lender's name in the list to request a free package of materials from that lender. The system facilitates this communication between the customer and a prospective lender.

The system uses linked databases and computers to provide a wide array of digital service offerings including a leasing marketplace, a selling marketplace, decision support, tenant information, comparable sales information, property marketing, and industry news. All of these services are preferably digitally delivered and most clients receive daily service updates over the Internet.

The system includes a comprehensive database of information that is relevant to commercial real estate transactions, a research department for updating the information, and links, through the Internet, for example, to participating organizations and other users. The database of the preferred embodiment has been constructed over more than a decade by a research department that now makes over 1.8 million updates each year to the database. The system has obtained and assimilated over 50 proprietary databases. The database now covers 54 commercial real estate markets in the United States. It tracks over 15 billion square feet in over 350,000 properties, including more than $40 billion in properties for sale, and over 900,000 tenants. It is estimated that 36,000 participating companies use the marketplace of the present invention to distribute information on their properties. Of these participating companies, approximately 3,600 are clients, representing 25,000 end-users, who subscribe to the services to facilitate transactions, market services and properties, and conduct market research.

The system of the present invention provides a digital commercial real estate marketplace that takes advantage of network effects. The digital marketplace can be used by and deliver value to several distinct categories of users. To begin with, a large percentage of the commercial real estate industry participating companies use the marketplace to distribute information on their properties. Some portion of these participating companies, are subscribers that pay for enhanced access or additional information or related services to facilitate transactions, market services and properties, and conduct market research. A significant aspect of the present invention is that the users, including clients and other members of the commercial real estate and related business community, assist the system operator by continuously updating the marketplace data. Each day thousands of updates to the marketplace database are made. The resulting information is distributed via the Internet, creating a more dynamic and efficient market for transactions involving the commercial real estate and related business community.

The system of the present invention capitalizes on the information accumulated in the digital marketplace to create a high value-added, full-service solution for users. The system of the present invention provides the following services:

Digital leasing marketplace—provides the information required to efficiently conduct commercial real estate leasing transactions, both between brokers and between owners and brokers. This service provides a more comprehensive solution with much higher data quality, at substantially less time and cost.

Digital selling marketplace—provides the information required to efficiently and securely conduct commercial real estate buy and sell transactions. This service benefits users by allowing purchasers to make more-informed investments and sellers to maximize realized property values.

On-line decision support services—allow members of the community to perform an analysis of underlying market conditions and trends when making investment, leasing, purchase, sale, build, and marketing decisions involving commercial real estate. These services benefit users by providing more powerful, flexible, time-efficient, and accurate analytic capabilities.

Comparable Sales Information—enables members of the real estate community to evaluate property value by analyzing comparable sales information including information on sale prices, income and expenses, capitalization rates, loan data, and other key details. This service provides a database searchable by such parameters as location, property type, square footage, price range, and number of units.

Tenant information services—enable members of the commercial real estate and related business community to identify and market to the tenants who are the most likely prospects for their goods and services. These services benefit users by more precisely identifying and capturing viable prospects at a lower cost.

On-line property marketing—provides a unique on-line means for the commercial real estate and related business community to direct advertising to the appropriate decision-makers. This service benefits users by providing them increased distribution, higher visibility, and a more cost-effective way to reach their targeted audience.

On-line industry news—allows members of the commercial real estate and related business community to remain current with developments in the industry. These services benefit users by providing more timely and in-depth news.

All of the foregoing services can be digitally delivered via the Internet or through other forms of downloads. The increased availability of services from a web-based platform will allow the commercial real estate and related business community real-time access to the digital marketplace data and provide the opportunity for increased interaction among community members. The practical result of this increased interaction is the development of a more efficient commercial real estate marketplace.

The system of the present invention uses the latest technology to continuously improve data collection, enhance sales efforts and service capabilities, and control costs as the marketplace framework and unified data model is built. The system preferably uses a mobile information-collecting device that is equipped with a GPS system and a link to the databases of the system of the present invention. The device further includes a display screen and input device, and can also include a web camera. As detailed below, the system is able to provide location-sensitive real estate information automatically, and to perform other useful tasks by correlating a vehicle's instantaneous position to data stored in a remote database to identify geographically pertinent information and transmitting the geographically pertinent information to the truck for display on the display panel within the truck. Optionally, the mobile information-collecting device also includes audio capabilities and the geographically pertinent information includes audio data, such that the device, for example, plays a voice describing the geographically pertinent information to the occupant of the mobile information-collecting device.

In addition, the system uses global satellite positioning and the Internet to coordinate remote field research vehicles equipped with GPS transponders, laptop computers, cellular communications, and laser measurement devices, to provide the most precise and timely inventory of available buildings.

The system also integrates a wide client and property information management system with a telecommunications system and database to allow the sales force, research staff, client-service staff, and accounting department to develop a coordinated sales, research, and account management effort. This enterprise-wide system also assists management in improving quality control and training.

The system also includes equipment to collect architectural photographs digitally so that the system can move the images into a database substantially faster and at lower cost.

Thus, the present invention provides the first national and standardized source for commercial real estate metrics that is comparable between geographic territories. For example, the definitions of vacancy rates and building classifications have varied among the different providers of real estate information. Through national presence and uniformity of services and data across all markets, the system provides a foundation for members of the commercial real estate and related business community to do business on a national basis. Leading firms within the community conduct business efficiently in multiple local markets by standardizing their internal systems on the proprietary database of the present invention.

The system of the present invention provides a unified data model that allows insight into relationships that were only inferred in the past.

The system of the present invention includes a variety of features that are useful for those within the commercial real estate field and elsewhere.

For example, the system provides fraud detection—by alerting brokers/owners that their property is being marketed—any person (subscriber or not) can see "my listings," which includes identification of properties that they own/represent that are shown as being on the market.

The system of the present invention also provides intelligent searching—the query system allows the user to add/remove terms from the search without rerunning the entire search. This allows users to refine searches. The ADD/DELETE feature lets the user narrow the user's existing search results by adding search terms to the user's original search request. The search software retains the user's original search request and corresponding search results.

To perform an ADD/DELETE Request, the user follows the following steps:

1. Once the user has completed a search request that returns search results, the user selects ADD/DELETE from the Search menu or clicks the ADD/DELETE button in the software's toolbar.
2. The user then enters a complete ADD/DELETE request. If the user is using the Graphical Interface, the user enters the ADD/DELETE request in the ADD/DELETE Search Request field.

The software returns focused search results through which the user can browse as the user normally would.

The user may want to narrow the scope of the user's search if the search results contain too many documents. Or, after reviewing the user's search results, the user may want expand the scope of the user's search. The user can make these adjustments by modifying the user's original search request to include additional connectors and/or search terms—all without losing the user's original search results. Narrowing the scope of search results is described herein as running a query on a query or running a negative search query.

The present invention also provides a database of nationwide commercial real estate information, in which each data entry is assigned a market and an information category. Accordingly, the present invention allows the user to execute searches based on market criteria (e.g., geographic region) and information type (e.g., a particular category of real estate data, such as a for-sale property, a for-lease property, a comparable sale listing, or a tenant listing). In addition, in a further embodiment, the present invention provides each user with a subscription status that dictates in which markets and information categories the user can search. For example, a user who subscribes to tenant information in the Mid-Atlantic region could conduct an unlimited amount of searches for tenants within that region for no additional cost above the periodic (e.g., monthly) subscription cost.

In some circumstances, however, a user may wish to obtain information beyond the information category to which the user subscribes. For instance, a user who subscribes to for-sale property information may want to learn more about the tenants of a particular building that the user is considering purchasing. Thus, this embodiment of the present invention enables a user to purchase one-time searches outside of the user's subscription status. In this way, a user who subscribes to searches in one market or information category can conduct one-time searches in other markets or information categories.

In accordance with another aspect of the present invention, information regarding tenants is gathered and stored in a central database, and is associated with building information. This makes it possible, for example, to graphically depict the occupancy of a particular building.

Another aspect of the present invention provides a tenant information database that contains tenant information from a plurality of markets (e.g., regions of the United States) across which a user can search. A user can cross-query the multi-market database to look for particular tenant information, such as the properties leased by a specific tenant, all of the tenants that occupy a particular building, or all of the tenants that meet a certain criteria (e.g., occupy 500,000 square feet or more).

Another aspect of the present invention provides a comparable sales database that contains information on comparable sales properties, and that associates each entry with a "quality" identification that indicates its degree of reliability and/or timeliness. The quality identification enables a user to better analyze and use the comparable sales information. As an example, the quality identification could include one of three categories: 1) verified comparable sales, 2) unverified comparable sales; and 3) for-sale properties. In this manner, the system of the present invention allows users to search all relevant comparable sales information, while at the same time calling to the user's attention the quality of the search results.

The system of the present invention also provides a unique method for searching for property within a geographical area using a map linked to a database that stores geographically pertinent information. As an example, the map includes icons showing the locations of properties for which the database has information. As a user drags a mouse pointer over an icon, a window pops-up displaying the geographically pertinent information from the database. For example, the information in the window could include a photograph of the property along with its sales price.

The system of the present invention also provides confidentiality assurance through a system for controlled dissemination of information.

The system of the present invention provides and facilitates "soft quotes," pursuant to which lenders offer loans on specific buildings subject only to qualification of buyer and possible discount for premium buyers.

The system of the present invention also provides and facilitates unsolicited refinancing offers for owners of buildings. In this way, the system allows building owners to take advantage of opportunities created by changes in rates and increased information available.

The system of the present invention also provides and facilitates creation of a derivatives market/futures market for commercial real estate.

The system of the present invention also provides a mobile data gathering and dissemination vehicle as well as a system tracking and dispatch of mobile vehicles. The system of the present invention further provides correlation of data stored in a remote location to vehicle position in real time. This feature is useful in the context of commercial real estate, residential real estate and as part of a merchant directory.

The system of the present invention also provides a least cost routing for data transfer system for transmitting data from the mobile vehicle.

The system of the present invention also synchronizes data stored in data sources by cross-checking data sources and prompting the input agent to make necessary changes in affected databases.

The system of the present invention also provides an investment advisor feature that provides relevant information such as: what is the leasing history of specific building? what is the history of market in that area? what is the history of the building relative to market (is the building generally one of the first to fill up)?

The system of the present invention also provides an intelligent assistant for assisting in setting prices based on the saved searches of users, i.e., knowing what other users (buyers) are looking (searching) for. The system could, for example, advise the user that "if you set the price at X level you will hit Y pending searches, but if you set the price at X' level you will only hit (Y-n) pending searches." The system thus allows queries against pending searches so that the user knows what people are looking for.

The system of the present invention also provides quick alerts when saved searches are satisfied to support user investment strategies. In particular, the system notifies the user by wireless messaging and/or e-mail as soon as a property matches existing search criteria. In accordance with a particularly important aspect of the present invention, this feature applies to searches that are satisfied as a result of changes in market conditions that bring a previously listed property within the investment criteria.

The system of the present invention in general employs the unified data model to enhance knowledge of the overall context of business decisions, for example, buying versus leasing.

The system of the present invention makes it possible for a user to extract data relating to virtually every aspect of a commercial real estate transaction. Although the data is described as being contained within a "database," data can be stored in a plurality of linked physical locations or data sources. The significant aspect is that the database contains information relating to areas that have previously been only accessible in isolation from one another. By providing a unified data model and a system for forming a variety of queries against the unified database, it is possible to understand with precision the relationship between market factors that have heretofore only been understood in an anecdotal way.

For example, prior to the present invention, a commercial real estate investor might have recognized the value of investing in a particular building that had low vacancy but was located in an area of extremely high vacancy. If so, this investor might also be interested in knowing that a building that is on the market has lost a big tenant.

Prior to the system of the present invention, however, there has been no unified way of storing an investor's investment criteria and continually monitoring the market so as to have the ability to provide a real-time alert when a property matching the investor's investment criteria has become available. This advantage is achieved because databases containing leasing information are linked with databases concerning buildings for sale, which are linked to databases that store a particular investor's investment criteria, which are linked to databases that store the data necessary to determine market conditions, and so on. It is through the connections of previously discrete databases that the synergies and advantages of the present invention arise.

In this sense, the present invention resides in the interconnection of related pieces of information that allows a true understanding and deep appreciation of a commercial real estate market. The user of the system of the present invention has the ability to understand data in context, because the data in one data source is influenced by other data sources that have heretofore not been connected.

The data stored in the databases of the present invention is from various sources. For example, property information can be obtained by researching information sold and information available. Tenant information can be obtained through personal inspection of properties and from brokers. Market analytics are obtained through an historical analysis. In addition, tax assessment information provides yet another source of information.

To gather this data, an aspect of the present invention provides a coordinated method and system for collecting data for a commercial real estate database having distinct but related categories of information. According to this embodiment, the system enters information concerning one category of information into the database, and then determines the relevance of that entered information to other categories of information. If the entered information is deemed relevant to a second category of information, then the system notifies a researcher responsible for collecting data for the second category of information. The system then provides the researcher with the entered information.

The coordinated research of this embodiment demonstrates the value of having a fully integrated database, which, in this instance, relates to commercial real estate. Another advantage afforded by a comprehensive integrated commercial real estate database is the ability to link comparable sales records to current lists of tenants in particular buildings.

Another way of gathering information is through mobile information-collecting device, according to another aspect of the present invention. The mobile information-collecting device is a truck or other vehicle that is equipped with a GPS system and a link to the databases of the system of the present invention. The device further includes a display screen and input device, and can also include a web camera. The system is designed such that the location of the truck or other mobile information gathering device at any particular instance is correlated to the database so that information concerning properties in the vicinity of the truck is automatically displayed on the display screen located in the truck. Thus, as a truck passes a particular commercial real estate building, information pertaining to that building is displayed, and the operator can determine whether additional information has to be gathered or whether information obtained in the database should be modified. The important feature is that the system automatically retrieves and displays the entirety of the currently available information so that the operator can determine if pieces of information are missing or need to be updated.

The mobile information gathering system of the present invention has other applications as well. For example, a similar device can be used in connection with residential real estate listings to display pertinent information and directions to the nearest available home for sale. The pertinent information could include, for example, photographs that pop-up on the display as the mobile information-collecting device travels. Likewise, the system could be used to display information concerning merchants, service providers, or tourist attractions within a particular area in a non-commercial setting. For example, the GPS in a passenger car could be linked to a database that contains information about local merchants, such as restaurants. As the driver approaches these restaurants, the system could display advertisements or other information pertaining to the restaurants.

Thus, in accordance with the present invention, the system provides location-sensitive real estate information automatically and performs other useful tasks by correlating a vehicle's instantaneous position to data stored in a remote database to identify geographically pertinent information and by transmitting the geographically pertinent information to the vehicle's occupant, by for example displaying the information on the display panel within the truck or producing an audio message of the information for the occupant to hear.

The invention also provides a method and system for listing and brokering a commercial real estate and its financial derivatives. In particular, the system of the present invention can be used in connection with the creation of financial derivatives for commercial real estate. To create these derivatives, one must have a source of comprehensive information. The system of the present invention supports derivatives for commercial real estate by providing sufficiently accurate market information that supports the creation of indexes and derivatives such as futures or hedge rental rates and occupancy rates. The system can also be used for underwriting and rating commercial mortgage banking securities.

For example, a big office tenant that must find 60,000 square feet faces entering a 5-year or 7-year deal or longer-term deal without knowing where the market will be in 7 years. If the tenant is $10 per square foot above market rate on 60,000 square feet—that is a great deal of money. Because the system of the present invention contains vast information concerning historical and current vacancy, projected absorption and demand, projected rental rates, and supply and demand figures, the system of the present invention can be used to create indexes with which commercial office tenants can hedge their occupancy costs. The tenants can basically buy futures, for example, "class A, Washington, suburban, close in office futures." This aspect enables Wall Street and the financial community to manage the building space by watching supply and demand. By watching these futures, investors can monitor and adjust building construction, making the market much more perfectly balanced. Thus, the system of the present invention cultivates the massive liquidity inherent in these markets.

Since the system includes data concerning a plurality of characteristics of the subject commodity, i.e., commercial real estate, in the database of a data processing system utilizing a real-time clock, an exchange market for the commodity, e.g., a particular type of commercial real estate "Class A space in downtown Bethesda, Md.", is established based upon a pre-selected set of the commodity's characteristics; and, after a market price for the commodity has been set, a class (or classes) of financial derivatives is established together with a financial exchange market for those derivatives. The characteristics of the derivatives comprise: a common descriptive link between varied commodity types; a contract length that runs from the purchase date of the contract to the performance date for the commodity; and, a contract price.

The system of the subject invention comprises a number of elements that include: data processing means; means for determining whether a match exists based upon a comparison of the commodity offered for sale and that requested for purchase or exchange; display means; means for selecting the matched entry for purchase and/or exchange; and, means for determining and selecting a class of financial derivatives. The data processing means of the system, in turn, further comprises a system controller which is further comprised of: a data processing system; data entry means; memory means; and, communication means for communicating data between the system controller and a plurality of input and output points.

To achieve the advantages described herein as well as other advantages, and in accordance with the purpose of the present invention, as embodied and broadly described, a preferred embodiment of the present invention is a method for allowing information providers to both distribute specified information through the Internet and control dissemination of information. This method operates within a system that includes a system operator, a plurality of information providers and a plurality of information customers. This method includes the following steps: 1) making the information provider's specified information available through a secured website on the Internet; 2) obtaining from the information provider a designation of a first subset of the information customers that are authorized to receive access to the specified information on the website; and 3) distributing to each one of the first subset of the information customers that are authorized to receive access to the specified information an ID that can be used to access the specified information.

In an aspect of this method, the system within which the method operates is used to facilitate exchange of information pertaining to commercial real estate available for sale. In addition, the information providers are owners or owner representatives that provide information concerning the availability of their respective properties for sale. Finally, the information customers are potential buyers or representatives of potential buyers.

In another aspect of this method for allowing the information providers to both distribute specified information through the Internet and control dissemination of information, the method further comprises requiring the execution of a non-disclosure agreement by each one of the first subset of the information customers that are authorized, before each one of the first subset of the information customers that are authorized can access the specified information. The execution of the non-disclosure agreement can be accomplished by clicking through an agreement posted on the Internet.

Another preferred embodiment of the present invention is a method for allowing information providers to both distribute specified information through the Internet and control dissemination of information. According to this embodiment, the method includes the following steps: 1) making the information provider's specified information available through a secured website on the Internet; 2) obtaining from the information provider a designation of a first subset of the information customers that are authorized to receive access to the specified information on the website; 3) distributing to each one of the first subset of the information customers that are authorized to receive access to the specified information an ID that can be used to access the specified information; 4) allowing a second subset of potential customers to query a searchable database containing a plurality of descriptions of information; 5) indicating to the second subset of potential customers that the specified information exists without revealing the specified information; 6) if one or more of the second subset of potential customers are interested in obtaining access to the specified information, allowing an interested potential customer to communicate a request for access directed to the system operator; 7) the system operator forwarding the request for access and information concerning the interested potential customer requesting access to the information provider in response to a request for access; and 8) allowing the information provider to make a decision to grant or deny the request for access and to communicate the decision to the system operator. In response to a deny access decision, the interested potential customer is notified of the deny decision without learning the specified information. In response to a grant access decision, the system operator grants the interested potential customer access to the specified information.

In an aspect of this embodiment of the present invention, the method further includes requiring the interested potential customer to execute a non-disclosure agreement prior to allowing the interested potential customer access to the specified information. For example, the interested potential customer executes the non-disclosure agreement by clicking through an agreement posted on the Internet.

In another aspect of this embodiment of the present invention, a profile of a member of the second subset of potential customers is obtained by the system operator and transmitted to the information provider in response to a request for access. As an additional aspect, before a profile of a member of the second subset of potential customers is transmitted to the information provider in response to a request for access, the system operator can authenticate the profile.

In another aspect of this embodiment of the present invention, the system operator, in response to a request for access, obtains a profile of the interested potential customer, authenticates the profile, and transmits the profile to the information provider in conjunction with the request for access.

In another aspect of this method, the system operator forwards the request for access to the information provider in response to a request for access, and requests a response from the information provider in real time through the Internet or through wireless data transmission. Optionally, with the request for access, the system operator can also forward a profile of the interested potential customer.

In another aspect of this embodiment of the present invention, the system is used to facilitate exchange of information pertaining to commercial real estate available for sale. The information providers are owners or owner representatives that provide information concerning the availability of their respective properties for sale. Finally, the information customers are potential buyers or representatives of potential buyers.

Another preferred embodiment of the present invention is a method for allowing information providers to both distribute specified information through the Internet and control dissemination of information. This method operates within a system that includes a system operator, a plurality of information providers, and a plurality of information customers. The method begins by making the information provider's specified information available through a secured website on the Internet and allowing potential customers to query a searchable database containing a plurality of descriptions of information. The method continues by indicating to the potential customers that the specified information exists without revealing the specified information. Then, if one or more of the potential customers are interested in obtaining access to the specified information, the method proceeds by allowing an interested potential customer to communicate a request for access directed to the system operator. The method continues by having the system operator forward the request for access and information concerning the interested potential customer requesting access to the information provider in response to a request for access. The method continues by allowing the information provider to make a decision to grant or deny the request for access and to communicate the decision to the system operator. In response to a deny access decision, the interested potential customer is notified of the deny decision without learning the specified information. In response to a grant access decision, the system operator grants the interested potential customer access to the specified information.

In an aspect of this embodiment of the present invention, the information concerning the interested potential customer requesting access is a profile of the interested potential customer. Optionally, the system operator can authenticate the profile of the interested potential customer before forwarding the profile to the information provider.

In another aspect of this embodiment of the present invention, the system operator forwards the request for access to the information provider in response to a request for access, and requests a response from the information provider in real time through the Internet or through wireless data transmission.

In another aspect of this embodiment of the present invention, if the request for access is granted, the method involves the additional step of requiring execution of a non-disclosure agreement by the interested potential customer before the system operator grants the interested potential customer access to the specified information. The execution of this non-disclosure agreement can be accomplished by clicking through an agreement posted on the Internet.

In another aspect of this embodiment of the present invention, the system within which the method operates is used to facilitate exchange of information pertaining to commercial real estate available for sale. In addition, the information providers are owners or owner representatives that provide information concerning the availability of their respective properties for sale, and the information customers are potential buyers or representatives of potential buyers.

In another aspect of this embodiment of the present invention, the system within which the method operates is used to facilitate exchange of information pertaining to residential real estate available for sale. In addition, the information providers are owners or owner representatives that provide information concerning the availability of their respective properties for sale, and the information customers are potential buyers or representatives of potential buyers.

Another preferred embodiment of the present invention is a system for correlating information stored in a remote database with a user's location, retrieving pertinent data files from the database based upon the user's location, and automatically transmitting the selected data files to the user. The system includes user equipment sets, a computer, and a database in communication with the computer. Each user equipment set includes a display and a location determining device for generating data pertaining to the user's location and for transmitting the data pertaining to the user's location to a remote computer automatically. The computer is equipped for wireless communication with geographically remote users that are equipped with the equipment sets so as to send data to the equipment sets and receive data from the equipment sets including the data pertaining to the user's location. The database stores information that includes information identifying a location of a property. Within this system, in response to receipt of the data pertaining to a user's location, the computer automatically retrieves information pertaining to the user's location and transmits the same to the user's equipment set for display on the display.

In an aspect of this embodiment of the present invention, each user equipment set further comprises a data input device for allowing the user to input data. The information is displayed on the display in a way that prompts the user to input missing information using the data input device.

In another aspect of this embodiment of the present invention, the display is a color display adapted for displaying photographic images.

In another aspect of this embodiment of the present invention, in response to receipt of the data pertaining to the user's location, the computer automatically retrieves information describing commercial or residential real estate near the user's location and transmits the same to the user's equipment set for display on the display.

In another aspect of this embodiment of the present invention, in response to receipt of data pertaining to a user's location, the computer automatically retrieves information regarding at least one of commercial enterprises and landmarks near the user's location and transmits the same to the user's equipment.

In another aspect of this embodiment of the present invention, the user's equipment set includes audio capabilities, and the information pertaining to the user's location includes audio data.

In another aspect of this embodiment of the present invention, the computer transmits the information pertaining to the user's location to the user's equipment set for color display on the display.

In another aspect of this embodiment of the present invention, the information pertaining to the user's location includes information on commercial enterprises located near the user's location. The information on commercial enterprises includes information on at least one of the products, goods, and services provided by the commercial enterprises. In addition, in response to receipt of the data pertaining to a user's location, the computer automatically retrieves the information on at least one of products, goods, and services provided by commercial enterprises near the user's location and transmits the same to the user's equipment set.

In another aspect of this embodiment of the present invention, the computer automatically retrieves information describing real estate near the user's location and the display shows a pop-up window including the information describing the real estate.

In another aspect of this embodiment of the present invention, the information stored in the database includes at least one of the following: square footage available for lease; whether a property is available for sale; property address; contact information; and price. With this information in the database, in response to receipt of the data pertaining to the user's location, the computer automatically retrieves information describing the commercial or residential real estate near the user's location and transmits the same to the user's equipment set for display on the display.

Optionally, the information stored in the database also includes at least one of the following: a digital image of the commercial real estate; square footage data representing a square footage of the commercial real estate; data characterizing the selected use of the commercial real estate; rental price of the commercial real estate; sale price of the commercial real estate; data about the tenant in the commercial real estate; a real estate submarket identification; sales comparable information; lender information; a grade indicator of the commercial real estate, the grade indicator having an alpha numerical representation and being a function of a classification system of the commercial real estate that is consistent with accepted standards and providing a representation of the quality of the real estate; a classification of the commercial real estate based upon at least one of the following: a building grade, an age of the building, and an extrapolation of comparable buildings; and information pertaining to the submarket including at least one of (i) rents, (ii) vacancy, and (iii) absorption rates for each of the submarket and nearby submarkets, and (iv) other indicators of submarket and location attractiveness.

Another preferred embodiment of the present invention is a commercial real estate information exchange and market. The exchange and market includes a database for storing information about commercial real estate, and computers and communication equipment for allowing a plurality of users to query the database, add data to the database, and retrieve the information from the database. The database contains data records, including information pertaining to lease information, sale information, comparable sales information, and tenant information.

In an aspect of this embodiment of the present invention, the database further includes at least one of: data about a tenant in the commercial real estate; building-specific information including data representing an age of the commercial real estate, and data representing financial obligations and tenancy status of the tenant in the commercial real estate; square footage data representing a square footage of the commercial real estate; data characterizing a selected use of the commercial real estate; cost data including a rental price of the commercial real estate; a real estate submarket identification; a classification of the commercial real estate based upon at least one of a building grade, an age of the building, and an extrapolation of comparable buildings; and information pertaining to a submarket including rent data, vacancy data, and absorption rate data.

In another aspect of this embodiment of the present invention, the data records include market analytic information.

Another preferred embodiment of the present invention is a method for storing and automatically displaying descriptions and visual images of commercial or residential real estate on a display of a user. The method involves generating a plurality of digitized video images of real estate, storing data records concerning the real estate; determining a location of the user; retrieving data records corresponding to the user's location; and displaying on the display the data records corresponding to the user's location. According to the method, each digitized video image depicts a real estate. In addition, the data records include the digitized video images, textual information concerning the real estate, and information identifying the location of the real estate.

Another preferred embodiment of the present invention is a method for listing and brokering commercial real estate. The method includes the following steps: 1) identifying a characteristics of the commercial real estate and entering the characteristics into a data processing system to establish a first exchange market for the commercial real estate based upon the characteristics; 2) identifying a market value for the commercial real estate and listing the market value on the first exchange market; 3) determining a class of derivatives based upon a pre-selected subset of the characteristics; and 4) establishing a second exchange market in respect of the derivatives.

In an aspect of this embodiment of the present invention, the first exchange market and the second exchange market are co-located within the data processing system.

In another aspect of this embodiment of the present invention, the characteristics include a geographic location, a start date and a finish date, a size, a class of building, and a cost.

Another preferred embodiment of the present invention is a method for establishing a unified group of correlated databases that provides real estate data to facilitate a real estate transaction. According to this method, each database of the unified group is a discrete data module. The method includes the following steps: (a) associating real estate data entries of a first database of the unified group with corresponding real estate data entries of the remaining databases of the unified group; (b) collecting the real estate data from real estate industry data sources; (c) recording the real estate data in the first database of the unified group; (d) determining an effect of the recorded real estate data on the remaining databases of the unified group; (e) reconciling remaining real estate data in the remaining databases based on the effect; and (f) distributing the recorded real estate data and the reconciled real estate data to real estate industry professionals and to real estate industry customers.

In an aspect of this embodiment of the present invention, the real estate data includes property information and tenant information, and the unified group of correlated databases includes a property information database and a tenant information database. Optionally, the real estate data further includes comparable property information, assessment information, and market analytics information, and the unified group of correlated databases further includes a comparable property information database, an assessment information database, and a market analytics information database.

In another aspect of this embodiment of the present invention, the real estate industry data sources include at least one of property managers, proprietary databases, Internet sources, site inspections, building owners, brokerage firms, real estate investment trust filings, tenant canvassing, public records, and comparable property databases. In addition, the step of collecting the real estate data involves the following steps: (i) communicating with at least one of the property managers, the building owners, and the brokerage firms by mail, electronic mail, telephone, or facsimile, if the real estate industry data sources include at least one of the property managers, the building owners, and the brokerage firms; (ii) searching and extracting data from at least one of the proprietary databases, the Internet sources, and the real estate investment trust filings, if the real estate industry data sources include at least one of the proprietary databases, the Internet sources, and the real estate investment trust filings; (iii) recording observed data from at least one of the site inspections and the tenant canvassing, if the real estate industry data sources include at least one of the site inspections and the tenant canvassing; and (iv) extracting data from at least one of the public records and the comparable property databases, if the real estate industry data sources include at least one of the public records and the comparable property databases.

In another aspect of this embodiment of the present invention, collecting real estate data involves receiving web-based input from the real estate industry professionals and the real estate industry customers. Collecting real estate data also involves receiving communications from the real estate industry professionals and the real estate industry customers through mail, electronic mail, telephone, or facsimile. Optionally, collecting the real estate data can further involve gathering information with a mobile data acquisition vehicle.

In another aspect of this embodiment of the present invention, reconciling the remaining real estate data involves confirming that the real estate data entries and the corresponding associated real estate data entries are internally consistent.

In another aspect of this embodiment of the present invention, distributing the real estate data involves providing a web-based interface in communication with the unified group of correlated databases. Optionally, this distributing further involves providing communication between parties to a transaction, and providing transactional services in support of a transaction. Also optionally, the method further involves providing a derivatives marketplace in which to define, value, and exchange real estate commodities. These commodities could be real estate cost futures.

In another aspect of this embodiment of the present invention, distributing real estate data involves accepting a property search query from a user, and running the property search query in the unified group of correlated databases and returning property search results to the user.

Optionally, this distributing could involve adding properties to the property search results as directed by the user without running another search query, removing properties from the property search results as directed by the user without running another search query, and running negative search queries in the property search results as directed by the user to remove properties from the property search results.

Also, optionally, this distributing could involve accepting a second property search query from the user, running the second property search query on the property search results, and returning a second set of property search results to the user.

In a further embodiment of this aspect of the present invention, the property search results provide data from at least one of leasing history of a specific building, history of a market in a particular geographic area, and history of the specific building relative to the market.

In another embodiment of this aspect of the present invention, the method further involves saving the property search query as directed by the user, running the saved property search query at a periodic interval, and notifying the user of new properties that satisfy the property search query. Optionally, the saved property search query has at least one field that relates to market conditions and at least one new property satisfies the property search query because of a change in the market conditions. Also optionally, the saving, running, and notifying repeat for different users, resulting in a plurality of saved searches. With these saved searches the method continues by calculating an amount of saved searches of the plurality of saved searches that will be satisfied by entry of a new property listing, and reporting the amount to an owner or owner representative so that the owner or owner representative can maximize demand for the new property listing. The owner or owner representative can maximize demand for the new property listing by setting, for example, an optimum price. The owner or owner representative can also maximize demand for the new property listing by setting, for example, an optimum building grade.

In another aspect of this embodiment of the present invention, distributing real estate data involves disseminating location-sensitive information to a mobile information receiving device. The mobile information receiving device determines its location and the unified group of correlated databases receives the location of the mobile information receiving device and transmits the location-sensitive information to the mobile information receiving device.

In another aspect of this embodiment of the present invention, distributing real estate data involves displaying a user interface; displaying a display element on the user interface to indicate a property for which information is recorded in the unified group of correlated databases; providing a link to the information on the user interface proximate to the display element; allowing a user to select the display element; and in response to the selection, retrieving and displaying the information. The user selects the display element by dragging a pointer proximate to the display element, in which case the information is automatically displayed. The information can be displayed in, for example, a pop-up window.

Another preferred embodiment of the present invention is a system for collecting, distributing, and using real estate data. The system includes data sources, data mining applications in communication with the data sources, a contact management system in communication with the data sources and the data mining applications, a core data warehouse in communication with the data mining applications, database processes in communication with the core data warehouse, and network integration applications in communication with the database processes. The data sources gather and generate real estate data. The data mining applications receive and organize the real estate data into separate interrelated modules, and evaluate the real estate data and reconcile the real estate data among the interrelated modules. The contact management system directs the data mining applications to conduct continuous pollings of the data sources to update the real estate data. The core data warehouse receives and stores the reconciled and updated real estate data from the data mining applications. The database processes access the reconciled and updated real estate data from the core data warehouse and create database sets. The network integration applications manipulate the database sets in response to commands from a user and present results of the manipulation to the user.

In an aspect of this embodiment of the present invention, the network integration applications comprise at least one of a look up property application, a search database application, and an add listing application. The search database application can accept property search queries from the user, run the property search queries, and return property search results to the user. The search database application can also add properties to the property search results as directed by the user without running another search query, remove properties from the property search results as directed by the user without running another search query, and run negative search queries as directed by the user to remove properties from the property search results.

In another aspect of this embodiment of the present invention, the data sources include at least one of property managers, proprietary databases, Internet sources, site inspections, building owners, brokerage firms, real estate investment trust filings, tenant canvassing, public records, and comparable property databases.

In another aspect of this embodiment of the present invention, data mining applications include at least one of a property information database, a tenant information database, an assessment information database, a comparable property information database, and a market analytics information database.

In another aspect of this embodiment of the present invention, the system further includes a mobile information collection device that provides functions of the data sources and the network integration applications. The mobile information collection device includes a global positioning system, an output device, and an input device. The global positioning system determines a location of the mobile information collection device. The output device is in communication with the database processes and the global positioning system. The output device reads the location provided by the global positioning system and retrieves and displays the database sets corresponding to the location. The data input device receives changes to the database sets corresponding to the location and transmits the changes to the data mining applications.

Another preferred embodiment of the present invention is a method for securely facilitating buying and selling of real estate properties. The method involves the following steps: (a) maintaining a unified group of interrelated databases accessible through a global information network; (b) accepting a property listing from an owner or owner representative and recording the property listing in the unified group; (c) providing confidentiality agreements to preapproved buyers or buyer representatives named by the owner or owner representative; and (d) providing access to the property listing for buyers or buyer representatives that agree to the confidentiality agreement. The confidentiality agreements require that the property listing remain confidential in return for viewing the property listing.

In an aspect of this embodiment of the present invention, the buyer or buyer representative is provided with an electronic identification key to access the property listing. The key generates a variable password at a predetermined frequency.

In another aspect of this embodiment of the present invention, the accepting and recording of the property listing involves determining if the owner or owner representative is fraudulent by posting the property listing for viewing by a true owner representative.

In another aspect of this embodiment of the present invention, the method includes the following additional steps: (e) indicating to an unapproved buyer or buyer representative that the property listing exists; (f) accepting from the unapproved buyer or buyer representative a request to view the property listing; (g) forwarding the request to the owner or owner representative for approval; (h) if the owner or owner representative approves the request, requiring the unapproved buyer or buyer representative to agree to a confidentiality agreement requiring that the property listing remain confidential in return for viewing the property listing; and (i) if the unapproved buyer or buyer representative agrees to the confidentiality agreement, providing access to the property listing for the unapproved buyer or buyer representative.

According to this aspect, optionally, the unapproved buyer or buyer representative subscribes to an access service that indicates the existence of property listings in the unified group of interrelated databases.

Also according to this aspect, optionally, the buyer or buyer representative agrees to the confidentiality agreement by clicking through an agreement posted on the Internet.

Also according to this aspect, optionally, forwarding the request further involves forwarding a profile of the buyer or buyer representative to the owner or owner representative. The forwarding of the request could also involve authenticating the profile of the buyer or buyer representative.

Also according to this aspect, optionally, accepting a request to view the property listing further involves obtaining a profile of the buyer or buyer representative, authenticating the profile, and transmitting the profile to the owner or owner representative.

Also according to this aspect, optionally, forwarding the request to the owner or owner representative involves requesting a response from the information provider in real time through the Internet or through wireless data transmission.

Another preferred embodiment of the present invention is a method for securely facilitating buying and selling of real estate properties. The method includes the following steps: (a) maintaining a unified group of interrelated databases accessible through a global information network; (b) accepting a property listing from an owner or owner representative and recording the property listing in the unified group; (c) indicating to an unapproved buyer or buyer representative that the property listing exists; (d) accepting from the unapproved buyer or buyer representative a request to view the property listing; (e) forwarding the request to the owner or owner representative for approval; (f) if the owner or owner representative approves the request, requiring the unapproved buyer or buyer representative to agree to a confidentiality agreement requiring that the property listing remain confidential in return for viewing the property listing; and (g) if the unapproved buyer or buyer representative agrees to the confidentiality agreement, providing access to the property listing for the unapproved buyer or buyer representative.

In an aspect of this embodiment of the present invention, the unapproved buyer or buyer representative is provided with an electronic identification key to access the property listing. The key generates a variable password at a predetermined frequency.

In another aspect of this embodiment of the present invention, the accepting and recording the property listing include determining if the owner or owner representative is fraudulent by posting the property listing for viewing by a true owner representative.

In another aspect of this embodiment of the present invention, the unapproved buyer or buyer representative subscribe to an access service that indicates the existence of property listings in the unified group of interrelated databases.

In another aspect of this embodiment of the present invention, the unapproved buyer or buyer representative agrees to the confidentiality agreement by clicking through an agreement posted on the Internet.

In another aspect of this embodiment of the present invention, forwarding the request involves forwarding a profile of the unapproved buyer or buyer representative to the owner or owner representative. Optionally, the profile of the unapproved buyer or buyer representative can be authenticated.

In another aspect of this embodiment of the present invention, forwarding the request to the owner or owner representative involves requesting a response from the information provider in real time through the Internet or through wireless data transmission.

Another preferred embodiment of the present invention is a method for underwriting loans for real estate property. The method begins by establishing a unified group of correlated databases that provides data to facilitate a real estate transaction. Each database is a discrete module of real estate data. The method continues by providing quotes on individual loan programs in response to customer requests. The quotes are based on property data in the unified group. The method continues by providing soft loan quotes based on property data in the unified group. The method ends by providing pre-approved loan quotes to owners of particular properties based on real estate data for the particular properties and market information in the unified group.

In an aspect of this embodiment of the present invention, providing pre-approved loan quotes involves examining a financial profile of an owner, examining a property owned by the owner, evaluating the property to determine value and market analytics, and formulating a pre-approved credit line for the owner based on the property.

Another preferred embodiment of the present invention is a method for listing and brokering real estate commodities and financial derivatives of the real estate commodities. The method involves identifying characteristics of the real estate commodities; entering the characteristics into a data processing system utilizing a real-time clock; establishing an exchange market for the real estate commodities based on a pre-selected set of the characteristics; setting a market price for the real estate commodities; and establishing classes of the financial derivatives.

In an aspect of this embodiment of the present invention, the characteristics can be geographic location, lease term start date range, lease term end date range, building class, volume, or cost.

In another aspect of this embodiment of the present invention, entering the characteristics into a data processing system involves the following steps: (i) determining whether or not a commodity is being identified to the data processing system for a first time; (ii) storing the characteristics in a commodity database if the commodity is being identified to the data processing system for the first time; and (iii) determining a status of the commodity with respect to being a candidate for purchase, sale, or trade, if the commodity is not being identified to the data processing system for the first time.

In another aspect of this embodiment of the present invention, the classes of financial derivatives can be all commercial real estate available during a particular time period in a particular region, all commercial real estate of a certain class, all commercial real estate of a certain cost, a lease space equivalent use, or combinations thereof. The lease space equivalent use can include a common descriptive link between varied commodity types, a time period that runs from a date of a contract to a performance date of the commodity, and a contract price.

Another preferred embodiment of the present invention is a system for listing and brokering real estate commodities and financial derivatives of the real estate commodities. This system includes: (a) a data processing means for accepting and storing parameters of an available commodity available for sale or exchange; (b) data processing means for entering a description of a desired commodity desired for purchase or exchange; (c) means for determining that a match exists between the available commodity and the desired commodity; (d) means for displaying the match to a system operator; (e) means for selecting the match for purchase, exchange, or purchase and exchange; (f) means for determining a class of financial derivatives based on a pre-determined set of characteristics resident in commodity descriptions stored in a database; and (g) means for selecting a class of derivatives for purchase, exchange, or purchase and exchange.

In an aspect of this embodiment of the present invention, the data processing means includes a system controller comprising a data processing system, a data management program, data entry means for entering data into the data processing system, memory means for storing memory, and communication means for communicating data between the system controller and a plurality of input and output points. The plurality of input and output points can include, for example, one or more commodity input points, one or more commodity receiver points, one or more commodity brokerage points, and one or more derivative exchange points.

Another preferred embodiment of the present invention is a method for shopping for real estate and completing real estate transactions. This method involves providing a mobile information transmitting and receiving device that is in communication with a database containing real estate data; determining a location of the mobile information transmitting and receiving device using a global positioning system; downloading from the database to the mobile information transmitting and receiving device real estate data corresponding to the location; and displaying on the mobile information transmitting and receiving device summary information corresponding to a property listed in the real estate data to which the mobile information transmitting and receiving device is nearest.

In an aspect of this embodiment of the present invention, this method includes the additional steps of providing communication between a buyer or buyer representative and a seller or seller representative of the property for approval by the seller or seller representative for the prospective buyer to view details of the property; displaying details on the mobile information transmitting and receiving device, if approved by the seller or seller representative; and communicating an offer from the buyer or buyer representative to the seller or seller representative using the mobile information transmitting and receiving device. In addition to these added steps, the method could also further involve completing an electronic agreement to transfer title of the property if the offer is accepted by the seller or seller representative.

Another preferred embodiment of the present invention is system for use in information exchange between a system operator, a plurality of information providers, and a plurality of information customers. The system allows the information providers to both distribute specified information through the Internet and control dissemination of information. The system includes means for making the information provider's specified information available through a secure website on the Internet; means for obtaining from the information provider a designation of a first subset of the information customers that are authorized to receive access to the specified information on the website; and means for distributing to each one of the first subset of the information customers that are authorized to receive access to the specified information an ID that can be used to access the specified information.

In an aspect of this embodiment of the present invention, the system is used to facilitate the exchange of information pertaining to commercial real estate available for sale. In addition, the information providers are owners or owner representatives that provide information concerning the availability of properties for sale, and the information customers are buyers or buyer representatives.

In another aspect of this embodiment of the present invention, the system also includes means for providing a description of the specified information in a searchable database containing a plurality of descriptions of information; means for allowing a second subset of customers to query the searchable database and retrieve information sufficient to show the existence of information responsive to the query without revealing all of the information; means for allowing one or more of the second subset of customers that are interested in obtaining access to the complete information to communicate their interest in access to the information responsive to the query; means for forwarding the request for access and information concerning the interested customer requesting access to the information provider in response to a request for access; and means for allowing the information provider to make a decision to grant or deny the request for access to the information responsive to the query. Within this system, in response to a deny access decision, the interested customer is notified of the deny decision without learning the identity of the information provider. In response to a grant access decision, the interested customer receives access to the specified information.

According to this aspect, optionally, the means for allowing one or more of the second subset of customers that are interested in obtaining access to the complete information to communicate their interest in access to the information responsive to the query, includes: 1) means for allowing the interested customer to send a request for access directed to the system operator; 2) means for allowing the system operator to forward the request for access and information concerning the interested customer requesting access to the information provider in response to a request for access; and 3) means for allowing the information provider to make a decision to grant or deny the request for access and to communicate the decision to the system operator. In response to a deny access decision, the interested customer is notified of the deny decision without learning the identity of the information provider. In response to a grant access decision, the system operator grants the interested customer access to the specified information responsive to the query. Optionally, the system can further include data records containing a profile of each of the second subset of customers and means for transmitting the profile information to information providers in response to a request for access. Also, optionally, the system includes means for forwarding a request for access and information concerning the customer requesting access to the information provider in response to a request for access, and requesting a response from the information provider in real time through the Internet or through wireless data transmission.

According to this aspect, optionally, the system further includes means for obtaining a non-disclosure agreement from the interested potential customer as a condition of receiving access to the specified information. Optionally, the means for obtaining a non-disclosure agreement from the interested potential customer as a condition of receiving access to the specified information includes means for obtaining an electronic signature.

Another preferred embodiment of the present invention is a system for use in information exchange between a system operator, a plurality of information providers, and a plurality of information customers. The system allows the information providers to both distribute specified information through the Internet and control dissemination of information. This system includes: (a) means for making the information provider's specified information available through a secure website on the Internet; (b) means for providing a description of the specified information in a searchable database containing a plurality of descriptions of information; (c) means for allowing a customers to query the searchable database and retrieve information sufficient to show the existence of information responsive to the query without revealing all of the information; (d) means for allowing one or more of the customers that are interested in obtaining access to the complete information to communicate their interest in access to the information responsive to the query; (e) means for forwarding the request for access and information concerning the interested customer requesting access to the information provider in response to a request for access; and (f) means for allowing the information provider to make a decision to grant or deny the request for access to the information responsive to the query. In response to a deny access decision, the interested customer is notified of the deny decision without learning the identity of the information provider. In response to a grant access decision, the interested customer receives access to the specified information.

In an aspect this embodiment of the present invention, the means for allowing one or more of the customers that are interested in obtaining access to the complete information to communicate their interest in access to the information responsive to the query, includes: 1) means for allowing the interested customer to send a request for access directed to the system operator; 2) means for allowing the system operator to forward the request for access and information concerning the interested customer requesting access to the information provider in response to a request for access; and 3) means for allowing the information provider to make a decision to grant or deny the request for access and to communicate the decision to the system operator. In response to a deny access decision, the interested customer is notified of the deny decision without learning the identity of the information provider. In response to a grant access decision, the system operator grants the interested customer access to the specified information responsive to the query.

In another aspect of this embodiment of the present invention, the system is used to facilitate the exchange of information pertaining to commercial real estate available for sale. In addition, the information providers are owners or owner representatives that provide information concerning the availability of properties for sale, and the information customers are buyers or buyer representatives.

In another aspect of this embodiment of the present invention, the system also includes means for obtaining a non-disclosure agreement from the interested potential customer as a condition of receiving access to the specified information. The means for obtaining a non-disclosure agreement from the interested potential customer as a condition of receiving access to the specified information could include, for example, means for obtaining an electronic signature.

In another aspect of this embodiment of the present invention, the system also includes data records containing a profile of each customer and means for transmitting the profile information to information providers in response to a request for access.

In another aspect of this embodiment of the present invention, the system includes means for forwarding a request for access and information concerning the customer requesting access to the information provider in response to a request for access, and requesting a response from the information provider in real time through the Internet or through wireless data transmission.

Another preferred embodiment of the present invention is a system for correlating information stored in a remote database with a user's location, retrieving pertinent data files from the database based upon the user's location, and transmitting the selected data files to the user. The system includes user equipment sets, a computer, and a database in communication with the computer. Each user equipment set including means for inputting or determining a user's geographic location and for transmitting information pertaining to the user's location to a remote computer. The computer is equipped for communication with geographically remote users that are equipped with the equipment sets so as to send data to the equipment sets and receive data from the equipment sets including data pertaining to a user's location. The database stores information that includes information identifying the location of a property. In response to receipt of data pertaining to a user's location, the computer retrieves information pertaining to the user's location and transmits the same to the user's equipment set for display on the display.

In an aspect of this embodiment of the present invention, the information pertaining to the user's location includes information concerning comparable properties.

In another aspect of this embodiment of the present invention, the information pertaining to the user's location includes information concerning three dimensional video description of properties.

In another aspect of this embodiment of the present invention, the information pertaining to the user's location includes information concerning historical performance of commercial properties.

In another aspect of this embodiment of the present invention, the information pertaining to the user's location includes information concerning comparable lease data for commercial properties.

In another aspect of this embodiment of the present invention, the information stored in the database includes information pertaining to commercial or residential real estate located proximate to the user's location. The information includes at least one of data and images describing the commercial real estate. In response to receipt of data pertaining to a user's location, the computer retrieves information describing the commercial real estate near the user's current location and transmits the same to the user's equipment set for display on the display.

In another aspect of this embodiment of the present invention, in response to receipt of data pertaining to a user's location, the computer retrieves geographically pertinent information and transmits the same to the user's equipment set for display on the display.

In another aspect of this embodiment of the present invention, the display includes a map of a geographic area; an indicator on the map to indicate a property for which information is recorded in the database; and (iii) a pop-up window linked to the indicator. The pop-up window appears when the user's location is proximate to the property for which information is recorded in the database. The pop-up window displays the information recorded in the database. The information can include, for example, at least one of a photograph of the property, an address of the property, a building class size of the property, a building size of the property, a number of floors of the property, a year in which the property was built, a buyer of the property, a sale price of the property, a price per square foot of the property, and a cap rate of the property.

Another preferred embodiment of the present invention is a system for storing and automatically displaying descriptions and visual images of real estate on a user's display. The system includes means for generating a plurality of digitized video images of selected real estate, means for storing data records concerning the real estate, means for determining a user's geographic location, means for retrieving data records corresponding to the user's geographic location, and means for displaying on a single display the digitized video images and textual information. Each digitized video image depicts a view of a specified area of a real estate property. The data records include, for example, the digitized video images, textual information concerning the real estate, and information identifying the geographic location of the real estate in a computer database.

In an aspect of this embodiment of the present invention, the system also includes means for generating and displaying three dimensional video depictions.

In another aspect of this embodiment of the present invention, the single display includes a map of a geographic area; an indicator on the map to indicate a location of a property for which a data record exists; a link to the data record on the map proximate to the indicator; and a pop-up window proximate to the indicator. The pop-up window appears when the link is activated and includes at least a portion of the data record. The link is activated by, for example, dragging a pointer over the indicator, touching a touch screen at the indicator, or voicing a command to a voice activated response system.

Another preferred embodiment of the present invention is a system for facilitating commercial real estate information loan transactions. The system includes at least one searchable database, a search engine, communication equipment, and a computer. The at least one searchable database contains data records. The data records identify a plurality of commercial real estate properties, associate at least one lender with each of the commercial real estate properties, associate a loan commitment with each of the commercial real estate properties, provide information sufficient to evaluate the investment value of the property, and provide a list of qualified buyers or information sufficient to evaluate the credit worthiness of prospective buyers. The search engine allows potential customers to query the searchable database. The communication equipment allows potential customers that are interested in purchasing a commercial real estate property to communicate their interest and lock in the loan commitment associated with that commercial real estate property subject to qualification of the potential customer as a qualified buyer. The computer determines whether the potential customer is a qualified buyer and prompts the potential customer to provide further information, if required.

In an aspect of this embodiment of the present invention, the data records that identify commercial real estate properties include information pertaining to: square footage data representing a square footage of the commercial real estate; data characterizing the selected use of the commercial real estate; cost data; data about the tenant in the commercial real estate; a real estate submarket identification; a classification of the commercial real estate based on at least one of a building grade, an age of the building, and an extrapolation of comparable buildings; information pertaining to the submarket including at least one of rent data, vacancy data and absorption rate data; and building-specific information. The system also includes computers and communication equipment for allowing a plurality of users to query the database, add data to the database, and retrieve information from the database.

Another preferred embodiment of the present invention is a method for facilitating commercial real estate information loan transactions. The method begins by providing at least one searchable database that contains data records. The data records identify a plurality of commercial real estate properties, associate at least one lender with each of the commercial real estate properties, associate a loan commitment with each of the commercial real estate properties, provide information sufficient to evaluate the investment value of the property, and provide a list of qualified buyers or information sufficient to evaluate the credit worthiness of prospective buyers. The method continues by allowing potential customers to query the searchable database to identify commercial real estate properties of interest. In response to such queries, the method continues by presenting the potential customers with information sufficient to evaluate the investment value of each property and the loan commitment associated with that commercial real estate property. The method continues by allowing potential customers that are interested in purchasing a commercial real estate property to communicate their interest and lock in the loan commitment associated with that commercial real estate property subject to qualification of the potential customer as a qualified buyer. The method ends by determining whether the potential customer is a qualified buyer and prompting the potential customer to provide further information, if required.

Another preferred embodiment of the present invention is a system for facilitating commercial real estate information loan transactions. The system includes at least one searchable database, a search engine, and communication equipment. The at least one searchable database contains data records that identify a plurality of qualified buyers of commercial real estate together with information sufficient to evaluate the credit worthiness of each of the qualified buyers listed, and associate either a category of interest or past purchase information indicative of a category of interest with each qualified buyer. The search engine allows potential sellers of commercial real estate to query the searchable database. The communication equipment allows potential sellers of commercial real estate property to communicate information concerning their property to qualified buyers.

In an aspect of this embodiment of the present invention, the data records that contain information concerning commercial real estate properties include information pertaining to square footage data representing a square footage of the commercial real estate; data characterizing the selected use of the commercial real estate; cost data including a rental price of the commercial real estate; data about the tenant in the commercial real estate; a real estate submarket identification; a classification of the commercial real estate based upon at least one of a building grade, an age of the building, and an extrapolation of comparable buildings; information pertaining to the submarket including rent data, vacancy data and absorption rate data; and building-specific information. In addition, the system also includes a computer for allowing qualified buyers to access the information concerning commercial real estate properties for which they receive information from potential sellers.

Another preferred embodiment of the present invention is a method for facilitating commercial real estate information loan transactions. The method begins by providing at least one searchable database containing data records. The data records identify a plurality of qualified buyers of commercial real estate together with information sufficient to evaluate the credit worthiness of each of the qualified buyers listed; and associate either a category of interest or past purchase information indicative of a category of interest with each qualified buyer. The method continues by providing a search engine for allowing potential sellers of commercial real estate to query the searchable database. The method ends by allowing potential sellers of commercial real estate property to communicate information concerning their property to qualified buyers. The information includes market information and building-specific information.

Another preferred embodiment of the present invention is a method for providing information concerning real estate property. The method involves displaying a user interface; displaying a display element on the user interface to indicate a real estate property; linking the display element to a data entry for the real estate property; allowing a user to select the display element; and, in response to selection of the display element, retrieving and displaying information from the data entry.

In an aspect of this embodiment of the present invention, the user selects the display element by dragging a pointer proximate to the display element, in which case the information from the data entry is automatically retrieved and displayed.

Optionally, the information from the data entry is displayed in a pop-up window. Also, optionally, the method also involves allowing the user to click on the pop-up window to receive more information from the data entry.

In another aspect of this embodiment of the present invention, the user selects the display element clicking through the indicator, using a touch screen, or using a voice activated response system.

In another aspect of this embodiment of the present invention, the information includes one or more of an image of the real estate property, audio content relating to the real estate property, video of the real estate property, and textual information on the real estate property. The textual information includes one of an address of the real estate property, a building class size of the real estate property, a building size of the real estate property, a number of floors of the real estate property, a year in which the real estate property was built, a buyer of the real estate property, a sale price of the real estate property, a lease price of the real estate property, a price per square foot of the real estate property, and a cap rate of the real estate property.

In another aspect of this embodiment of the present invention, the user interface is a chart and the display element is a textual listing of the real estate property.

In another aspect of this embodiment of the present invention, the user interface is a map and the display element is an icon. The icon can signify a characteristic of the real estate property. For example, the icon could signify that the real estate property is an office space, an industrial space, or a retail space. Or, the icon could signify that the real estate property is a condominium, a townhouse, or a single family home. The icon could also signify the price range of the real estate property or the price of the real estate property.

Underlying the seemingly automatic retrieval of location-based information of the previous preferred embodiment of the present invention, another preferred embodiment of the present invention is a database containing data concerning real estate information and/or other information of interest, including merchant information, tourist information, service provider information, and the like. The information in the database is correlated with geographic location information to allow data pertaining to a particular geographic location to be retrieved. Information may be retrieved on demand in response to user queries or searches, or the information may be retrieved in response to predetermined system queries. The use of the predetermined system queries allows the seemingly automatic display of pertinent information as mentioned before.

The ability to automatically retrieve information corresponding to a geographic location in response to predetermined queries can be used in various contexts. As mentioned before, the information can be used in conjunction with a GPS or other position determining system to automatically display geographically relevant information based on a user's position, whether in a vehicle or using a handheld system. The automatic retrieval can also be used to provide a user-friendly graphical user interface for accessing information stored in the database.

In accordance with one important aspect of the present invention, the system includes software for providing a unique graphical user interface for displaying information retrieved from a database. Specifically, when data is retrieved from the database (either as a result of a user query or a predetermined query), only a portion of the data retrieved is displayed. The remaining data is stored locally for quick retrieval, such as in a cache. The portion of the data that is displayed may be displayed in a text grid/spreadsheet/chart format. Optionally, the data may be displayed in a map format.

In accordance with one aspect of the present invention, to provide an uncluttered, yet user-friendly interface, only a subset of the data that is retrieved is displayed. Additional data is automatically displayed in response to a user input, such as passing a pointing device icon over text on the grid/spreadsheet/chart or over an icon on the map display. In the embodiment described herein, the data retrieved, but not initially displayed, is a digital image of the property presented with address and/or price information. The interface further includes a means for users to optionally retrieve even further information from the database by, for example, selecting (e.g., with a pointing device) text or an icon representing the desired information. It should be understood, however, that this graphical user interface feature is more widely applicable and, indeed, can be used in connection with any system where there is an advantage to use of this display technique.

In accordance with another important aspect of the present invention, icons can be used to provide information about the properties shown in the text grid/spreadsheet/chart or on the map view of the user interface. In the map view, for instance, an icon's location on a map provides geographic location information. To provide further information, the icon may be in a shape or appearance that conveys information concerning the type of property, the cost of the property, or the identity of the broker listing the property. Further, the icon may be a small digital image (thumbnail image) of the property itself to convey further information.

Another embodiment of the present invention provides a system and method for presenting, through a unique user interface, commercial real estate tenant information in relation to property information. The unique user interface provides users with an intuitive and convenient tool for accessing tenant information relating to a building. In a specific implementation, the user interface is an image of the building to which the tenant information corresponds.

The graphical user interface features described herein may be used in various combinations to customize functionality for different purposes to leverage the use of the database. For example, it is possible for the system operator to provide custom content for individual brokers by using predetermined queries to display only properties listed by a particular broker and by displaying the information as an essentially seamless part of the broker's web site. The hierarchical display of information retrieved from the database can be used in other contexts in which display of too much information is confusing or impractical, and resubmitting queries to get basic information is too cumbersome for users. Thus, the present invention also provides graphical user interface tools with broad applicability.

Related to the provision of custom content to individual brokers, another embodiment of the present invention provides a system and method for supplying content from a central database to affiliated web sites. This embodiment provides access to a comprehensive, up-to-date, integrated commercial real estate database, from which data can be drawn to support commercial real estate web sites for brokerage companies or individual brokers. As an example, in this embodiment, a broker uses a site template (e.g., graphical user interface) containing modifiable portions and portions that link to the integrated commercial real estate database.

The present invention also provides communication and analytical tools that interface with a commercial real estate database and support commercial real estate transactions. These communication and analytical tools include: 1) a survey tool; 2) a commercial real estate transaction tool; 3) a tour scheduling tool; 4) an activity summary tool; 5) a tool for analyzing commercial real estate data; and 6) a map search tool.

An embodiment of the present invention provides, in a system comprising a real estate database containing information regarding commercial real estate properties, a method for disseminating information contained in the real estate database. The method includes accepting search criteria from a user; searching the real estate database for information that meets the search criteria; reporting search results to the user, wherein the search results include the information that meets the search criteria; receiving a file from the user; associating the file with the search results and the search criteria; and providing the user with access to the search criteria, the search results, and the associated file.

The search criteria are, for example, space requirements of a prospective tenant or buyer, or are information requirements of a commercial real estate professional. The file can include, for example, a spreadsheet, a document, or a brochure. The method can also include receiving instructions from the user to provide a second user with access to the search criteria, the search results, and the associated file, and then providing the second user with the access. The user could be, for example, a broker in a brokerage firm, while the second user could be a client of the broker, a broker who is a member of the brokerage firm, or a broker who is not a member of the brokerage firm.

Another embodiment of the present invention provides a system for collecting, distributing, and using real estate data. The system includes data sources that gather and generate the real estate data. The system also includes data mining applications in communication with the data sources. The data mining applications receive and organize the real estate data into separate interrelated modules, and evaluate the real estate data and reconcile the real estate data among the interrelated modules. The system also includes a contact management system in communication with the data sources and the data mining applications. The contact management system directs the data mining applications to conduct continuous pollings of the data sources to update the real estate data. The system also includes a core data warehouse in communication with the data mining applications. The core data warehouse receives and stores the reconciled and updated real estate data from the data mining applications. The system also includes database processes in communication with the core data warehouse. The database processes access the reconciled and updated real estate data from the core data warehouse and create database sets. The system also includes a search database application in communication with the data processes. The search database application accepts a property search query from the user and reports search results to the user. The search results include real estate data in the core data warehouse that meet the user's search query. The search database application is adapted to receive files from the user and associate the files with the search results.

In an aspect of this embodiment, the search database application is adapted to provide the user with access to the search results and the associated files. In addition, the search database application can be adapted to receive instructions from the user to provide a second user with access to the search results and the associated files, and to provide the second user with the access.

Another embodiment of the present invention provides a method for facilitating a commercial real estate transaction. This method includes receiving space requirements from a user; searching a commercial real estate database for spaces meeting the space requirements; reporting to the user the spaces meeting the space requirements; receiving from the user selected spaces from among the spaces meeting the space requirements, wherein the selected spaces are spaces for which the user wants to confirm availability; forwarding electronic communications to representatives of the selected spaces, wherein the electronic communications request confirmation of availability of the selected spaces; updating the commercial real estate database in response to receiving denials of space availability; and reporting, to the user, available spaces from among the selected spaces in response to receiving confirmations of space availability for the available spaces.

In an aspect of this embodiment, the method further includes receiving from the user final chosen spaces from among the available spaces, wherein the final chosen spaces are spaces for which the user wants proposals; forwarding second electronic communications to representatives of the final chosen spaces, wherein the second electronic communications request proposals on behalf of the user for the final chosen spaces; and reporting, to the user, the proposals from the representatives of the final chosen spaces.

In another aspect of this embodiment, the method includes providing the user with comparisons of the proposals.

In another aspect of this embodiment, the method includes consulting the commercial real estate database to determine locations of the final chosen spaces; receiving, from the user, times to spend visiting each of the final chosen spaces; determining an order in which to visit the final chosen spaces; calculating travel times between the final chosen spaces based on the order and the locations; and determining a tour of the final chosen spaces based on the visiting times and the travel times. Determining the order can involve receiving the order from the user. Alternatively, the order can be based on one of shortest time and shortest distance.

In another aspect of this embodiment, the method includes forwarding to the user and to the representatives of the final chosen spaces a third electronic communication providing access to the tour.

In another aspect of this embodiment, the method includes displaying the tour on a map that shows a route between the final chosen spaces. The map can include an icon indicating the location of a final chosen space. The icon can be linked to data in the commercial real estate database that corresponds to the final chosen space, and can be adapted to be activated to provide access to the data.

In another aspect of this embodiment, the method includes reporting, to the representatives of the final chosen spaces, the requests for proposals along with other requests for proposals on their respective spaces.

Another embodiment of the present invention provides a method for reporting tasks completed in commercial real estate transactions. This method comprises storing information pertaining to a property in a commercial real estate database; associating the property with a representative of the property; facilitating searches of the commercial real estate database for spaces meeting designated space requirements, wherein the property meets the designated space requirements for a number of the searches; and reporting the number to the representative.

In an aspect of this embodiment, the method also includes receiving requests to confirm availability of the property, and reporting, to the representative, the number of requests to confirm availability of the property.

In another aspect of this embodiment, the method also includes receiving requests for proposals for the property, and reporting, to the representative, the number of requests for proposals for the property.

In another aspect of this embodiment, the method also includes receiving schedules for tours of the property, and reporting, to the representative, the number of tours of the property. The representative can include one or more brokers and reporting the number of tours of the property can include reporting the number of tours given by each of the one or more brokers.

In another aspect of this embodiment, the method also includes receiving, from the representative, proposals on the property, and reporting, to the representative, the number of proposals on the property. The representative can include one or more brokers and reporting the number of proposals on the property can include reporting the number of proposals issued by each of the one or more brokers.

In another aspect of this embodiment, the method also includes reporting the number to an owner of the property.

Another embodiment of the present invention provides a method for monitoring activities of a commercial real estate broker. This method includes providing a commercial real estate database that associates the broker with properties that the broker represents; facilitating searches of the commercial real estate database for spaces meeting designated space requirements, wherein the properties meet the designated space requirements for a number of the searches; and reporting the number to the broker.

In an aspect of this embodiment, the number is broken down according to each property of the properties that the broker represents.

In another aspect of this embodiment, the method also includes receiving requests to confirm availability of the properties, and reporting, to the broker, the number of requests to confirm availability of the properties.

In another aspect of this embodiment, the method also includes receiving requests for proposals for the properties, and reporting, to the broker, the number of requests for proposals for the properties.

In another aspect of this embodiment, the method also includes receiving schedules for tours of the properties, and reporting, to the broker, the number of tours of the properties. The broker can include one or more agents and reporting the number of tours of the properties can include reporting the number of tours given by each of the one or more agents.

In another aspect of this embodiment, the method also includes receiving, from the broker, proposals on the properties, and reporting, to the broker, the number of proposals on the properties. The broker can include one or more agents and reporting the number of proposals on the properties can include reporting the number of proposals issued by each of the one or more agents.

Another embodiment of the present invention provides a system for analyzing commercial real estate market conditions. This system includes a database for storing information about commercial real estate. The database contains data records, including information pertaining to lease information, sale information, comparable sales information, and tenant information. The system also includes an analytical application in communication with the database. The analytical application is adapted to receive characteristics of a property, to retrieve data pertinent to the characteristics from the database, and to display historical trends and forecasts of the real estate market conditions based on the data retrieved from the database.

In an aspect of this embodiment, the forecasts are based on projected data in the database. The projected data can be projected absorption, projected construction starts, projected building deliverables, or projected lease expiration. The projected absorption can be based on one of preceding year average; five year average; median quarter value; mean quarter value; % seq positive growth; % seq negative growth; best of four quarters; and worst of four quarters. The projected construction starts can be based on one of preceding year average; five year average; mode quarter value; average quarter value; and % of five year average.

In another aspect of this embodiment, the historical trends and the forecasts include at least one of absorption, deliveries, and vacancy; rental rates; occupancy rates; percent leased rates; vacancy by space type; direct and sublet vacant square footage; occupancy and leased rates; current rental rates; vacancy and rental rates; and net absorption rates.

Another embodiment of the present invention provides a map search application that facilitates access to geographic-based data stored in a database. As an example, the map search application allows access to the commercial real estate data described above. This embodiment provides this access through a global computer network, such as the Internet, allowing remote access to the database. A user can conduct queries across all relevant databases by identifying a region on a map and specifying search criteria to meet within the region.

According to an aspect of this embodiment of the present invention, a user selects a search area by drawing a search area on a map. The user draws the search area by dragging a shape, such as a rectangle or circle, or by using a polygon drawing tool. The present invention correlates the drawn search area to geographic-based data encompassed within the search area and retrieves the data. The results are then plotted across the map.

In one aspect of this embodiment, the search area and search results are overlaid on a map that represents the geographic area. In another aspect of this embodiment, the search area and search results are overlaid on an aerial photographic view of the geographic area.

In a specific implementation of the present invention, the geographic-based data includes properties available for lease. After a user defines an area using the map search application and specifies criteria by which to search for properties for lease, the invention displays, within the defined area, the properties for lease that meet the criteria. The user can then select an individual property, in response to which the invention displays information about the property and, optionally, a photograph of the property.

These and other objects, aspects, and advantages of the present invention are described in greater detail in the detailed description of the invention, the appended drawings, and the claims. Additional features and advantages of the invention will be set forth in the description that follows, will be apparent from the description, or may be learned by practicing the invention.

BRIEF DESCRIPTION OF THE DRAWINGS

FIGS. 3–16 are slides that graphically depict the commercial real estate market and the process for transactions within that market, to provide the context in which a preferred embodiment of the present invention operates.

FIGS. 17–34 are slides that graphically depict a preferred embodiment of the system and method for collection and distribution of information according to the present invention.

FIGS. 35–71 are web screen shots that depict a preferred embodiment of the system and method for collection, distribution and use of information according to the present invention.

FIGS. 77–84 are screen shots that depict an exemplary survey tool, according to an embodiment of the present invention.

FIGS. 85–95 are screen shots that depict an exemplary commercial real estate transaction tool, according to an embodiment of the present invention.

FIGS. 96–99 are screen shots that depict an exemplary tour scheduling tool, according to an embodiment of the present invention.

FIGS. 101–116 are screen shots that depict an exemplary analytical tool, according to an embodiment of the present invention.

FIGS. 125 and 126 are schematic diagrams that illustrate an exemplary system and method for providing map-based search functions, according to an embodiment of the present invention.

DETAILED DESCRIPTION OF THE INVENTION

Figure 1:
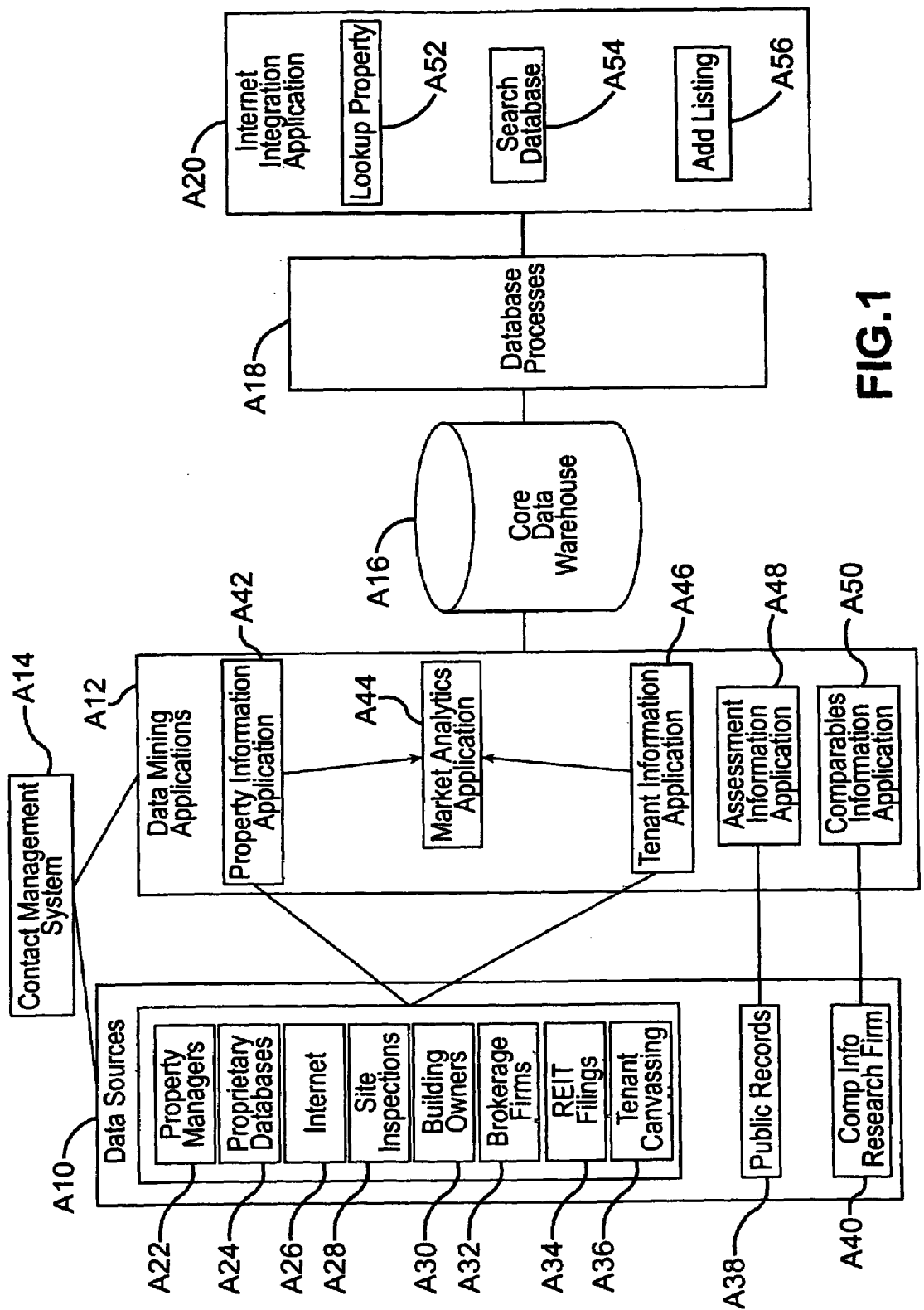
FIG. 1 shows the overall system architecture of the present invention, according to a preferred embodiment of the present invention.

The system of the present invention, the preferred embodiment of which is referred to as COSTAR EXCHANGE™, is a web-based marketplace that efficiently and securely facilitates the buying and selling of commercial properties.

The invention includes, but is not limited to the following: a large-scale database of commercial properties for sale (over 38,000 commercial properties with a combined asset value in excess of $40 billion in the preferred embodiment); a secure web service, the preferred embodiment of which is known as COSTAR EXCHANGE,™ for distributing the information; and communication and data processing equipment that allow sellers of properties to list extensive information about their properties for sale on the site at no cost. The site affords an efficient means for these sellers to reach a large universe of potential buyers. In the currently preferred embodiment, potential buyers pay a subscription fee to access the system. Sellers of investment-grade properties have the additional option of selecting limited, secure distribution of their properties in order to address confidentiality requirements.

The system of the present invention makes it possible for a user to extract data relating to virtually every aspect of a commercial real estate transaction. Although the data is described as being contained within a "database," data can be stored in a plurality of linked physical locations or data sources. The significant aspect is that the database contains information relating to areas that have previously been only accessible in isolation from one another. By providing a unified data model and a system for forming a variety of queries against the unified database, it is possible to understand with precision the relationship between market factors that have heretofore only been understood in an anecdotal way. For example, prior to the present invention, a commercial real estate investor might have recognized the value of investing in a particular building that had low vacancy but was located in an area of extremely high vacancy. If so, this investor might also be interested in knowing that a building that is on the market has lost a big tenant. Prior to the system of the present invention, however, there has been no unified way of storing an investor's investment criteria and continually monitoring the market so as to have the ability to provide a real-time alert when a property matching the investor's investment criteria has become available. This advantage is achieved because databases containing leasing information are linked with databases concerning buildings for sale, which are linked to databases that store a particular investor's investment criteria, which are linked to databases that store the data necessary to determine market conditions, and so on. It is through the connections of previously discrete databases that the synergies and advantages of the present invention arise.

In this sense, the present invention resides in the interconnection of related pieces of information that allows a true understanding and deep appreciation of a commercial real estate market. The user of the system of the present invention has the ability to understand data in context, because the data in one data source is influenced by other data sources that have heretofore not been connected.

The data stored in the databases of the present invention is from various sources. For example, property information can be obtained by researching information sold and information available. Tenant information can be obtained through personal inspection of properties and from brokers.

Market analytics is obtained through an historical analysis. In addition, tax assessment information provides yet another source of information.

Another way of gathering information is through a mobile information-collecting device, according to another aspect of the present invention. The mobile information-collecting device is a truck or other vehicle that is equipped with a GPS system and a link to the databases of the system of the present invention. The device further includes a display screen and input device, and can include a web camera. The system is designed such that the location of the truck or other mobile information gathering device at any particular instance is correlated to the database so that information concerning properties in the vicinity of the truck is automatically displayed on the display screen located in the truck. Thus, as a truck passes a particular commercial real estate building, information pertaining to that building is displayed, and the operator can determine whether additional information has to be gathered or whether information obtained in the database should be modified. The important thing is that the system automatically retrieves and displays the entirety of the currently available information so that the operator can determine if pieces of information are missing or need to be updated.

The mobile information gathering system of the present invention has other applications as well. For example, a similar device is used in connection with residential real estate listings to display pertinent information and directions to the nearest available home for sale. The pertinent information could include, for example, photographs that pop-up on the display as the mobile information-collecting device travels. Likewise, the system displays information concerning merchants, service providers, or tourist attractions within a particular area in a non-commercial setting. For example, the GPS in a passenger car is linked to a database that contains information about local merchants, such as restaurants. As the driver approaches these restaurants, the system displays advertisements or other information pertaining to the restaurants.

Thus, in accordance with the present invention, the system provides location-sensitive real estate information automatically and performs other useful tasks by correlating a vehicle's instantaneous position to data stored in a remote database. The system identifies geographically pertinent information and transmits the geographically pertinent information to the vehicle for display on the display panel within the vehicle or, perhaps, for audio announcements to the vehicle occupant.

System Architecture

FIG. 1 shows the overall system architecture of a preferred embodiment of the present invention. As shown, the principal components of the system architecture include data sources A10, a contact management system A14, data mining applications A12, a core data warehouse A16, database processes A18, and Internet integration applications A20. Broadly stated, contact management system A14 directs data mining applications A12 to obtain commercial real estate information from data sources A10; data mining applications A12 gather, organize, and transmit the information to core data warehouse A16; database processes A18 access the information from core data warehouse A16 and organize it for manipulation by Internet integration application A20 (e.g., by building database sets); and Internet integration application A20 presents the information to the end user for review and manipulation by the user. In terms of input and output, data sources A10, contact management system A14, and data mining applications A12 represent the input side of the system architecture, while database processes A18 and Internet integration application A20 represent the output side to which an end user of the system is connected.

Data sources A10 represent a vast network of entities generating information about commercial real estate. Each entity maintains information specific to the business or process in which it is involved. Contact management system A14 directs the input systems of data mining applications A12 to conduct continuous pollings of data sources A10. By conducting continuous, periodic polling of data sources A10, data mining applications A12 ensure that core data warehouse A16 contains up-to-date information.

Data sources A10 include such data repositories as property managers A22, proprietary databases A24, Internet A26, site inspections A28, building owners A30, brokerage firms A32, REIT filings A34, tenant canvassing A36, public records A38, and comparable information research firms A40. Property managers A22, building owners A30, and brokerage firms A32 maintain records on the individual properties in which they are involved, concerning such information as transaction histories and characteristics of a property. To obtain this information, contact management system A14 supports communications (e.g., by telephone or e-mail) between representatives operating the present invention and the personnel of property managers A22, building owners A30, and brokerage firms A32.

Proprietary databases A24, Internet A26, and REIT filings A34 are data source entities that require review by personnel associated with contact management system A14 and data mining applications A12. The personnel pull the pertinent information from these data sources for gathering by data mining applications A12 and storage by core data warehouse A16.

Site inspections A28 and tenant canvassing A36 are data source entities that target specific regions or properties on which to obtain commercial real estate information. Typically, this information is obtained manually by visiting a particular location and recording observations and/or by using a mobile information gathering system.

Public records A38 and comparable information research firm A40 are automated data source services that digitally record information and automatically transmit the information to data mining applications A12.

Data mining applications A12 receives the information from data sources A10 into separate modules or applications, including, in a preferred embodiment of the present invention, property information application A42, market analytics application A44, tenant information application A46, assessment information application A48, and comparables information application A50.

Property information application A42 and tenant information source A46 receive information from property managers A22, proprietary databases A24, Internet A26, site inspections A28, building owners A30, brokerage firms A32, REIT filings A34, and tenant canvassing A36. Assessment information application A48 receives information from public records A38. Comparables information application A50 receives information from comparable information research firm A40. As sort of a hybrid of property information application A42 and tenant information application A46, market analytics application A44 receives information from data sources A10 through property information application A42 and tenant information application A46 and conducts analyses of the data to present historical evaluations of transactions.

Property information application A42 includes sales information on properties, such as physical characteristics, available space, selling price, and income expense statements. Tenant information application A46 includes leasing information such as lease turnover dates, average price per square foot, and the types of tenant under lease. Market analytics application A44 draws on information from property information application A42 and tenant information application A46 to analyze transactions over a long period of time (e.g., ten years) to provide valuable historical performance data. Assessment information application A48 includes property valuations, e.g., tax assessments. Comparables information application A50 includes broad market information that enables accurate comparisons of property values based, for example, on type of building structure and geographic proximity.

Each of the modules of data mining applications A12 is highly interrelated with other modules, such that a change of information in one module necessitates a change of information in another. For example, if tenant canvassing A36 learns that a tenant has moved out of property A and into property B, tenant information application A46 must note under the tenant's information the new space the tenant occupies; additionally, and as a direct result of the transaction, property information application A42 must note the new vacant space in property A and the now occupied space in property B. In turn, the adjustments in occupancy affect the analysis performed by market analytics application A44, e.g., if property A is now left with a low occupancy rate, it compares unfavorably to other properties similarly situated. In addition, considering the likely scenario that property B was occupied by a previous tenant who moved elsewhere, the seemingly singular event of the initial transaction (tenant's move from property A to property B) is actually a part of a series of transactions through the interrelated modules of data mining applications A12. As a helpful analogy, data mining applications A12, with its group of interrelated modules, is effectively an enormous accounting ledger that tracks property space instead of dollars, and records a series of related transactions in zero-sum fashion, akin to credits and related debits. After recording a single transaction, the present invention reconciles the entries in each interrelated module by confirming that the interrelated entries are internally consistent.

As data mining applications A12 receive real estate information from data sources A10 and process the impact of that information through the modules or applications, the information is stored and constantly updated in core data warehouse A16. Database processes A18 access this data from the output side of core data warehouse A16 and create database sets compatible with formats required by Internet integration application A20. Internet integration application A20 manipulates the database sets in response to commands from a user, and presents the results of database manipulations, e.g., search query results, to the user in the form of graphical user interfaces. The specific manipulations executed by Internet integration application A20 are described below in more detail under the subheading "Detailed Description—Website Operation."

Another embodiment of the present invention provides a coordinated method and system for collecting data for a commercial real estate database having distinct but related categories of information. According to this embodiment, the system enters information concerning one category of information into the database, and then determines the relevance of that entered information to other categories of information. If the entered information is deemed relevant to a second category of information, then the system notifies a researcher responsible for collecting data for the second category of information. The system then provides the researcher with the entered information.

For a nationwide commercial real estate database, the collection and maintenance of data is an enormous undertaking, involving numerous individuals. Updating the data may involve, for example, researchers in the field gathering information concerning, among other things, commercial real estate that is for sale. In conducting this research, the researchers may come across information that is important to researchers responsible for other categories of information, as well. For example, a researcher may determine that a building previously listed as for-sale has been sold. This completed sale information would be highly relevant to researchers tracking comparable sales information. Without contact with the for-sale property researchers, however, these other comparable sales researchers would typically have to wait for the information to arrive through other sources such as county records and deeds.

Thus, it is advantageous to pass the completed sale information along to the researcher tracking comparable information. However, in a large-scale operation, it is virtually impossible to pass information on a person-to-person basis. Thus, there is a need to automate the process.

In accordance with an embodiment of the present invention, therefore, a system automatically forwards information to other researchers whose research criteria relate to that information. For example, information on a completed building sale, which is tracked by for-sale property researchers, is automatically sent to researchers tracking comparable sale information. In this way, the researcher tracking comparable sales information can begin research immediately following the building sale and does not have to wait to receive the deed or assessment record from the county.

In reference to FIG. 1, this example would include a first researcher who collects data on for-sale properties and a second researcher who collects data on comparable sales properties (i.e., completed sales). The for-sale researcher and comparable sales researcher would be a part of contact management system A14, and would poll data sources A10. As the for-sale researcher polls data sources A10 and records properties that have been sold, data mining applications A12 determines that that sale information is relevant to comparable sales information as well. Accordingly, data mining applications A12 notify the comparable sales researcher of the update and provide the comparable sales researcher with the related information.

The coordinated research of this embodiment demonstrates the value of having a fully integrated database, which, in this instance, relates to commercial real estate. Another advantage afforded by a comprehensive integrated commercial real estate database is the ability to link comparable sales records to current lists of tenants in particular buildings.

Figure 2:
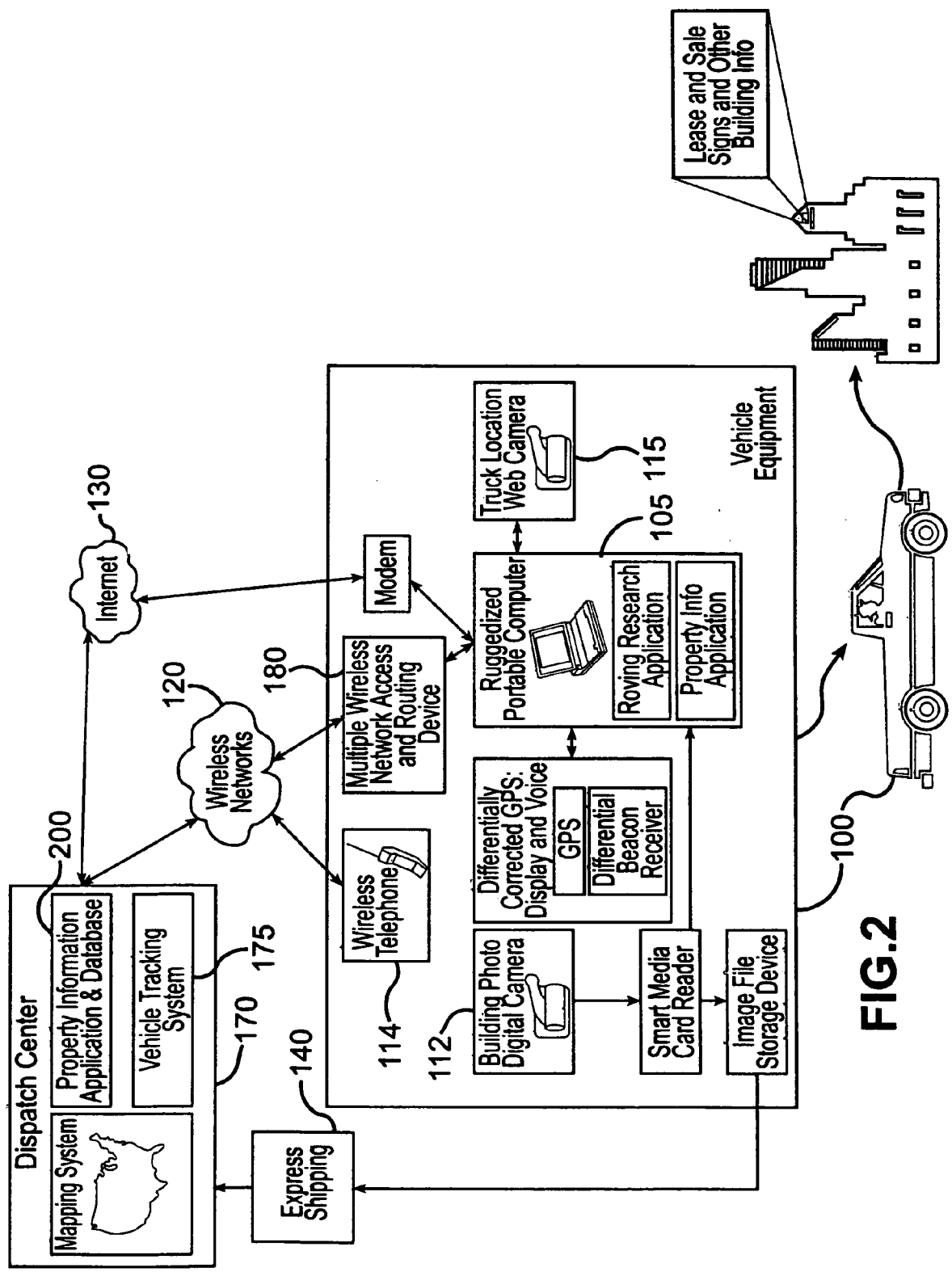
FIG. 2 is a schematic representation of the mobile information gathering system and related system architecture, according to a preferred embodiment of the present invention.
Figure 3:
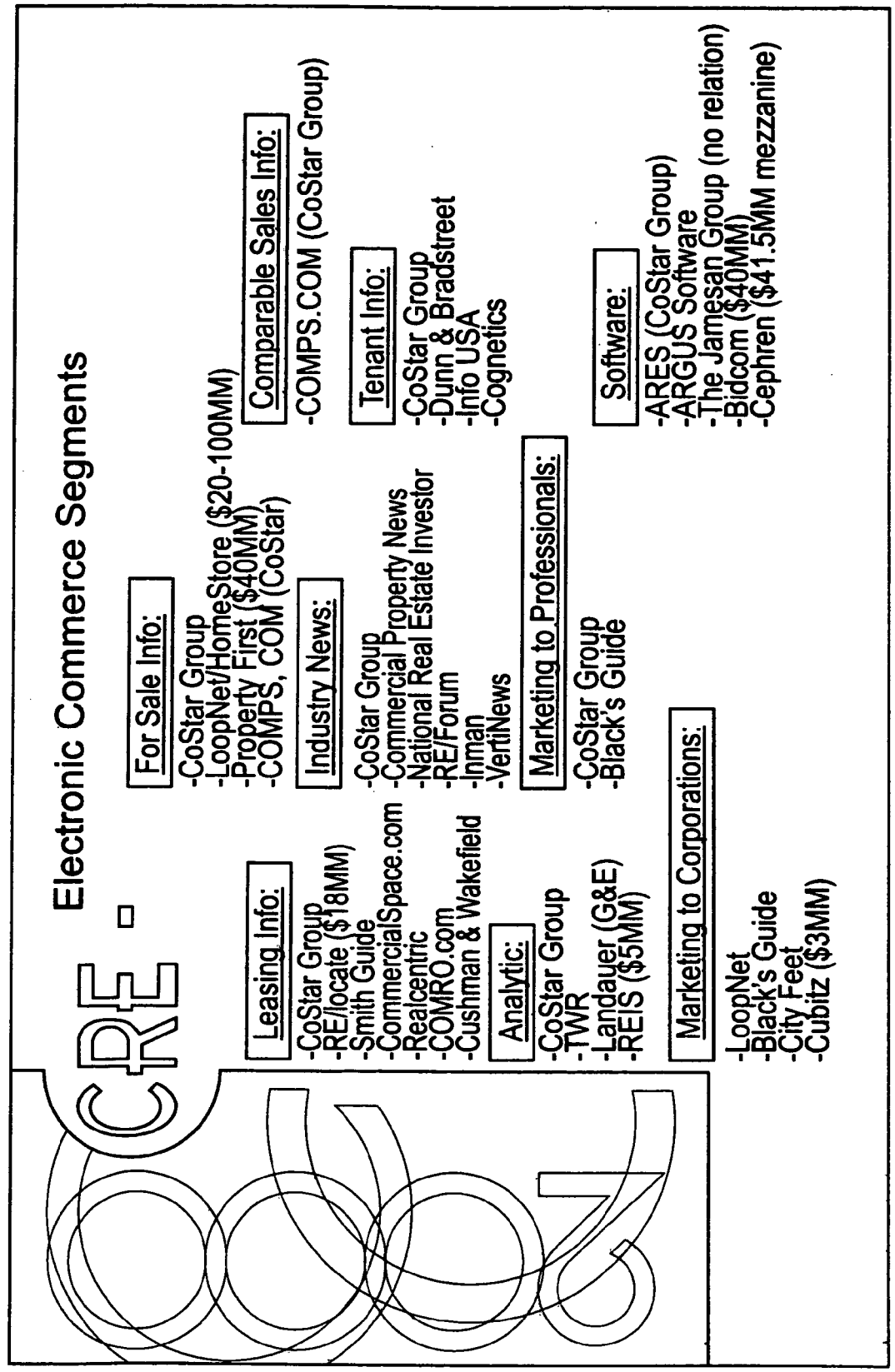

In a further embodiment of data collection, FIG. 2 is a schematic representation of a mobile information gathering system and related system architecture. As shown, the mobile information-collecting device is a truck 100 that is equipped with a GPS system 110 and a link for data transmission (through wireless network 120, the Internet 130 and/or by express shipping 140) to the databases 200 of the system of the present invention which are shown at a dispatch center 170. The device (truck) 100 further includes a display screen, audio output and data input device (here in the form of a portable computer 105), and can also include a web camera 115 that transmits a continuous "driver's eye" view to the dispatch center 170. Other equipment includes digital camera 112, wireless telephone 114, and other computer and communication equipment.

The system is designed such that the location of the truck or other mobile information gathering device 100 at any particular instance is correlated to the database 200 so that information concerning properties in the vicinity of the truck is automatically displayed on the display screen located in the truck. Thus, as a truck passes a particular commercial real estate building, information pertaining to that building is displayed, and the operator can determine whether additional information has to be gathered or whether information obtained in the database should be modified. The important thing is that the system automatically retrieves and displays the entirety of the currently available information so that the operator can determine if pieces of information are missing or need to be updated.

As shown, in the context of the system of the present invention, the mobile data gathering and dissemination vehicle 100 is coordinated by a central system 170 for tracking and dispatch of mobile vehicles 100. Using a multiple network access and routing device 180, the system employs least cost routing for data transfer system for transmitting data from the mobile vehicle. The mobile data gathering and dissemination vehicle plays an important role in quality control and synchronization of data stored in data sources by periodically verifying and filling gaps in the data stored in the databases. The system also cross checks data sources and prompts the input agent (whether in the field or a central office) to make necessary changes in databases affected.

An important and more widely applicable aspect of the present invention is correlation of data stored in a remote location to vehicle position in real time. This feature is applicable in the context of commercial real estate, residential real estate, and as part of a merchant directory. For example, a similar device can be used in connection with residential real estate listings to display pertinent information and directions to the nearest available home for sale. Likewise, the system could be used to display information concerning merchants within a particular area in a non-commercial setting. For example, the GPS in a passenger car could be linked to a database that contains information about local merchants, such as restaurants. As the driver approaches these restaurants, the system could display advertisements or other information pertaining to the restaurants.

Thus, in accordance with the present invention, the system is able to provide location-sensitive real estate information automatically and perform other useful tasks by correlating a vehicle's instantaneous position to data stored in a remote database to identify geographically pertinent information and by transmitting the geographically pertinent information to the vehicle, by for example displaying the information on the display panel within the vehicle or by playing audio announcements of the information.

In the context of commercial real estate, the mobile information collection and dissemination system for correlating data to a vehicle's location and for transmitting the data to the vehicle in real time includes the vehicle 100 equipped with equipment for both transmitting and receiving data. The vehicle position is preferably determined by GPS and the system links GPS data to real estate information. The system intelligently correlates vehicle position to real estate data, retrieves the appropriate real estate data as the vehicle travels and then transmits information back and forth over a network, preferably the global information network (i.e., the Internet or web). As the vehicle drives down the street, pictures of the buildings are automatically displayed on a display screen. The user need not search, because the information just pops up on the display screen. This information could include, for example, descriptions and photographs of buildings. The data changes automatically as the user drives down the street. The user (in this example a field researcher) is prompted to gather and transmit information that is missing.

In addition to using the system of the present invention to research properties, the system brokers or customers could use the system such that as the broker or prospective tenant drives around, the information on the property nearest them comes up. Such a system is also useful for residential real estate brokers. Naturally, access to data and the amount of content provided must be tailored to the particular user to address security and market concerns. Using data available on the database of the present invention, however, the system could provide a virtual tour of a commercial building. The same approach could be employed in the residential context provided one had access to a database of residential property information.

Linking position data to commercial information is valuable in other contexts as well. For example, position location information could be correlated with information concerning commercial establishments, such as restaurants, for advertising or directory assistance purposes. In context of advertising or marketing, the system intelligently correlates vehicle position to merchant data, retrieves the appropriate merchant data, and then transmits information back and forth over a network, preferably the global information network (i.e., the Internet or web). As the vehicle drives down the street, ads, promotions, tourist information, or other merchant or general interest information, including pictures of the buildings, are automatically displayed on a display screen. The user need not search nor do anything, as the information just pops up. The data changes automatically as the user drives down the street. The system operator could sell advertisements to be displayed in cars via GPS. The information may be audio and/or a visual on a screen.

The system also stores the recent history or sequence of vehicle movement so that the speed and the direction of movement can be ascertained. Direction of movement information is useful in the real estate information gathering and display context since it helps the central system track, dispatch, and route mobile vehicles. Direction of movement information is useful in the merchant directory/advertising/marketing context since the direction of movement affects the geographic desirability of commercial establishments. For example, if a user is driving 80 miles an hour going South, restaurants that are 5 miles back are not as desirable as restaurants that are 5 miles ahead (establishments 5 miles East or West are also not too desirable). Thus, as the vehicle moves the system preferably takes speed and direction of travel into account when correlating data such as ads, promotions, tourist information, or other merchant or general interest information, including pictures of the buildings, with vehicle position for display on the display screen.

The information to be retrieved and displayed to the user based on the user's location can be stored locally with the user or transmitted to the user from a remote database. As the display content becomes data rich, however, storing the information locally and keeping information uniform and current becomes difficult. For this reason, transmission from a remote repository is preferred whenever sufficient transmission bandwidth is available.

Linking position data to commercial information is also useful in contexts other than the mobile vehicle. The system could be used to transmit location sensitive real estate information to a user's PDA or laptop computer, for example. For example, PDA's such as those made by Palm™ will soon have both a GPS capability and a data transmission capacity. Using the system of the present invention, information could be retrieved from the database of the present invention and displayed on the user's PDA or laptop computer based on the user's location. The information can be stored locally with the user or transmitted to the user from a remote database. For example, a user in Loudoun County investigating a property, looking at 5 or 6 adjoining parcels could have a Palm VII telling the user who owns the parcels around where the user is standing, who the tenants are, what the rent is, and what the sale points are.

System Operation

FIGS. 3–17 are slides that graphically depict the commercial real estate market and the process for transactions within that market, to provide the context in which a preferred embodiment of the present invention operates.

Referring now to FIGS. 3 through 17, FIG. 3 shows the electronic commerce segments involved in commercial real estate. Specifically, there is a need for leasing information, sale information, industry news, comparable sales information, tenant information, information for marketing to professionals, and information for marketing to corporations and software. These will be described below. Concerning "for sale information," the information will list what types of buildings are for sale. Concerning leasing information, the information pertains to buildings that are available for lease or to space within buildings that are available for lease. Concerning industry news, the information can be any of a wide variety of information that provides industry professionals with news that they need. Concerning tenant information, information will relate to the needs and financial characteristics of commercial real estate tenants. Analytic information relates to the types of information that real estate investors or landlords use to assess the market and the value of any particular property.

The commercial real estate market is enormous. Within the United States alone, the collective value of commercial real estate assets is estimated to be in excess of $4 trillion dollars. Approximately one hundred thousand building sale transactions occur each year. The value of these transactions is estimated to exceed $300 billion. Every transaction involves multiple parties. Notwithstanding the enormity of this market, the prior art system for facilitating these transactions is enormously inefficient.

Figure 4:
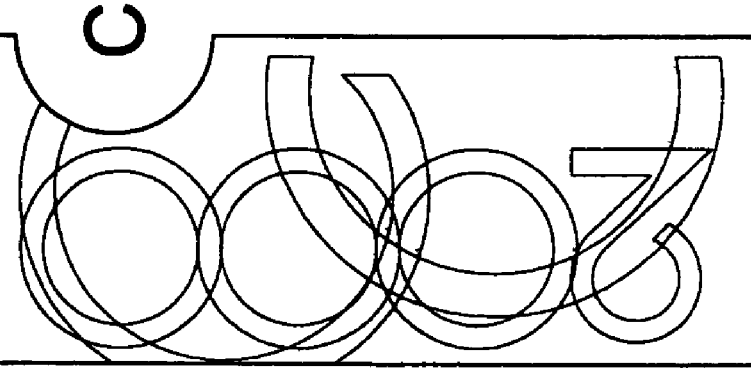

As shown in FIG. 4, the current prior art inefficiencies in the market include the fact that only a fraction of the real audience ever sees any particular property. In particular, the conventional way of selling commercial real estate is through buyers' brokers representing the buyers, and sellers' brokers representing the sellers. Unlike the sale of single family homes, the availability of high-value commercial real estate is not widely advertised. This is because of the way that high-value commercial real estate properties have typically been marketed in the past. In particular, when a seller's broker is prepared to offer a seller's building, the seller prepares a lengthy offering document and distributes the lengthy offering document to a very small group of select potential purchasers. These potential purchasers may be thought of as being within the inner circle of the seller's agent. This practice is so prevalent that if a potential buyer or buyer's broker receives a building offering from a broker and the buyer's broker or potential investor knows that they are not within that sellers broker's inner circle, they will assume that all potential buyers within the sellers broker's inner circle have passed on the building and that the mere receipt of the building offering indicates a building value that is tarnished in some way.

Other inefficiencies in the current prior art way of selling commercial real estate include the fact that there is a significant marketing expense involved since the marketing involves preparation of lengthy documentation and because the system in place is not highly automated.

Another inefficiency in the prior art is a basic economic inefficiency of the market. Because the number of bidders is limited, the price is lower than it might otherwise be if all possible bidders or a greater number of bidders were allowed to bid on the property. In addition, the current system is inefficient because it is very time-consuming. Moreover, there is too much risk and expense for the buyer, and buyers see only a fraction of their options.

Figure 5:
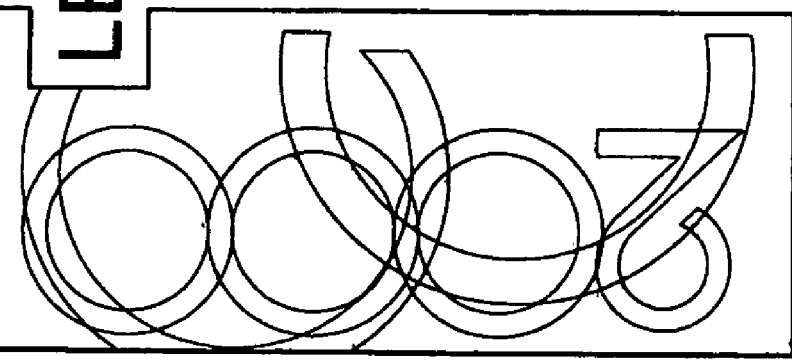
Figure 6:
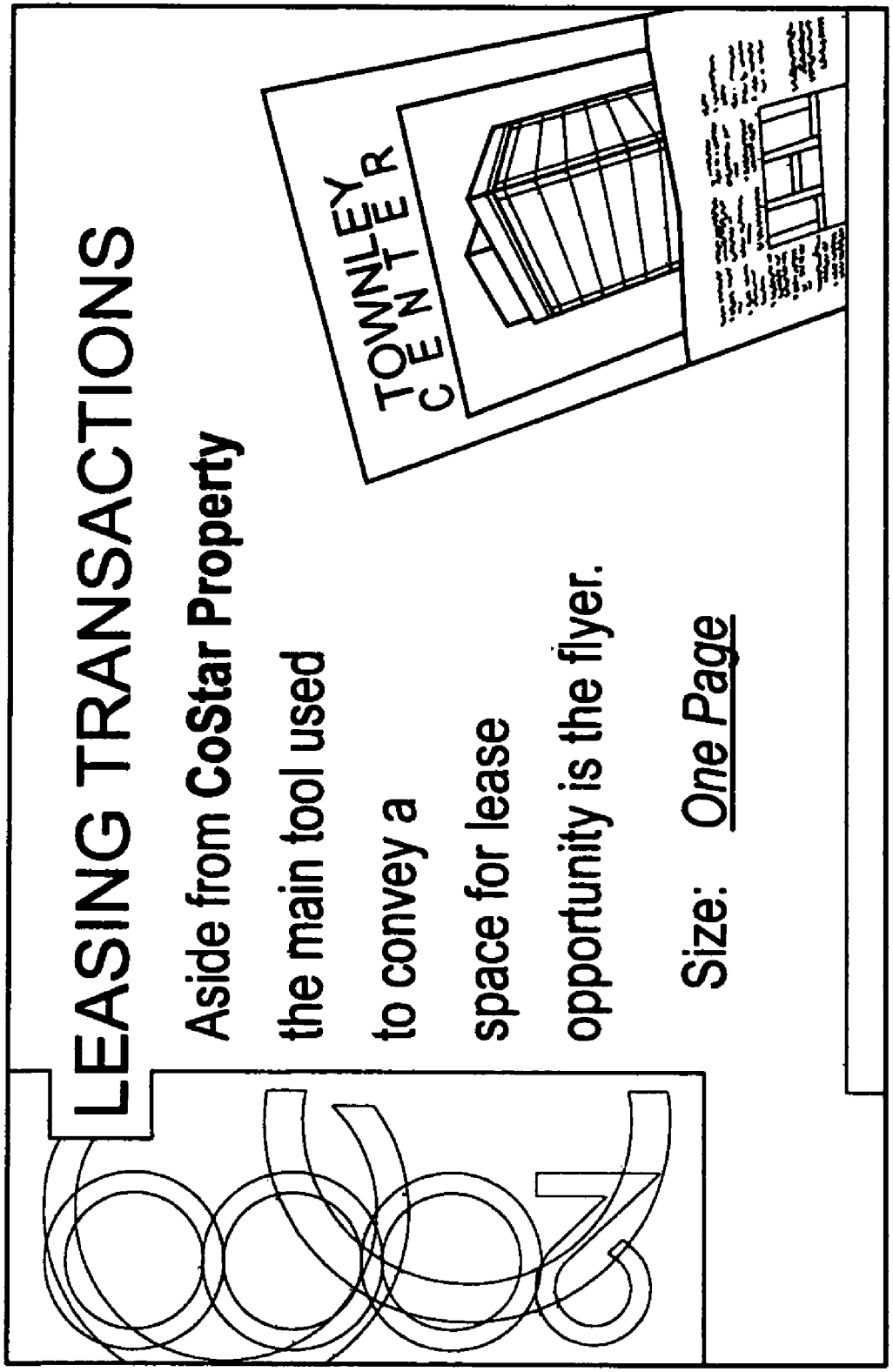
Figure 7:
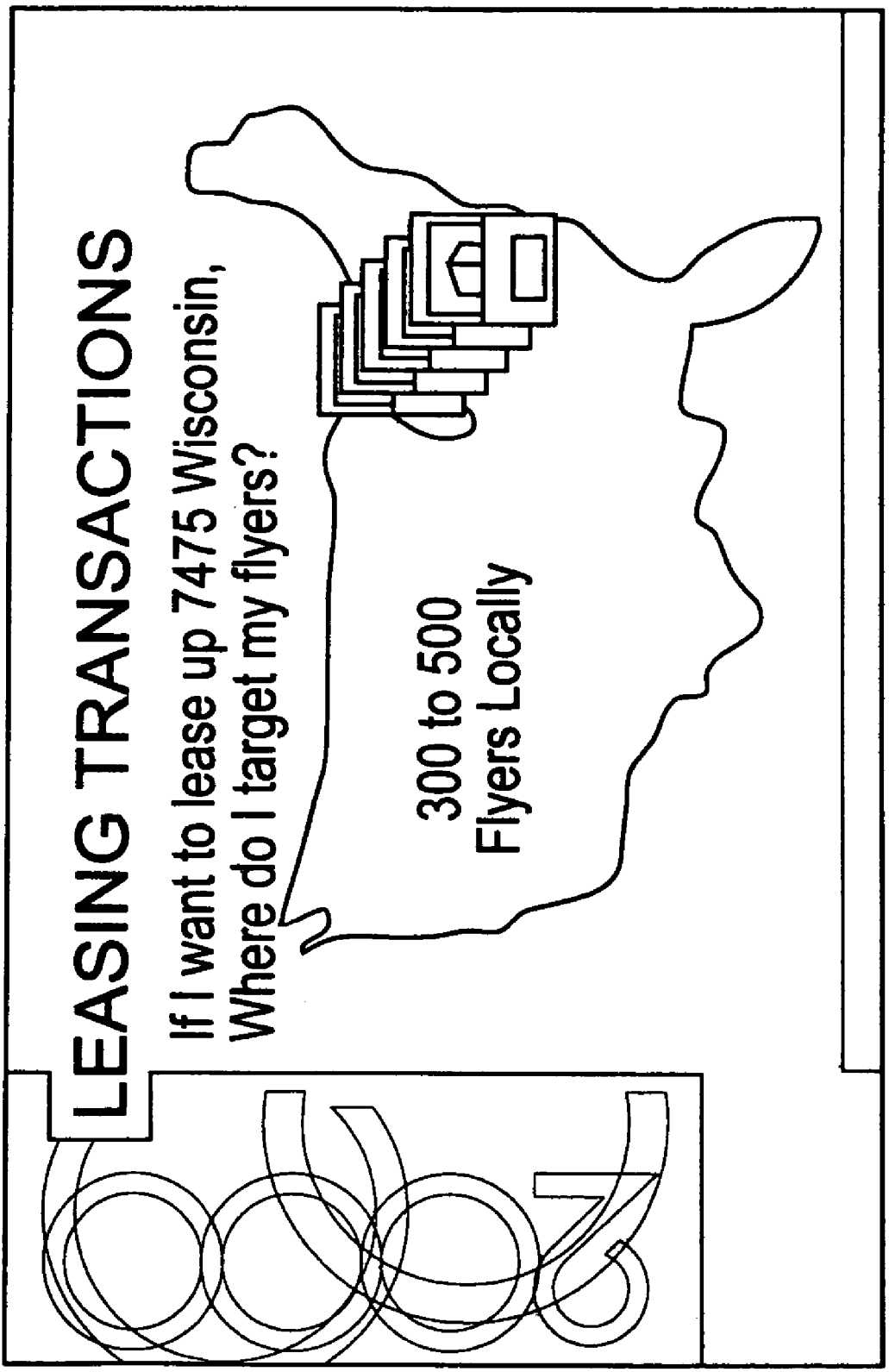

The commercial real estate process will now be described beginning with the conventional prior art process for leasing transactions. As shown in FIG. 5, from the vantage point of the prospective tenant, the leasing transaction is basically decided based upon three considerations: 1) Do I like this location? 2) Do I like the building? and 3) Can I afford this rent? As shown in FIG. 6, the main tool used to convey a space for a lease opportunity is a one-page flyer. Thus, the conventional prior art marketing approach for marketing a property for leasing is to distribute 300 to 500 one-page flyers locally, as shown in FIG. 7.

Figure 9:
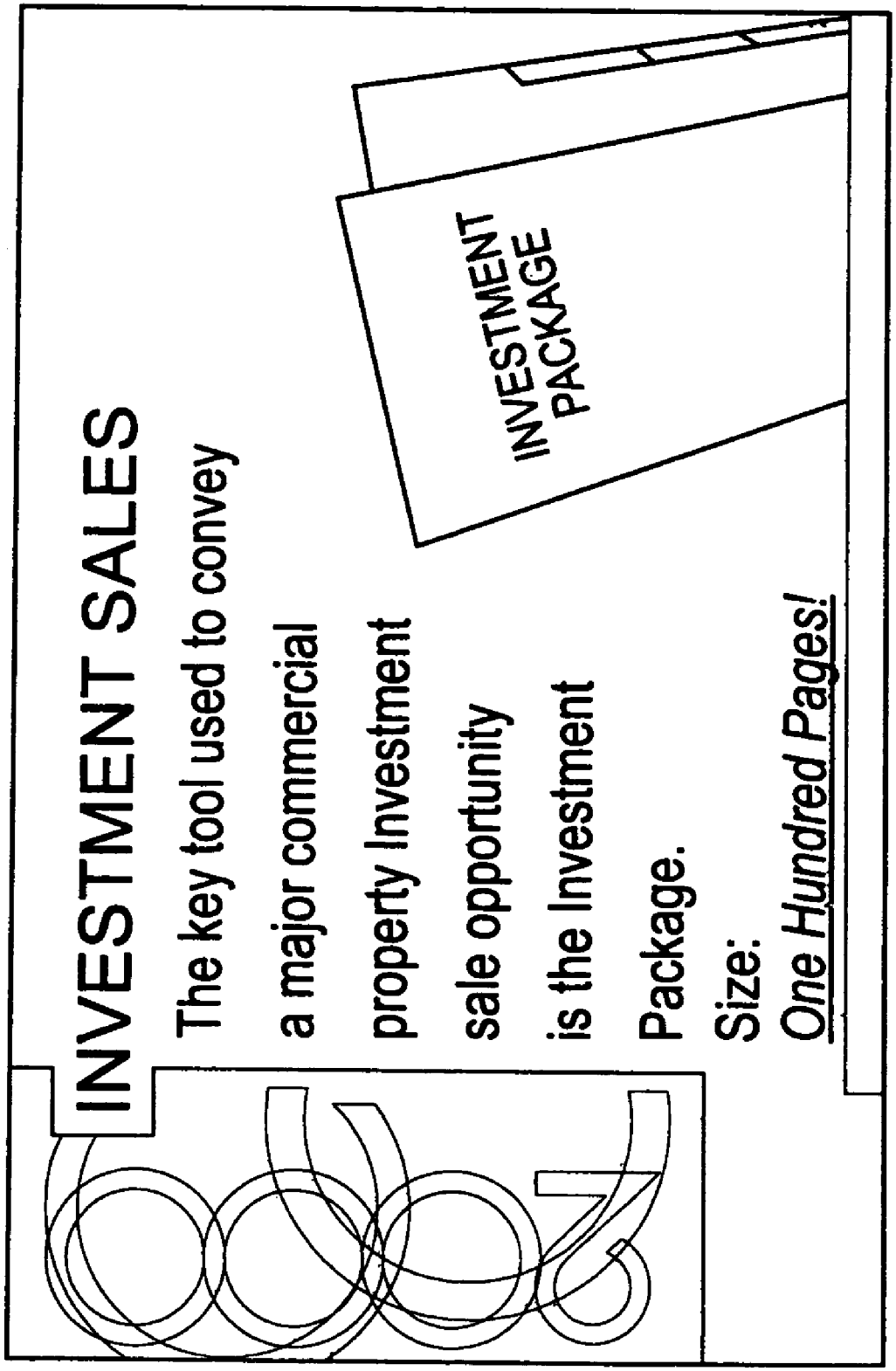

In contrast, the prior art investment sales process is considerably more complex. To begin with, there are many more considerations as summarized on FIG. 8. These include: 1) Is this the right type of property?; 2) Do we invest in properties in this area?; 3) Is this building leased up enough?; 4) When do the tenants' leases expire?; 5) Are these good credit tenants?; 6) Does this building have enough income?; 7) When these tenants' leases roll, will I get good rents?; 8) Does this market have a low vacancy rate, such that I can re-lease quickly?; 9) When I have to re-lease, who will my competitors be?; 10) Based on other sales in this area, is this a fair price?; 11) What multiple revenues are other buildings selling for?; 12) Can I get reasonable financing for this property?; 13) Will the seller accept an offer of $35 million?; 14) Will the seller accept these legal terms of sale?; and 15) Did my engineers find structural or environmental flaws? Because of the complexity of issues that must be considered, the main tool used in the prior art to convey a major commercial property investment sale opportunity is the investment package, which typically is a document on the order of 100 pages, as shown in FIG. 9.

Figure 10:
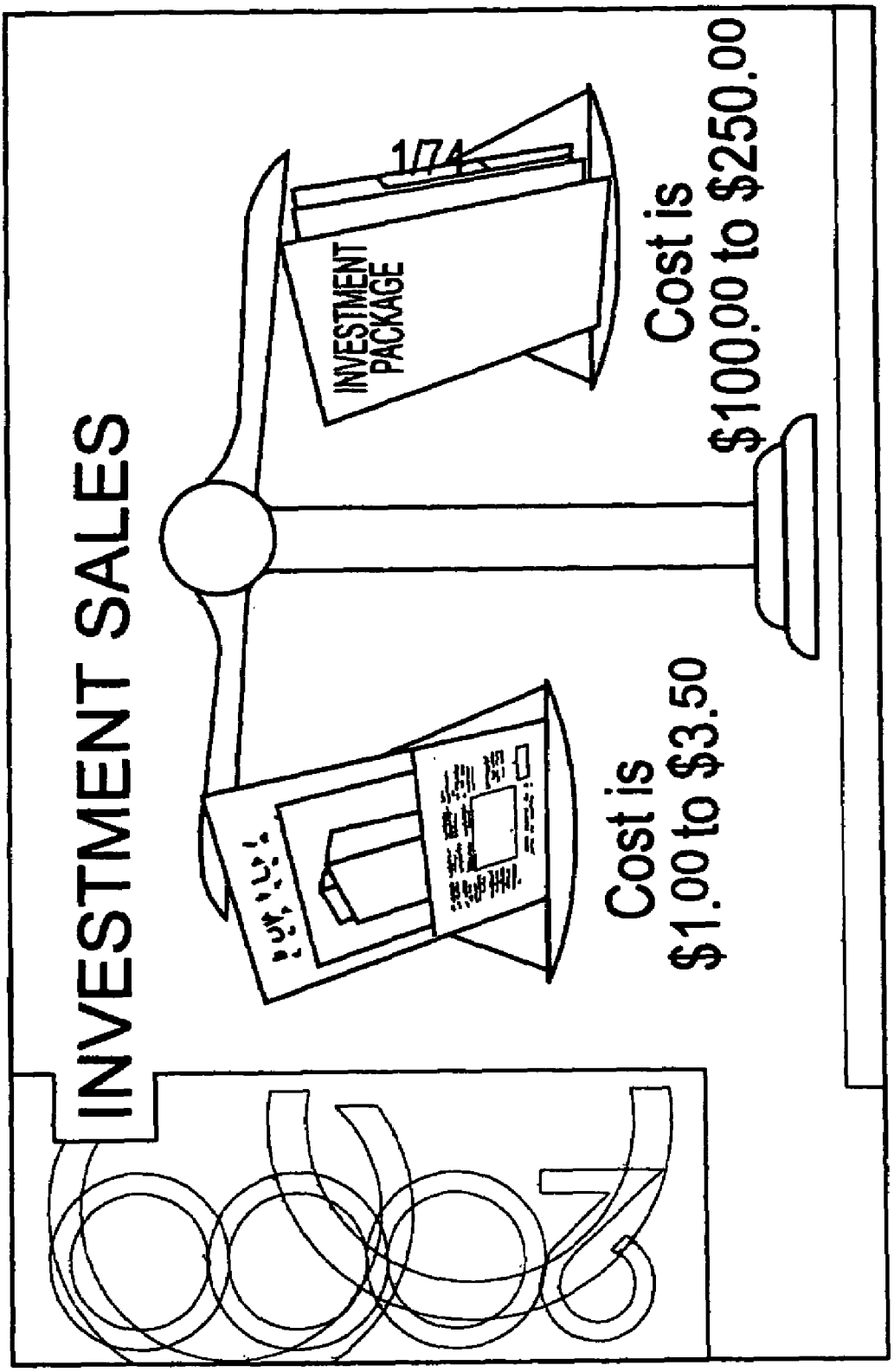
Figure 11:
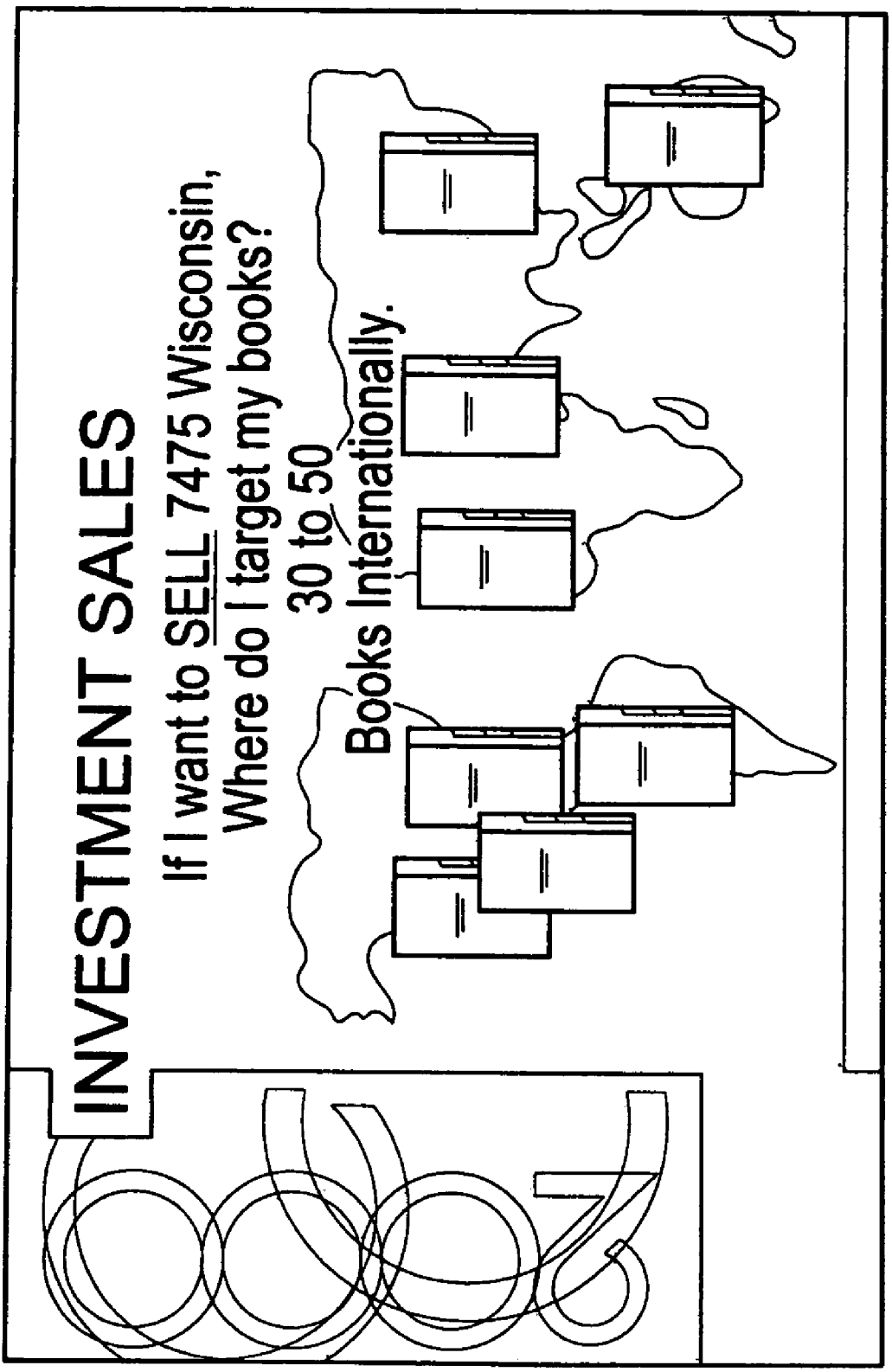

FIG. 10 shows the relative comparison between commercial leasing and investment sales. As noted before, in the case of commercial leasing, the main tool is a one-page flyer that typically costs $1.00 to $3.50 per copy. In contrast, the main tool for investment sales, i.e., the investment package, costs between $125.00 and $250.00 per copy. The distribution of these books is very different, as well. In particular, as shown in FIG. 11, if one wishes to sell a particular building, the books are distributed to a group of 30–50 sophisticated real estate investors and brokers internationally.

Figure 12:
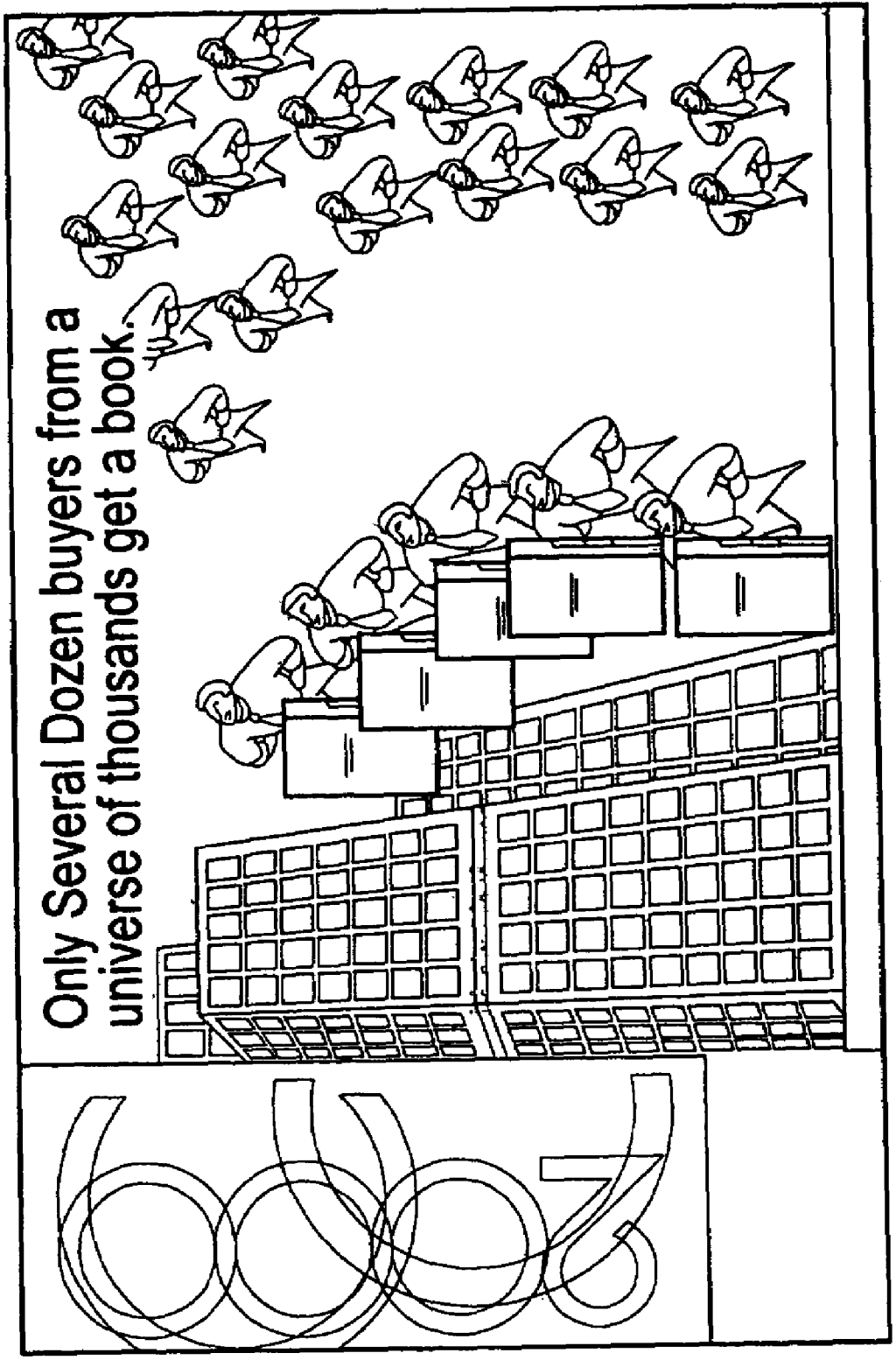
Figure 13:
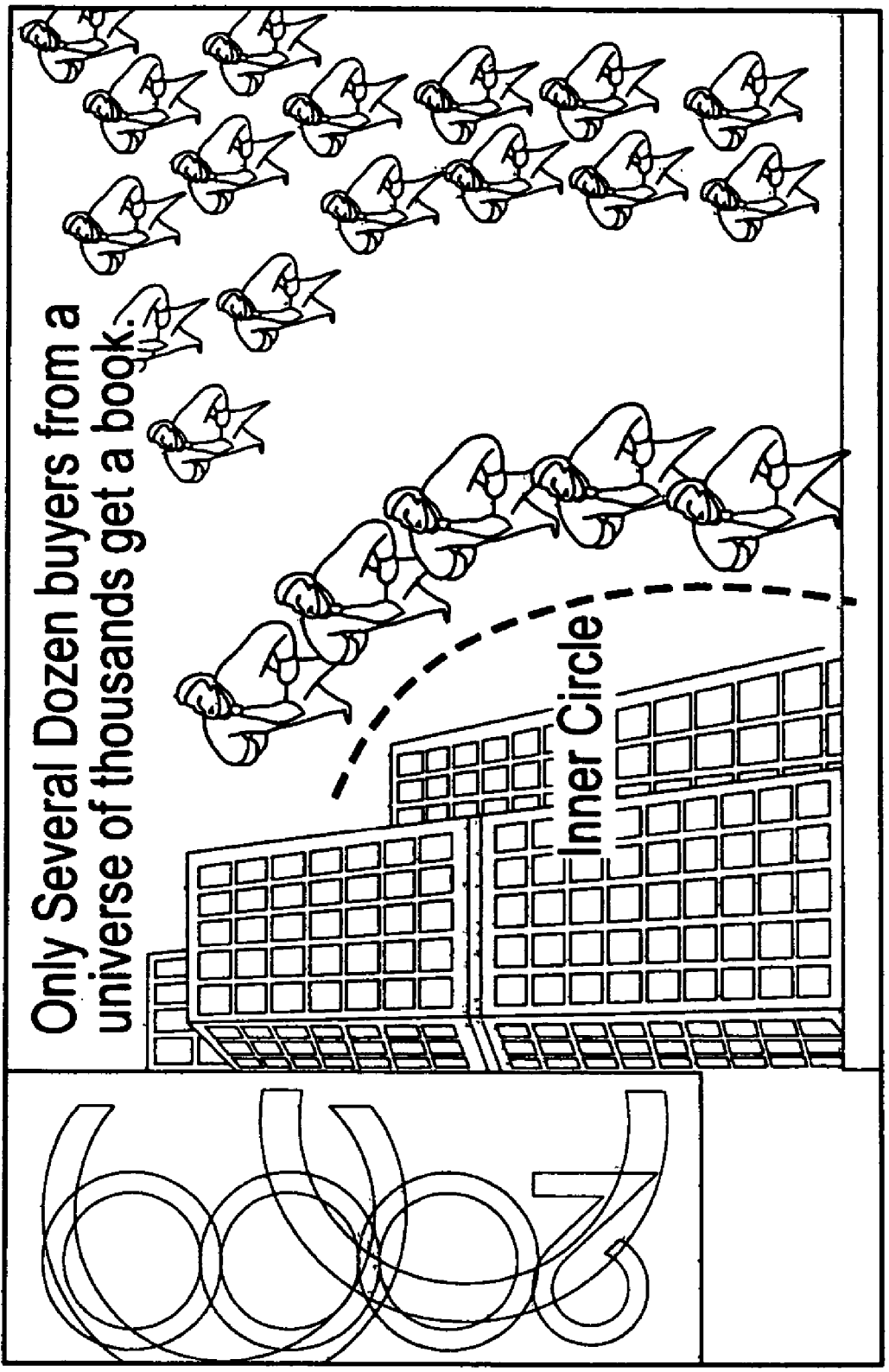
Figure 14:
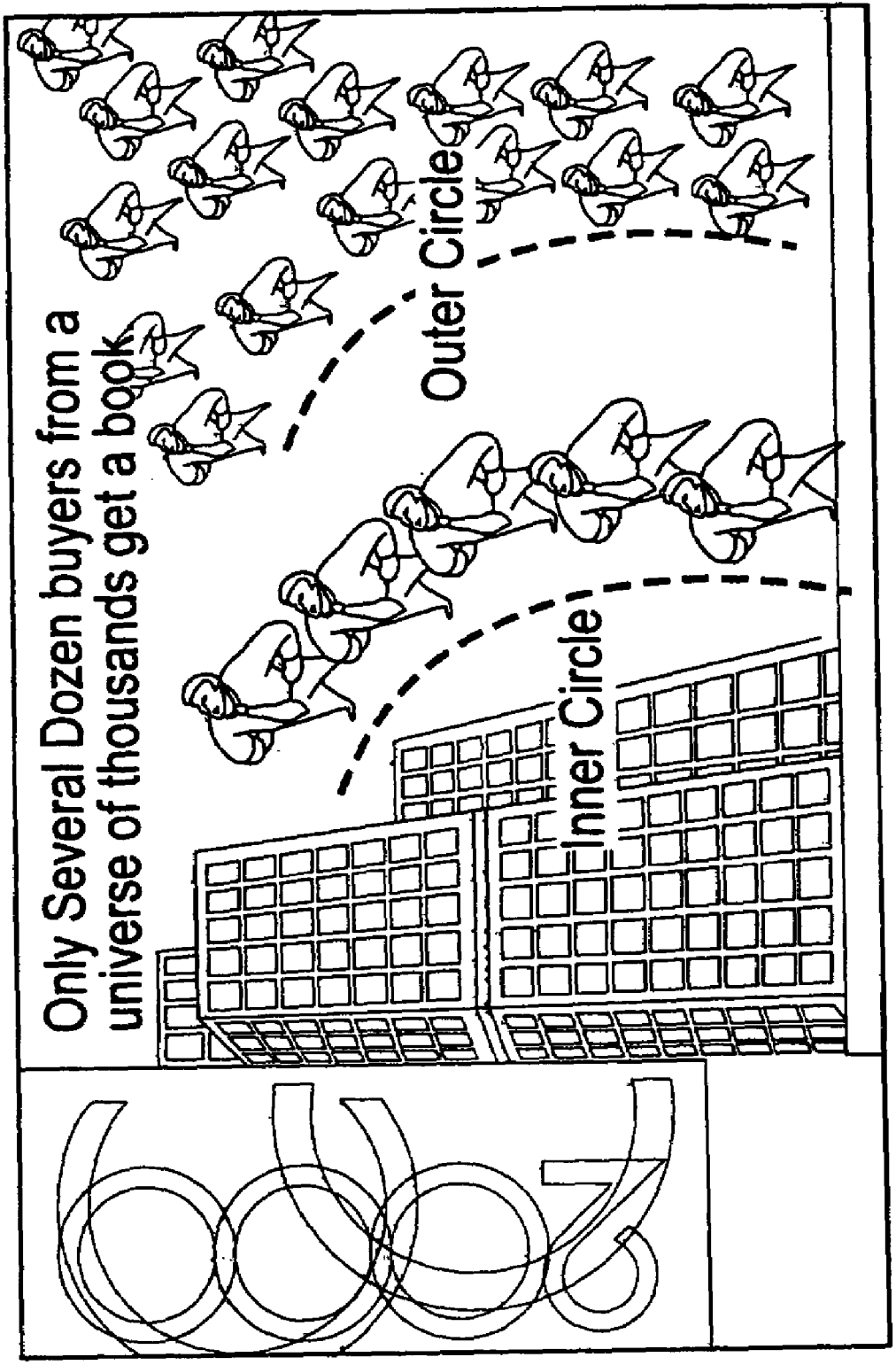

Consequently, only several dozen buyers from a universe of thousands get a copy of the "book," i.e., the investment package, as graphically illustrated by FIG. 12. The select few buyers from the universe of thousands that get a book are typically referred to as the inner circle of the seller's agent as shown in FIG. 13. The remaining universe of potential buyers that are not selected, i.e., that are not in the inner circle of the seller's agent, are referred to as the outer circle, as graphically illustrated in FIG. 14.

Figure 15:
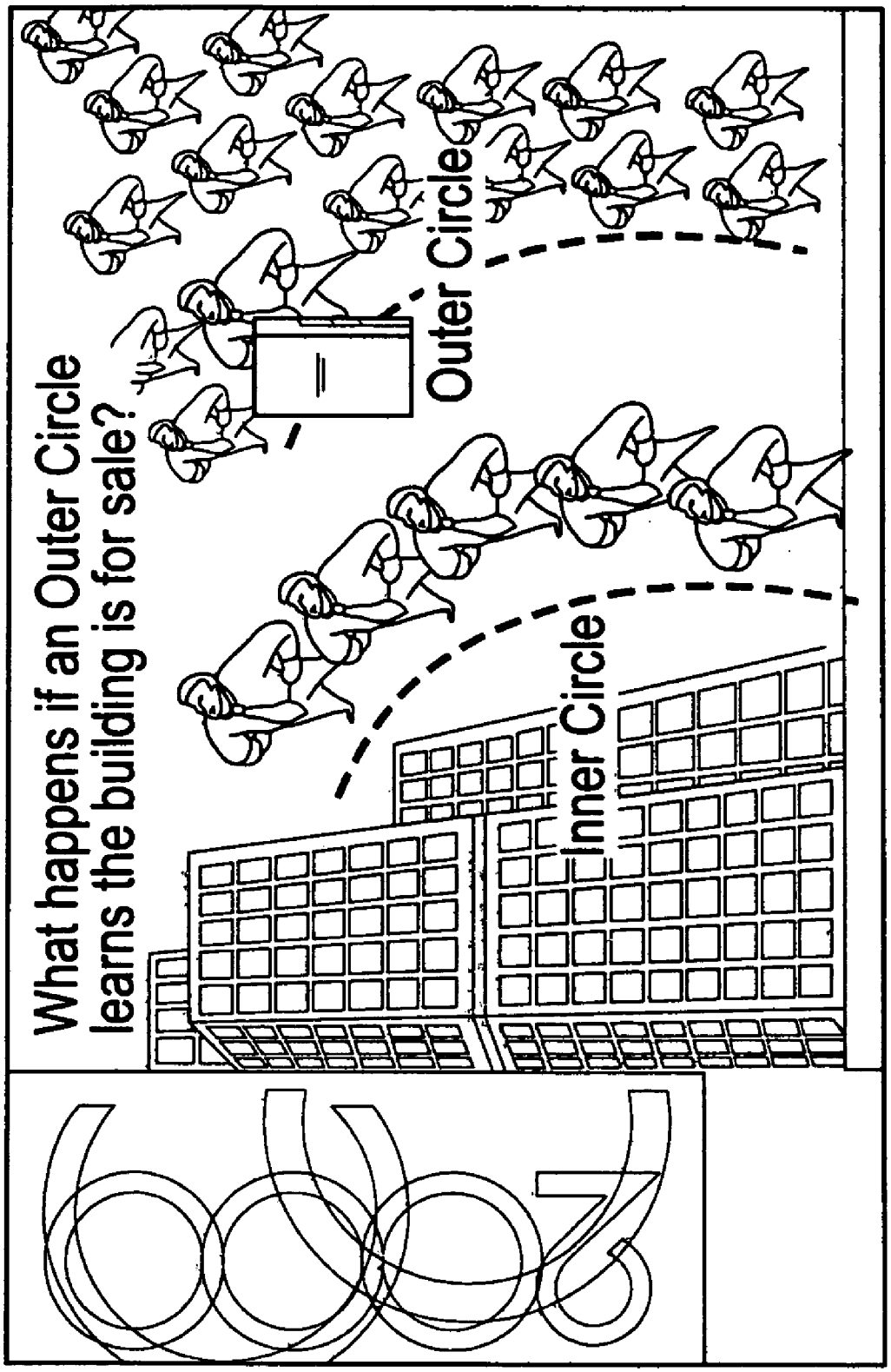

As alluded to earlier, a distinctive characteristic of the commercial real estate industry is what happens if a broker or investor in the outer circle learns that the building is for sale as graphically illustrated in FIG. 15. In this instance, the property is immediately tarnished and the value of the property is reduced. This is because the practice of distribution of the investment book to only those buyers, agents, or investors within the broker's inner circle is so prevalent that, if a buyer's broker or investor that is not in the seller's agent's inner circle receives a copy of the book, they will assume that all of the individuals in the inner circle have passed on the property and, for that reason, the property is tarnished, and the value is reduced. Thus, for acceptance within the commercial real estate community, the present invention includes a secure way of controlling distribution.

Figure 16:
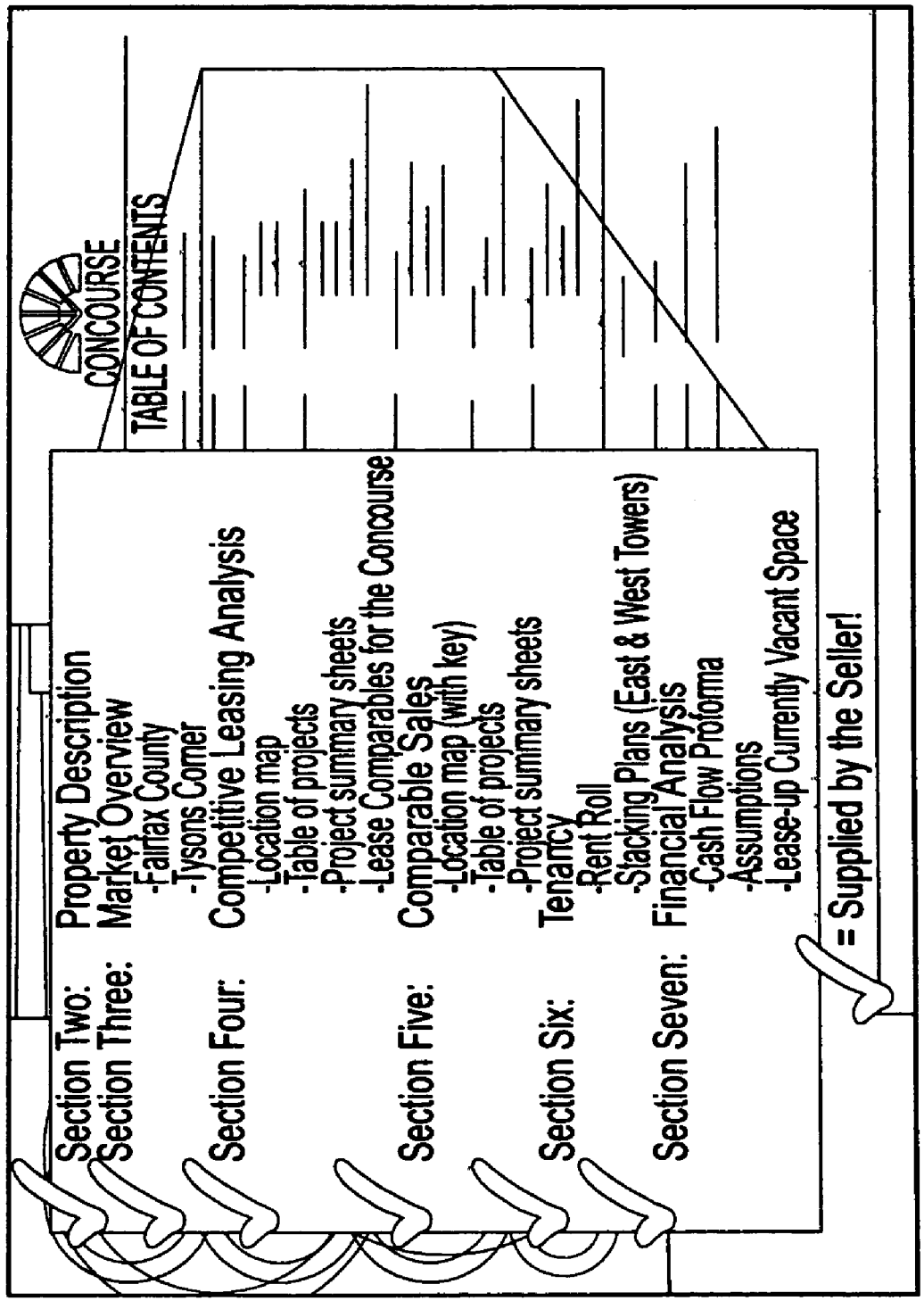

FIG. 16 shows an example of the table of contents of a prior art investment book for a high-value commercial property. As shown therein, the investment book typically includes an investment summary, a property description, a market overview, a competitive leasing analysis, information concerning comparable sales, information concerning tenancy, and a financial analysis. In a conventional setting, all of this information is supplied by the seller—an interested party. Because the seller has an interest in selling the property, this information is naturally suspect. Thus, notwithstanding the tremendous amount of effort that is necessary to compile the information, the information is ultimately of little value to a potential buyer, and must be verified with an objective provider of real estate information, or independently verified.

FIGS. 17–34 are slides that graphically depict a preferred embodiment of the system and method for collection and distribution of information according to the present invention. This system and method operate within the above-described commercial real estate market and transactional process.

Figure 17:
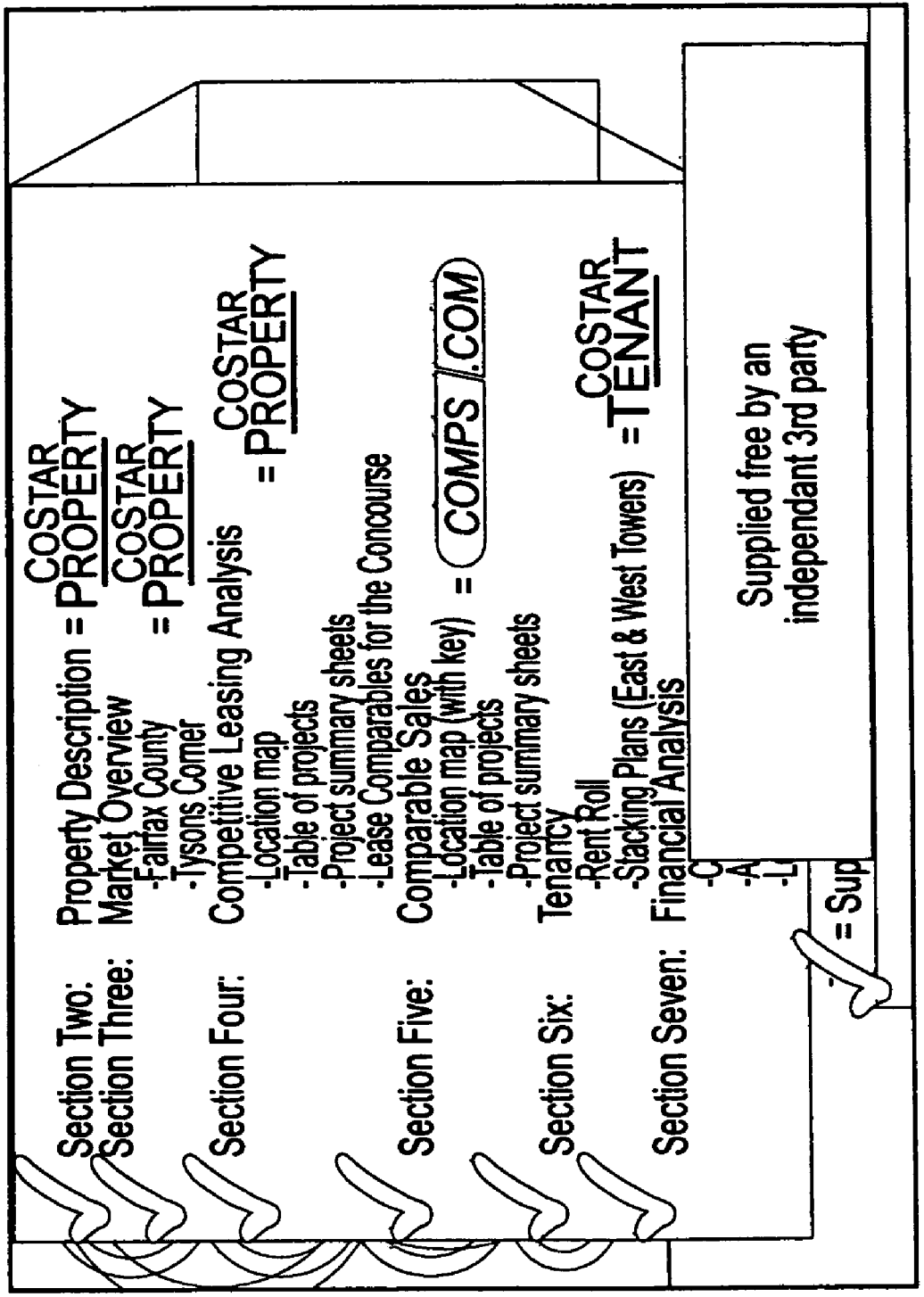

An important aspect of the present invention is the provision of networked databases that can provide much of the information required in the investment book. FIG. 17 illustrates networked databases of a preferred embodiment of the present invention correlated to the typical contents of a prior art investment book.

Referring to the graphical depiction in FIG. 18, the system of the present invention will now be described. In the figure, the system of the present invention is referred to as COSTAR EXCHANGE™. COSTAR EXCHANGE™ is a system that allows owners to list their properties for sale on an Internet website at no cost. A generation of the product is derived from a master database, incorporating much of the data from, for example, tenant and property databases, but emphasizing the sales process as opposed to the listing process. Emphasized information includes tenant information, leasing information, and income and expense data.

Figure 18:
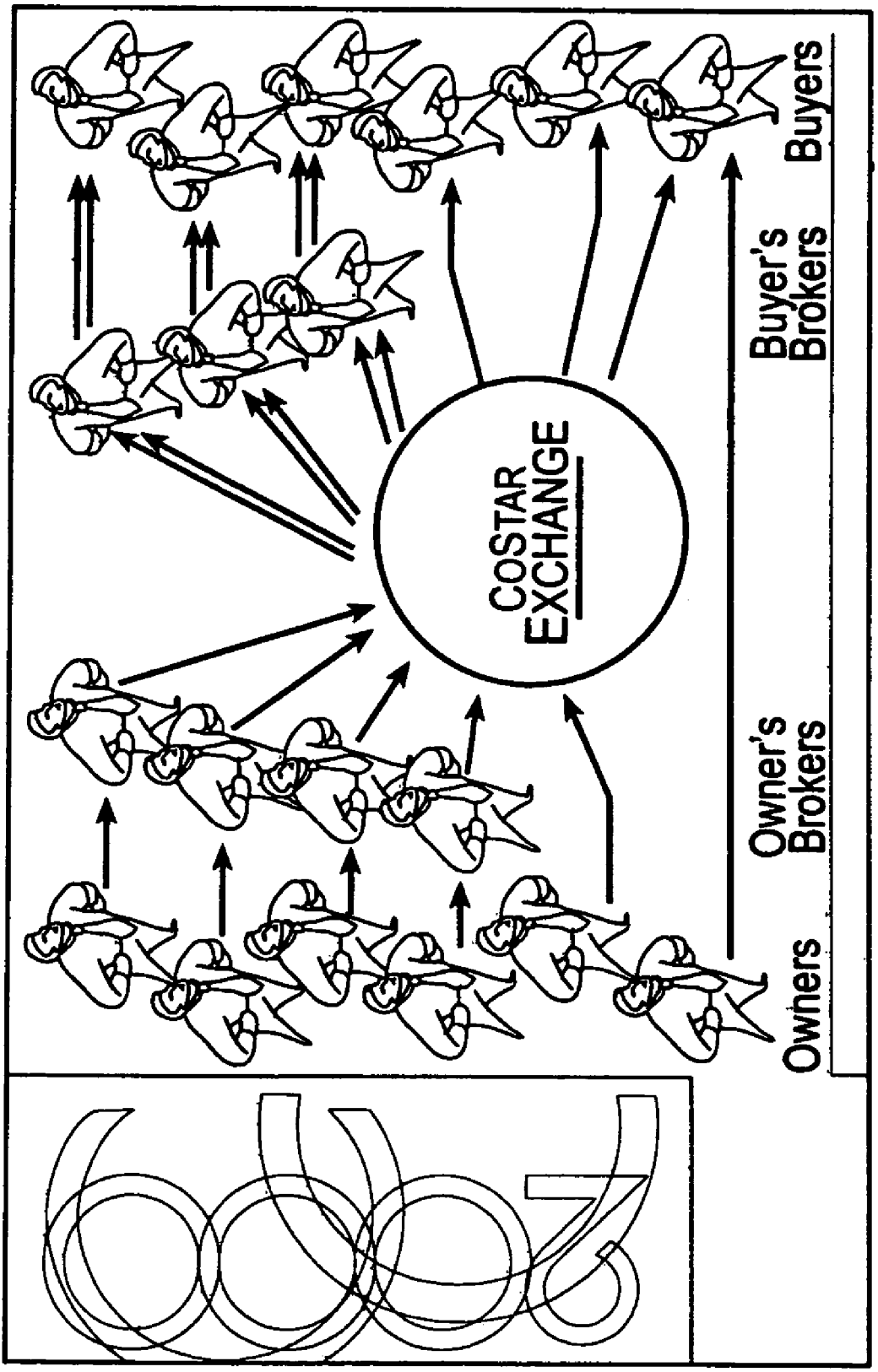

The system, i.e., COSTAR EXCHANGE™, is intended as a tool for facilitating commercial real estate transactions of various forms, as illustrated in FIG. 18. In particular, the system can facilitate transactions between owners' and buyers' brokers, transactions between owners' brokers and buyers' brokers and transactions between owners' brokers and buyers. The system currently contemplated would not be used to facilitate direct owner to buyer transactions, as indicated by the arrow passing directly from owners to buyers that that does not involve the COSTAR EXCHANGE™.

Figure 19:
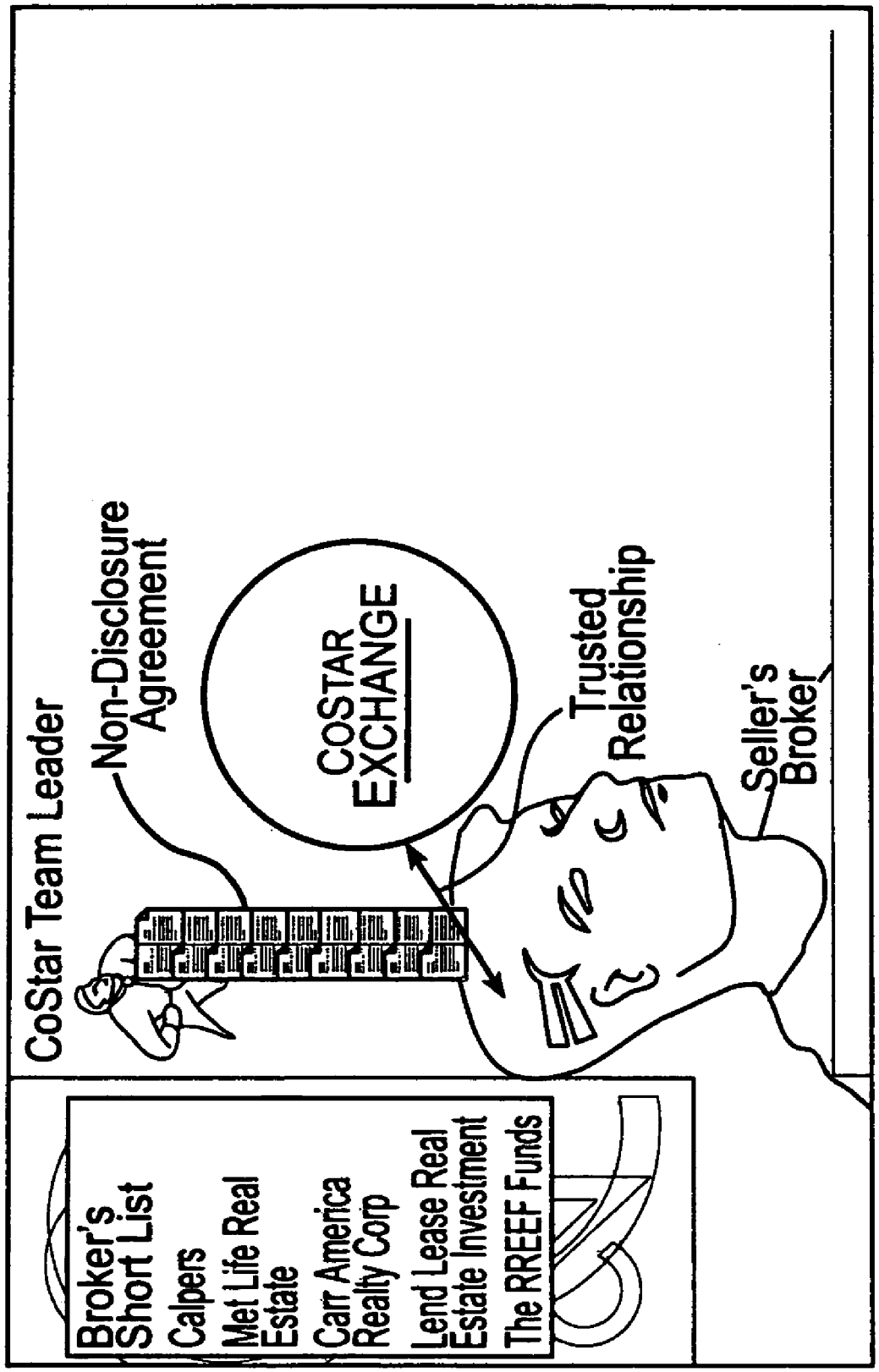

In accordance with the present invention, the system operator, in this case, COSTAR, maintains a database. The database is preferably accessible through the global information network, i.e., Internet or web. In accordance with the invention, property owners list their properties for sale in COSTAR's database without being charged. As indicated in FIG. 19, owners list properties in the database typically through a seller's broker that has a trusted relationship with the system operator of the COSTAR EXCHANGE™. Indeed, for properties worth more than $5 million, there is preferably a contractual arrangement between the system operator and the seller's broker specifying, among other things, a non-disclosure agreement. In the system of the present invention, the system operator designates a team leader to interact with each of the seller's brokers.

For certain properties, it is critically important that distribution of the information pertaining to the property be strictly limited. To most closely replicate the conventional system under which the seller's broker has complete control over to whom the property is "shown," the system includes means for limiting distribution of information on the website. More particularly, the seller's broker that has listed the property has complete control over who has access to the information pertaining to the property that they have listed. In the currently preferred embodiment, the seller's broker works with the team leader to designate individuals that are to receive the information pertaining to the property. This would typically be those buyers or brokers within the "inner circle" of the seller's broker.

Figure 20:
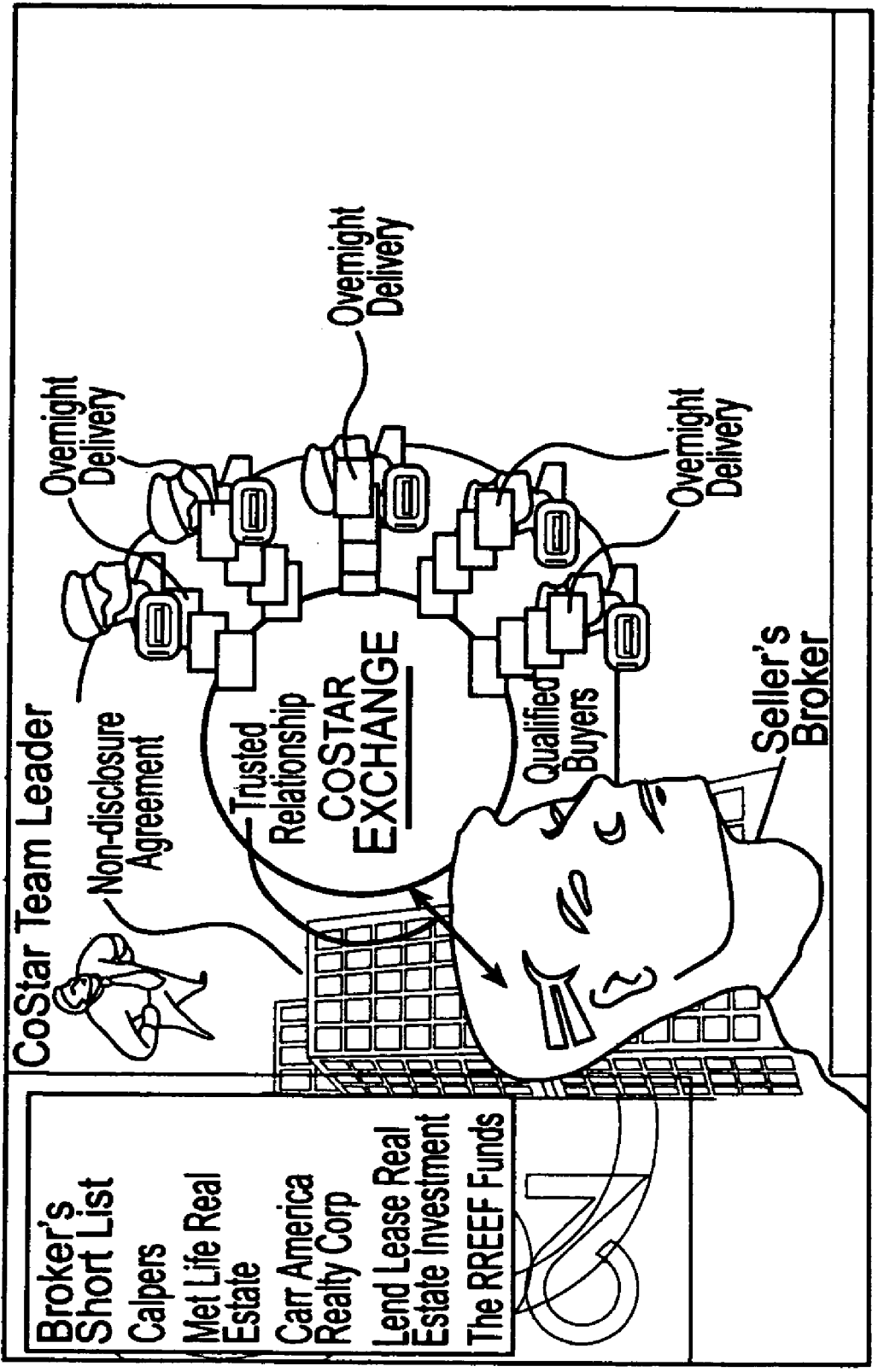

As shown in FIG. 20, the seller's broker has designated five qualified buyers to receive access to the information on the website. Often, these qualified buyers are not subscribers to the general listing features of the system, and, therefore, do not have the ability to learn of the property listing on the system.

Once the seller's broker designates the qualified buyers, the system operator sends to the qualified buyers, preferably by overnight courier, an electronic ID, along with instructions for accessing the system. The qualified buyers use the electronic key to gain access to property listing.

Figure 21:
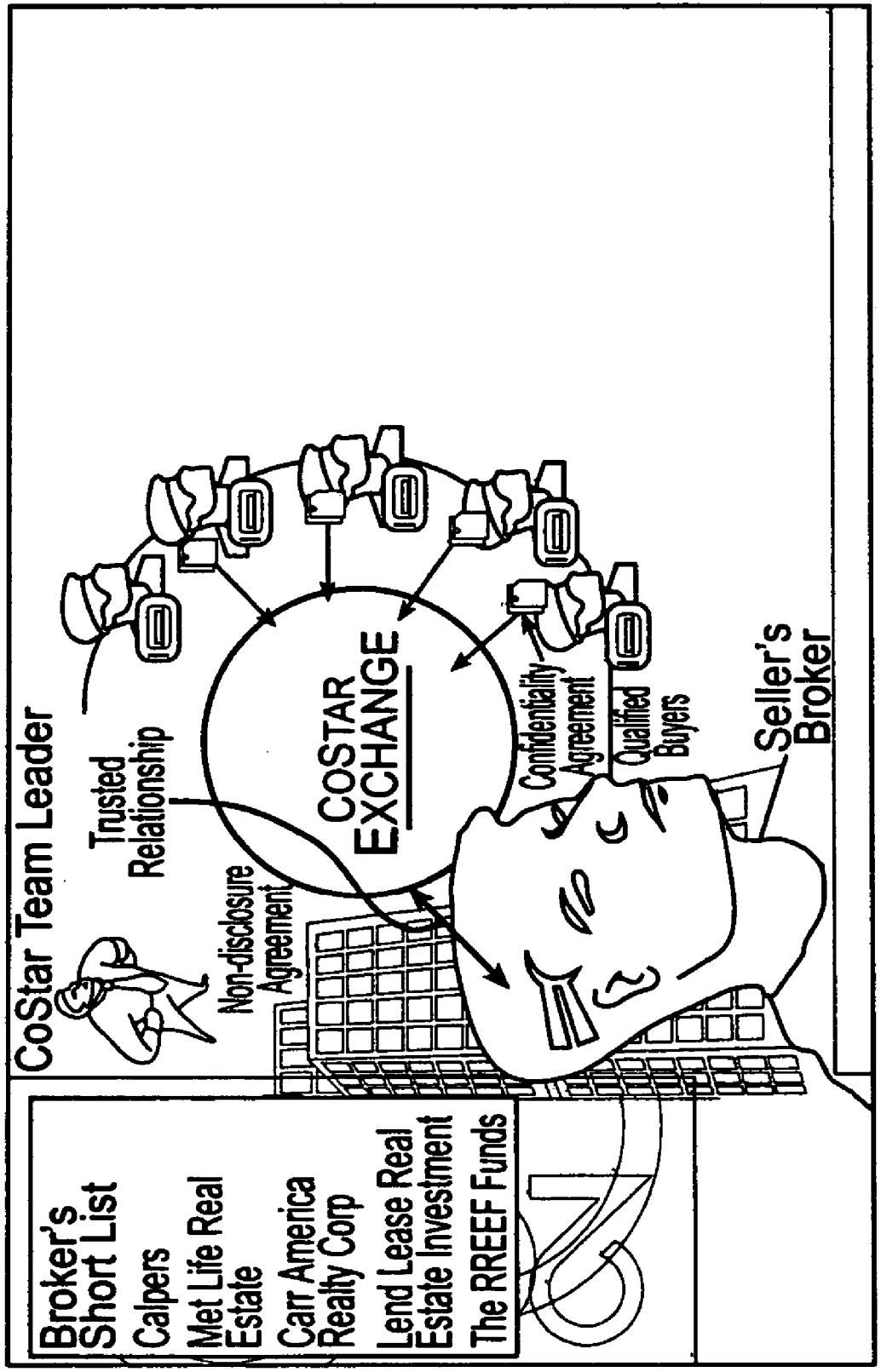
Figure 22:
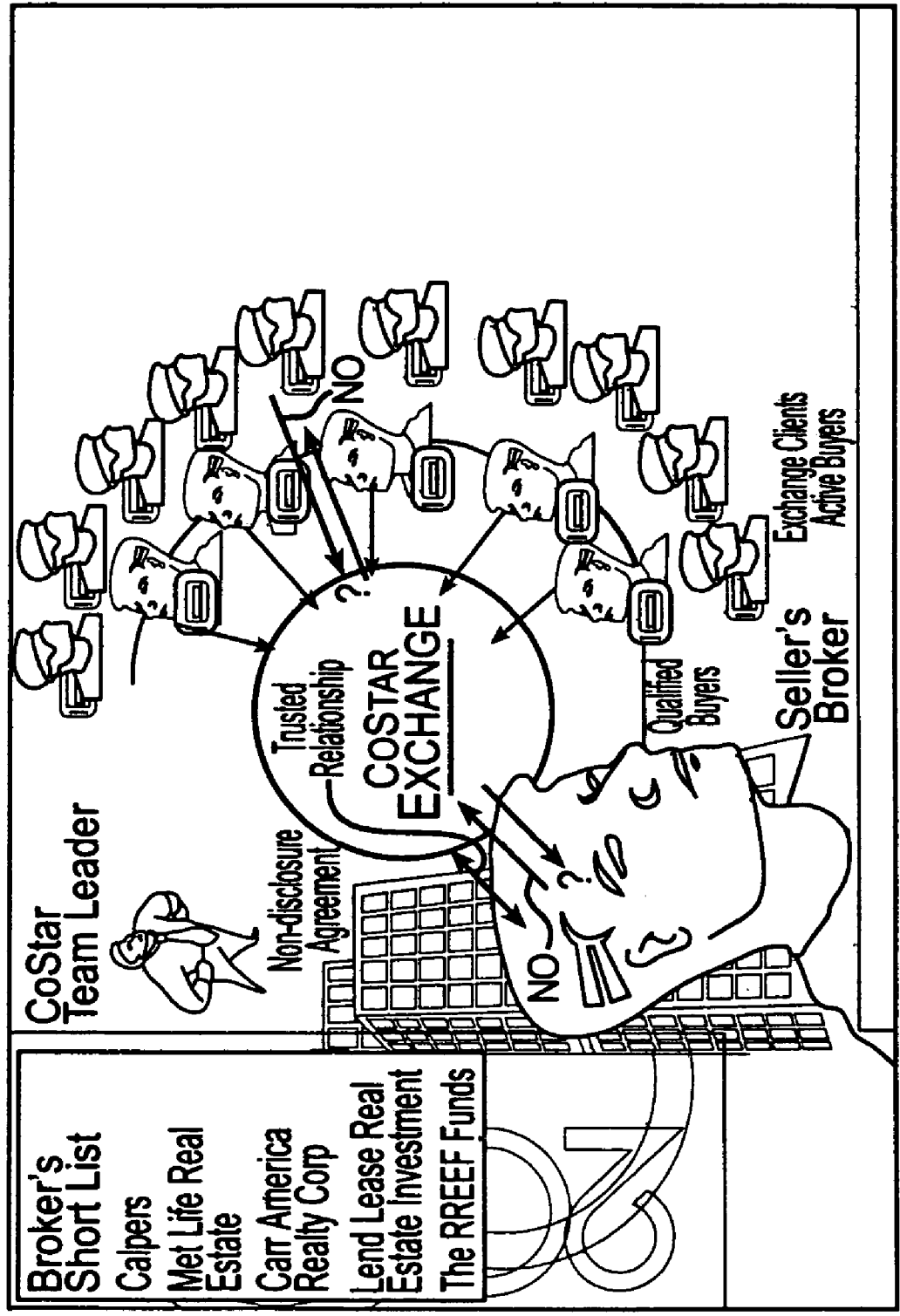

Optionally, before the qualified buyers are allowed to view the information pertaining to the property, the system requires the qualified buyers to first enter into a confidentiality agreement. Preferably, the qualified buyers enter into the agreement by electronically executing and submitting an online confidentiality agreement as indicated in FIG. 21. Executing and submitting the confidentiality agreement could occur, for example, by clicking-through an "accept" button for an agreement posted online or by exchanging electronic documents having electronic signatures. Upon receipt of the executed confidentiality agreement, the system operator allows qualified buyers to access the information pertaining to the property, using the electronic key as described hereinafter. FIG. 22 graphically indicates that the qualified buyers now have access to the system by showing the buyers with their blindfolds removed.

In accordance with another aspect of the present invention, the system operator has a plurality of clients (i.e., subscribers), who presumably are paying for access to information on the COSTAR EXCHANGE™. These exchange clients are active buyers and brokers of buyers of investment properties. Since COSTAR EXCHANGE™ preferably lists a wide variety of properties, including many properties that are not subject to the confidentiality concern, these exchange clients are assumed to routinely query the system for properties meeting certain descriptions, and, indeed, the system allows such queries.

In accordance with an important aspect of the present invention, when a confidential property meets the needs of one of these exchange clients, that fact is indicated in a general way without providing information that would allow the exchange client to easily identify the specific property. In other words, the exchange client is notified that there is a property in a particular city meeting the exchange client's requirements, but he is not told what that property is or who the seller's broker is. As clients of COSTAR, however, exchange clients all have access to the system as indicated by the graphical depiction of the ID key. Thus, in FIG. 22, the exchange clients are shown as a second ring of potential buyers that do not yet have access to the specific information concerning the building, as indicated by the blindfolds, but can learn of its existence.

In accordance with an important aspect of the present invention, if one or more of the clients are interested in learning more about the property, they can indicate their interest through e-mail or alternative communication directed to the system operator. The system operator will then forward the inquiry to the seller's broker so that the seller's broker can determine whether or not the particular client will receive access to the information. In the example shown in FIG. 22, the seller's broker, in response to the query, has determined not to disclose the details of the property to the exchange client that requested information. This "no" answer is conveyed, by the system operator, to the exchange client that raised the request, as indicated by arrows in FIG. 22. The system, therefore, does not divulge the property listing to the denied client.

Figure 23:
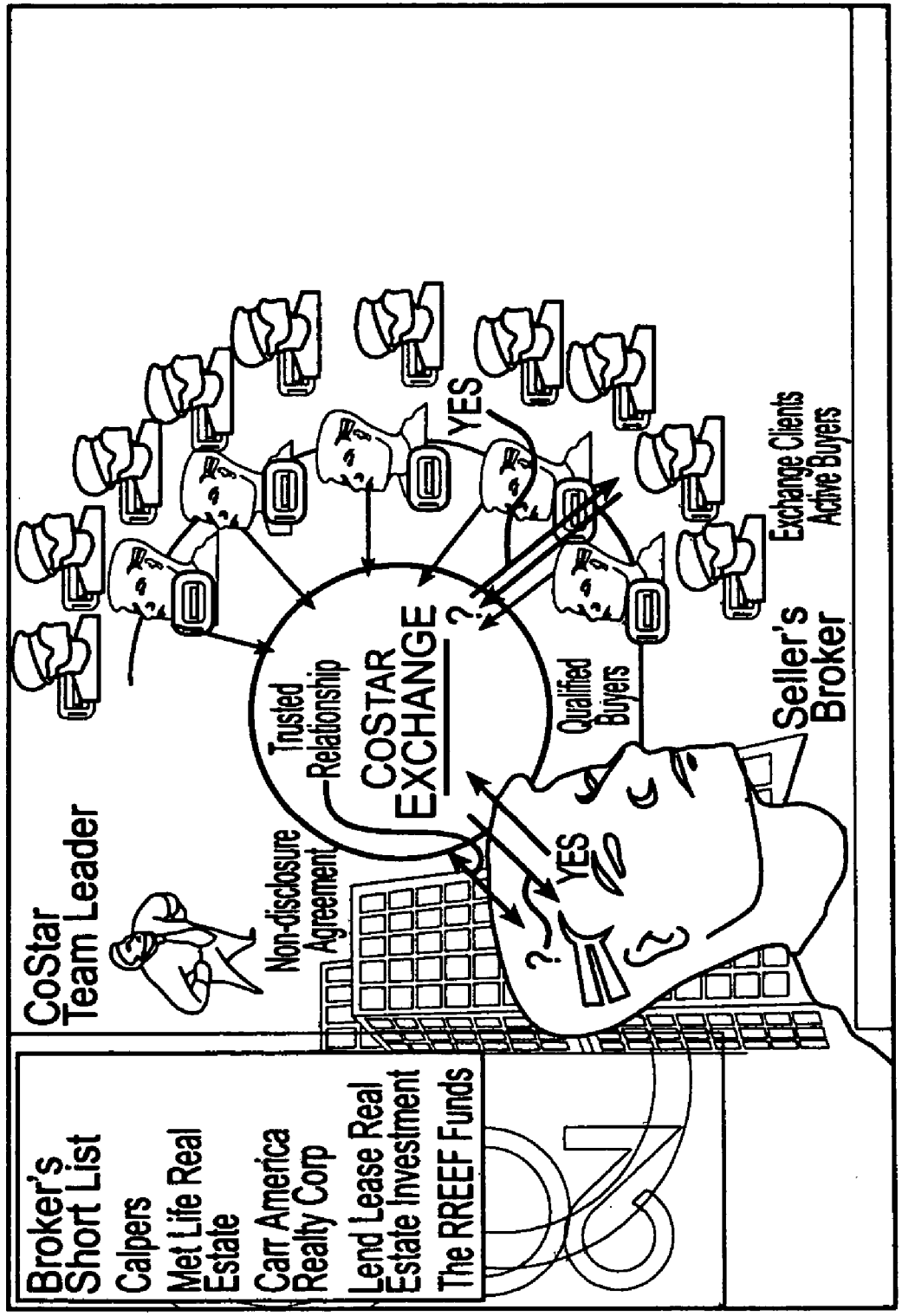

FIG. 23 shows an alternative arrangement in which the seller's broker has indicated "yes" to the request for information. In response to this "yes" indication, the system operator grants the accepted client access to the property listing.

Optionally, before the system grants the accepted client access, the system provides the newly authorized potential buyer with a confidentiality agreement. After executing and submitting the confidentiality agreement, the system allows the newly authorized potential buyer to access to the listing for that property. Preferably, the newly authorized potential buyer enters into the agreement by electronically executing and submitting an online confidentiality agreement. Executing and submitting the confidentiality agreement could occur, for example, by clicking-through an "accept" button for an agreement posted online or by exchanging electronic documents having electronic signatures.

Figure 24:
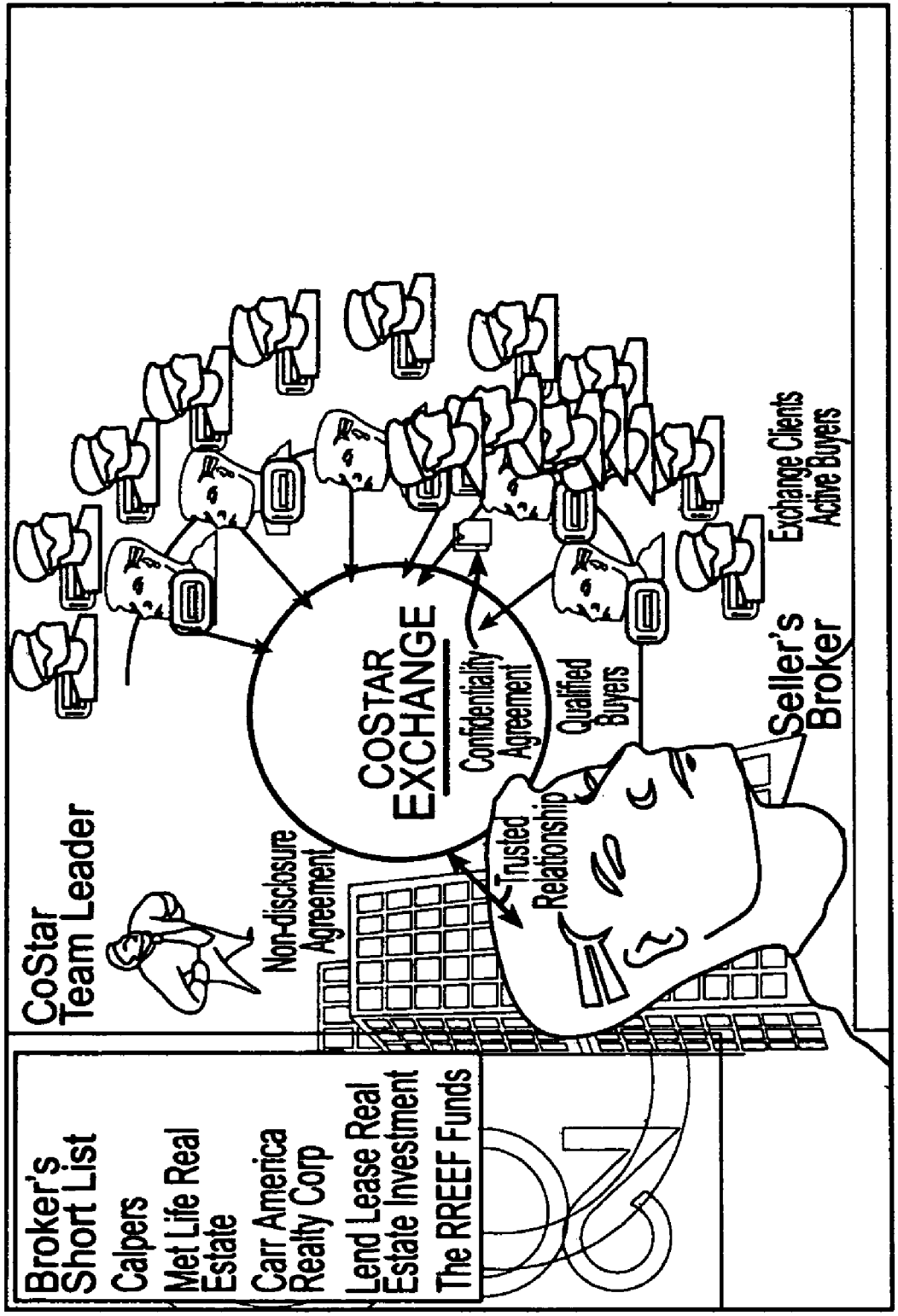
Figure 25:
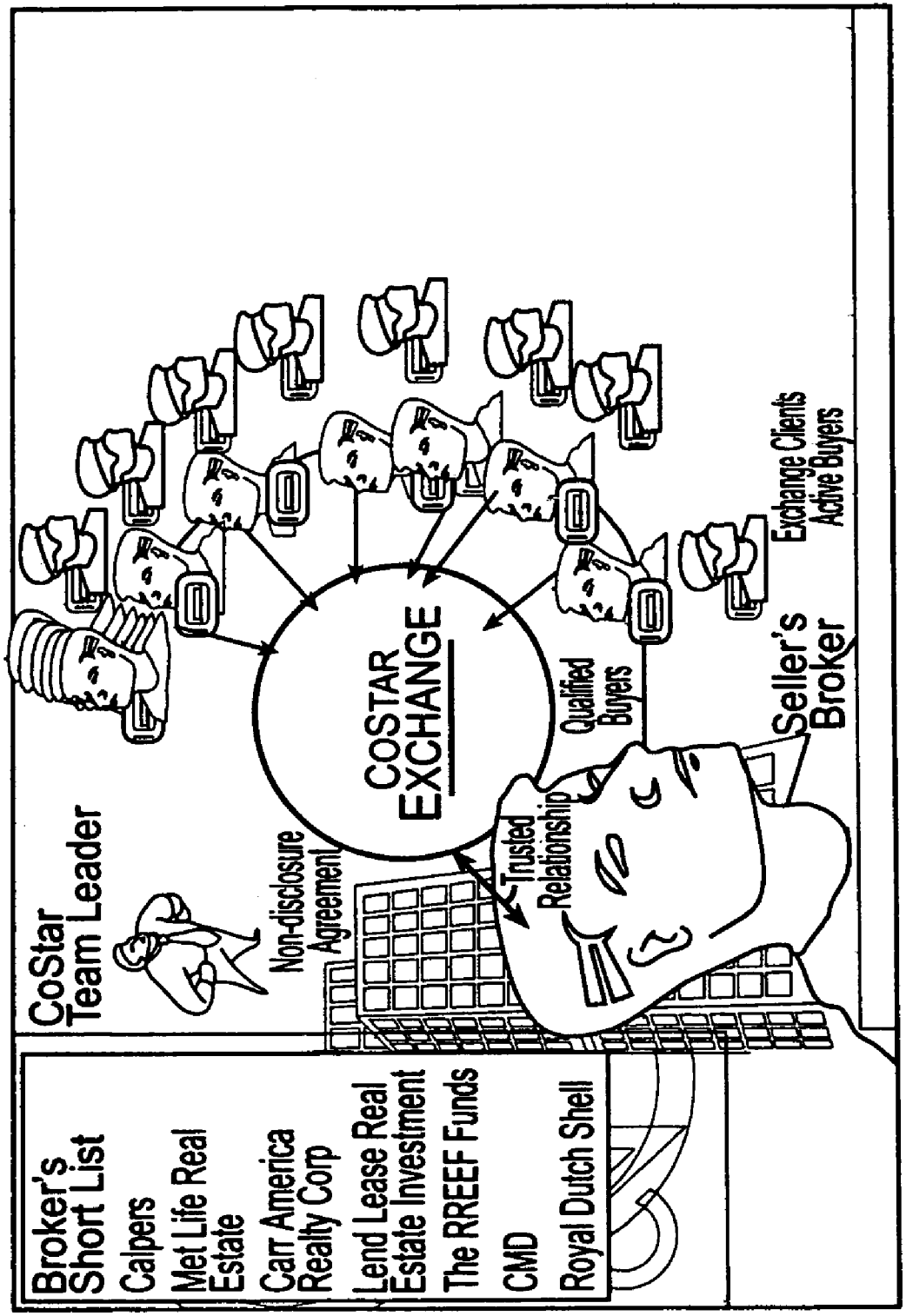

FIGS. 24 and 25 illustrate this aspect of the present invention. FIG. 24 shows, graphically, the confidentiality agreement being provided to the newly authorized buyer. FIG. 25 shows that having executed and submitted the confidentiality agreement, the newly authorized buyer moves into the inner circle and has his blindfold removed so that he can see the information. In this way, the pool of qualified buyers can be greatly increased, but the seller's broker still maintains complete control over who is allowed to see the listing. Thus, the present invention allows the seller's and seller's brokers to access a far greater pool of qualified buyers without the highly undesirable act of distributing the information to all interested parties.

It will naturally be appreciated that this system of information distribution is useful in contexts other than the commercial real estate context, such as purchases of business enterprises.

In accordance with yet another aspect of the present invention, the listings on the system are made available not only to qualified buyers and clients of the system, but to all potential buyers so as to encompass an extremely wide pool of potential buyers.

Figure 26:
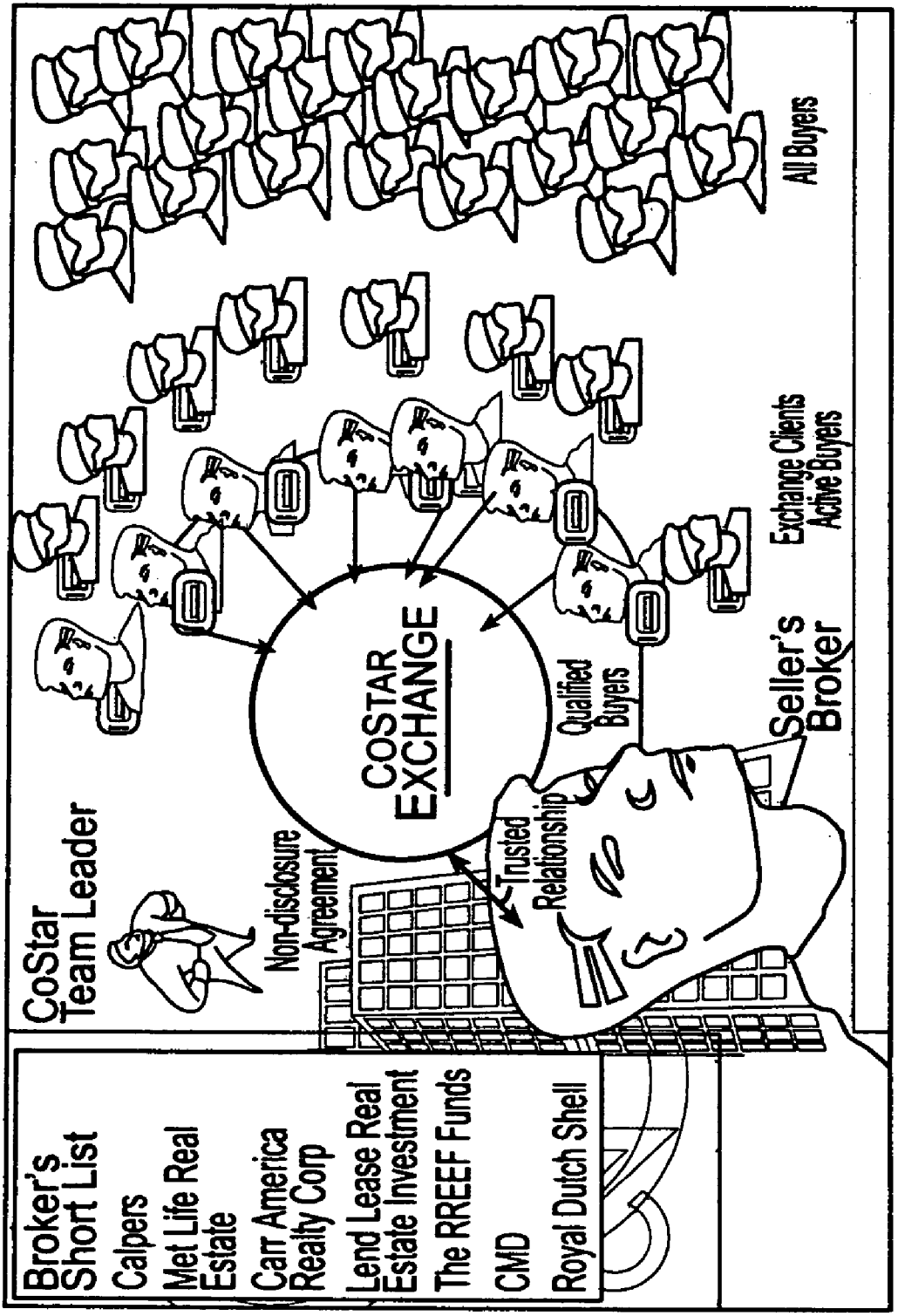

In the preferred embodiment of the present invention, the pool of potential buyers that are not clients of the system is given limited access to the database and can be allowed more detailed access on a pay-per-view basis, for example. As indicated in FIG. 26, this large pool of buyers does not have detailed access to the listing, but could be allowed access, or the opportunity to gain access to learn of the existence of the listing. The lack of detailed information, is, again, indicated by the blindfold on the depiction of the potential buyer in FIG. 26.

In accordance with the preferred embodiment of the present invention, the more wide spread dissemination of the information may be delayed for a period of time to allow preferential access to persons within the seller's inner ring, or to exchange clients. This is not required, however, and the pool of potential buyers could be extended immediately.

Figure 27:
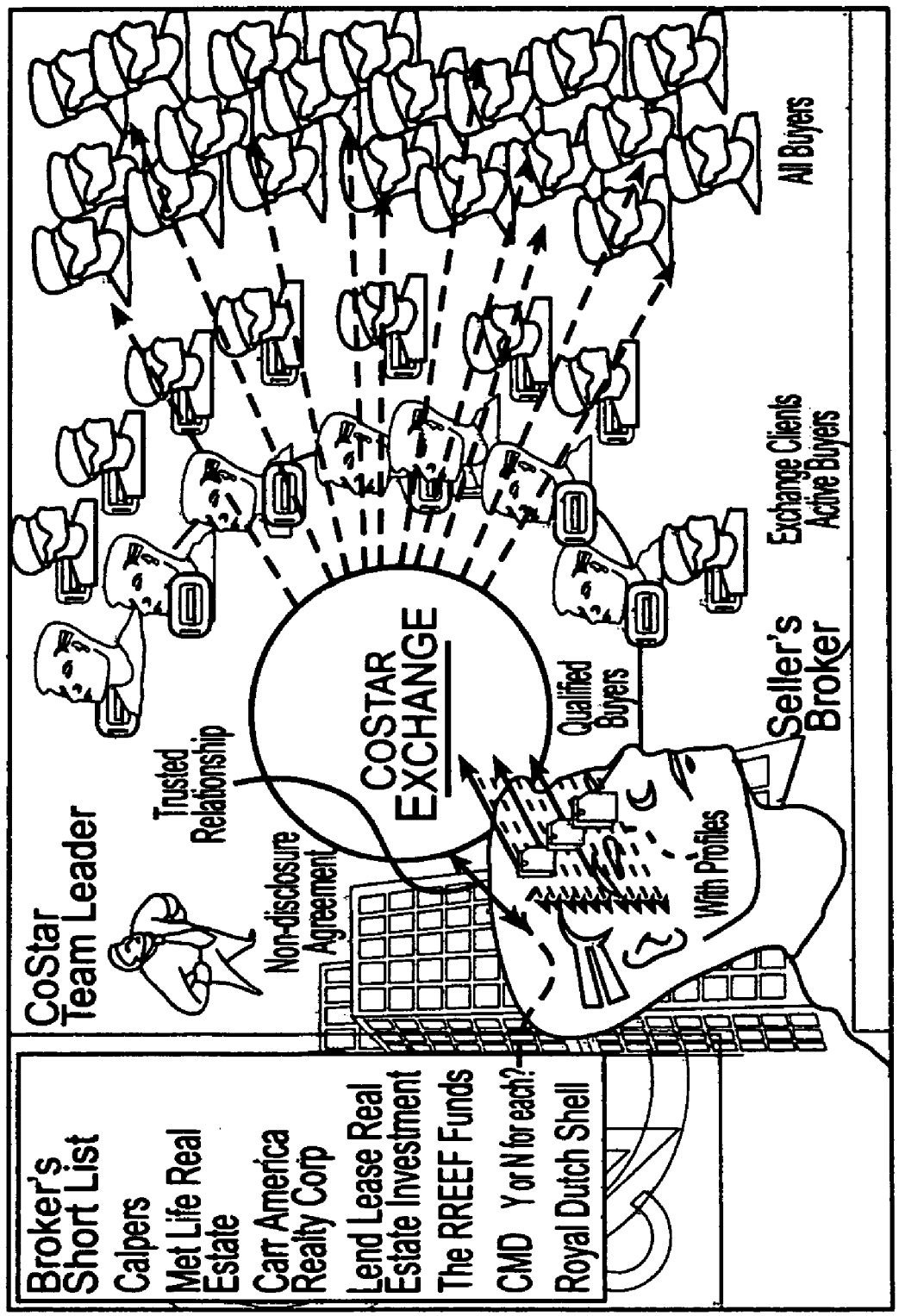

As shown in FIG. 27, through COSTAR EXCHANGE™, the existence of a listing, without the details of the listing, is disseminated to the entire pool of potential buyers as shown by the broken arrows. Any interested buyers can send an expression of interest or a request for information query back to the COSTAR EXCHANGE™, and, since these potential buyers are not current clients, the system operator obtains a profile of the potential buyers and transmits the request along with the profiles to the sellers brokers for a determination of which, if any, of the requesting potential buyers should receive access to the information.

Figure 28:
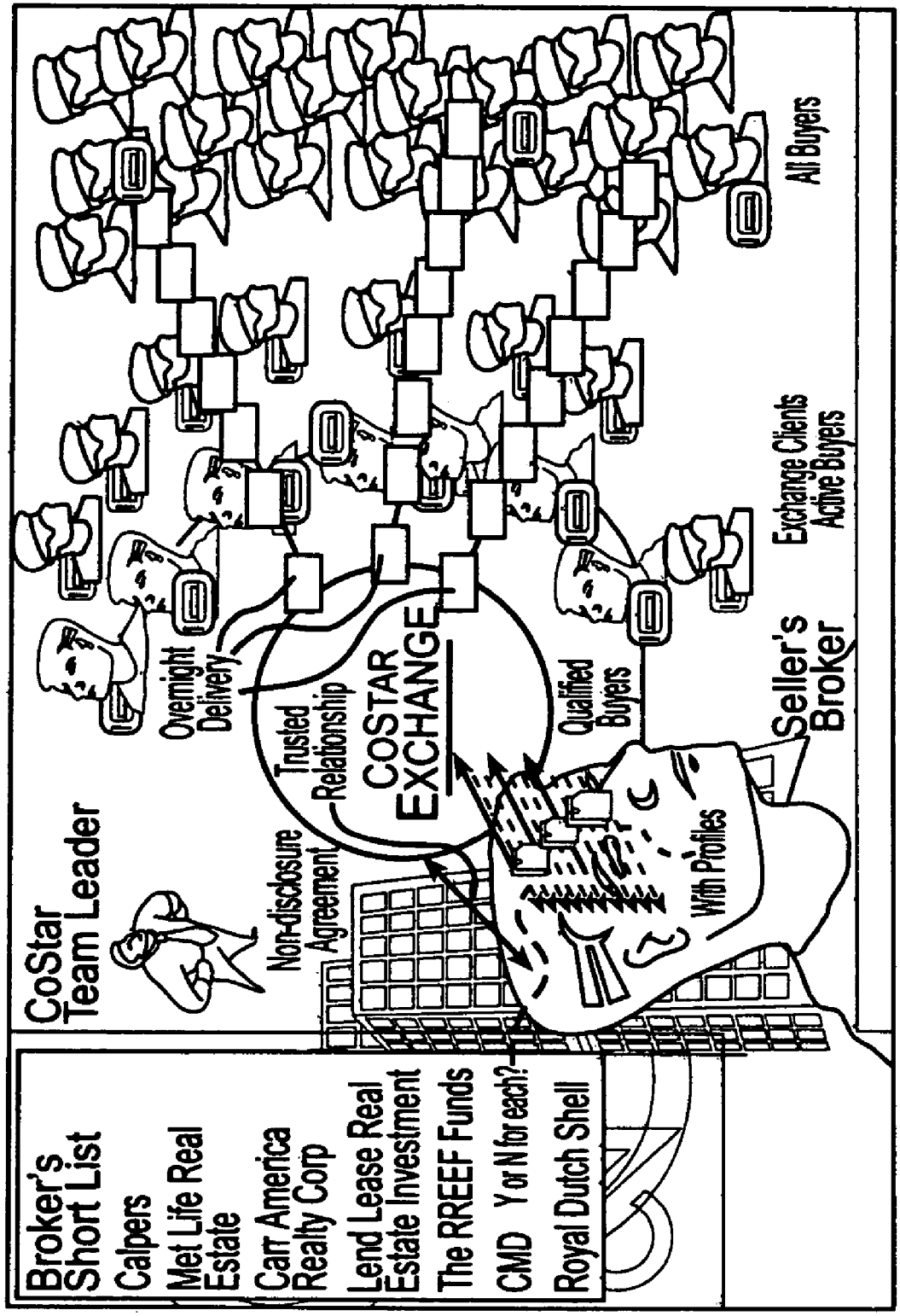
Figure 29:
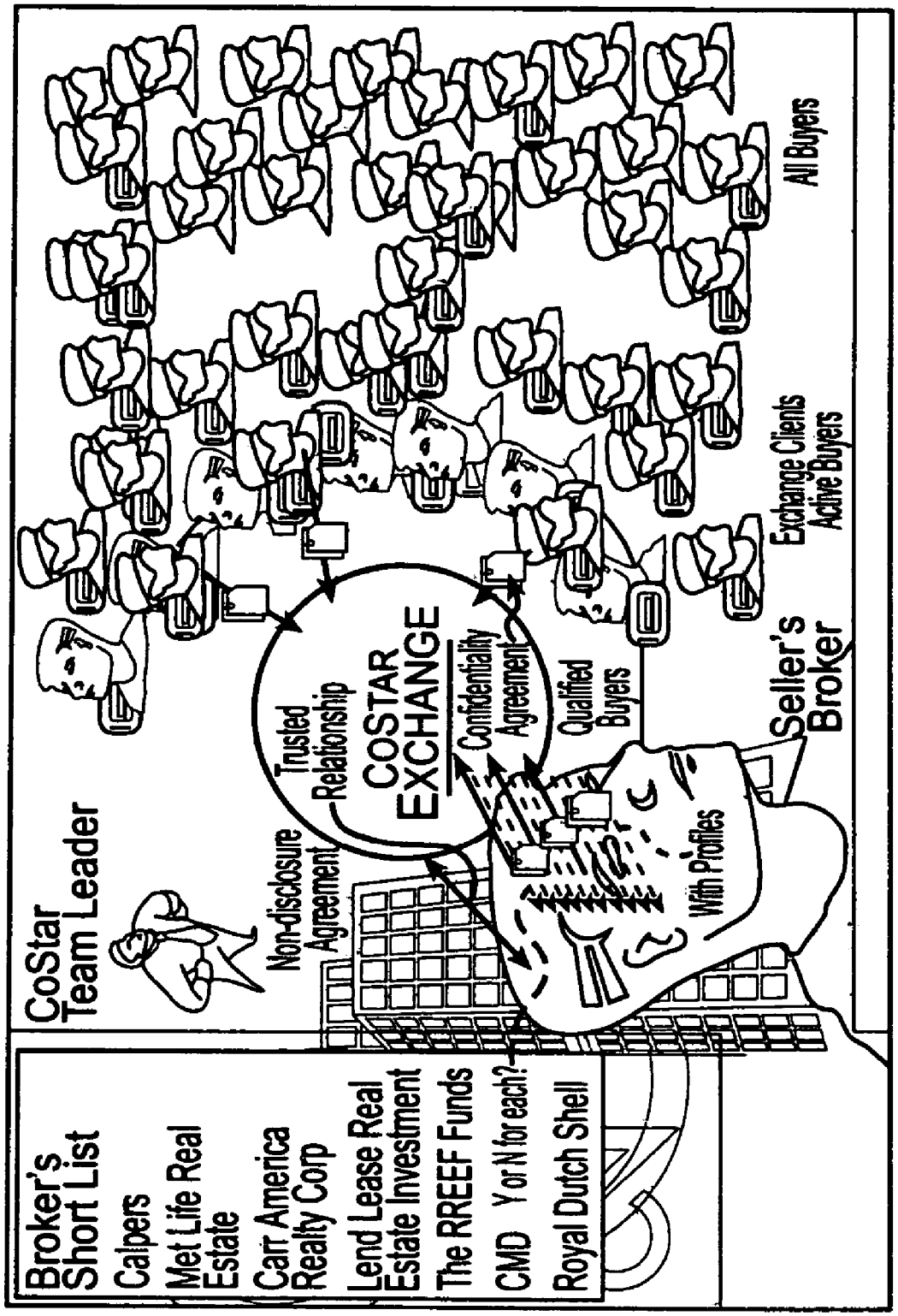
Figure 30:
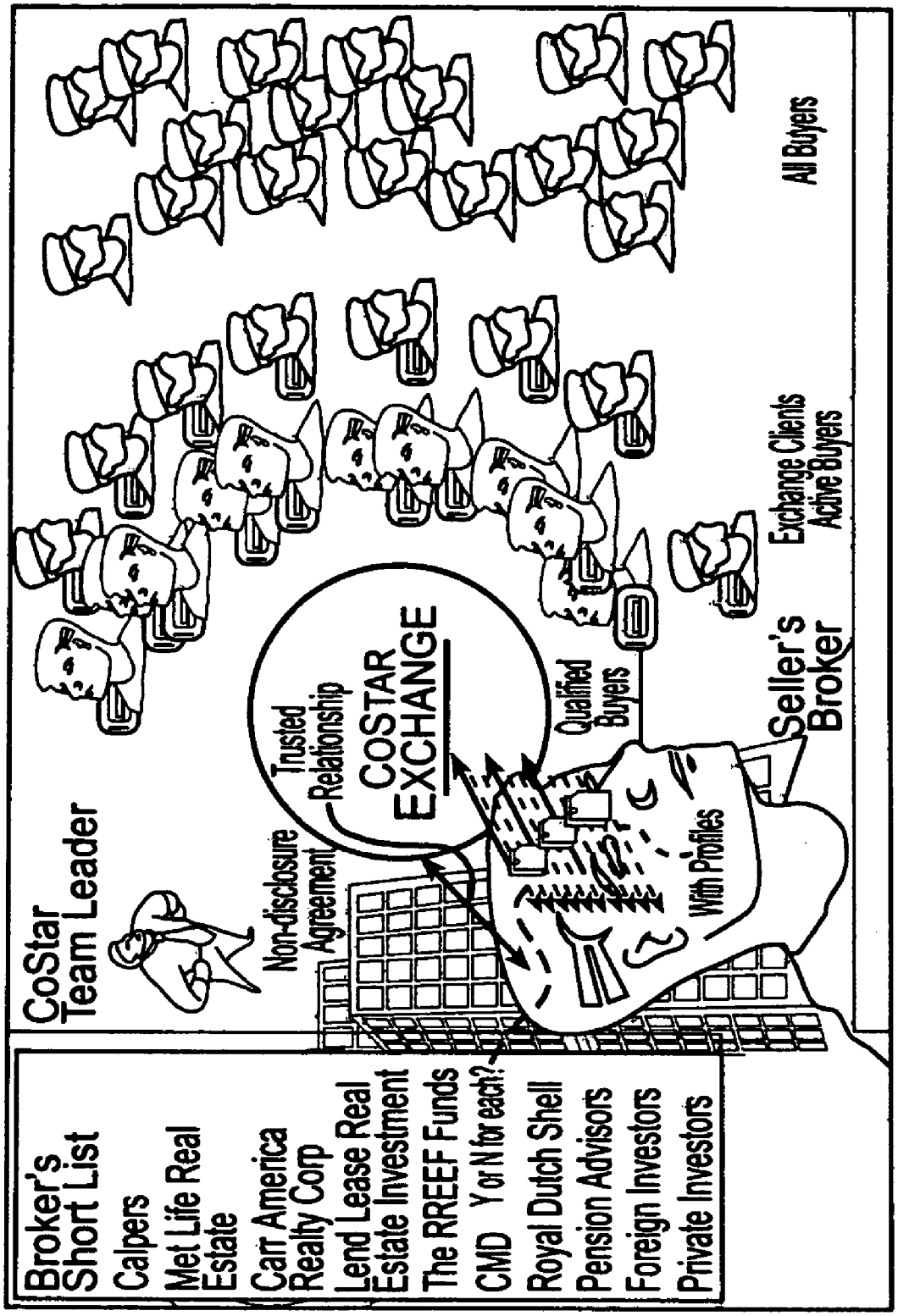
Figure 31:
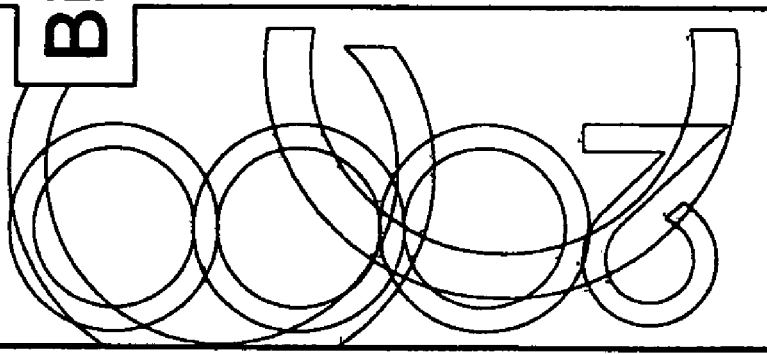

As before and as shown in FIG. 28, for those buyers to which the seller's broker has authorized distribution of the information, a packet containing an ID key is sent to the potential buyer. As shown in FIGS. 29 and 30, after first executing and submitting confidentiality agreements (if so required), these potential buyers are moved into the inner circle of qualified buyers who can obtain access to property information. FIG. 30 depicts these potential buyers moved into the inner circle with their blindfolds removed. In this way, the entire pool of potential buyers can be brought into the bid process, but only to the extent authorized by the seller or seller's broker.

It should be apparent that the system of the present invention provides numerous benefits and creates great efficiencies in the commercial real estate market.

The benefits to the seller or seller's broker include the fact that the listing service is free. In addition, the distribution of information leading to their property is highly secure and controlled closely, and is at the seller or seller's broker's complete discretion. In addition, the system broadens the reach of their offering without tarnishing the value of the offering. The system also allows the development of a private buyer network, i.e., allows the seller's broker or seller to increase their inner ring of buyers by identifying new qualified buyers with whom the seller's broker or seller may not have previously had a relationship. In addition, the system greatly accelerates the transaction and brings buyers that are more qualified into the system, which is likely to provide a more competitive market for the seller and, thus, bring the seller a higher price. The benefits are summarized in FIG. 31.

Figure 32:
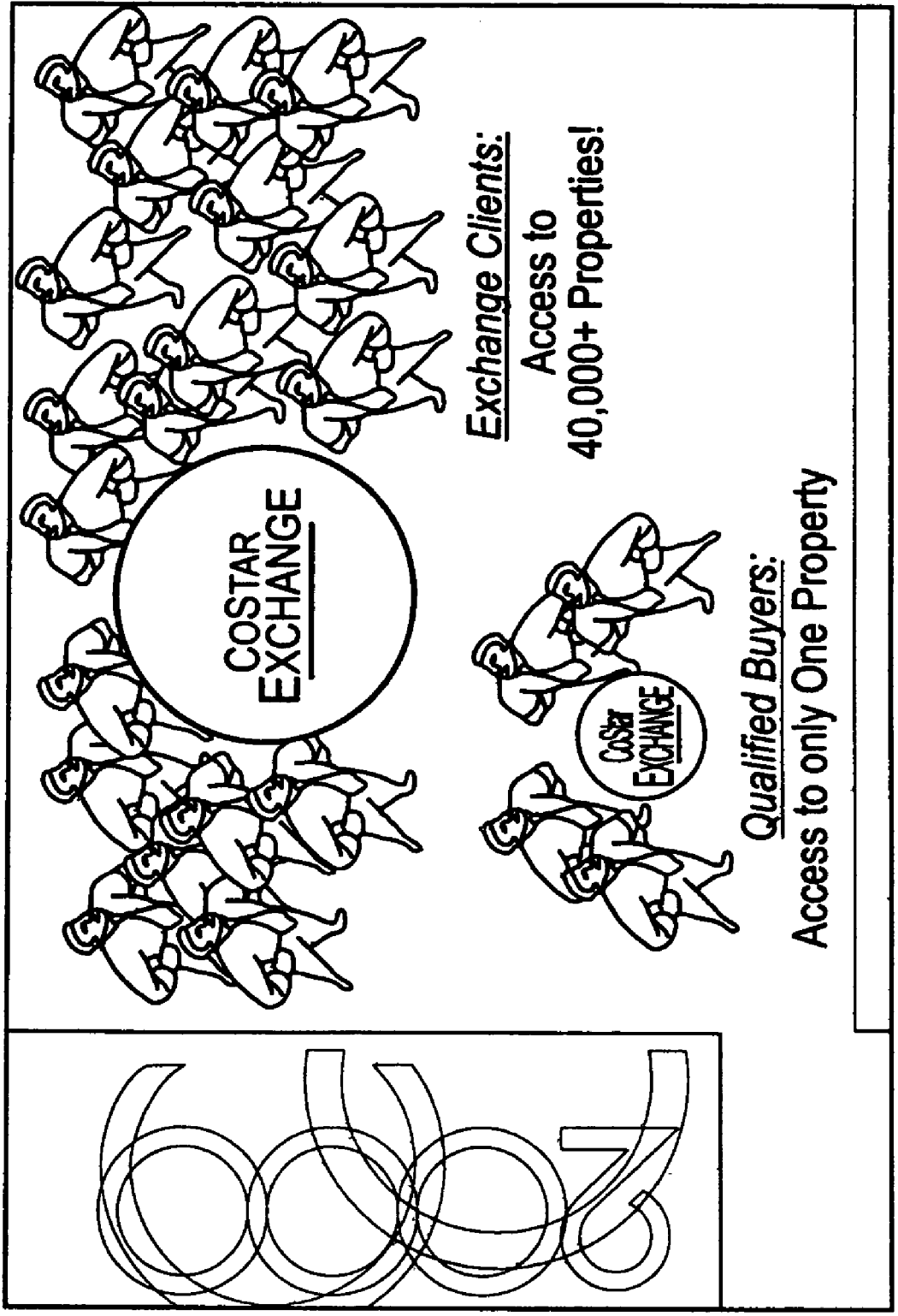
Figure 34:
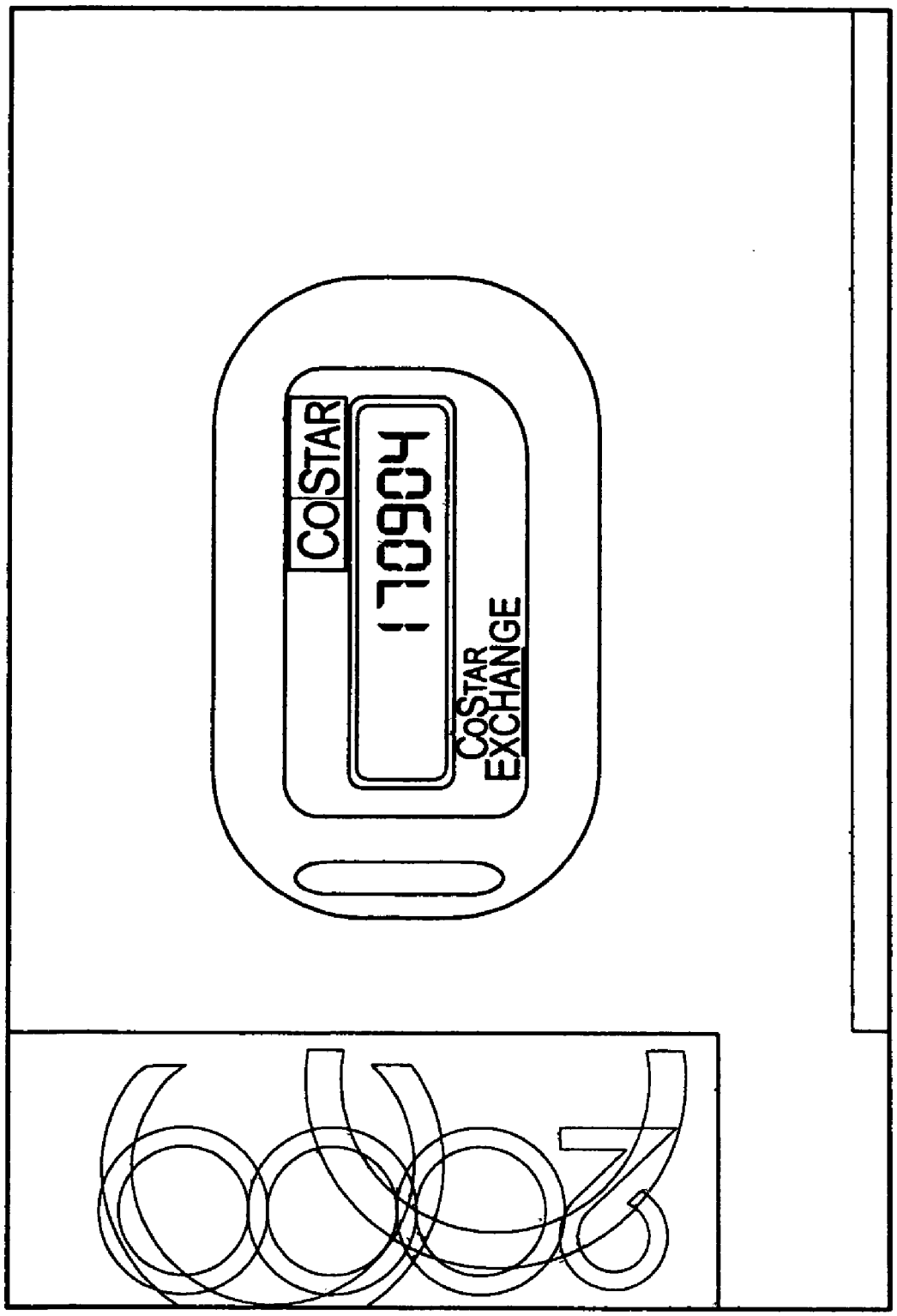

As indicated in FIG. 32, the system also provides benefits to qualified buyers. In particular, in the current system, the qualified buyer may have access to only the properties of select agents that place that qualified buyer into their inner circle. And, in connection with the present invention, the persons within a particular participating seller's inner circle are allowed access to a single property on COSTAR EXCHANGE™. However, there is a great benefit for potential buyers to become clients of the system, in that they will have access to over 40,000 properties.

There are numerous possible sources of operating revenue for the system operator using the system in the present invention. In particular, as summarized in FIG. 33, the system operator can obtain revenue through a subscription service by charging for access to the system. In addition, the system operator can obtain revenue through banner advertising and lender referral fees. In addition, the system operator could obtain revenues through buyer/seller matching fees, click-through revenue, and fees for enhanced listings on the database. Also, the system operator obtains value through information posted onto the system since it memorizes the cost of independently obtaining such data.

In accordance with the present invention, the ID key (shown in FIG. 34) includes a unique serial number printed on the back and generates a six-digit password that changes at a predetermined frequency, preferably once every minute. Thus, the user's ID is always changing so that it provides a high level of security.

The system of the present invention also facilitates mortgage lending. For example, using the information concerning the building characteristics and the information concerning prospective borrowers that is maintained within the system, the system facilitates matching borrowers with lenders. Alternatively, the system can list all available lenders, either generally or only those lenders that are willing to borrow money from a particular property, and the borrower can click on a particular lender and obtain information or submit information for loan pre-approval. In addition, the system functions as a due diligence tool for lenders, providing the information necessary to determine whether to provide a loan to buy a building, based on information about the building.

As a further aspect of the present invention, a lending product is provided on COSTAR EXCHANGE™ that lists every lender that CoStar tracks. The present invention enables customers to click on a lender's name in the list to request a free package of materials free from that lender. COSTAR EXCHANGE™ facilitates this communication between the customer and a prospective lender.

The remaining figures illustrate a graphical presentation and description of the present invention, as well as a series of screen images presented during operation of the invention. The screen images provide a self-evident and exemplary description of the flow through the system by a user as detailed hereinafter.

Website Operation

Figure 35:
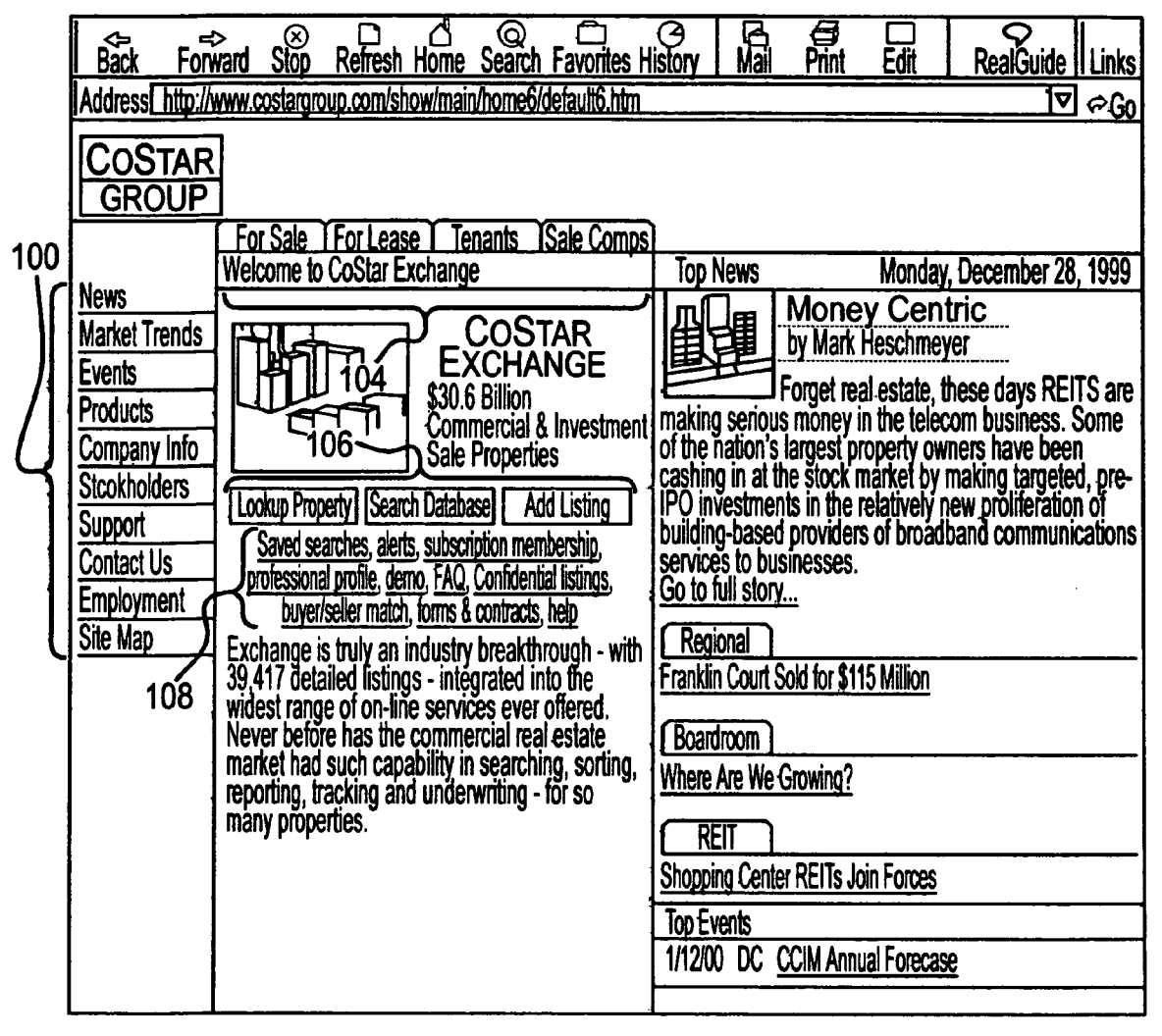

In a preferred embodiment, the website operates in the following manner. Through an Internet connection provided by an Internet service provider, a user enters the Internet address of the present invention to access the website of the present invention. To ensure secured access, the website presents the user with a login page, requesting a user name and password. Once the user enters an authorized user name and password and agrees to the Terms of Use, the website presents a homepage, as shown in FIG. 35, with the following features. One section of the homepage includes a menu 100 with labeled buttons, such as 'News,' 'Market Trends,' 'Events,' 'Products,' 'Company Information,' 'Stockholders,' 'Technical Support,' 'Contact Us,' 'Employment,' and 'Site Map.' By clicking on a button, a user can obtain more information and further sub-menus on the labeled topic. Another section of the homepage lists summaries of news articles 102 related to the commercial real estate industry. In this section, the homepage provides additional buttons and links to further information concerning the news articles. The final section of the homepage presents a group of structured tabs 104 that a user can click through to access the functions of the present invention. The structured tabs subdivide the functions of the present invention into four categories: (1) For Sale, (2) For Lease, (3) Tenants, and (4) Sale Comps.

Under the For Sale structured tab, a user has three primary functions 106 and several secondary functions 108. The primary functions 106 are represented by buttons through which the user can click to access the functions. The three primary functions are Lookup Property, Search Database, and Add Listing. The secondary functions include, but are not limited to, Saved Searches, Alerts, Membership, Professional Profile, Demonstration, Frequently Asked Questions (FAQ), Confidential Listings, Buyer-Seller Match, Forms & Contracts, and Help.

Figure 36:
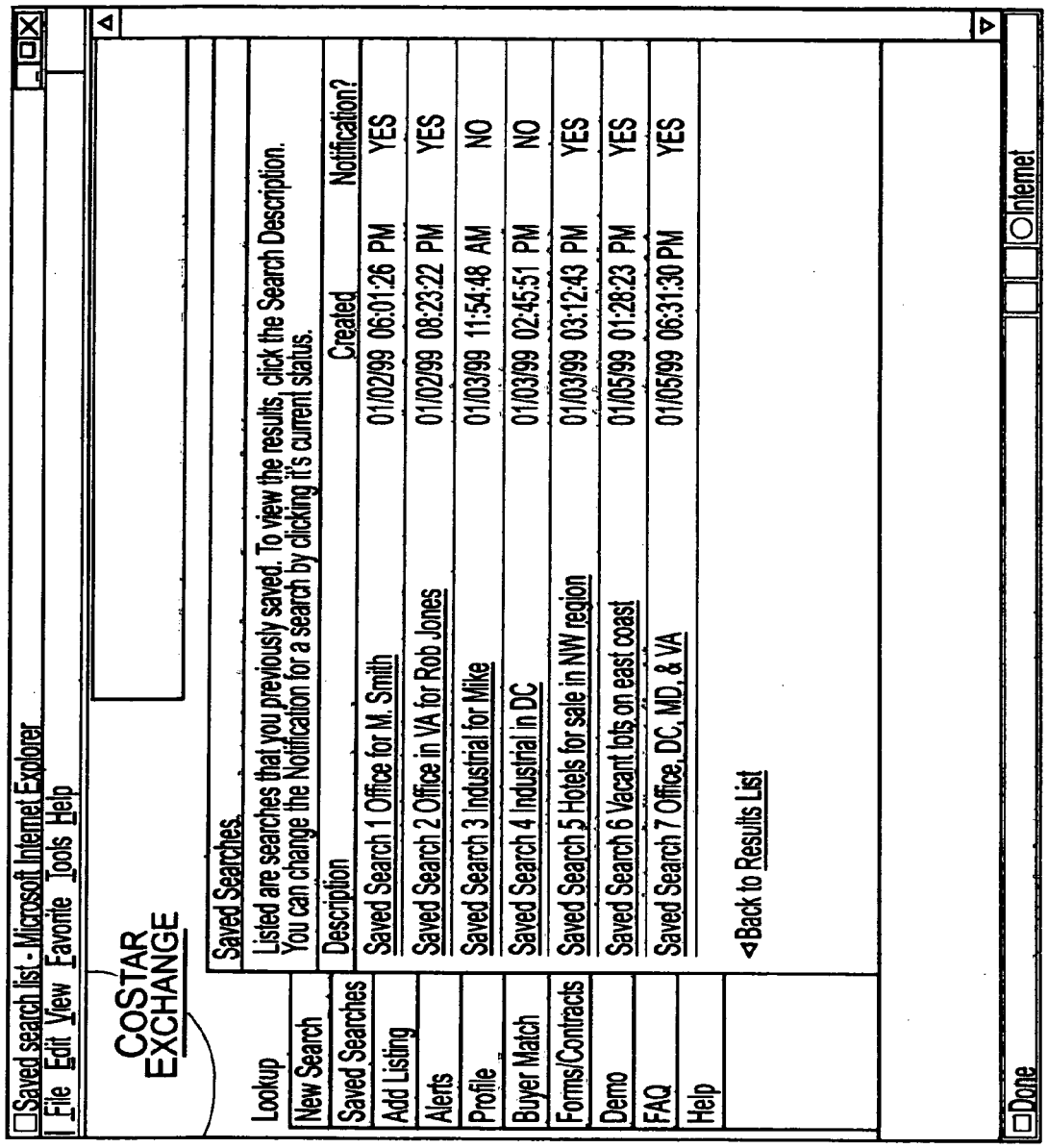

By clicking through Saved Searches, a user can view a list of searches that were previously saved, as shown in FIG. 36. The list includes a description of the search, the date and time the searches were created, and whether or not an alert notification was activated (to be described below). A user clicks on the description of the search to view the results of that search. A user can also change the alert notification of a search by clicking the check box on the list. Finally, a user can delete a search by clicking on a delete button (not shown).

Figure 37:
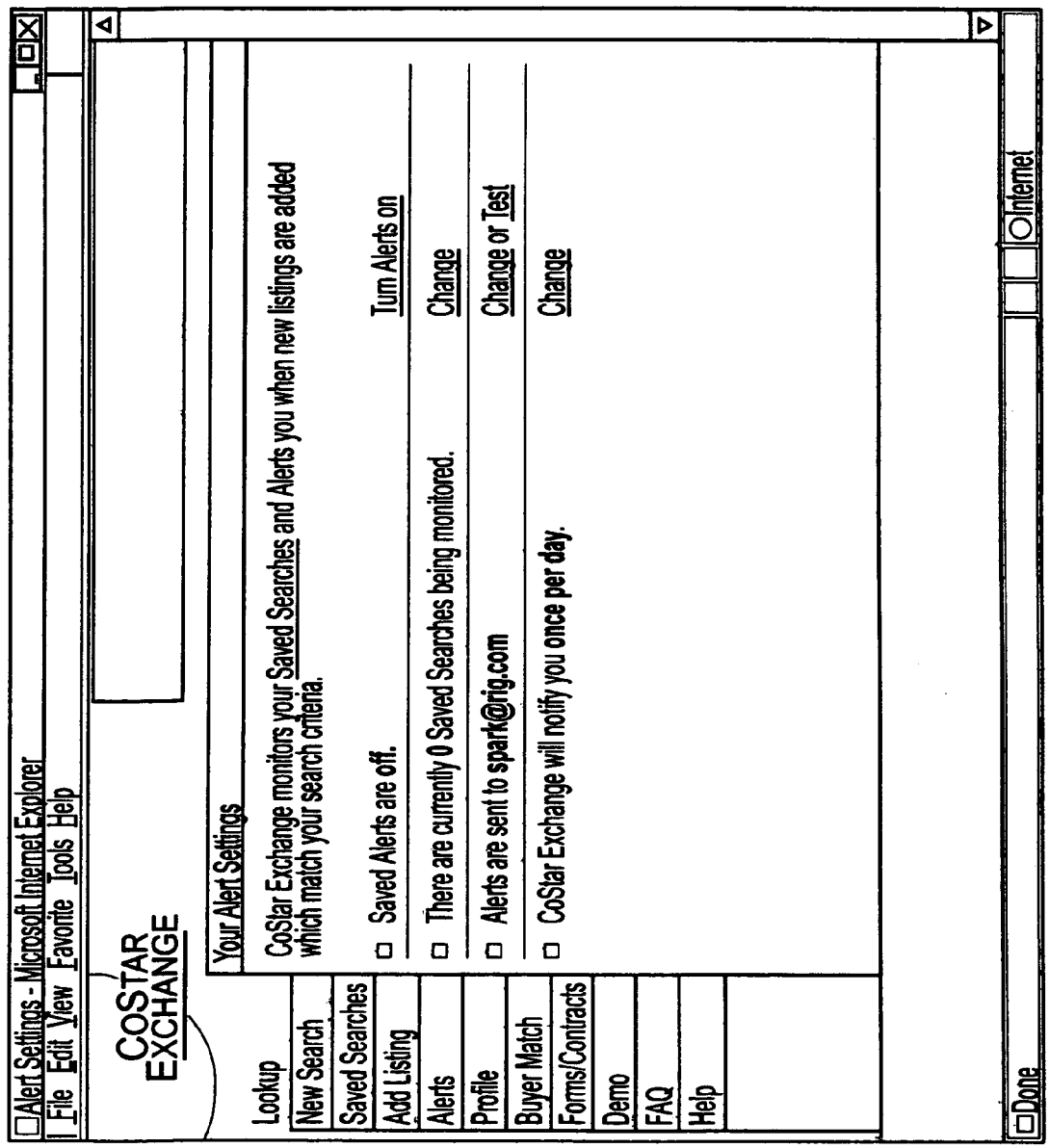

Returning to the homepage, under the For Sale structured tab, clicking on the secondary function Alerts presents the user with that user's Alert settings as shown in FIG. 37. The present invention monitors the saved searches and alerts a user when new listings are added that match the existing saved search criteria. There are four Alert settings: (1) an on/off indicator to activate or deactivate the Alert feature, (2) the number of saved searches being monitored and which individual searches are being monitored, (3) the e-mail address to which the Alerts are sent, and (4) frequency with which alerts are sent (e.g., once per day). From the Alert Setting page, a user can click on the appropriate buttons for each of these settings to change them as desired.

Returning again to the homepage, by clicking through the secondary function Membership, a user can view his or her membership status. Also from the homepage, by clicking on the Professional Profile secondary function a user can access her professional profile, as shown in FIG. 38, which includes information that the present invention uses to customize operation of the website according to a user's particular professional background in commercial real estate. The profile information is used to alert the user to new or updated properties of the website operation, which the user might find useful. On the Professional Profile page, the present invention presents various data entry fields prompting for such information as the user's name, title, company website, business e-mail address, and other contact information. The Professional Profile page also asks for information describing the user such as the type of customer the user is (e.g., owner, individual, investor, corporate, or seller), the type of property the user is typically interested in purchasing, the investment range the user anticipates, the type of financing the user will use (leveraged or all cash), the locations in which the user is interested, recent transactions completed by the user, and the annual transaction activity targets of the user. The Professional Profile page also enables a user to indicate interest in subscription membership, listing properties, and banner advertising.

Returning to the homepage, under the For Sale structured tab, a user can click through the Demonstration button to view an example operation of the website for tutorial purposes. Also from the homepage, a user can click through the Frequently Asked Questions, or FAQ button, to view more information for tutorial purposes.

Figure 39:
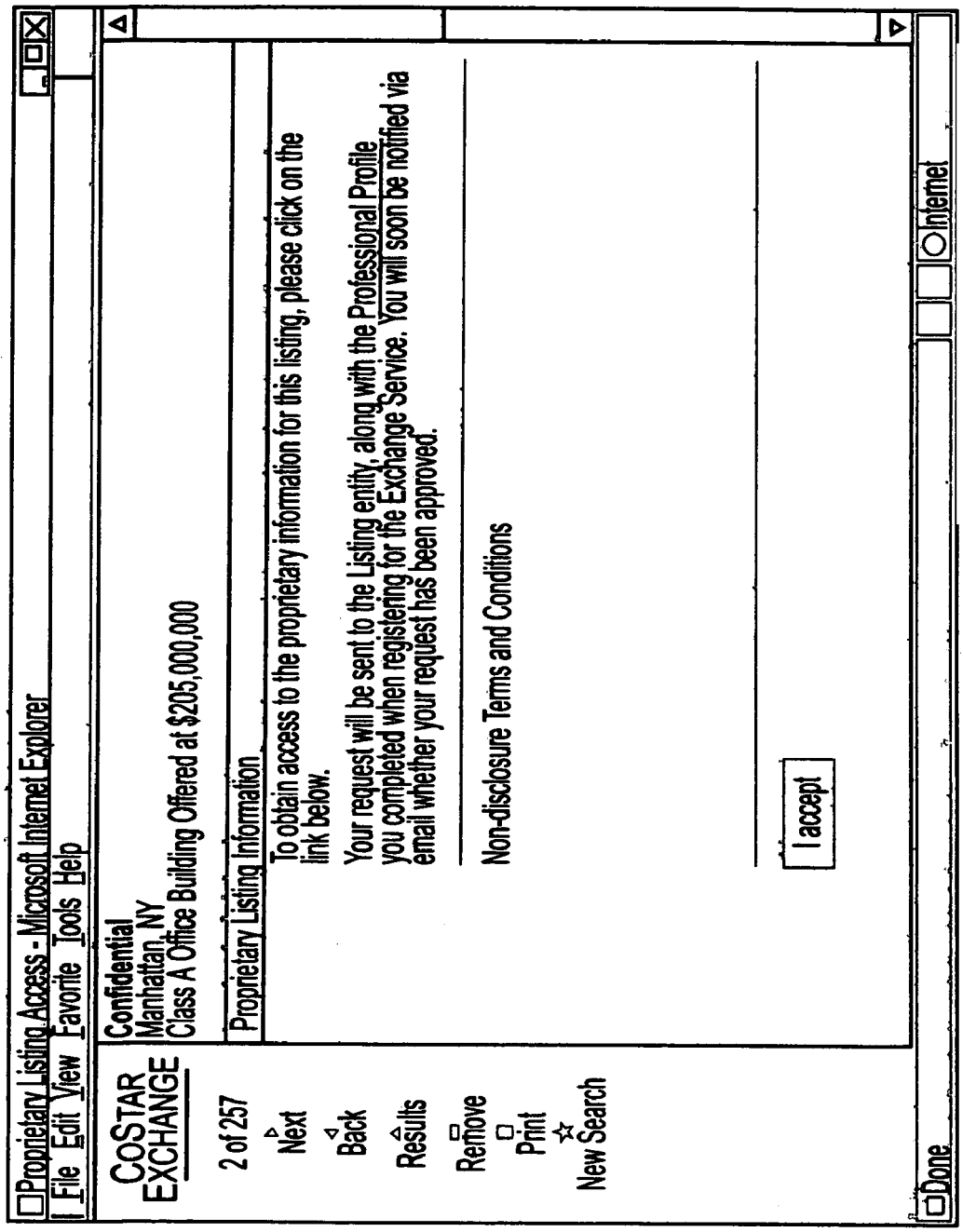
Figure 41:
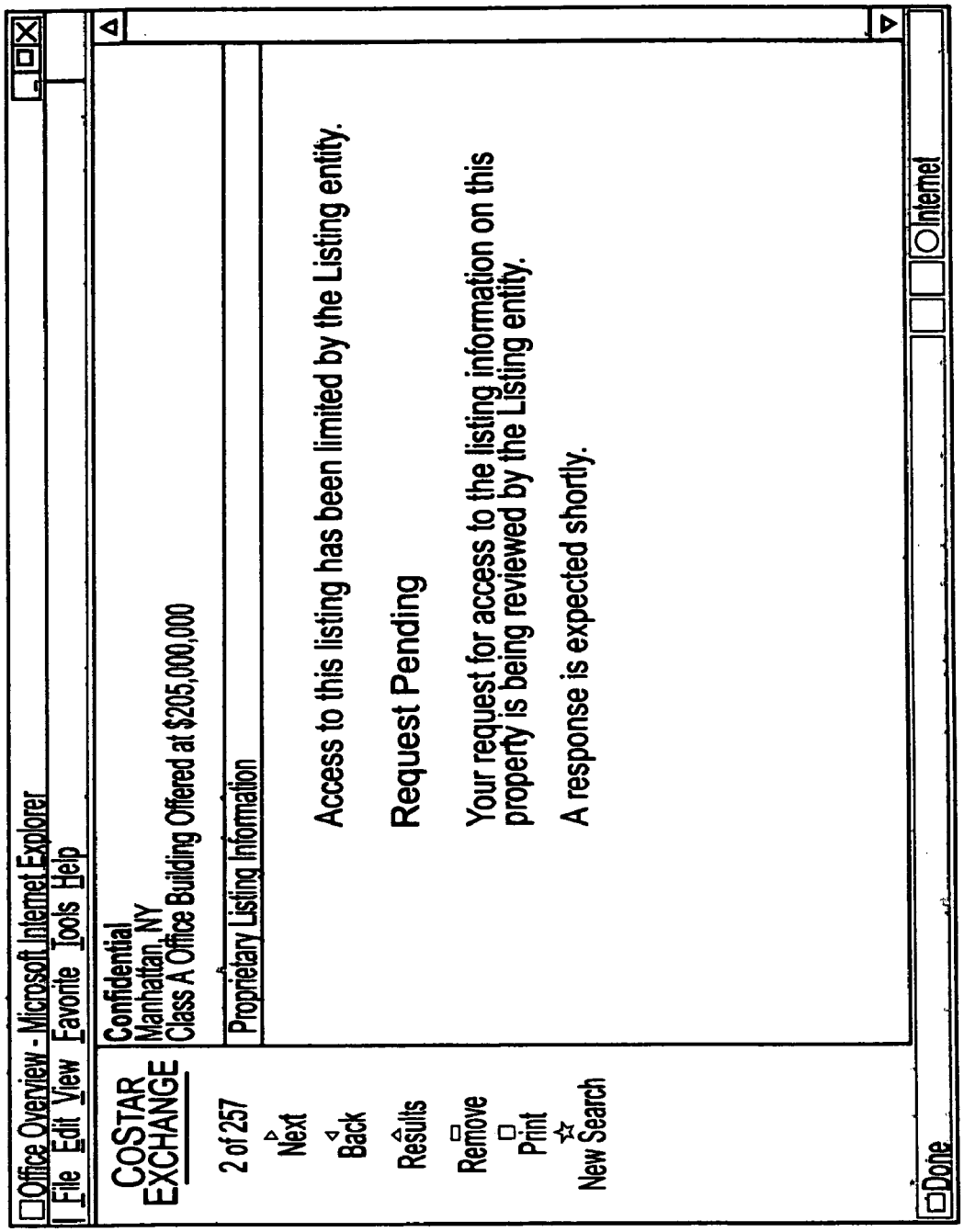
Figure 42:
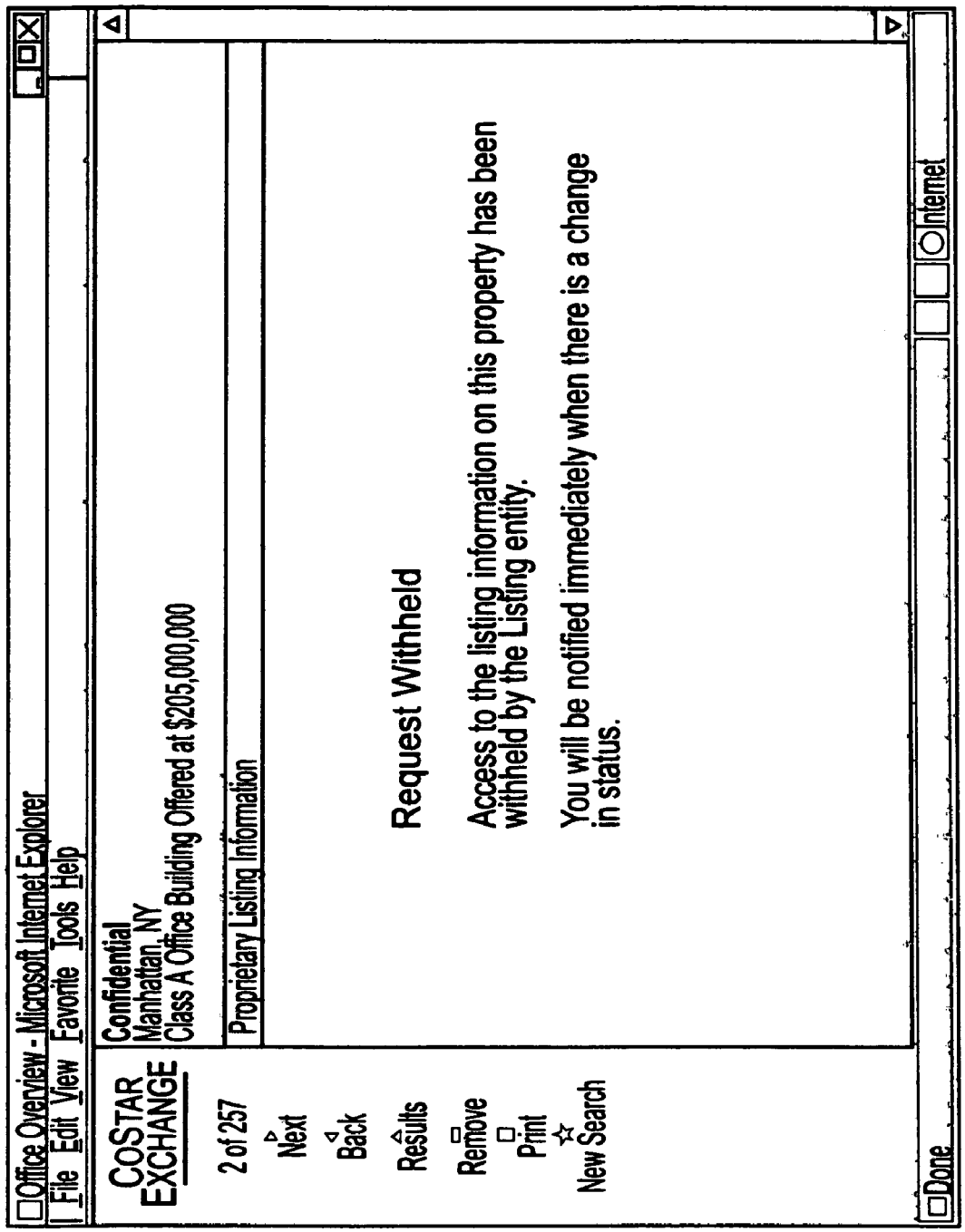

From the homepage, under the For Sale structured tab, a user can click through the Confidential Listings button to view real estate information maintained in secured access. After the Confidential Listings button is clicked, the website presents a Proprietary Listing Information access page, as shown in FIG. 39. The website maintains secured access to the proprietary listings. A user must enter a valid password and have a professional profile on file. In this manner, the present invention can forward the user's (potential buyer) information to the listing entity to initiate the unique buyer-seller matching feature. Once the user enters a valid password, the website displays a Request Pending screen, as shown in FIG. 40, and contacts the listing entity to request access for the user/buyer. As shown in FIGS. 41 and 42, the website returns a results page indicating whether the listing entity has approved the user's/buyer's request. FIG. 41 shows access that has been limited, while FIG. 42 shows access that has been withheld. If access is approved, admitting the buyer into the "inner-circle," the website presents the subject property on a Property Details page (described below).

Also from the homepage under the For Sale structured tab, a user can click through the Buyer-Seller Match button to view real estate listings that match buyer criteria or seller criteria. Also from the homepage, a user can click through the secondary function of Forms & Contracts to view, download, and print standard documents used in the commercial real estate industry. This feature also autopopulates the documents with appropriate buyer, seller, and proprietary information.

Finally, under the secondary functions listed on the homepage under the For Sale structured tab, a user can click on the Help button to receive technical information concerning the operation of the website as well as administrative information concerning enrollment in the use of the present invention.

Figure 43:
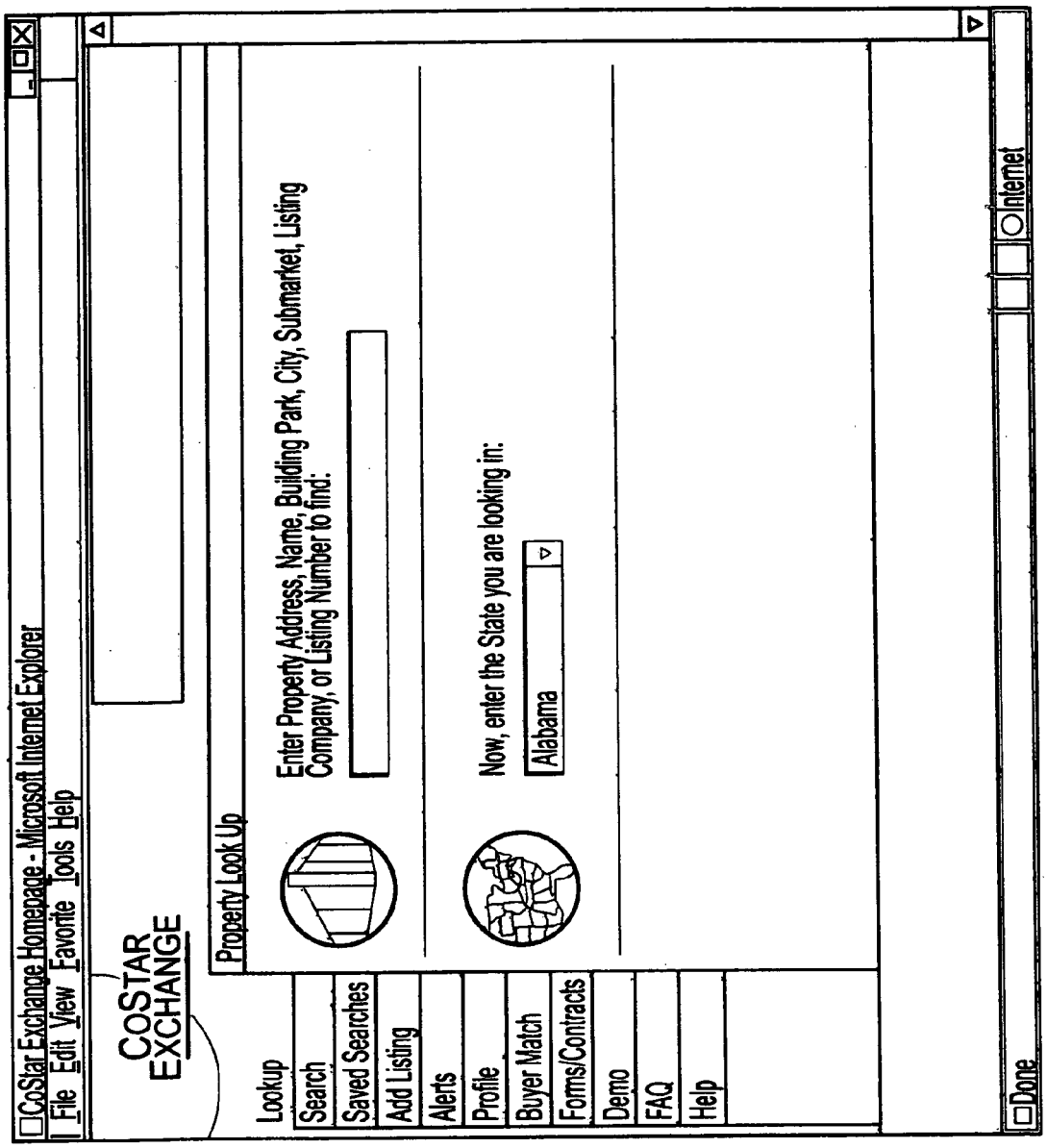

Turning attention to the primary functions of the For Sale structured tab, by clicking on the Lookup Property button on the homepage, a user can search for a particular property. After clicking through this button, the present invention presents a Property Lookup page, as shown in FIG. 43, which asks for the property address, property name, listing number, building park, city, sub-market or listing company of the property to be found. The Property Lookup page also asks the user for the state in which the property is located. As an example of a property lookup, a user can enter the name "Park Place" in the data entry field for the property name. Then, when the user presses a Get Results button, the website returns a property lookup results list listing (FIG. 44) all of the properties in the database with the name "Park Place." The property list includes information such as address, city, state, price, square foot size, price per square foot, cap rate, and type of property (e.g., office, industrial, and land). As an example of another property lookup, to narrow the search, a user could specify the state in which "Park Place" property resides, for example, New York. With this search criteria, upon clicking through the Get Results button, the user would view a property lookup results list containing only the entry that reads "790 Park Place, Long Beach, N.Y." in FIG. 44. After entering the search criteria and viewing the property lookup results list, a user can double-click on a property listing to obtain the details about that property, including an overview of the property, financial information, tenant information, market statistics, comps, and a map of the area in which the property resides. During operation of the property lookup function, the present invention provides a menu on the screen for ongoing options such as Return to Homepage, Print Results, or Enter a New Lookup Criteria.

Figure 45:
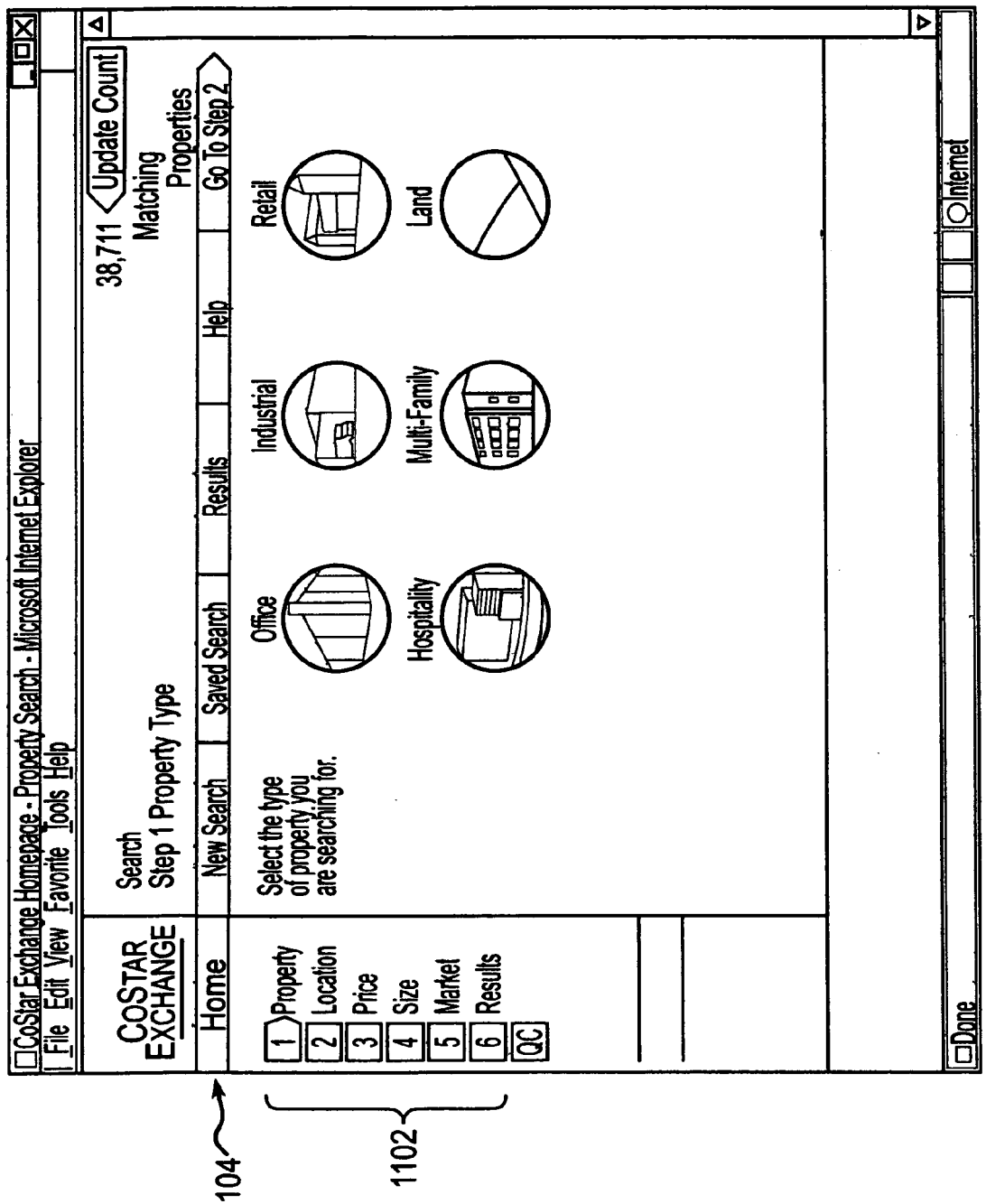

Returning to the homepage under the For Sale structured tab, the second primary function is Search Database. After clicking on the Search Database button, the user activates a series of web pages that execute the search function of the present invention, beginning with the page shown in FIG. 45. The search function is broken down into six steps by which a user enters search criteria and receives results. Each web page of the search function presents six buttons 1102 that can be clicked through to access the six steps of the search function. Each web page also includes general function buttons 1104, including a button to return to the homepage, a New Search button, a Saved Search button, a Results button, a Help button, and a Go to the Next Step button. The six steps of the search function include five steps for entering search criteria and a sixth step for obtaining the results of the search. The search criteria for steps one through five include property, location, price, size, and market. The general function buttons 1104 can be activated during any step, such that, e.g., a user can specify search criteria for only the first two steps, and then can skip directly to obtaining results. Also, a user can skip back and forth between steps to revise information (the steps do not have to be completed in order).

The web page corresponding to Step One, Property Type, presents six options or categories of property types from which to choose. These property types include office, industrial, retail, hospitality, multi-family, and land. From this Step One page, the user has the option of selecting a property type by clicking on one of the six categories of property types or skipping the selection of a property type by clicking on the Location button or the Go to the Next Step button.

Figure 46:
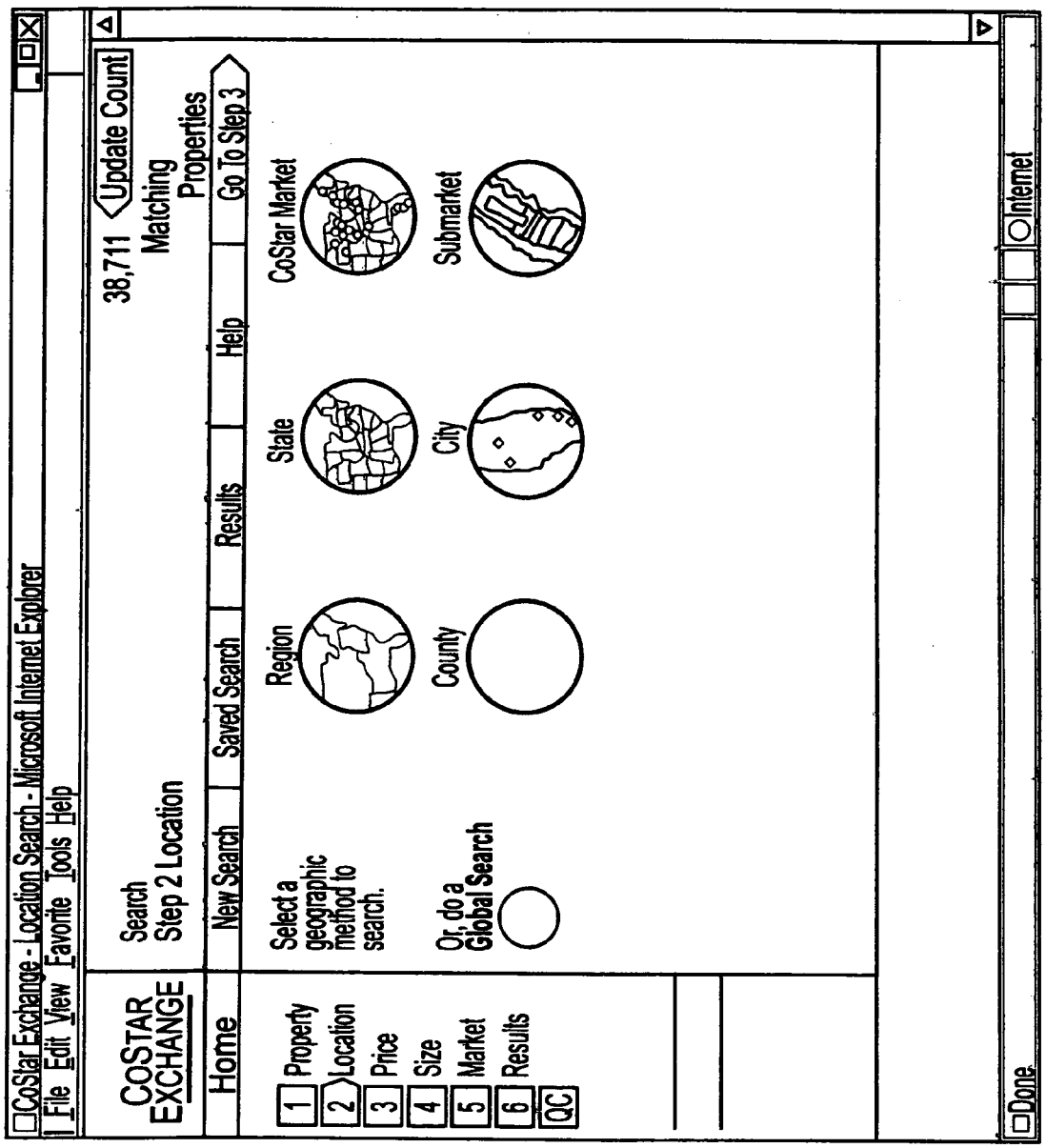
Figure 47:
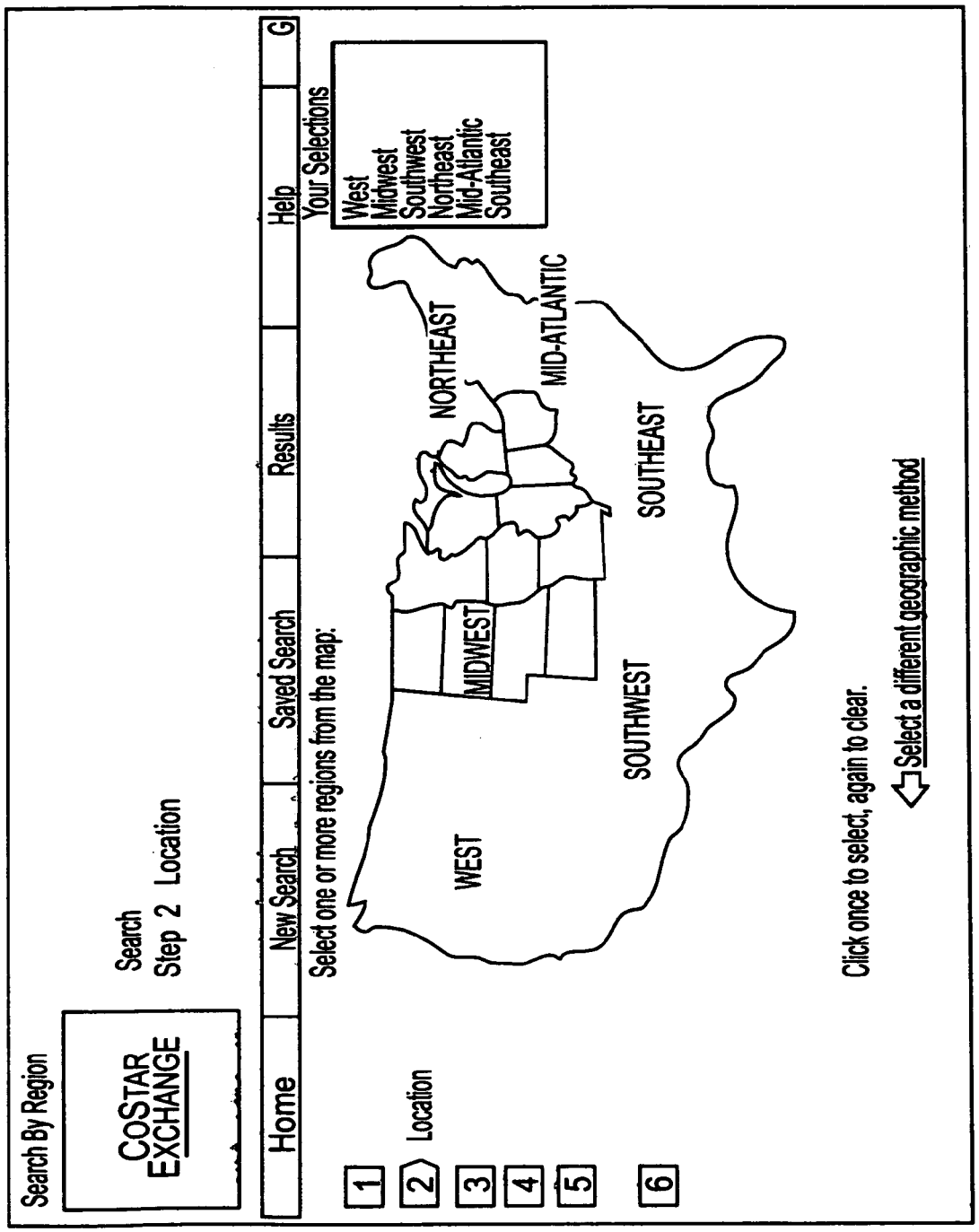

The web page corresponding to Step Two of the search function (FIG. 46) asks the user to select a geographic method by which to search the database or to select the option of conducting a global search. The geographic methods by which a user can search the database include searching by region, state, market, county, city, or sub-market. The user can proceed to the next step of the search function by clicking on one of the six categories of geographic search methods, by choosing to conduct a global search, or by skipping a preferred geographic search method by clicking on the Step Three Price button or the Go to the Next Step button. If the user chooses to use a geographic search method, the website presents another page asking for more detail on that search method. For example, if the user chooses to conduct a regional geographic search, the present invention presents a map showing each region, as shown in FIG. 47. The user clicks on a region to narrow the search to within that region. Similarly, for the state, market, county, city, and sub-market categories, a user chooses a particular state, market, county, city, or sub-market to narrow the search. After selecting a geographic method by which to search the database or selecting a global search, the user moves on to the next step of the search criteria: Step Three Price.

Figure 48:
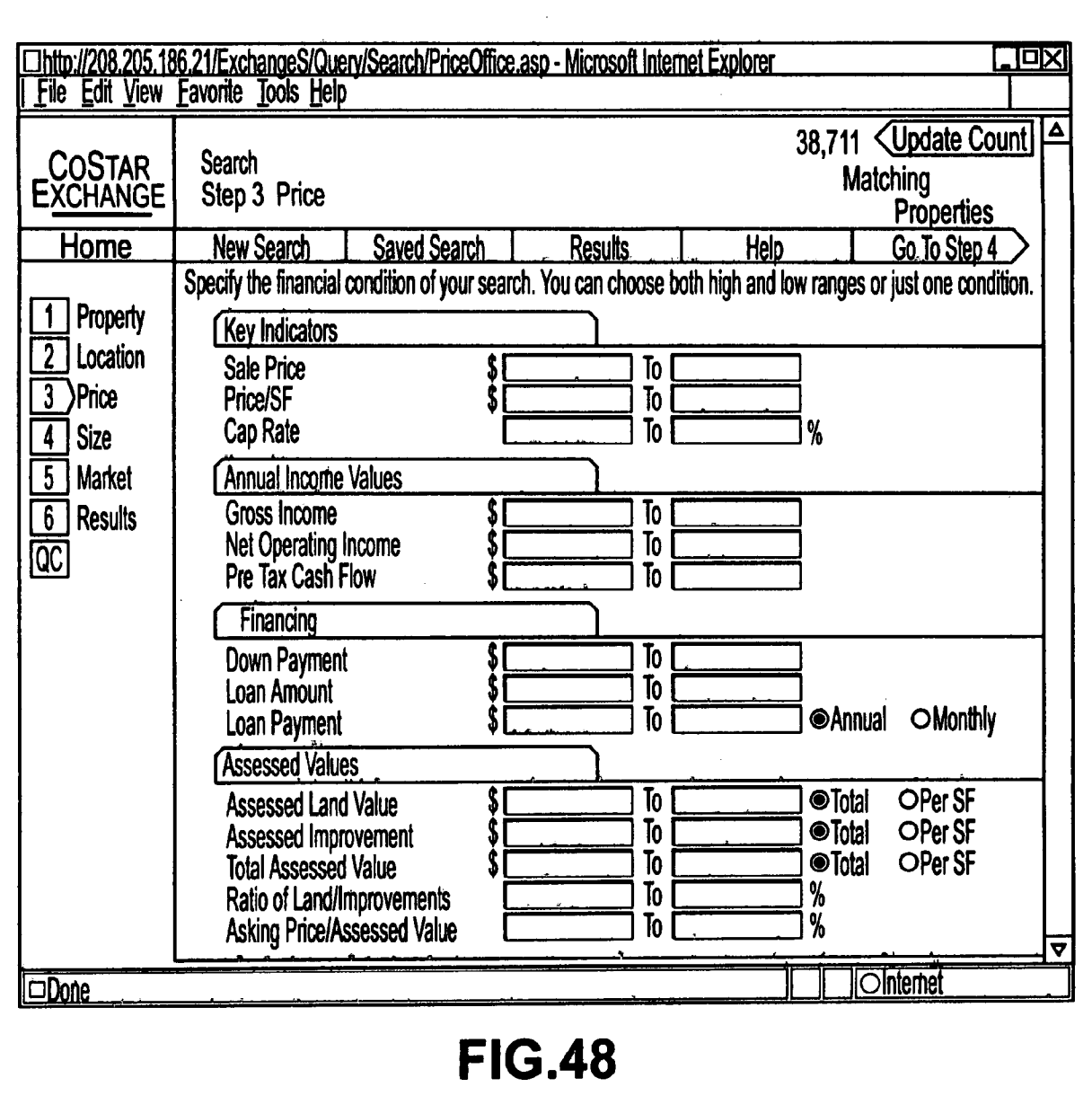

Step Three of the search criteria allows a user to specify the financial conditions for the search. The user can choose both high and low ranges for the price categories or just one condition. As shown in FIG. 48, the price conditions are broken down into four categories: key indicators, annual income values, financing, and assessed values. Under key indicators, the user can specify a sale price, a price per square foot, and a cap rate. Under annual income values, a user can specify gross income, net operating income, and pre-tax cash flow. Under the financing heading, a user can specify down payment, loan amount, and loan payment in either annual or monthly terms. Under the assessed values subheading, the user can specify assessed land value, assessed improvement, and total assessed value either in total amounts or per square foot. Also under the assessed values subheading, the user can specify the ratio of land to improvements and the ratio of asking price to assessed value. Once the user has chosen values for the price conditions or has chosen to skip Step Three, the user proceeds to Step Four by clicking on the Go to Next Step button or the Step Four button.

Figure 49:
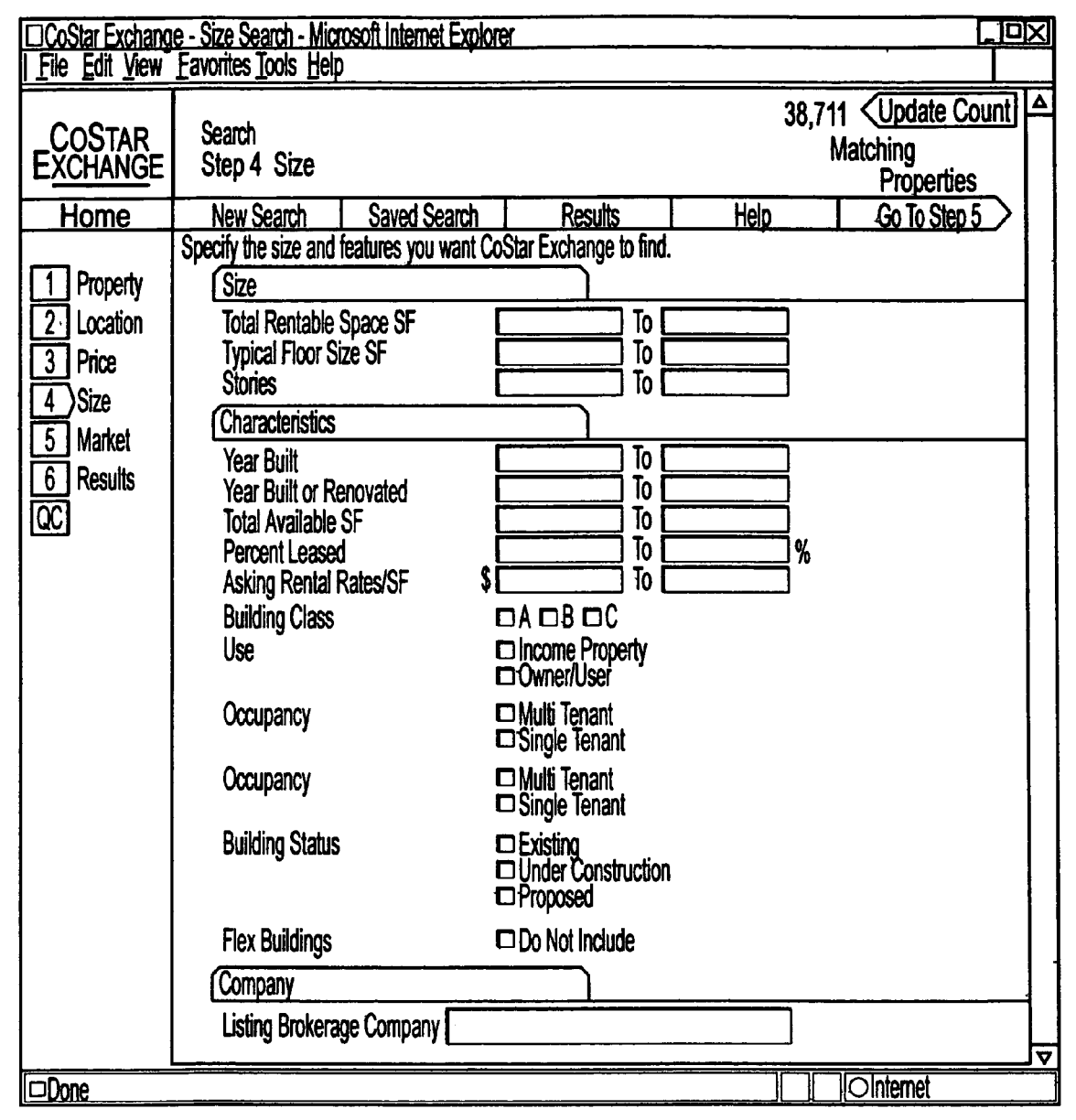

As shown in FIG. 49, the web page for Step Four enables the user to specify the size and features of the property for which the user is searching. The data entry fields for this search criteria are broken down into the subheadings: size, characteristics, and company. Under the size subheading, the user can specify the total rentable space in square feet, the typical floor size in square feet, and the number of stories. Under characteristics, the user can specify the year built, the year built or renovated, the total available square feet, the percent leased, the asking rental rates per square foot, the building class (e.g., A, B, or C), the type of use (e.g., income property or owner/user), the occupancy type (e.g., multitenant or single tenant), the building status (e.g., existing, under construction, or proposed), and whether to include flex buildings in the search. Under the company subheading, the user can specify the listing brokerage company and thereby limit the search to that company. Once the user has entered the desired data into the web page of Step Four, the user proceeds to Step Five by clicking on the Go to Next Step button or clicking on the Step Five button.

The web page for Step Five, as shown in FIG. 50, enables a user to specify the market conditions of the user's desired property. These market conditions are broken down into three subheadings: vacancy and absorption, inventory ratios, and inventory. Under the vacancy and absorption subheading, a user can specify the vacancy rate in a region or submarket, the point increase in the last 12 months in a region or submarket, the point decrease in the last 12 months in a region or submarket, the 12 months' gross absorption in a region or submarket, the 12 months' net absorption in a region or sub-market, and finally, the asking rental rates per square foot in a region or submarket in annual or monthly terms. Under the inventory ratios subheading, a user can specify the ratio of net absorption to inventory in a region or submarket, the ratio of gross absorption to inventory in a region or submarket, and the ratio of under construction to inventory in a region or submarket. Under the inventory subheading, a user can specify the total building inventory in square feet in a region or submarket, the average building size in square feet in a region or submarket, the number of buildings in a region or in a submarket, and the under construction in square feet in a region or submarket. Once a user has entered the desired values in the data entry fields of the Step Five web page, the user can return to other steps by clicking on those buttons or can proceed to Step Six to obtain the results for the search criteria. From the web page for Step Five, a user can access Step Six by clicking on the Get Results button or by clicking on the Step Six button.

The web page for Step Six lists the results of the search in the form of a table, as illustrated in FIG. 51. The table includes column headings such as address, city, state, price, square foot size, price per square foot, cap, and class of property.

Figure 52:
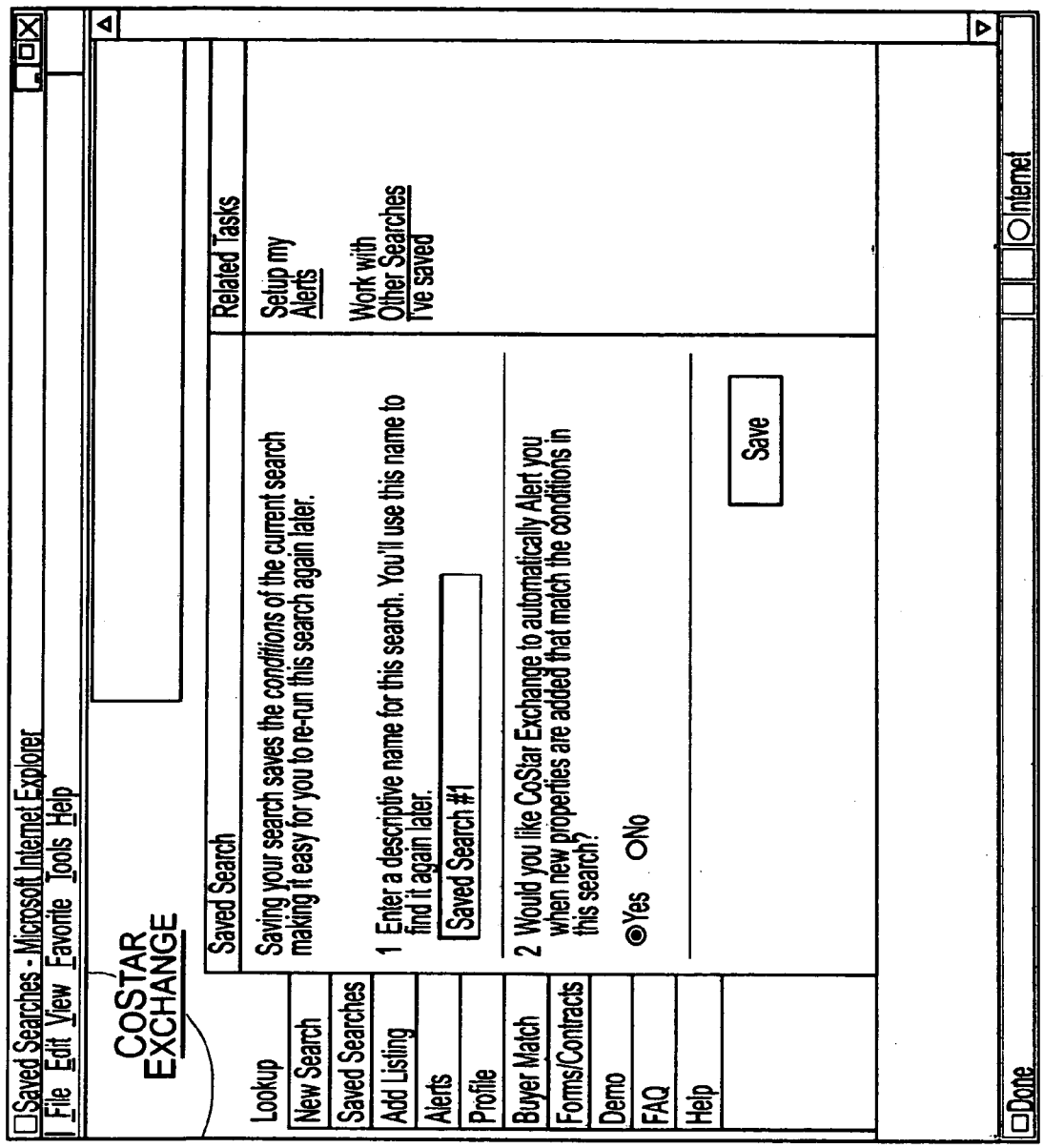

The web page for Step Six, as with the other steps, also provides the user with the function buttons including Return to Homepage, New Search, Save Search, Add Property, Remove Property, and View Details. The New Search button enables a user to return to Step One of the search function to choose new search criteria. The Save Search button enables a user to save the search criteria to be accessed, reviewed, and executed again later. In addition, by saving the search criteria a user can establish an alert notification that automatically notifies the user of a new listing that satisfies that search's criteria. FIG. 52 shows the Saved Search page displayed to a user who clicks through the Save Search button. The Saved Search page prompts a user for a file name and whether alert notification should be activated for the saved search.

The Add Property button (FIG. 51) enables a user to add a property to the search results table that did not initially meet the search criteria but which the user would like to add to the list for comparison purposes. The Remove Property button enables the user to remove properties that did satisfy the search requirements but that the user has determined to be undesirable. Finally, a user can obtain details on a property listed in the search results table by either highlighting the property and clicking on the Get Details button, or by double-clicking on the entry in the table. The web page for Step Six also provides a Print button that enables a user to print out the search result table.

Once the user has chosen to view details on a particular property, the website presents an overview page (FIG. 53) listing general information about the property, photographs of the property, three dimensional images of the property, and maps of the area in which the property is located. The overview page is one tabbed page of six tabbed pages that are presented as part of a Property Details page. Each tabbed page has a structured tab. The structured tabs include Overview, Financial, Tenants, Market, Comps, and Map.

Under the Overview structured tab, the general information on the property is broken down into eight subheadings including investment summary, highlights, property description, assessment value, location, building team, transaction guidelines, and "presented by."

Under the investment summary subheading, the Overview web page lists such data as the price, price per square foot, cap rate, percent leased, building size, land area, year built, and sale status of the property.

Under the highlights subheading, the Overview web page provides a narrative describing the principal selling points of the property.

Under the property description subheading, the Overview web page lists such data as the building size, number of floors, typical floor size, core factor, elevators, building class, land area, lot dimensions, building FAR, zoning, percent leased, available space, vacant space, number of tenants, average tenant size, parking ratio, open parking, covered parking, parking spaces, and parking rates. This section also provides an area for a description of special qualities of the property.

Under the assessment value subheading, the Overview web page lists such figures as land assessment, improvement assessment, total assessment, property tax rate, annual property tax, and property tax per square foot.

Under the location subheading, the Overview page lists the property's metro market, county, submarket, and zip code. This section also provides the map book and page on which to find the property, the block/lot of the property, and the parcel number. This section also provides an area for narrative comments about the location.

Under the building team subheading, the Overview page lists such information as the property manager, the developer, the architect, and a contact person in charge of the building information.

Under the transaction guidelines subheading, the Overview page lists such data as the sales status, marketing, final offers, contract signing, closing, active date, last update, and days on market.

Under the "presented by" subheading, the Overview page lists such information as the contact information for the broker or party responsible for listing the property.

As shown in FIG. 54, under the Financial structure tab of the Property Details page, the information is broken down into four subheadings: financial overview, financial worksheet, income and expense, and existing financing. Under the financial overview subheading, the Financial page lists such data as the price, the price per square foot, the use, and the cap rate. Under the financial worksheet subheading, the Financial page lists such data as the down payment, the new loan, the net operating income, the loan payment, the pre-tax cash flow, the price, cap rate, down payment, the interest rate, and the loan term along with a Calculate button. Under this subheading, a user can change a field in the worksheet and click the Calculate button to refresh the values in each of the fields. In this manner, the present invention enables a user to enter different financial criteria to determine the impact on price terms, loan terms, and cash flow.

Under the income and expense subheading, the Financial page lists such data as the gross income, other income, vacancy allowance, operating expenses, net operating income, loan payment, pre-tax cash flow, current asking rent per square foot, estimated average rent per square foot, taxes, insurance, utilities, wages, maintenance, management, miscellaneous reserves, total estimated expenses, and estimated expenses per square foot.

Under the existing financing subheading, the Financial page lists such information for the existing financing as lender, loan payment, due date, loan amount, interest rate, and loan term.

As shown in FIG. 55, under the Tenant structured tab of the Property Details web page, the information is broken down into the subheadings: tenants tracked, tenant analysis, and tenant notes. Under the tenants tracked subheading, columns of information include suite, tenants, occupancy square foot, building percentage, industry, expires, and estimated rent. The suite column lists the suite a tenant occupies. The tenants column lists the name of the tenant. The occupancy square foot column lists the number of square feet the tenant occupies. The building percentage lists the percentage of space in the building that the tenant occupies. The industry column lists the type of business the tenant runs (e.g., health, media, and legal). The expires column lists the date the lease expires for the tenant. The estimated rent column lists the estimated rent the tenant is paying.

Each row under the tenants tracked subheading lists information for individual tenants. At the bottom of the list of tenants are totals for the entire building including tenant subtotals, unspecified tenants, vacant space, and total building. In this manner a user can conveniently determine the percentage of space leased in the property, the percentage of unspecified tenants leasing space in the property, and the total space leased by the listed tenants.

Under the tenant analysis subheading, the Tenant web page lists the number of tenants in the building, the average tenant size, the average lease term, the estimated average rent per square foot, the total percent occupied, the estimated rollover in the next 12 months, the estimated rollover in the next 36 months, and the current asking rent per square foot. Alternatively, the tenant analysis subheading also links Dunn & Bradstreet™ ratings and information.

Under the tenant notes subheading, the Tenant web page lists any relevant narrative information about the tenants.

As shown in FIG. 56, under the market structured tab of the Property Details web page, information is presented under three subheadings: size/vacancy, inventory/absorption, and price/rate. The information under the Market structured tab enables a user to compare the commercial viability of the property against similar properties in the same region and state. Under the size/vacancy subheading, the Market web page presents such data as the number of buildings, the total rentable space, the average building size, the average tenant size, the average building age, the percent leased, the number of available spaces, the total available space in square feet, the average available space in square feet, the vacant space in square feet, the average vacant space in square feet, the vacancy rate, the vacancy YAG, and the vacancy rate v. the YAG.

Under the inventory/absorption subheading, the Market web page lists such data as the total existing space in square feet, the square footage under construction, the square footage under renovation, the square footage proposed, the total rentable space in square feet, the 12 month gross absorption in square feet, and the 12 month net absorption in square feet.

Under the price/rate subheading, the Market web page lists such information as the average asking price per square foot, the average asking rent per square foot, the average asking rents YAG, and the rent charge v. YAG.

Figure 57:

As shown in FIG. 57, under the Comps structured tab of the Property Details web page, the present invention lists sale properties comparable to the subject property. The Comps web page includes summaries of each comparable sale property with a thumbnail picture 2302 and a button 2304 the user can click to obtain full details on the property. Each summary includes such information as the address of the property, the building class size, the building size, the number of floors, the year built, the buyer, the sale price, the price per square foot, the cap rate, and the sale date. In addition, the summary includes the distance the comparable sale property is located from the subject property. The Comps web page also lists a series of buttons 2306 at the top of the page corresponding to each category listed in the comparable sale property summaries. By pressing one of these buttons, a user can sort the comparable properties by the summary category corresponding to that button. Thus, for example, if a user wishes to sort the comparable sale properties by their distance from the subject property, the user would click the Distance button. To view a full-sized picture of the sale property, a user simply clicks on the thumbnail picture. To open the Properties Details page for a comparable sale property, the user simply clicks on the Full Details button for that property. In addition, in a further preformed embodiment, the comps structured tab includes a summary of the subject property to enable side-by-side comparisons with comparable properties by summary categories.

Figure 58:
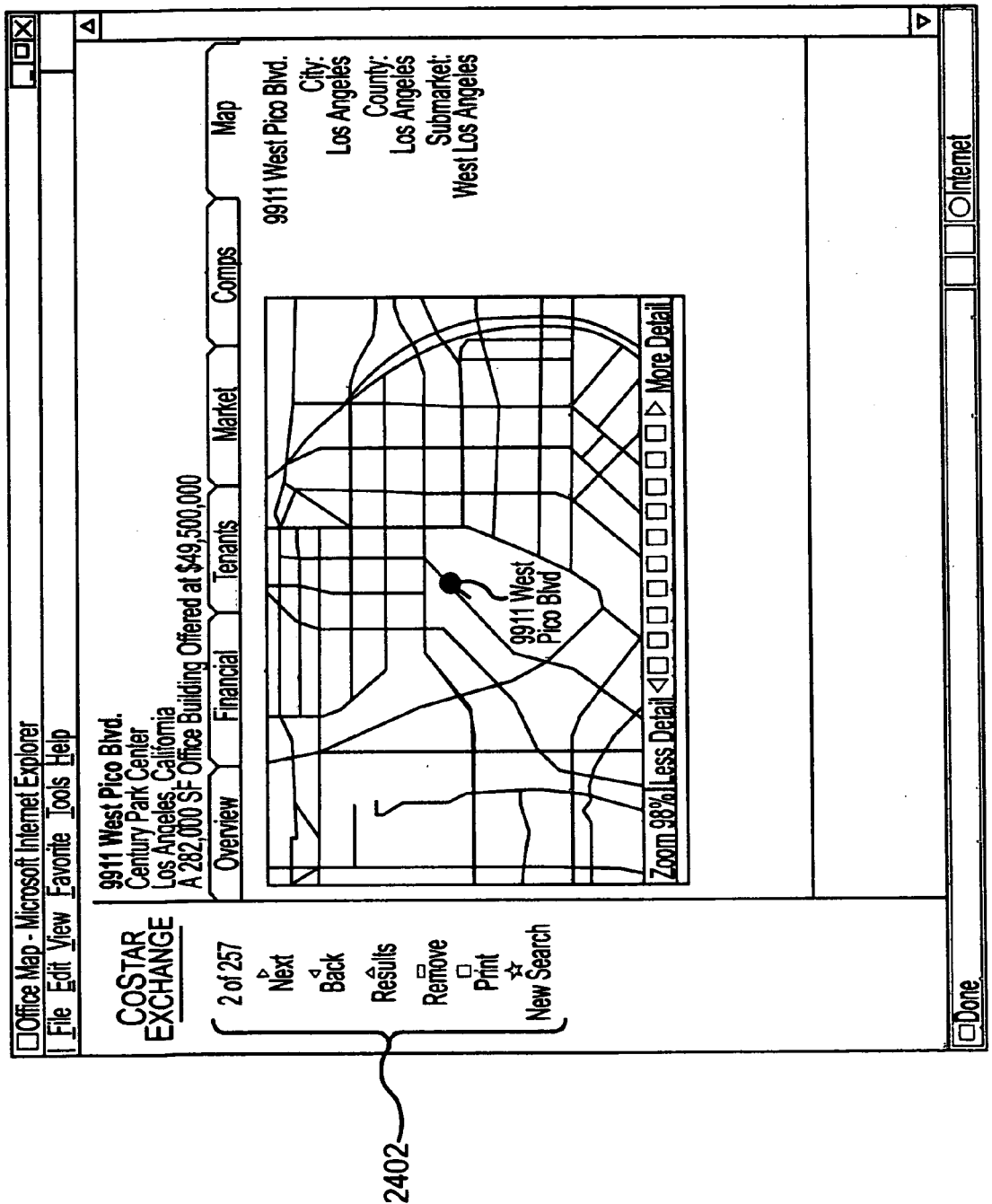

As shown in FIG. 58, under the Map structure tab of the Property Details web page, the present invention provides maps, pinpointing the location of the subject property with an icon or other indicator. The Map web page also lists the address, the city, the county, and the submarket of the property. The maps give the user the ability to view the overall region in which the property is located, as well as the ability to zoom in and out on the map of the property.

Optionally, the map displays the locations of other for sale and comparable properties using icons or other indicators. Preferably, when the user drags the mouse pointer over an icon, the system displays a pop-up window providing information on the associated property, e.g., a photograph, square footage, and price of the property. A user could then click through the pop-up window to access more information about the property.

While a user is exploring the above-described six structured tabs of the Property Details web page, the present invention provides a function menu area 2402 (as noted in FIG. 58) including next, back, results, remove, print, new search, and a numerical listing of the property. The numerical listing corresponds to the item number of the property in the list of the search results. For example, a user may be viewing the property details for the 12th property listed on a search list of 39 properties, i.e., 12 of 39. The next function enables a user to view the next property listing in the search results table. Thus, for example, the user could click on the next function to view 13 of 39 after viewing 12 of 39. Similarly, the back function allows the user to move to a prior property listing. The results function allows the user to return to the table listing the search results. The remove function enables the user to remove a property from the search result table after viewing the property details and determining that the property is not desirable. The print function enables a user to print out the property details of a particular property. Finally, the new search function enables a user to return to the original six step search function to commence a new search. A further preferred feature provides on-screen and print reports such as a one-line summary, a multi-line summary with photos, a one page report, and an investment package (all data compiled in a paginated investment package format).

Returning to the website homepage (FIG. 35), the third primary function under the For Sale structured tab is Add Listing. Upon clicking on the Add Listing button, the website presents the user with a Building Questionnaire web page, as shown in FIG. 59. The Building Questionnaire page asks the user to select the type of property the user wishes to profile in the present invention. These types of properties include such categories as 'for sale' properties and 'for lease' properties. Within each of these property types, the user can choose a particular class of property, such as office or industrial.

Figure 60:
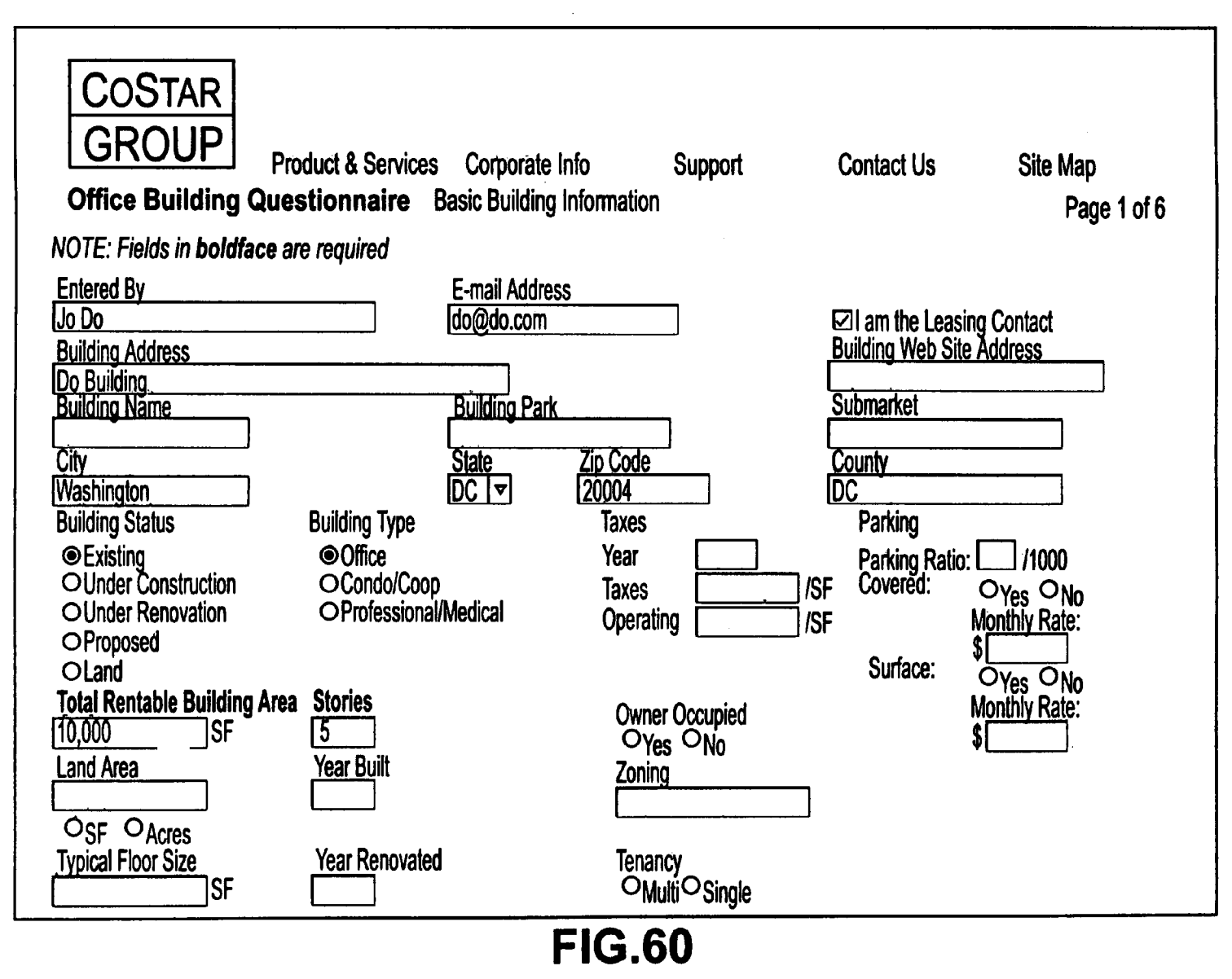

Upon clicking a property and class type, the website presents a data entry page as shown in FIGS. 60 and 61. The data entry page prompts the user for basic building information. The user enters the building information in searchable data fields such as building address, city, state, zip code, county, building status, building type, total rentable building area, and number of stories.

As shown in FIG. 62, after completing the basic building information, the Building Questionnaire prompts the user for suite level information including such information as floor, smallest square feet available, whether the total square feet is divisible or is not divisible, and the maximum contiguous square feet on a floor. The Questionnaire also asks for suite level information such as the space type (e.g., relet/direct, new and sublet), the space use (e.g., office, office/retail, retail, and medical), and occupancy (e.g., 120 days, to be determined, and vacant/off-market). From this page, a user can save the suite level information by clicking through the Save button. Upon saving, the website displays the page shown in FIG. 63.

Figure 64:
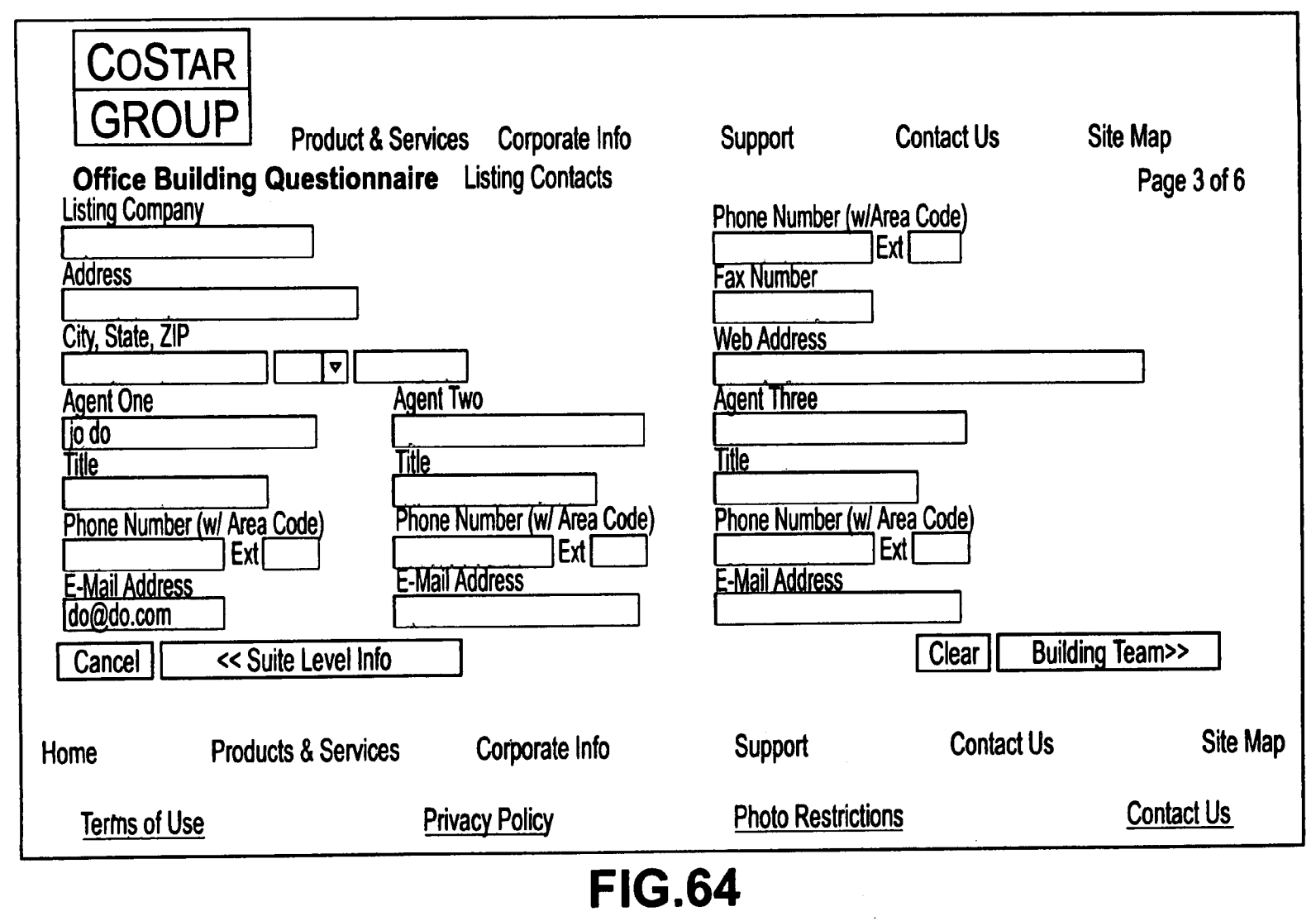

As shown in FIG. 64, the next section of the office building questionnaire prompts the user for information concerning the listing contact such as the listing company, its telephone number, its agents, and its e-mail address.

As shown in FIG. 65, the next section of the office building questionnaire prompts the user for information about the building team including such data fields as owner, architect, developer, management company, property manager, asset manager, and the various contact information for each of these entities.

Figure 66:
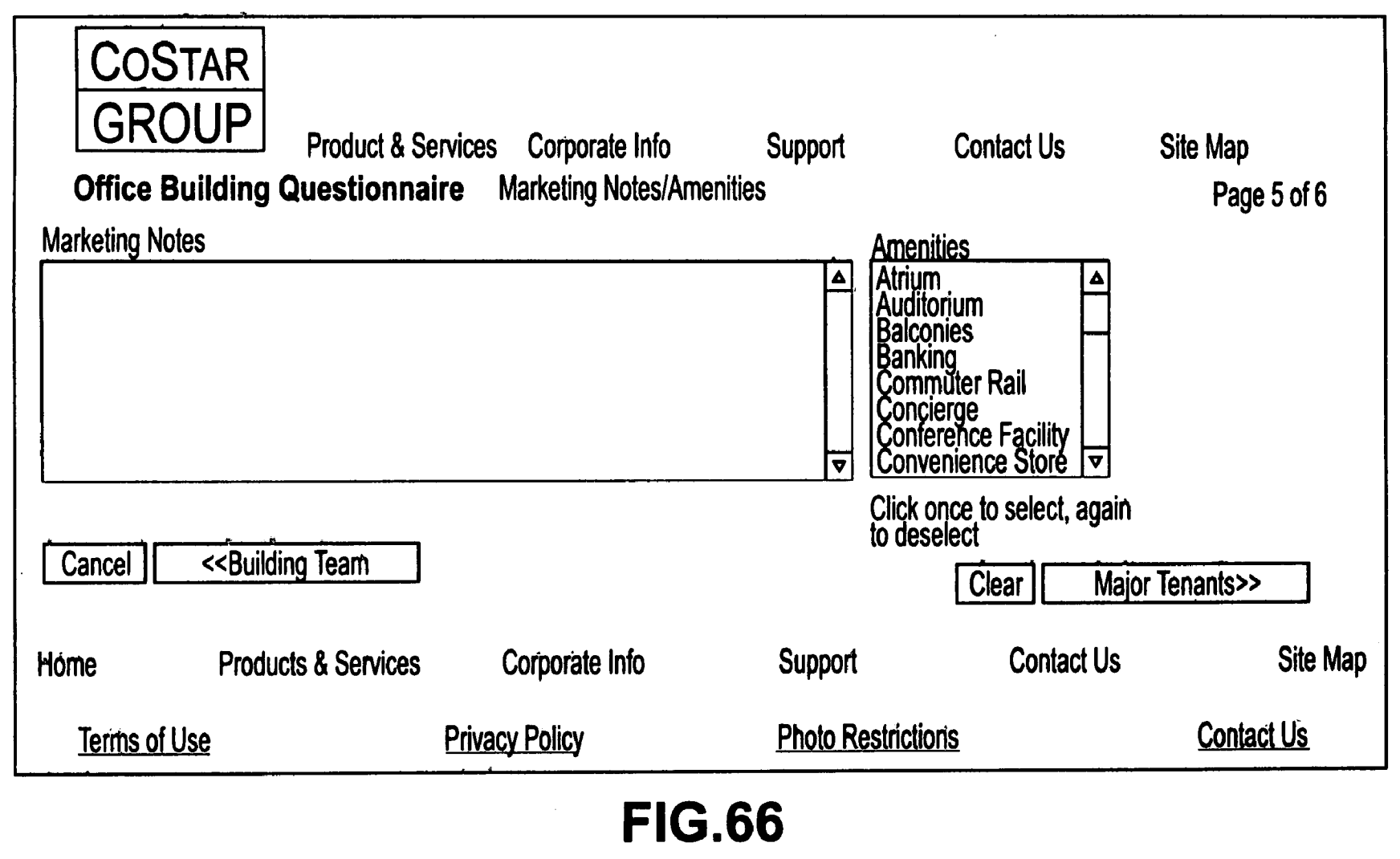

As shown in FIG. 66, the next section of the office building questionnaire prompts the user for information concerning marketing notes and amenities such as an atrium, auditorium, nearby commuter rail stations, dry cleaners, golf courses, and restaurants. A data entry field for marketing notes accepts free-style narratives on any special features that improve the value of the property and enhance its attractiveness to buyers.

As shown in FIG. 67, the final section of the office building questionnaire prompts the user for information on major tenants in the subject property. This section includes data entry fields for such information as major tenant name and square feet.

Each of the above-described sections of the office building questionnaire presents web page buttons that allow the user to move back and forth between the sections of the questionnaire. On the final section for major tenants (FIG. 67), the button Submit Questionnaire allows a user to submit the questionnaire and exit the Add Listing function of the present invention. After clicking the Submit Questionnaire button, the web page presents the user with a confirmation thank you page (FIG. 68), thanking the user for submitting the office questionnaire and providing a tracking number for the user's records. The confirmation page also informs the user that a research analyst will be contacting the user shortly concerning the listing. According to the overall process of the present invention, once the research analyst contacts the listing entity and confirms the validity of the information, that data is entered into the database for access by the search function.

Although the above description presents the web site operation in the context of for-sale properties, the described functionalities apply equally well to databases containing other real estate information such as for-lease property information, tenants information, and comps information. For example, the search functions described with reference to FIGS. 45–58 could look for for-lease properties, tenants, or comparables, instead of the for-sale property described above. A user would access these databases through, for example the For Lease, Tenants, and Sale Comps structured tabs 104 shown in FIG. 35. The present invention can therefore provide a user with access to various databases containing nationwide commercial real estate information.

In spite of this nationwide access, in the context of real estate, and especially commercial real estate, users tend to focus on specific geographic locations associated with, for example, a client's interests or the business locations of a broker. For this reason, even when a national database is available, many users would find little use or value in having access to information from outside their region. In some instances, however, users may desire limited ad hoc access to information from outside their region. Moreover, there are some users that require information from multiple regions.

To address these competing demands and to provide the capability of better meeting each user's particular needs, the core data warehouse A16 of FIG. 1 stores commercial real estate data for multiple markets, and associates each data entry with a particular market. The multiple markets could correspond to the different regions of the United States, as shown for example in FIG. 47 (i.e., West, Midwest, Southwest, Northeast, Mid-Atlantic, and Southeast). Core data warehouse A16 also associates each data entry with a particular category of real estate data, such as a for-sale property, a for-lease property, a comparable sale listing, or a tenant listing. Thus, the present invention can execute searches based on market criteria and information type.

By assigning a market and information category to each data entry, the system operator can provide information services to match a user's needs. Thus, this embodiment of the present invention provides each user with a subscription status that dictates in which markets and information categories the user can search. For example, a user who subscribes to tenant information in the Mid-Atlantic region could conduct an unlimited amount of searches for tenants within that region for no additional cost above the periodic (e.g., monthly) subscription cost.

Normally, a user subscribing to a particular region would execute a search in the user's primary market (e.g., the Washington, D.C. metropolitan area) within that region. This primary market would typically correspond to the location of the user's office and/or the market or area in which the user conducts most of the user's business.

In some circumstances, however, the user may wish to explore other markets, beyond the user's subscription market. For example, in searching tenant information, a user may want to determine the properties leased by a particular tenant across multiple markets. As another example, in searching comparable sales data, a user may wish to expand the sample of comparable sales for a unique property that might not have appropriate comparable sales within the user's subscription market. For instance, there may be a limited number of mall properties in the $40–50 million range across the United States.

Likewise, in other circumstances, the user may wish to obtain information beyond the information category to which the user subscribes. For instance, a user who subscribes to for-sale property information may want to learn more about the tenants of a particular building that the user is considering purchasing.

Thus, this embodiment of the present invention enables a user to purchase one-time searches outside of the user's subscription status. In this way, a user who subscribes to searches in one market or information category can conduct one-time searches in other markets or information categories. For instance, a user who subscribes to the Mid-Atlantic region can, after conducting a search in the Mid-Atlantic region, expand his search to encompass the Northeast and Southeast regions. Similarly, a user who subscribes to for-sale property access can broaden his search to include for-lease properties as well. The user pays a fee for each expanded search by, for example, authorizing the forwarding of an electronic payment to the system operator.

A specific implementation of this embodiment provides a method for selling a subscription that allows users to search a database. The database contains information regarding commercial real estate properties, which includes geographic information or information regarding the geographic region of each property, and information regarding at least one of comparable real estate sales, tenant information, for-sale information, and for-lease information. The method for selling a subscription includes associating each user with a subscription status that identifies geographic regions and information categories that the user can search, and allowing users to purchase other information on an ad hoc basis beyond the geographic regions and the information categories identified in the subscription status.

Figure 74:
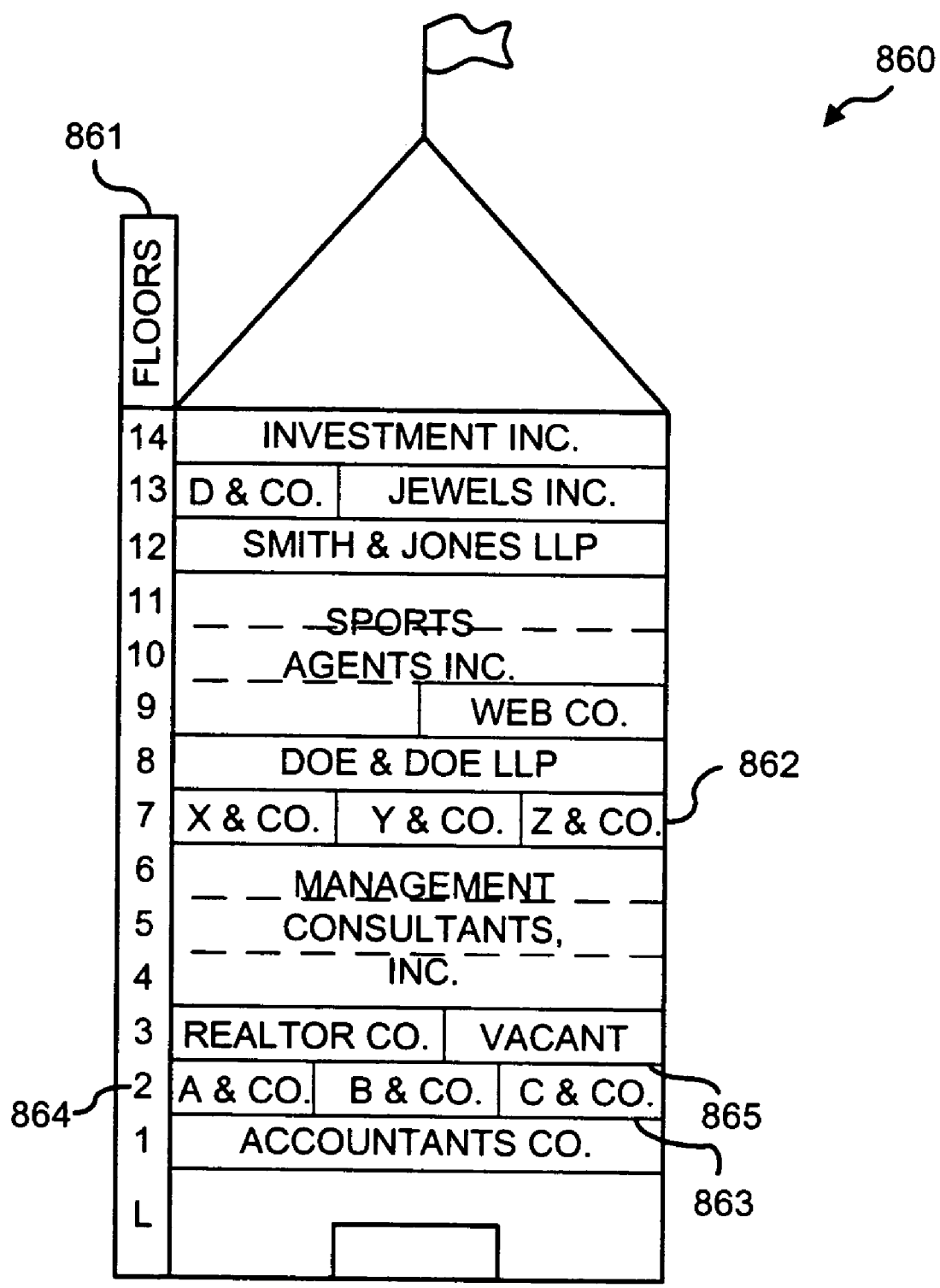
FIG. 74 is a schematic diagram of a user interface through which to access tenant information, according to an embodiment of the present invention.

In accordance with another aspect of the present invention, information regarding tenants is gathered and stored in core data warehouse A16. Through the use of relational database software, for example, the tenant information is associated with building information. This makes it possible, for example, to graphically depict the occupancy of a particular building, an example of which is shown in FIG. 74 is shown and described hereinafter.

An embodiment of the present invention provides a tenant information database that contains tenant information from a plurality of markets (e.g., regions of the United States) across which a user can search. In reference to FIG. 1, this tenant information database could be contained in core data warehouse A16 and populated by tenant information application A46. Each entry in the tenant information database could include the name of a tenant, the name and/or address of the building that the tenant occupies, the type of business the tenant runs, the start and end dates of the tenant's lease, and the lease price the tenant is paying. A user can cross-query the multi-market database to look for particular tenant information, such as the properties leased by a specific tenant, all of the tenants that occupy a particular building, or all of the tenants that meet a certain criteria (e.g., occupy 500,000 square feet or more).

In analyzing a particular tenant, the search result would list the properties leased by that tenant across the plurality of markets. Thus, for example, a nationwide search of tenant information on the fictitious "ABC Company" might return results listing offices leased in New York, Chicago, Los Angeles, and Dallas.

In conjunction with these multi-market searches, an embodiment of the present invention also provides a unique user interface to display the results of the multi-market searches. In a specific implementation, the interface plots on a map of the United States an icon for each leased property. In a further embodiment, each icon also includes a summary of the tenant information corresponding to each location, such as the lease rate, the term of each leased property, and a photograph of the tenant's building. A user can then click on any of the icons to drill down and obtain more related tenant information.

Another embodiment of the present invention provides a comparable sales database that contains information on comparable sales properties. In reference to FIG. 1, this comparable sales database could be contained in core data warehouse A16 and populated by comparables information application A50. For this embodiment, each entry of the comparable sales database is associated with a "quality" identification that indicates its degree of reliability and/or timeliness. The quality identification enables a user to better analyze and use the comparable sales information. As an example, the quality identification could include one of three categories: 1) verified comparable sales, 2) unverified comparable sales; and 3) for-sale properties.

Verified comparable sales are entries that researchers have confirmed for accuracy. After receiving notification of a sold property (e.g., from deed records), a researcher confirms the details of the sale by, among other methods, speaking with individuals who participated in the sale, recording data that those individuals provide, visiting the property to observe and record features of the property, and taking a picture of the property.

Unverified comparable sales are database entries that have not been confirmed by a researcher. These entries are based solely on a property sale notification, such as a recorded deed, and are considered to be "in the pipeline" awaiting verification.

For purposes of comparable sales information, for-sale properties can be considered "future comparable sales." Although the sale has neither been completed nor confirmed by a researcher, the for-sale information can give an indication as to what the comparable sales information might be.

Figure 75:
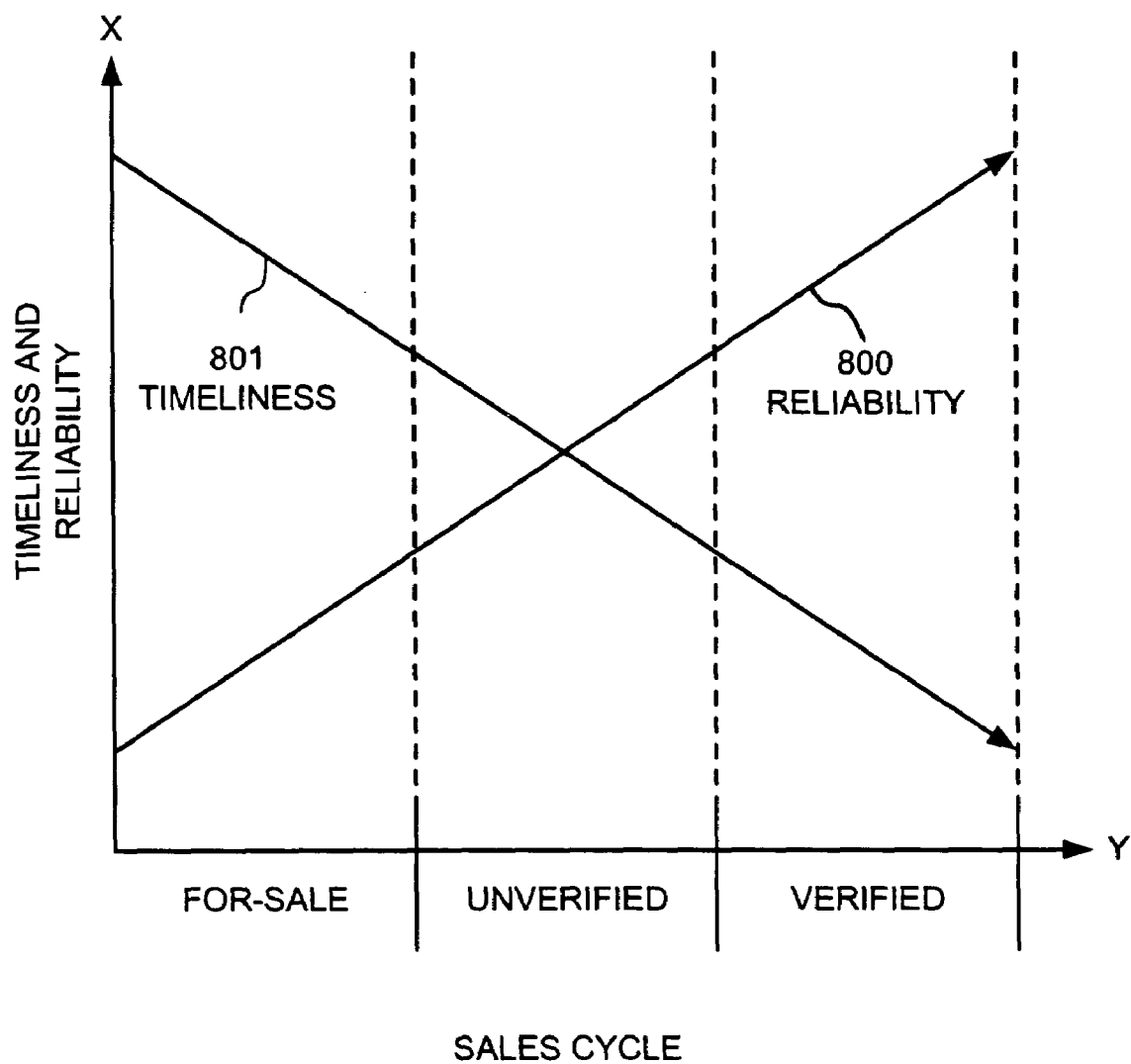
FIG. 75 is a graph illustrating the timeliness and reliability of comparable sales information as a function of sales cycle, according to an embodiment of the present invention.

Those skilled in the art will appreciate that these three categories of information are of varying degrees of reliability and timeliness, as illustrated in FIG. 75. The x-axis of FIG. 75 corresponds to an increasing amount of timeliness and reliability. The y-axis indicates to which part of the sales cycle the quality identifications correspond. Following along this cycle, the "for-sale" quality identification corresponds to the period in which a property is up for sale. The unverified quality identification corresponds to the period after the property is sold and a sale notification is received, but before the sale has been verified or confirmed. Finally, the verified quality identification corresponds to the period after a researcher has confirmed the sale information for accuracy.

Lines 800 and 801 represent conceptually the relationships between the quality identifications and their timeliness and reliability. As represented by reliability line 800, as a property listing progresses from for-sale to unverified to verified, the data becomes more reliable. As represented by timeliness line 801, during this same progression, the data becomes less timely.

Verified comparable sales are highly reliable because of the researcher's confirmation and other value-added contributions. Unverified comparable sales are somewhat less reliable, but may be more timely since they are likely to be more recent than the verified comparable sales. Information on for-sale properties may not be reliable for comparable sale purposes because the sale has not yet been completed. On the other hand, the for-sale listing could be highly relevant in setting asking prices and forecasting trends in comparable sales.

Thus, in accordance with this embodiment, the system of the present invention allows users to search all relevant comparable sales information, while at the same time calling to the user's attention the quality of the search results. Therefore, based on the quality identifications in the foregoing example, a user would recognize that a search result containing for-sale and unverified comparable sales information may be less reliable, but more relevant or timely. A user query is applied against all three categories of information, but the system generates a flag or other indicator that alerts the user to the quality of the results.

Figure 69:
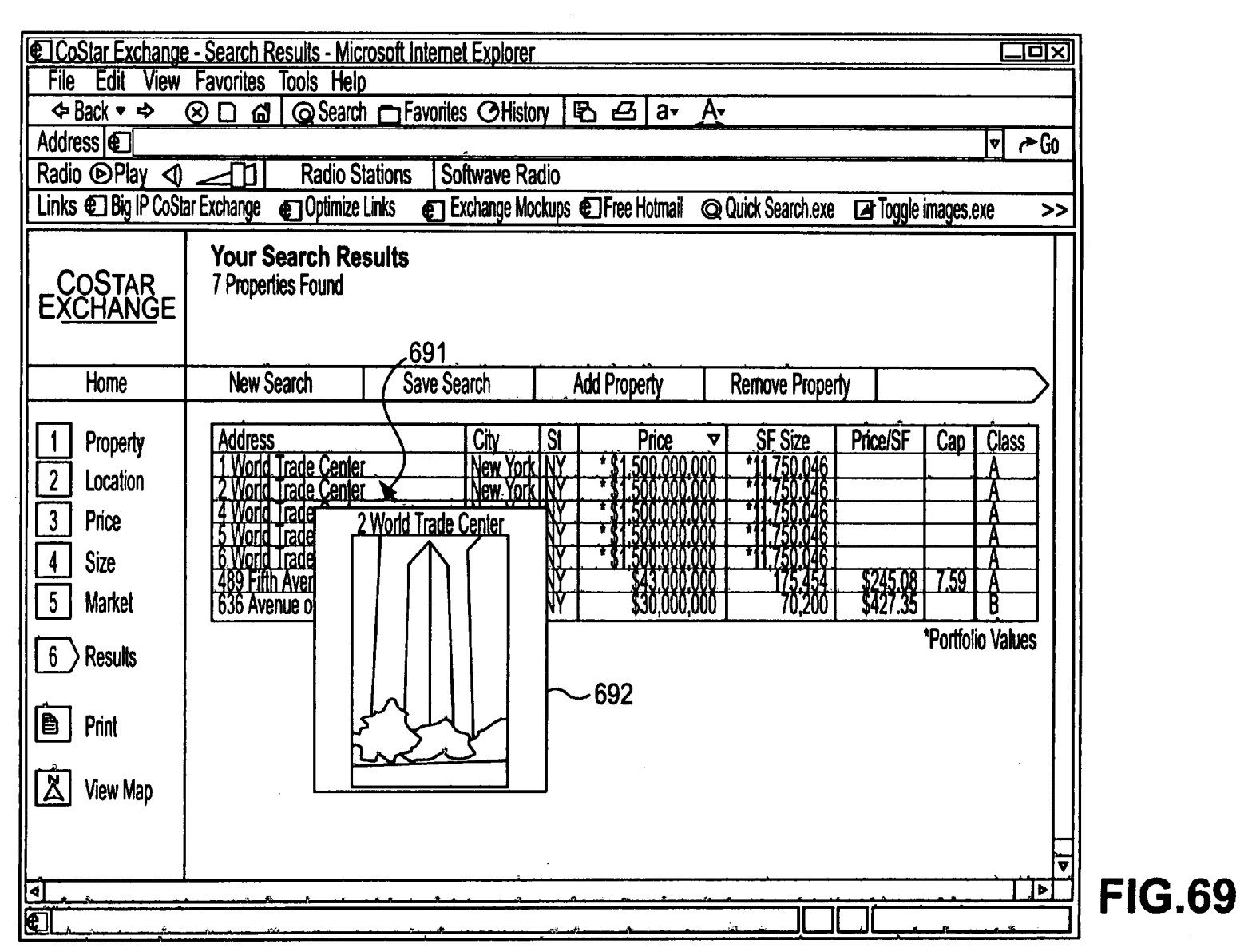
Figure 70:
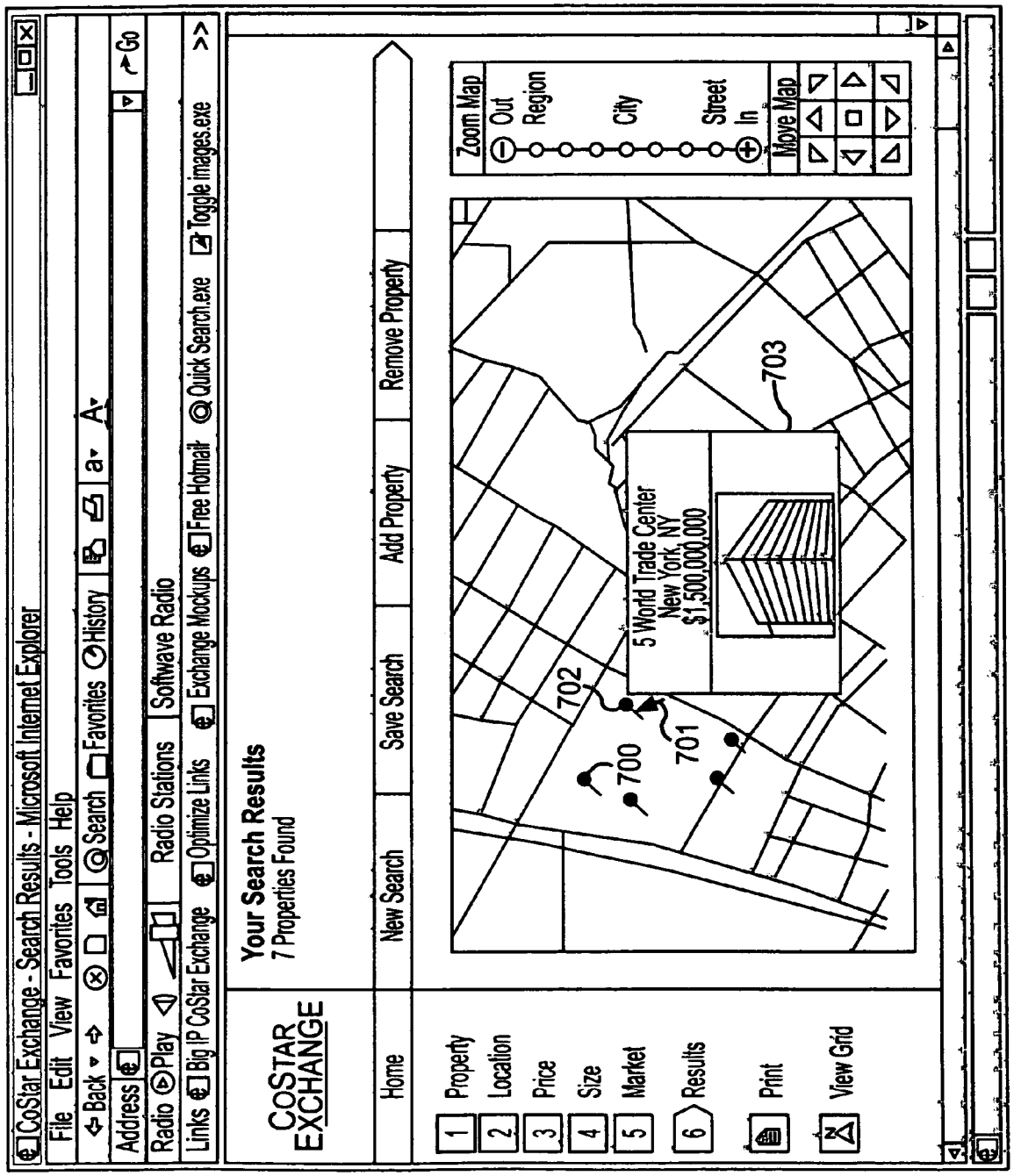
Figure 71:
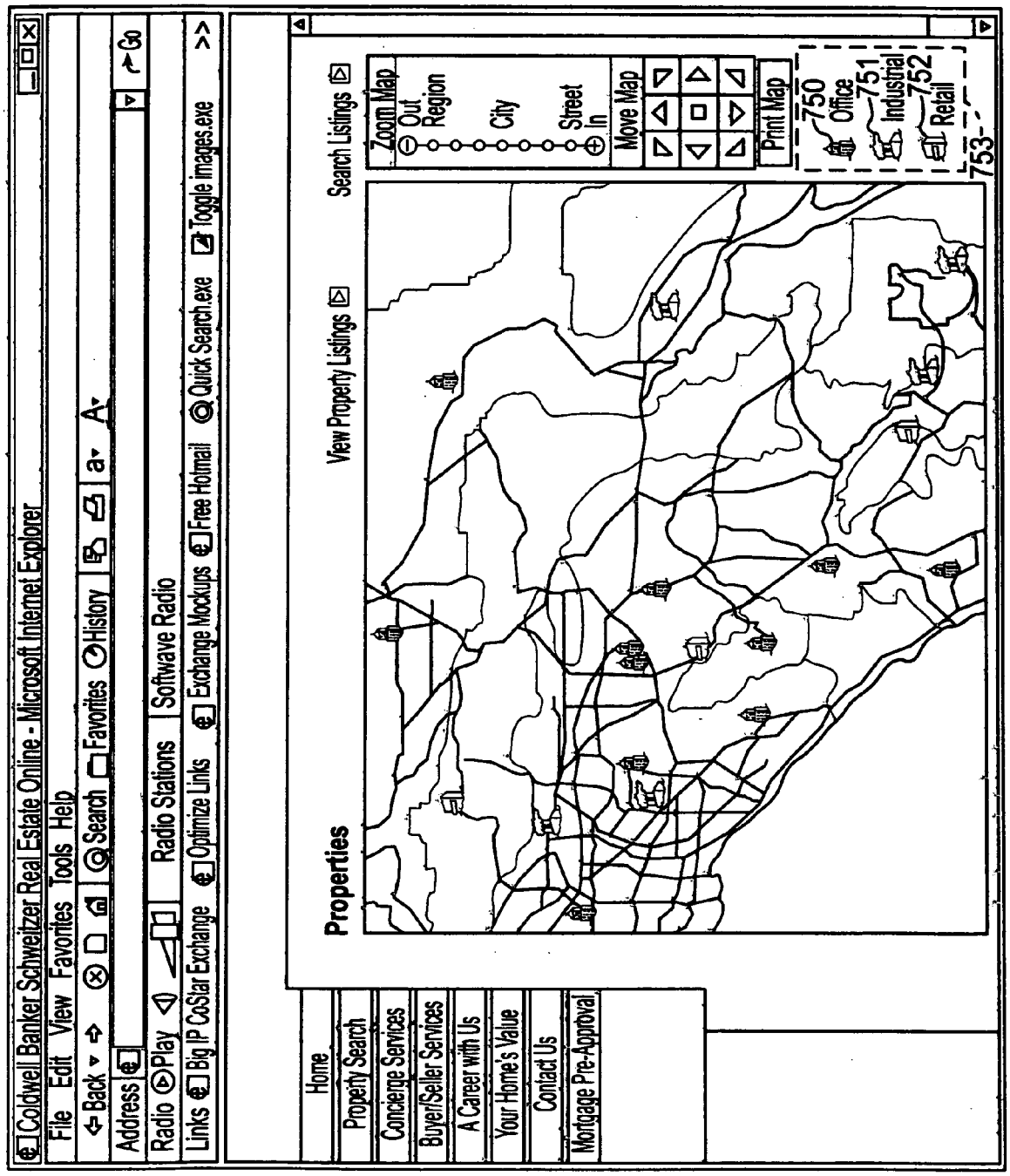

In a further preferred embodiment of the present invention, FIGS. 69–71 illustrate a system and method for providing real estate property information through a unique user interface. The system and method link display elements on a user interface to a real estate property database. Each display element represents a specific real estate property. Proximate to each element, the user interface includes a link (e.g., a Hypertext Markup Language (HTML) link) to a data entry in the database corresponding to the specific property. By selecting the display element (e.g., by clicking through it with a mouse), a user can access the corresponding information from the data entry in the database. Preferably, a user selects the display element by dragging a mouse pointer over the element, in which case the system automatically accesses the corresponding information and displays it in a pop-up window. Optionally, a user could also select the display element using a touch screen, a voice activated response system, or any other type of pointing or selecting device.

The preferred formats of the user interface and display element include 1) a chart with textual listings of properties and 2) a map with icons or some other type of indicator to indicate properties within the particular geographic area covered by the map. FIG. 69 illustrates the chart format in which the textual property listings are the display elements. In this example, the chart of search results contains eight property listings. The user has positioned the mouse pointer 691 over the listing "2 World Trade Center" and has activated the link to a data entry in the property database corresponding to the "2 World Trade Center." In response, the system has displayed a pop-up window 692 containing a photograph of the property.

FIG. 70 illustrates the map format in which the display elements are icons or other types of indicators. In this example, the icons are push-pins 700. The user has positioned the mouse pointer 701 proximate to a particular push-pin 702 and has activated the link to a data entry in the property database corresponding to the "5 World Trade Center." In response, the system has displayed a pop-up window 703 containing a photograph, address, and price of the property.

Although these examples describe limited categories of information displayed in the pop-up window, the information could include any data available from the property database, including media such as text, images, audio, and video. In addition, as a further feature, after the display element is selected and the pop-up window is displayed, the user can click on the pop-up window to view a subsequent display containing more details about the property. As an example, the information included in the pop-up window and the subsequent display could include images of the property, audio content relating to the property, video of the property, and one or more textual details on the property, such as the address of the property, the building class size, the building size, the number of floors, the year built, the buyer, the sale price, the price per square foot, and the cap rate.

In this further preferred embodiment, a user can easily browse a chart of search results or a map of a particular geographic area to learn about for property for sale or for lease. Although FIGS. 69 and 70 present this embodiment of the present invention within the context of searching for property for sale or lease, the method of linking map indicators with geographically pertinent database information, and especially photographic or video information, is also applicable to other aspects of the present invention, e.g., in looking up or searching for comparable properties within a particular geographic area or for searching for property listings limited to specific criteria. As an example, FIG. 71 illustrates using the map format of this embodiment of the present invention to search property listings of a particular broker, e.g., Coldwell Banker™.

FIG. 71 also shows an additional aspect of this further preferred embodiment, in which the display elements carry an added information content. In this manner, the user can recognize a characteristic of the property even before activating the link associated with the display element. For example, as shown in FIG. 71, different icons could signify different types of property, such as office, industrial, and retail, corresponding to icons 750, 751, and 752, respectively. Preferably, a legend 753 indicates to the user the meaning of each icon. A user interested in the particular listings of Coldwell Banker™, but only interested in purchasing retail space, would browse the map looking for icon 752 and would save time by dragging the mouse pointer only across that particular icon.

As one of ordinary skill in the art would appreciate, this aspect would work equally as well in the residential real estate context, in which different icons could, for example, represent condominiums, townhouses, and single family homes. In addition, icons or other indicators can represent different characteristics of a real estate property. For example, an indicator consisting of a certain number of dollar signs (e.g., "$$$") could show that a particular property is selling within a certain price range. A legend could provide the particular price ranges to which each number of dollar signs corresponds. As another example, the icon could be the price of the property itself.

As suggested by FIGS. 69–71, the present invention provides various user-friendly graphical user interface systems and methods that are useful in displaying information retrieved from a database. The graphical user interface features of the present invention are described herein largely in the context of a database containing data concerning real estate information and/or other information of interest, including merchant information, tourist information, service provider information, and the like, which is correlated with geographic location information to allow data pertaining to a particular geographic location to be retrieved. It should be appreciated, however, that the user interface features described herein are useful in other contexts as well, and that the graphical user interface tools described herein have broad applicability.

One user interface feature is the ability to provide seemingly automatic retrieval of location-based information. Underlying this seemingly automatic retrieval of location-based information is a software enabled feature that allows the system to retrieve one set of data in response to a user query or predetermined system queries to the database, but to display only a subset of the data retrieved (a first portion), while storing the remaining data (a second portion) locally such as in a cache on the user's computer. The portion of the data that is displayed (the first portion) may be displayed in a text grid/spreadsheet/chart format. Optionally, the data (the first portion) may be displayed in a map format. A subset (but preferably not all) of the second portion of data (i.e., the data that is retrieved and stored, but not displayed) may then be automatically displayed in response to a user input, such as passing a pointing device icon over a portion of the text grid/spreadsheet/chart or over an icon on the map display. More specifically, the user input selects a portion of the displayed data (the first portion) and system then displays a subset of the second portion of data that is relevant to the selected portion of the first portion.

In the embodiment described herein, the data initially retrieved includes digital images, address information, and price information. The digital images are not initially displayed. The address and/or price information of the properties is initially displayed (in a text grid/spreadsheet/chart or map format) in the display of the first portion of the data retrieved. The second portion of data includes the digital images (if available) of all the properties retrieved, but each image is only displayed when the user "selects" a property as described above. The display is both uncluttered with extraneous data (because most of the second portion of data is NOT displayed) and user-friendly because the relevant subset of the second portion of data is displayed quickly without need for an additional database query.

The interface further includes a means for users to optionally retrieve even further information from the database by, for example, selecting (e.g., with a pointing device) text or an icon representing the desired information. It should be understood, however, that this graphical user interface feature is more widely applicable and, indeed, can be used in connection with any system in which there is an advantage to use of this display technique.

In accordance with another graphical user interface feature of the present invention, icons can be used to provide information about the properties shown in the text grid/spreadsheet/chart or map view of the user interface. In the map view, for instance, an icon's location on a map provides geographic location information. To provide further information, the icon may be in a shape or appearance that conveys information concerning the type of property, the cost of the property, or the identity of the broker listing the property. Further, the icon may be a small digital image (thumbnail image) of the property itself to convey further information.

Another embodiment of the present invention provides a system and method for presenting, through a unique user interface, commercial real estate tenant information in relation to property information. The unique user interface provides users with an intuitive and convenient tool for accessing tenant information relating to a building.

In a specific implementation, the user interface is an image of the building to which the tenant information corresponds. FIG. 74 illustrates a representative building image 860. Image 860 represents the actual physical appearance of the building and depicts the individual floors 861 of the building (14 floors in this example). Image 860 is subdivided to show the spaces occupied by individual tenants, which are referred to herein as tenant segments of image 860.

Each floor is segmented as necessary to show the specific locations of individual tenants. For instance, the seventh floor 862 is divided into three segments to show three tenants. Image 860 also indicates when an individual tenant occupies more than one floor, by showing a single tenant segment that includes more than one floor and possibly a part of a floor. Image 860 indicates the different floors within a single tenant segment using dotted lines.

Within each tenant segment, the building image can also list tenant information corresponding to the particular tenant(s). This tenant information could simply be the name of the tenant as shown, for example, in the tenant segments on the seventh floor 862 of FIG. 74: X & Co., Y & Co., and Z & Co. As space permits, each tenant segment could also include other tenant information, such as the amount of square footage that a tenant occupies.

To obtain more tenant information, a user activates the tenant segments by clicking on an area or dragging a mouse pointer over the area. For example, in FIG. 74, if the user wants to learn more about the terms of C & Co.'s lease, then the user clicks on or drags over segment 863. A user can also obtain further information about all tenants on a particular floor. For example, to learn more about all of the tenants on the second floor, the user clicks on or drags over the area 864 proximate to the second floor label.

The user interface also conveniently illustrates vacant spaces of a building, such as space 865 in FIG. 74. In this manner, a prospective lessee can quickly determine whether there is space available in a building, and if so, can quickly retrieve lease information associated with that space.

In providing this unique building image user interface, the system and method of this embodiment of the present invention link display elements on the user interface to the commercial real estate database (e.g., core data warehouse A16 of FIG. 1). Each individual tenant segment within the building image is a display element. On top of or proximate to each display element, the user interface includes a link (e.g., an HTML link) to a data entry in the database corresponding to the specific property and tenant. When a user selects the display element, the system retrieves the corresponding information from the data entry in the database. A user selects a display element by, for example, clicking through the element (i.e., the segment or floor segment of the building image) or by dragging a mouse pointer over the element. As other examples, the system could allow a user to select the display element by touching a touch screen or interacting with a voice activated response system.

If the system allows the user to click through the display element, the system then displays a separate web page containing the additional tenant information. If the system allows the user to activate the display element by dragging over it, then the system can display a pop-up window as described and illustrated above in reference to FIGS. 69 and 70.

The graphical user interface features described herein may be used in various combinations to customize functionality for different purposes to leverage the use of the database. For example, it is possible for the system operator to provide custom content for individual brokers by using predetermined queries to display only properties listed by a particular broker and by displaying the information as an essentially seamless part of the broker's web site. The hierarchical display of information retrieved from the database can be used in other contexts where display of too much information is confusing or impractical, and resubmitting queries to get basic information is too cumbersome for users. Thus, the present invention also provides graphical user interface tools with broad applicability.

Related to the provision of custom content to individual brokers, another embodiment of the present invention provides a system and method for supplying content from a central database to affiliated web sites.

By way of background, in the context of commercial real estate, the current practice of providing updated information to a broker's web site is extraordinary complex. One known example is offered by LOOPNET™ (wwww.loopnet.com), in which brokers supply their listing information. There is, however, no readily apparent mechanism in place for confirming the currency, accuracy, or comprehensiveness of the information provided on the database. For example, although a broker submitting information to LOOPNET™ has an incentive to provide complete and accurate information, there is little or no incentive for the broker to keep the information current once the property is sold or when the information about the property changes in some way. The system depends on the broker's own initiative to enter and then update the information. Unfortunately, entering and updating the information can be extraordinarily complex and time-consuming in the context of commercial real estate, which, unlike residential real estate, involves a wide variety of property criteria that may be of interest to potential buyers.

Without a comprehensive source of information, maintaining widely distributed individual sites with current, reliable information is virtually impossible. However, having access to a comprehensive, integrated commercial real estate database, data can be drawn from the database to support commercial real estate web sites for brokerage companies or individual brokers. Moreover, content that is available on broker sites remains consistent from site to site.

Figure 76:
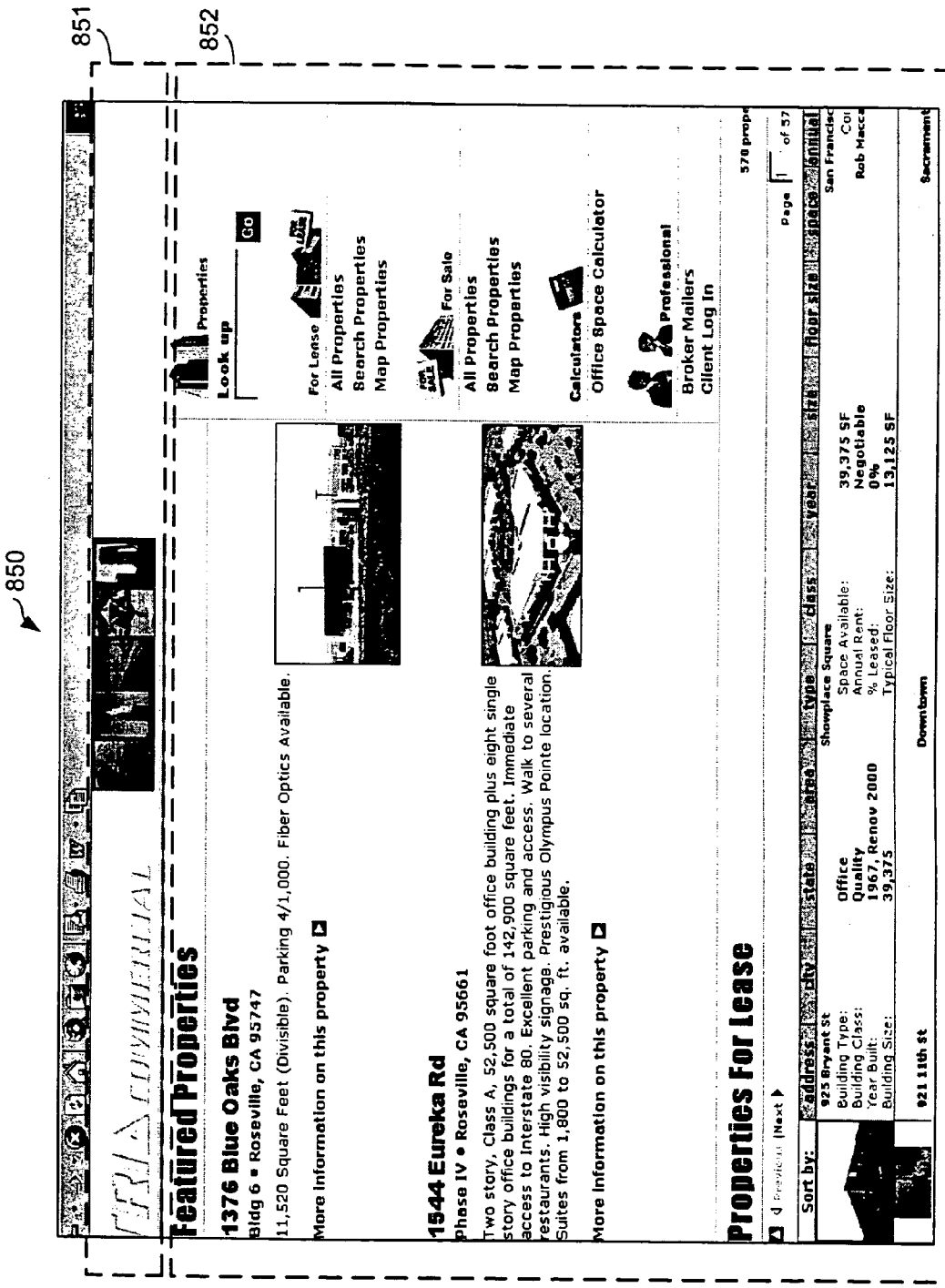
FIG. 76 is a schematic diagram of a site template containing modifiable portions and portions that link to an integrated commercial real estate database, according to an embodiment of the present invention.

In accordance with this embodiment, a broker uses a site template (e.g., graphical user interface) containing modifiable portions and portions that link to the integrated commercial real estate database. FIG. 76 shows an example of a template 850 having a modifiable portion 851 and a linked portion 852. The modifiable portion 851 allows a broker to customize the site with, for example, the logo, contact information, and service descriptions of the broker. The linked portion 852 draws content from the commercial real estate database, which includes, for example, descriptions and photographs of listed properties. On a particular broker's web site, for example, the linked portions would contain all commercial real estate listings on which the broker is listed.

To provide the content for the linked portions, the system executes predetermined queries across the commercial real estate database to retrieve only those properties associated with the particular broker. Thus, for the example in FIG. 76, the system retrieves from the commercial real estate database all entries listing TRI COMMERCIAL™ as the broker.

As a further embodiment, a customized broker web site could include pages further customized for individual agents (employees) of the broker. For these customized pages, the system executes predetermined queries across the commercial real estate database to retrieve only those properties associated with the particular agent.

Accessing content from a central database ensures that the content appearing on broker sites is consistent, accurate, and current. Once an operator of the central database collects and stores the content, it is immediately available to all affiliated broker sites. Then, as another significant benefit, the operator of the central database only has to update the content once, rather than updating individual databases of the various broker sites.

Leveraging the valuable data available in core data warehouse A16 of FIG. 1, such as property information, comparable sales information, tenant information, leasing information, and income and expense data, a further embodiment of the present invention provides communication and analytical tools that interface with the commercial real estate data and support commercial real estate transactions between the parties. These communication and analytical tools include: 1) a survey tool; 2) a commercial real estate transaction tool; 3) a tour scheduling tool; 4) an activity summary tool; 5) a tool for analyzing commercial real estate data; and 6) a map search tool. Although the descriptions and figures presented below may refer to particular types of users (e.g., tenant-brokers) working with these tools, it should be understood that the tools are broadly useful for many types of users of a commercial real estate database, on all sides of commercial real estate transactions, including, for example, brokers representing tenants, brokers representing sellers, brokers representing investors buying buildings, brokers representing owners, and tenants, sellers, and owners themselves. One of ordinary skill in the art would appreciate how to adapt the tools for each user type.

Survey Tool

According to a representative embodiment of the present invention, the survey tool is an interactive application through which users can search the commercial real estate database, and then have areas in which to (i) privately store documents, or (ii) post documents and share such documents or other communications with colleagues within their own firm, with other brokers in the industry, and/or with their clients. This ability to search the commercial real estate database, and then to immediately interact with colleagues, clients, and other brokers greatly speeds the real estate transaction process.

Figure 77:
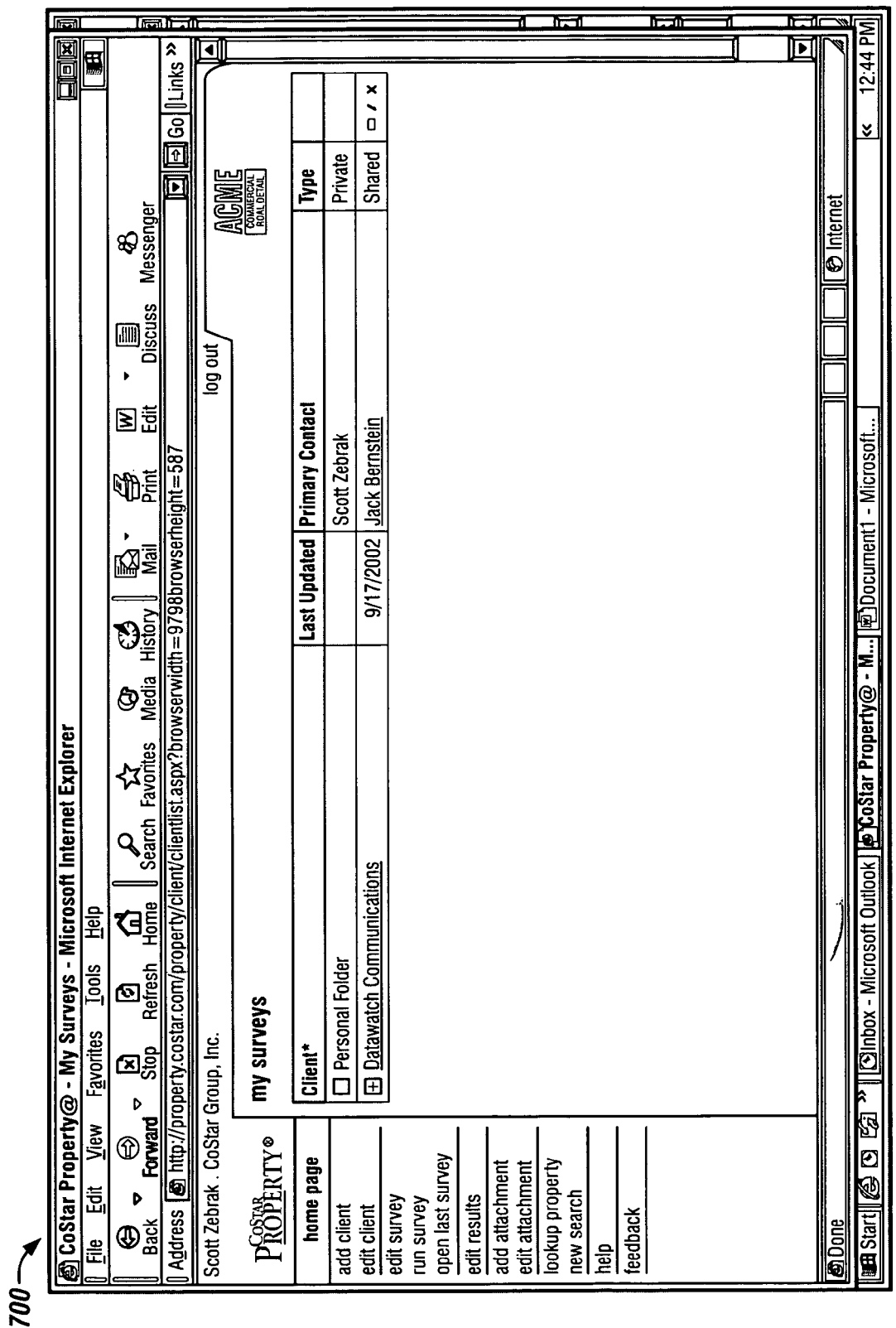

As shown in FIG. 77, the survey tool is accessible through a "my surveys" home page 7700, which lists, by client (tenant) name, the surveys on which the user is working. Preferably, home page 7700 is a password protected page. In this example, the user is a tenant-broker and has one client tenant named Datawatch Communications™. Although, in this example, the user is a tenant-broker, the survey tool is, of course, applicable to other types of users, such as brokers representing investors buying a building or brokers representing owners. In addition, although this example demonstrates a search for space availability for a prospective tenant, the survey tool is applicable to other types of real estate data searches, such as searches for analyzing market conditions (e.g., rents, vacancies, etc.).

Home page 7700 provides access to several functions related to surveys: 1) adding client profiles; 2) editing client profiles; 3) editing surveys; 4) running surveys; 5) editing the results of surveys; 6) adding attachments to surveys; and 7) editing attachments to surveys. FIGS. 78–84 illustrate these functions.

Figure 78:
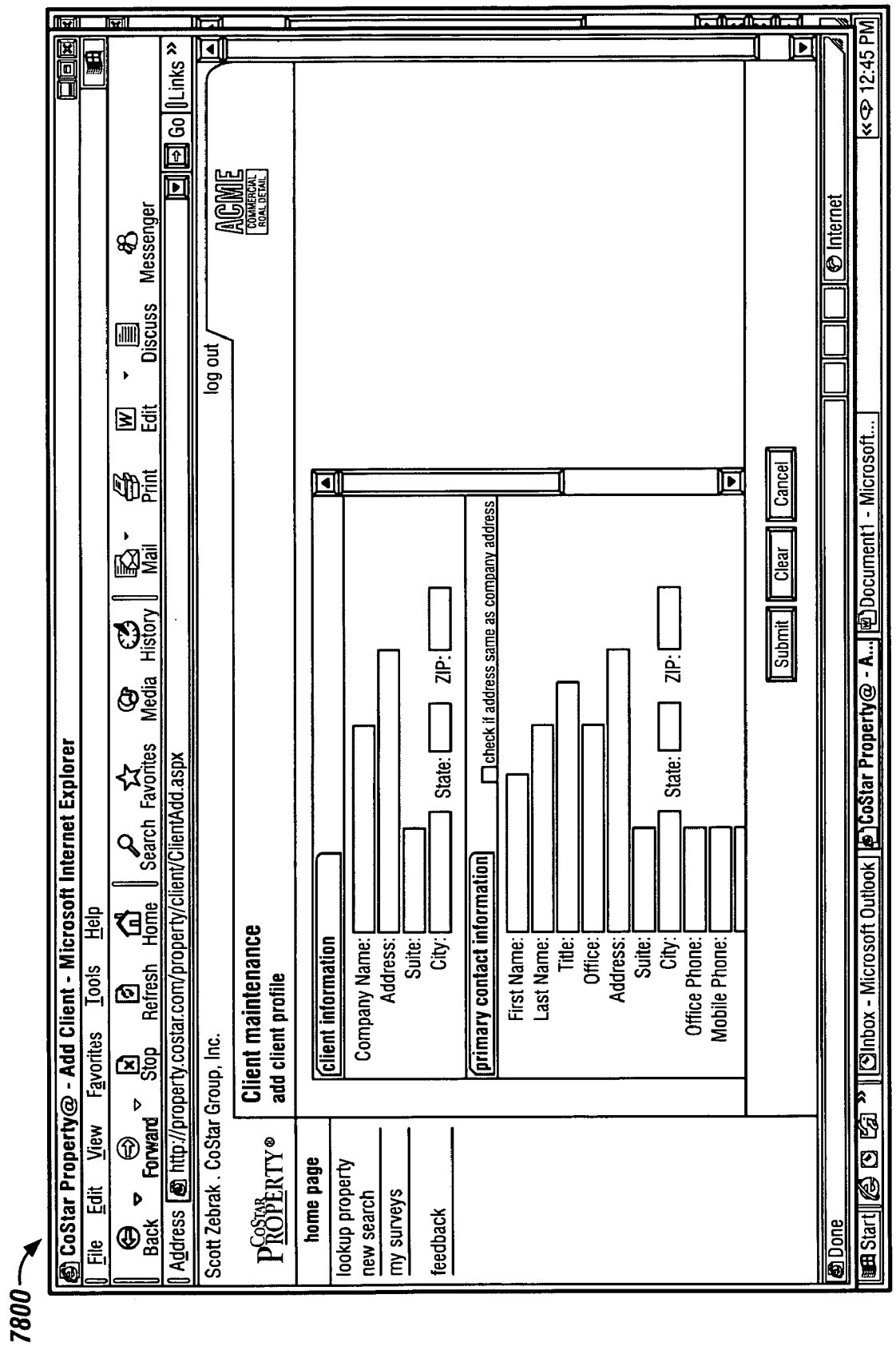

To add client profiles, the survey tool of the present invention displays an "add client profile" page 7800 as shown in FIG. 78. Page 7800 provides data fields in which the tenant-broker can enter information about the client tenant, such as the name and address of the client, and the contact information of a representative of the client.

Figure 79:
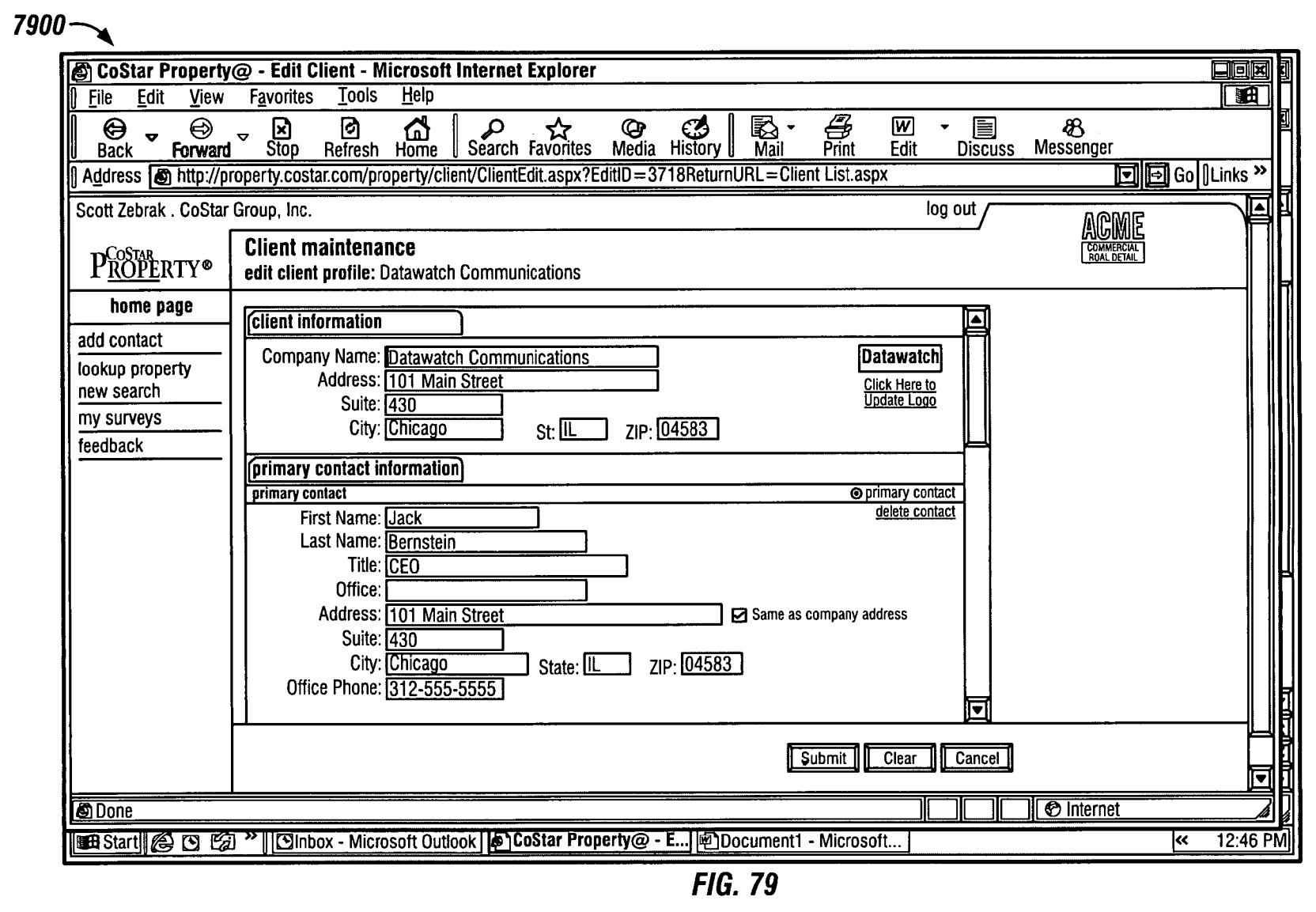

After a client profile has been added through page 7800 and is listed on page 7700, the tenant-broker can edit the profile of the client. To facilitate this function, the survey tool displays an "edit client profile" page 7900 as shown in FIG. 79. Here, the tenant-broker can edit or add to the information that was originally entered in the "add client profile" page 7800.

Figure 80:
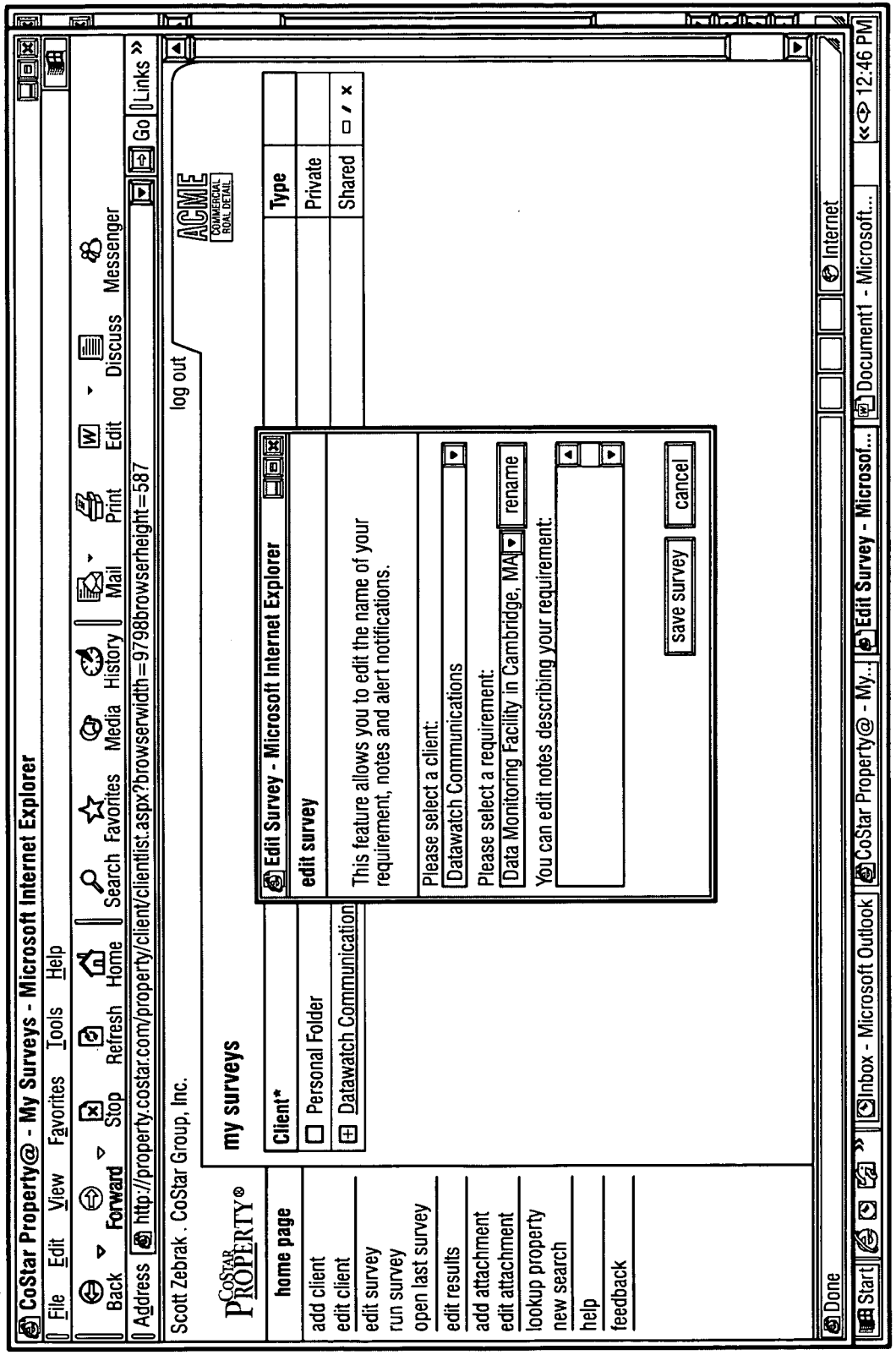

After entering a client tenant, the tenant-broker can then specify the various space requirements of the client, as shown in the "edit survey" page 8000 of FIG. 80. Page 8000 provides data fields in which the tenant-broker can create and edit the name of a space requirement of a client, as well as enter notes describing the requirement.

Figure 81:
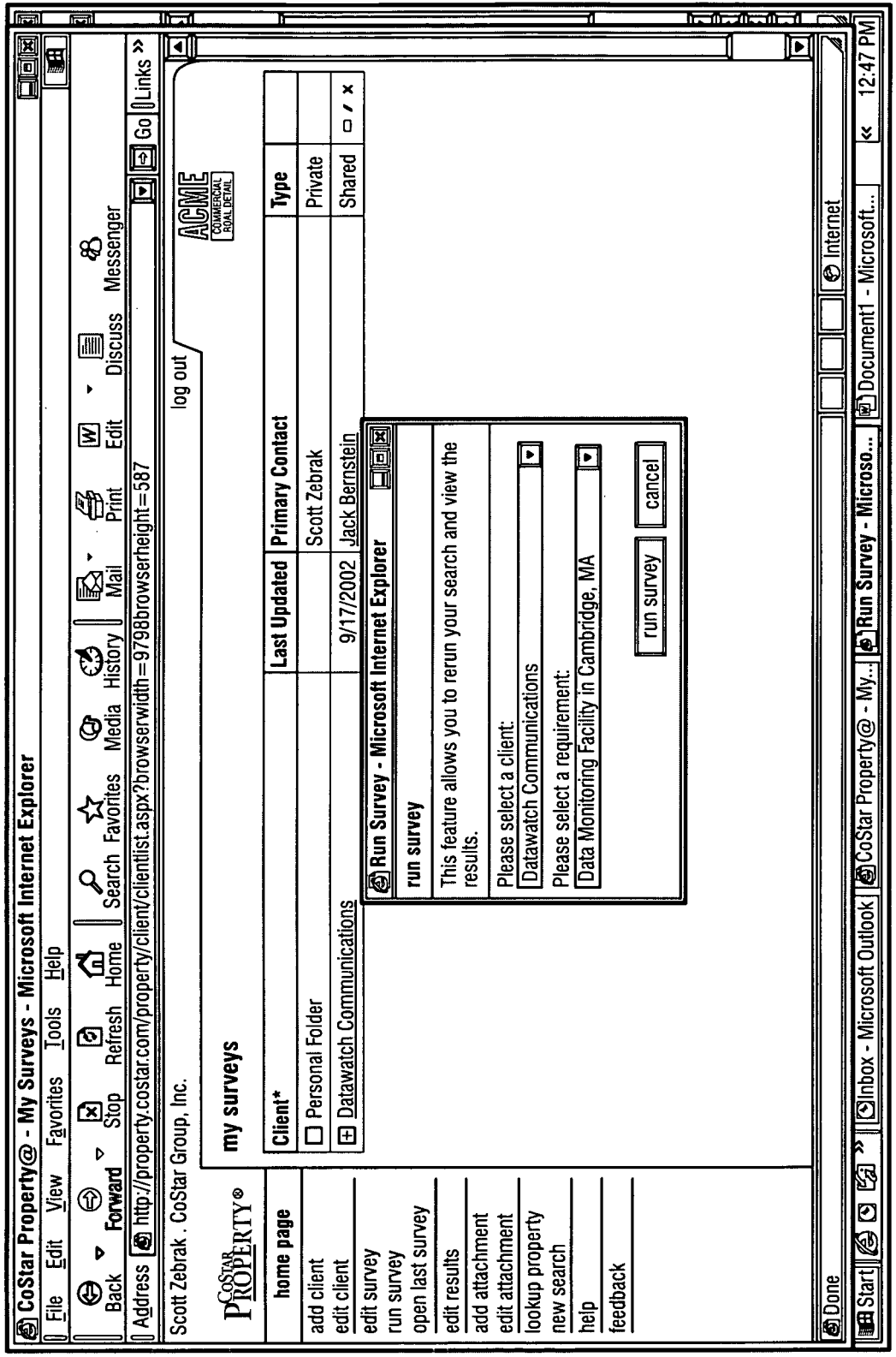

FIG. 81 illustrates a "run survey" page 8100 through which the tenant-broker can run a survey and view the results. To run a survey, the tenant-broker selects the name of the client and a particular space requirement of the client.

Figure 82:
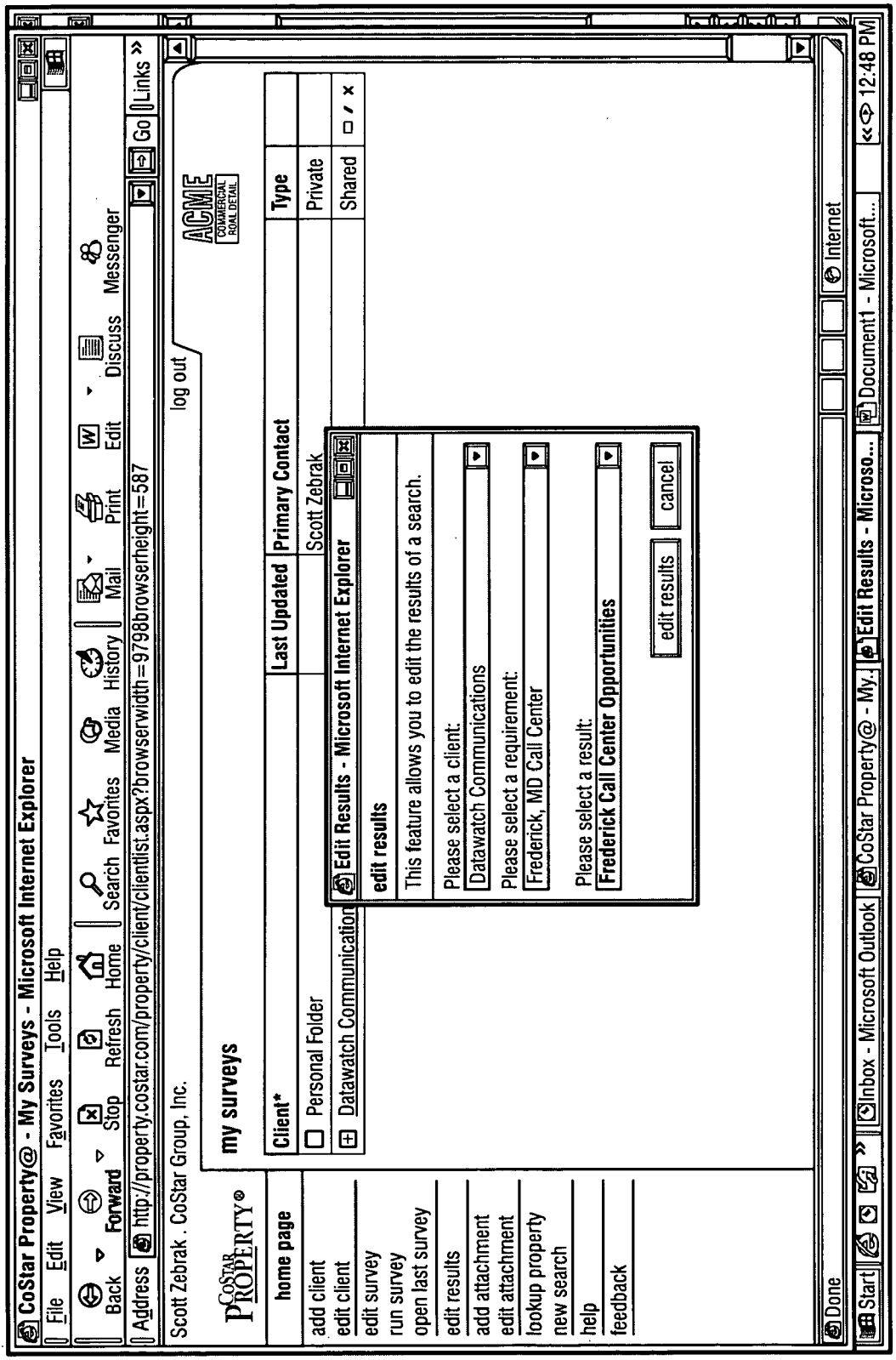

FIG. 82 illustrates an "edit results" page 8200, which enables a tenant-broker to edit the results of a survey. The tenant-broker accesses the search results by selecting the name of the client, the particular space requirement of the client, and the particular results that the tenant-broker wishes to edit.

Figure 83:
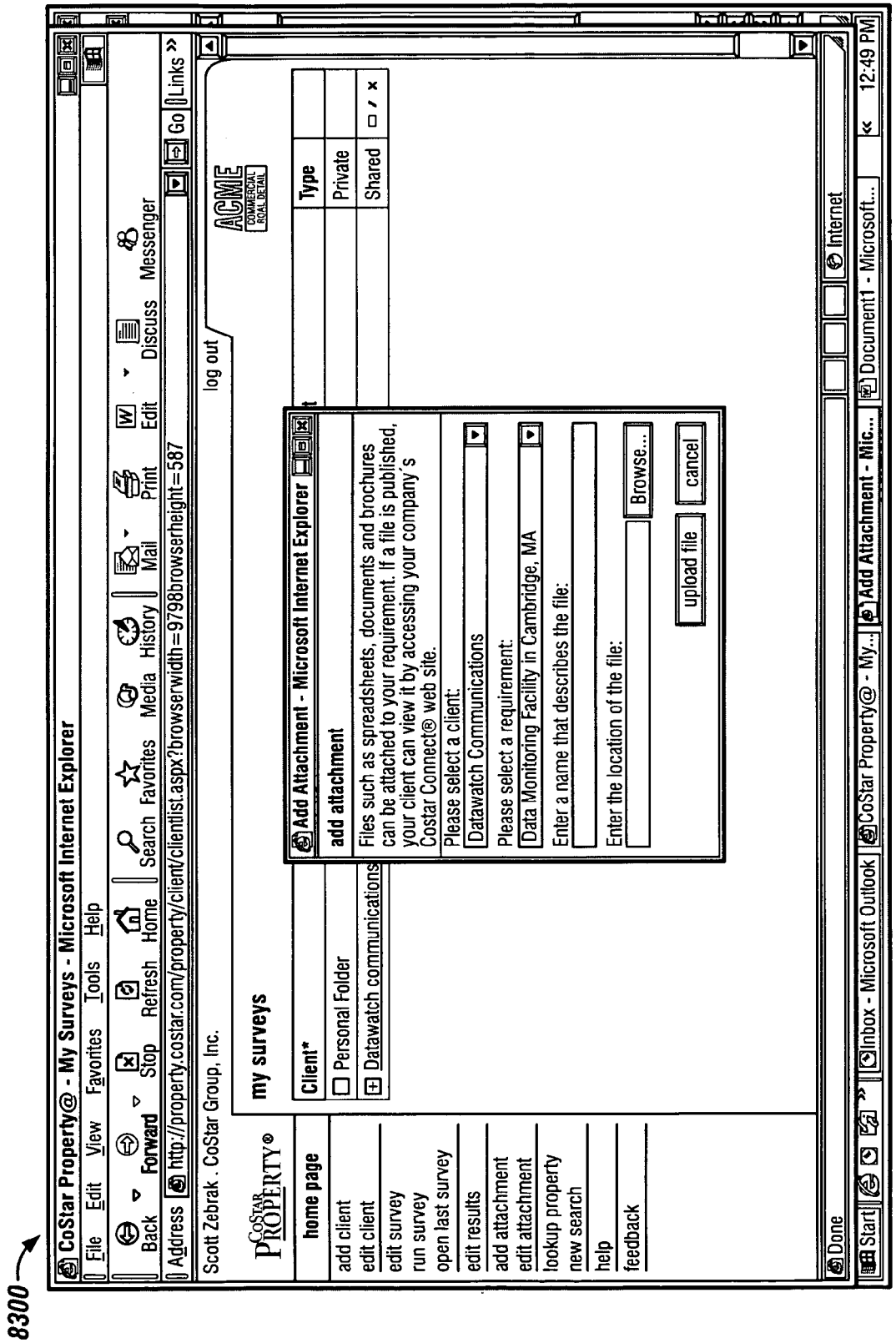

FIG. 83 illustrates an "add attachments" page 8300, which allows a tenant-broker to attach files, such as spreadsheets, documents, and brochures, to a space requirement. If the tenant-broker desires, the attached files can be published such that they are accessible to the client tenant and, perhaps, also to other members of the tenant-broker's firm and other brokers outside the firm. Preferably, access to the files is provided through the web site of the tenant-broker. In adding attachments through page 8300, the tenant-broker specifies the name of the client, a particular space requirement of the client, a name that describes the attachment, and the location from which the file can be retrieved (e.g., a path and filename on the hard drive of the tenant-broker's computer).

The documents that can be attached through page 8300 include search results or any other material generated by any of the interactions with the commercial real estate database described herein (e.g., maps and comparable sales reports). Such material can be edited by the user, although there is no requirement that it be edited. In addition, the attached documents can concern material wholly unrelated or separate from the commercial real estate database, including information from sources other than the database. Indeed, the user can attach documents that the user has created outside of the context of the interactions with the commercial real estate database.

Figure 84:
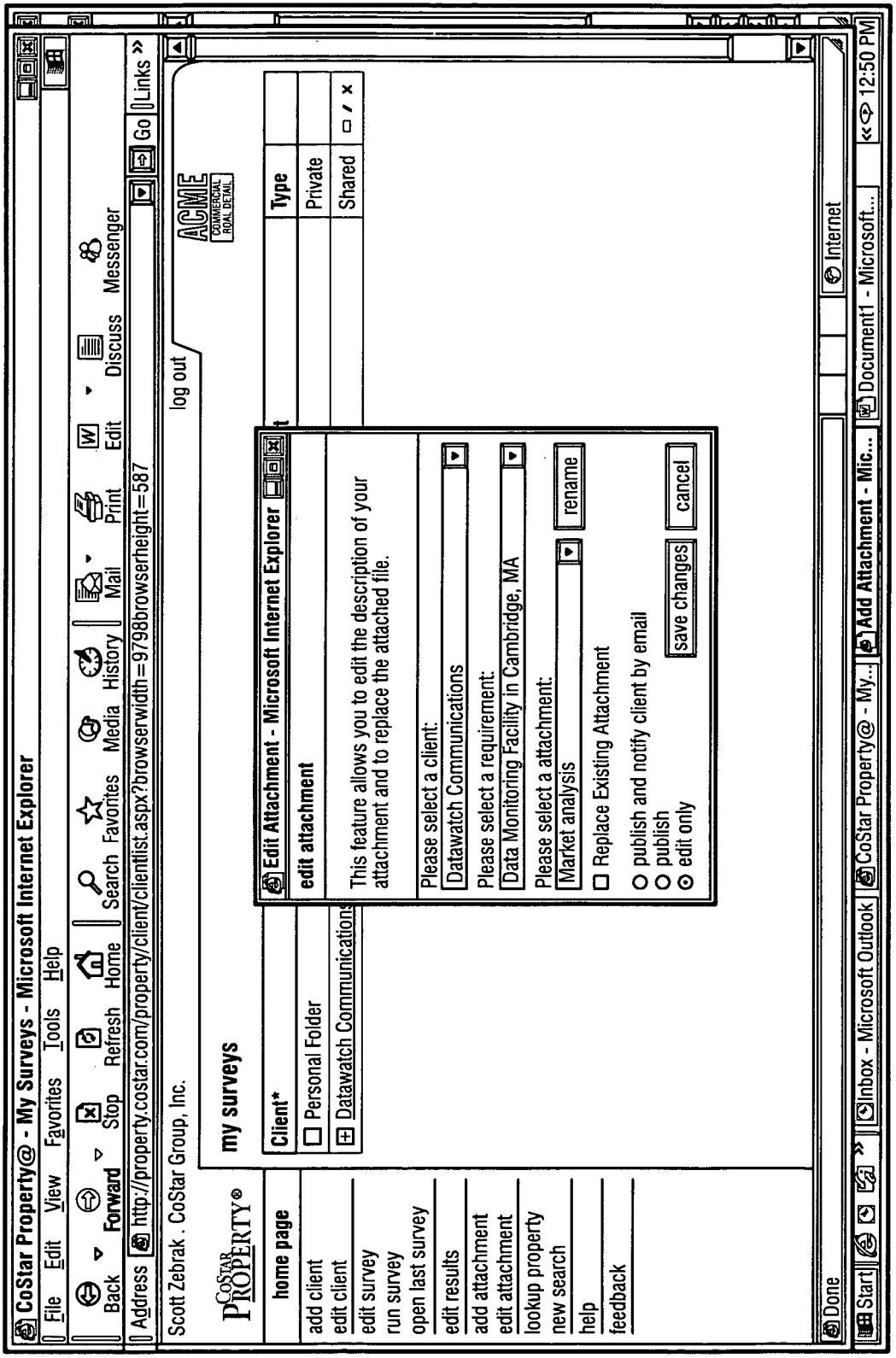

After the tenant-broker has added attachments, the tenant-broker can edit those attachments as shown in the "edit attachment" page 8400 of FIG. 84. Through page 8400, the tenant-broker can edit the description of the attachment and replace the attached file. In addition to editing the attachment, the tenant-broker can also publish the attachment for access by the client or other parties, and can notify the client of the publishing via e-mail.

In addition to listing clients, the "my surveys" page 7700 of FIG. 77 could also list any essential matters on which the tenant-broker is currently working. For example, the web page may list the status of spaces that the tenant-broker has investigated and the status of negotiations with owner/brokers on different deals.

An alternative embodiment of page 7700 provides customized screens for each agent of a tenant-broker firm. In other words, each agent could have her own proprietary page. For example, the page of an individual agent could have a picture of the agent along with the agent's current listings. The agent-specific page could also function like a business site, with which the agent could, for example, transfer documents (e.g., via FTP) on behalf of clients. As another example, the agent could direct clients to the page to retrieve prospective space information and review attached files.

Commercial Real Estate Transaction Tool

An embodiment of the present invention provides a commercial real estate transaction tool that facilitates the steps involved in completing a real estate transaction, from searching for a space to signing a proposal. In facilitating the transaction, the tool enables e-mail communications between tenants, tenant-brokers, owners, and owner-brokers. The e-mail communications include templates for the basic terms of proposals. Among other benefits, the transaction tool accelerates the transaction process, engages the tenant and/or tenant-broker in the entire transaction process, and aids the tenant and/or tenant-broker in reaching a decision.

In a further embodiment, the e-mail communications to owners or owner-brokers include links that enable them to update incorrect information in the commercial real estate database (e.g., core data warehouse A16 of FIG. 1).

FIGS. 85–95 illustrate the commercial real estate transaction tool, according to an embodiment of the present invention. In the example of FIGS. 85–95, a tenant-broker conducts an initial search of properties, selects properties in which she is interested, and communicates with the owners/brokers of the selected properties to confirm availability of the properties and to request, receive, and negotiate proposals with the owners/brokers.

Figure 85:
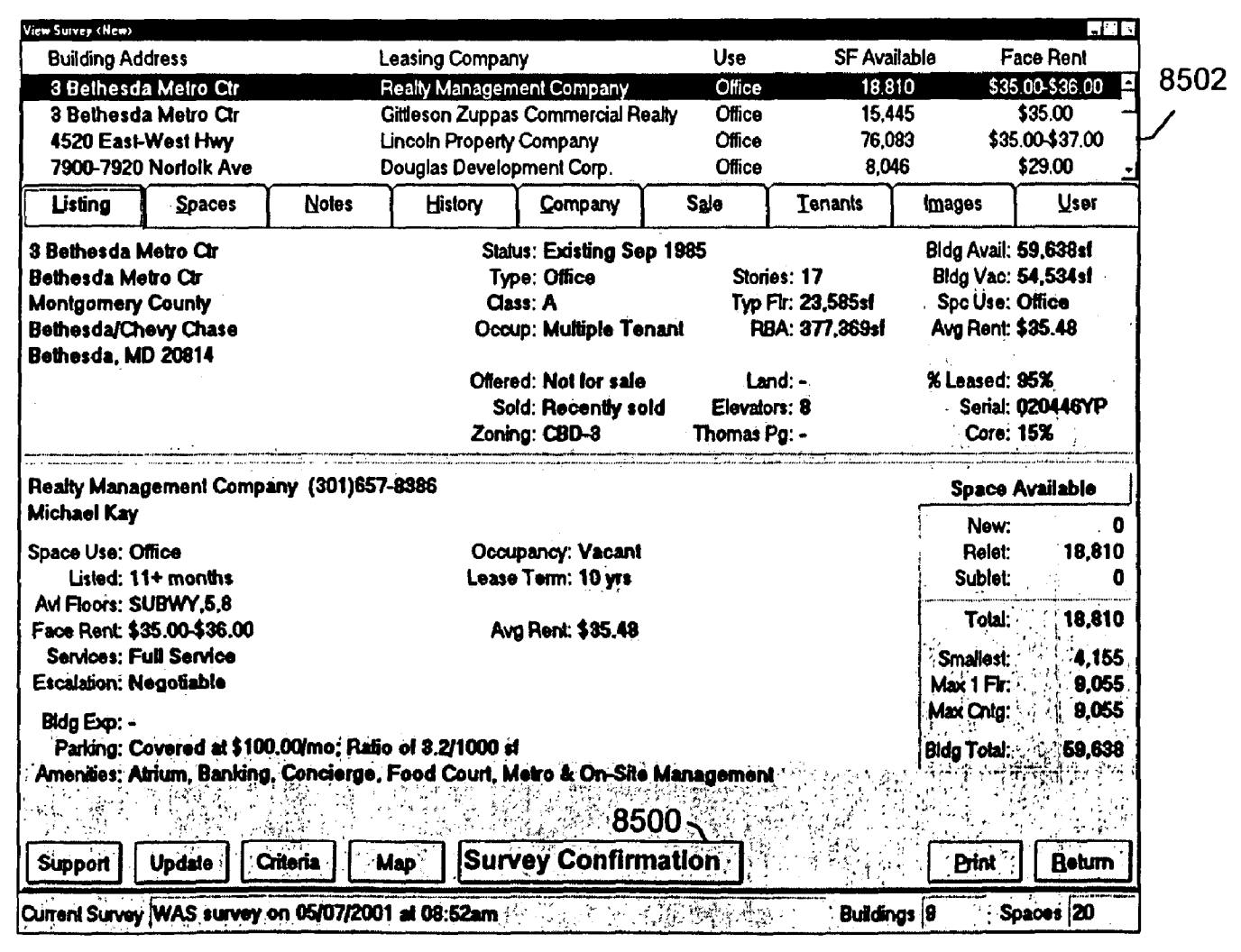

As shown in FIG. 85, after an initial search is completed, the transaction tool displays the properties that meet the criteria designated by the tenant-broker (e.g., looking for 5,000 square feet of A class space in Bethesda, Md.). The transaction tool executes the search similar to the manner described above under the heading "Website Operation." At this point, in a conventional process, the tenant-broker would have to individually contact (e.g., via telephone or e-mail) the individual owners/brokers of the different properties listed in the search results, to confirm the availability of the space and proceed with proposals and negotiations, if desired. For example, the tenant-broker would have to send separate e-mails to the owners/brokers asking if a particular space is available, and, upon receiving a positive indication of availability, would have to continue corresponding with the owners/brokers concerning proposals and negotiations.

With the transaction tool of the present invention, however, a tenant-broker is able to simultaneously communicate with a group of owners/brokers that represent properties and spaces in which the tenant-broker is interested. Specifically, after reviewing the search results of FIG. 85, the tenant-broker initiates the space confirmation process by clicking the "survey confirmation" button 8500. In response, the transaction tool displays the properties from the initial search results page of FIG. 85 in a re-formatted list, as shown in FIG. 86. The re-formatted list of FIG. 86 corresponds to the scrollable field 8502 in FIG. 85, except that FIG. 86 shows all of the properties at once, for convenient viewing by the tenant-broker. From the list of FIG. 86, the tenant-broker selects the spaces in which the tenant-broker is interested, and would like to confirm availability. The tenant-broker makes these selections using the checkboxes 8602, the Select All button 8604, and the Unselect All button 8606. The individual selections that the tenant-broker makes would be based on, for example, the tenant-broker's particular tastes and proprietary knowledge of the market. After making the selections, the tenant-broker clicks on the continue button 8608.

In response, the transaction tool displays a space requirement e-mail template, the contents of which will be converted into an e-mail and forwarded to the owners/brokers corresponding to the list of spaces that the tenant-broker selected in FIG. 86. FIG. 87 illustrates an example of this space requirement e-mail template. As shown, the e-mail template includes basic information about the tenant with which the tenant-broker is working, including the space requirements of the tenant. The content of the space requirements fields 8700 is pulled from the criteria of the initial property search. In addition to the basic space requirements, the tenant-broker adds the deadline 8702 for returning space confirmations. The tenant-broker can also add a customized message 8704, which can include specific comments about the tenant, such as the name of the tenant.

Figure 88:
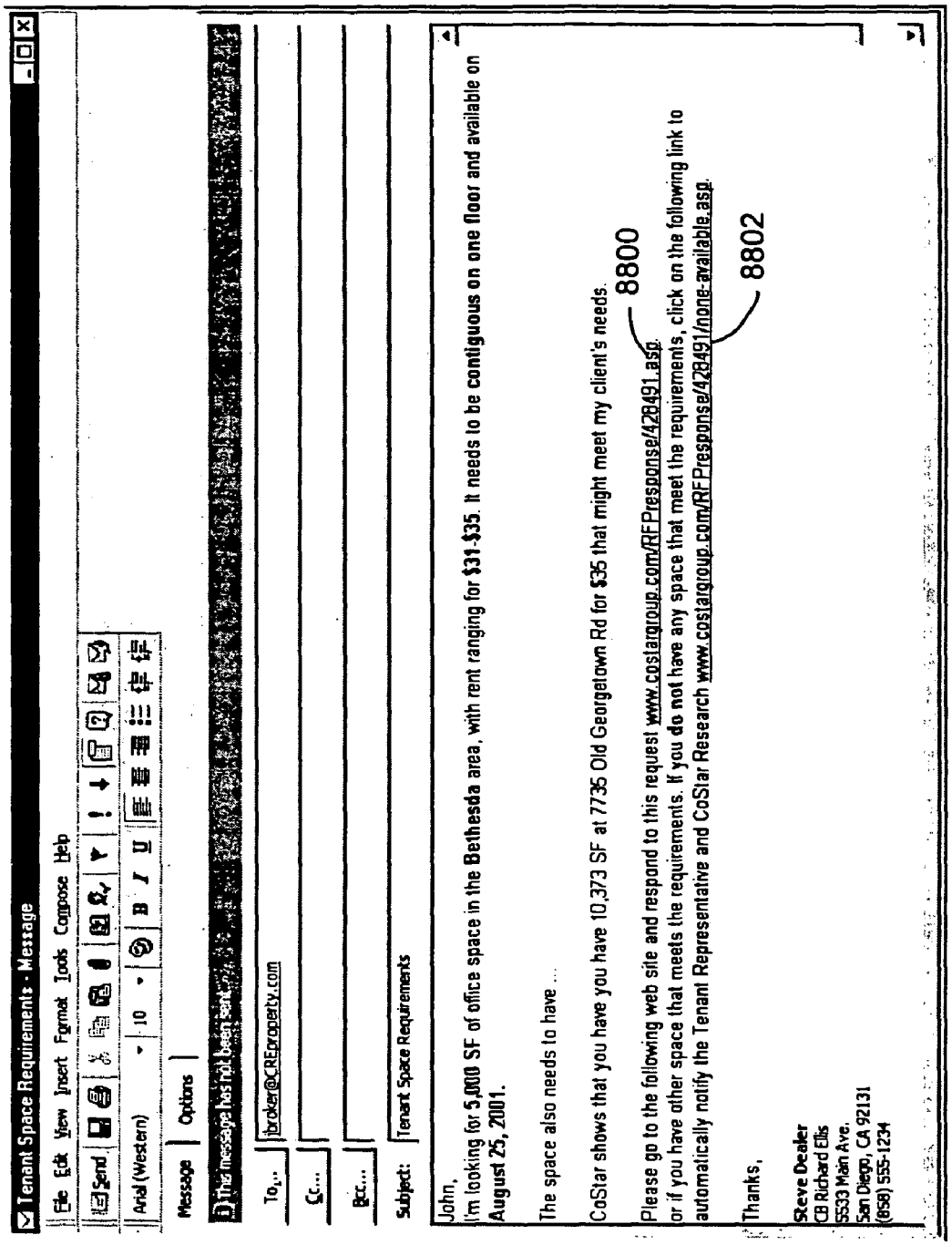

After completing the template of FIG. 87, the tenant-broker clicks the e-mail button 8706. In response, the transaction tool automatically creates and forwards e-mails to the representatives of each property that was selected in FIG. 86. This batch e-mail greatly eases the tenant-broker's burden in contacting the brokers of prospective spaces. The e-mail addresses of the representatives and the associations between the representatives and their respective properties are stored in the commercial real estate database. The transaction tool creates the e-mail messages from the content captured in FIG. 87. FIG. 88 illustrates an exemplary e-mail message.

As shown in FIG. 88, the e-mail message informs the owner/broker of the space requirements in which the tenant is interested. The e-mail message also states that a search of the commercial real estate database revealed that the recipient (owner/broker) of the e-mail might have space that meets the tenant's requirements. In addition, the e-mail message includes links 8800 and 8802 for responding to the e-mail message. The owner/broker clicks on link 8800 if the owner/broker has space that meets the requirements. However, if, contrary to the database search results, the owner/broker does not have space meeting the requirements, then the owner/broker clicks on link 8802. Clicking on link 8802 notifies the administrator of the commercial real estate database that the particular property does not have space available and that the database should be updated accordingly. This update can, of course, occur automatically, based on the property information that was listed in the initial search results (FIG. 85) and carried through to the e-mail (FIG. 88).

Figure 89:
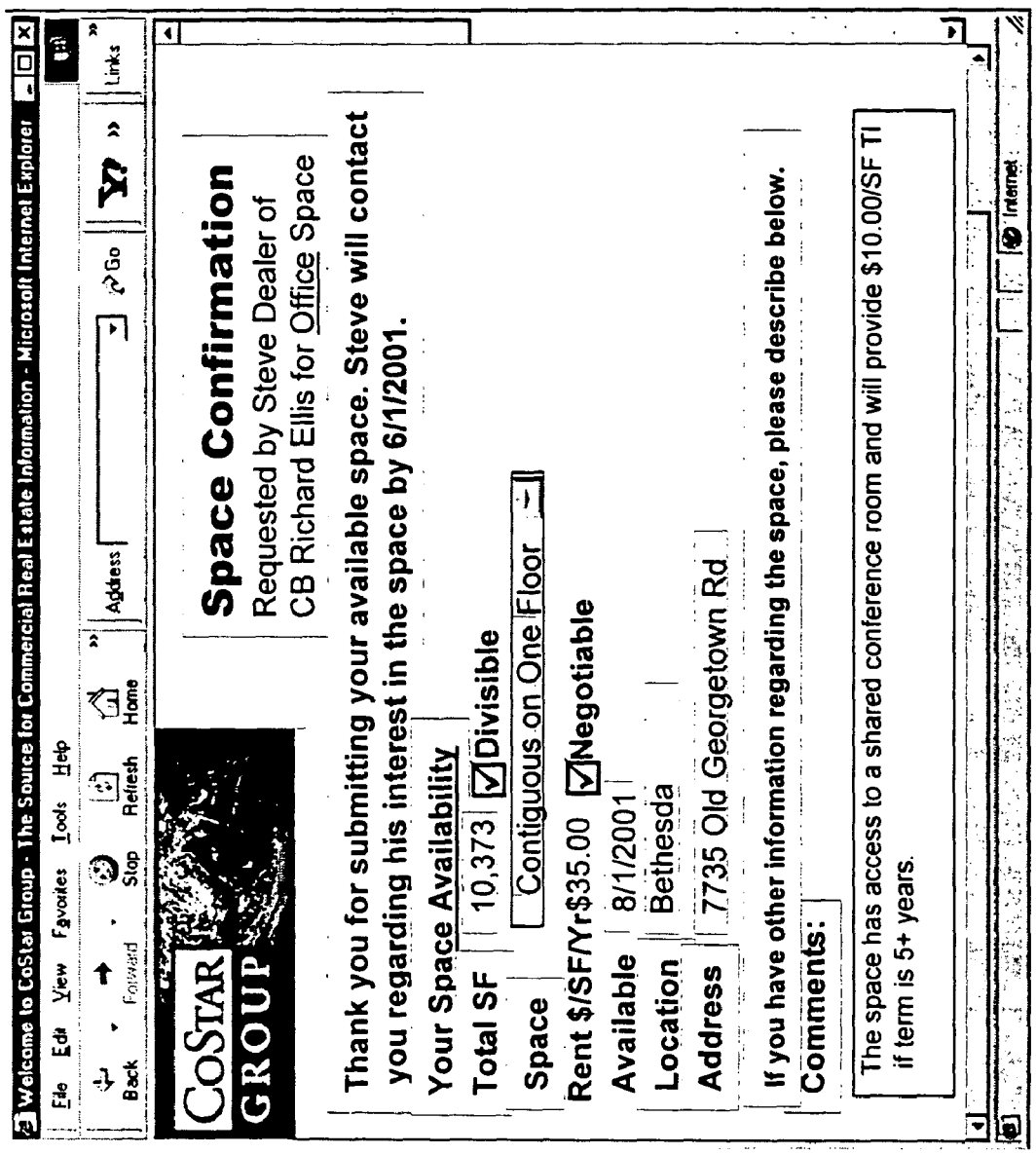

If the owner/broker indicates that space is available by clicking link 8800, the link 8800 launches a web browser and takes the owner/broker to a space confirmation web page, such as the exemplary page shown in FIG. 89. The space confirmation page lists the property data from the search results (FIG. 85) and e-mail (FIG. 88), such as the square footage of the space, whether the space is divisible, the layout of the space, the rent price, whether the rent price is negotiable, the date that the space is available, and the location and address of the space. Through this page, the owner/broker can confirm the availability of the space, add any comments related to the space, provide information on other space opportunities, and edit any of the data describing the space.

After editing and adding information as needed, the owner/broker submits the data by, for example, clicking a submit button (not shown). The transaction tool reports the owner/broker's submission back to the tenant-broker, for example, as part of a status page that lists all of the space requirement e-mails that have been sent out to the various owner/brokers and the responses that the tenant-broker has received. At the same time, the owner/broker's submission is reported to the activity summary tool (described below) to indicate that the owner/broker has received an inquiry concerning the space, and to account for the inquiry in an activity summary report.

In responding to the tenant-broker's request for space confirmation, the owner/broker does not necessarily have to have the transaction tool software. Indeed, the owner/broker merely receives an e-mail message with web links. The web links enable the updating of the commercial real estate database or the reply confirming the space availability. Thus, this embodiment of the present invention provides a flexible communication tool for the tenant-broker, which does not require the owner/brokers with whom the tenant-broker deals to have any special software, other than an e-mail application and a web browser.

According to an embodiment of the present invention, if the owner/broker edits the space data listed in the web page of FIG. 89, those changes are not reflected in the commercial real estate database. In other words, the owner/broker may change the space data for the limited purpose of negotiating with the particular tenant-broker, but without changing the data stored in the commercial real estate database. For example, if the owner/broker recognizes a certain promotional value in having a particular tenant (e.g., a Fortune 100 company), then the owner/broker may lower the asking rent price in attempt to attract that tenant. This special price would be related back to the tenant-broker, but would not be captured in the commercial real estate database. This confidentiality helps gain the trust and participation of owner/brokers.

After receiving responses to the batch e-mail and the property data of each response with any edits entered by the owner/brokers, the tenant-broker reviews the responses on a status page that includes, for example, a table of available spaces and the data associated with each space. This table enables the tenant-broker to conveniently compare spaces according to criteria such as that listed in the space confirmation replay of FIG. 89 (e.g., square footage, divisibility, type of space, rent price, negotiability, availability, location, address, and comments). Preferably, this status page would include a send button that automatically creates and sends an e-mail message to the tenant, which includes the table of available spaces and, perhaps, suggests a tentative schedule for touring the spaces. The steps involved in scheduling and completing the tour are described herein under the separate heading, "Tour Scheduling Tool."

After reviewing the table of available spaces and touring the spaces if desired, the tenant and tenant-broker request a proposal from a final group of selected properties. At this stage, the transaction tool presents a proposal page through which the tenant-broker can select the owner/broker's that will receive a request for proposal. FIG. 90 illustrates an exemplary proposal page 9000. As shown, page 9000 includes a transaction summary 9002, a tour schedule 9004, and a proposal stage listing 9006. In this example, the tenant-broker is working with the tenant, Oracle™, whose space requirements are listed in the transaction summary 9002 and who has completed the tour shown in the tour schedule 9004. Based on Oracle's instructions, the tenant-broker has selected three owner/brokers from which to request proposals, as indicated by the checkmarks in the proposal stage listing 9006.

After selecting the desired owner/brokers, the tenant-broker clicks on the "Create New E-mail Blast" button 9008. In response, the transaction tool displays a request for proposal e-mail template, the contents of which will be converted into an e-mail and forwarded to the owners/brokers corresponding to the owner/brokers selected in the proposal stage listing 9006 of FIG. 90. FIG. 91 illustrates an example of this request for proposal e-mail template. As shown, the e-mail template includes the terms of the request for proposal, such as the type of space, the square footage, the duration of the lease, the rent price, and the deadline for returning the proposal. The tenant-broker can edit any of the fields and can also add a customized message, which can include specific comments about the tenant. According to an embodiment of the present invention, the edited information is not reflected in the commercial real estate database.

Figure 92:
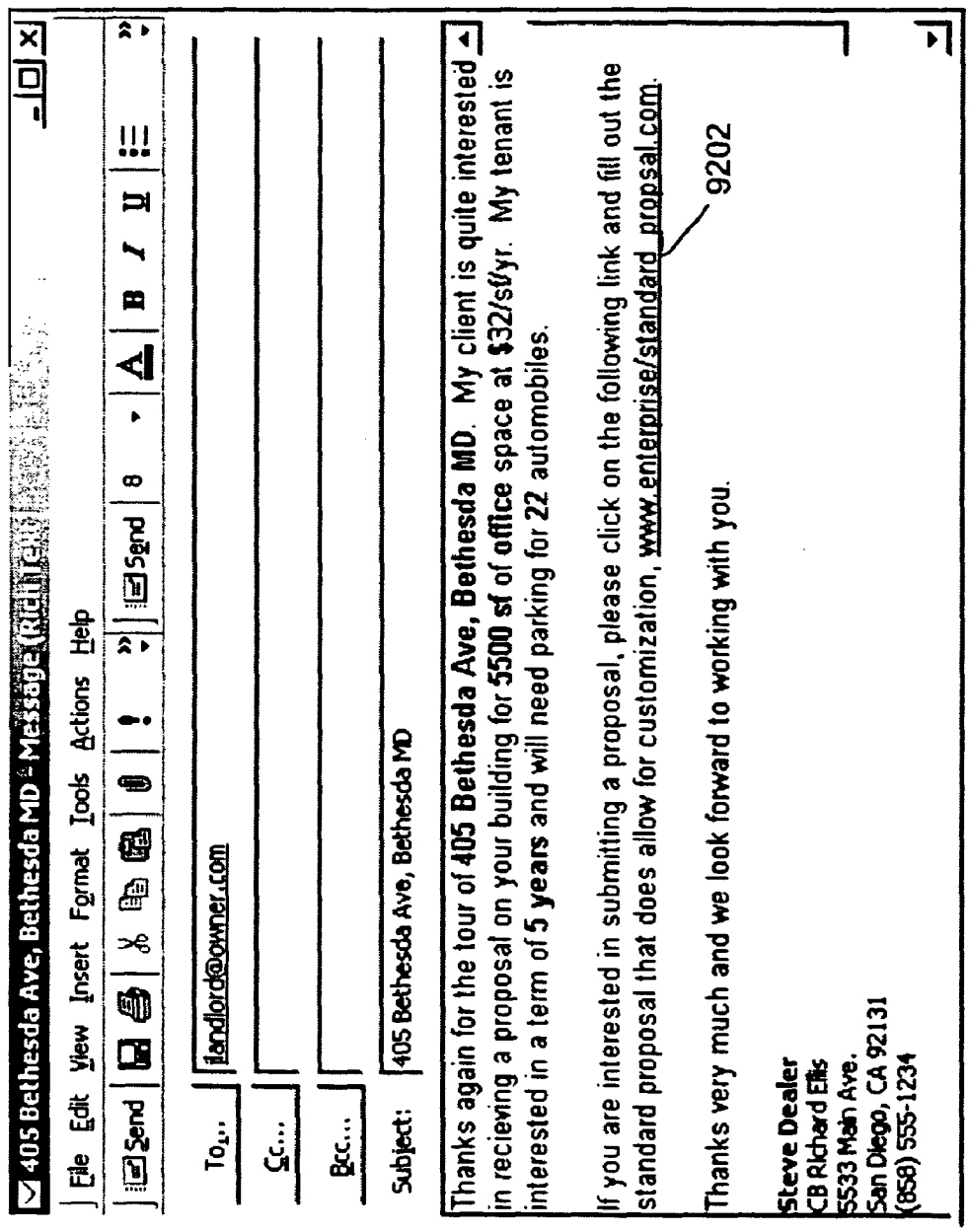

After completing the template of FIG. 91, the tenant-broker clicks the "Send RFP" button 9102. In response, the transaction tool automatically creates and forwards e-mails to the representatives of each property that was selected in FIG. 90. This batch e-mail greatly eases the tenant-broker's burden in contacting the owners/brokers of the prospective spaces. The e-mail messages request formal proposals on the individual spaces and include the content captured in FIG. 91. FIG. 92 illustrates an exemplary request for proposal e-mail message. As shown, the e-mail message includes a link 9202 through which the owner/broker can access a web page and electronically submit a proposal to the tenant-broker in the same manner as described above for the space confirmation e-mail messages.

Figure 94:
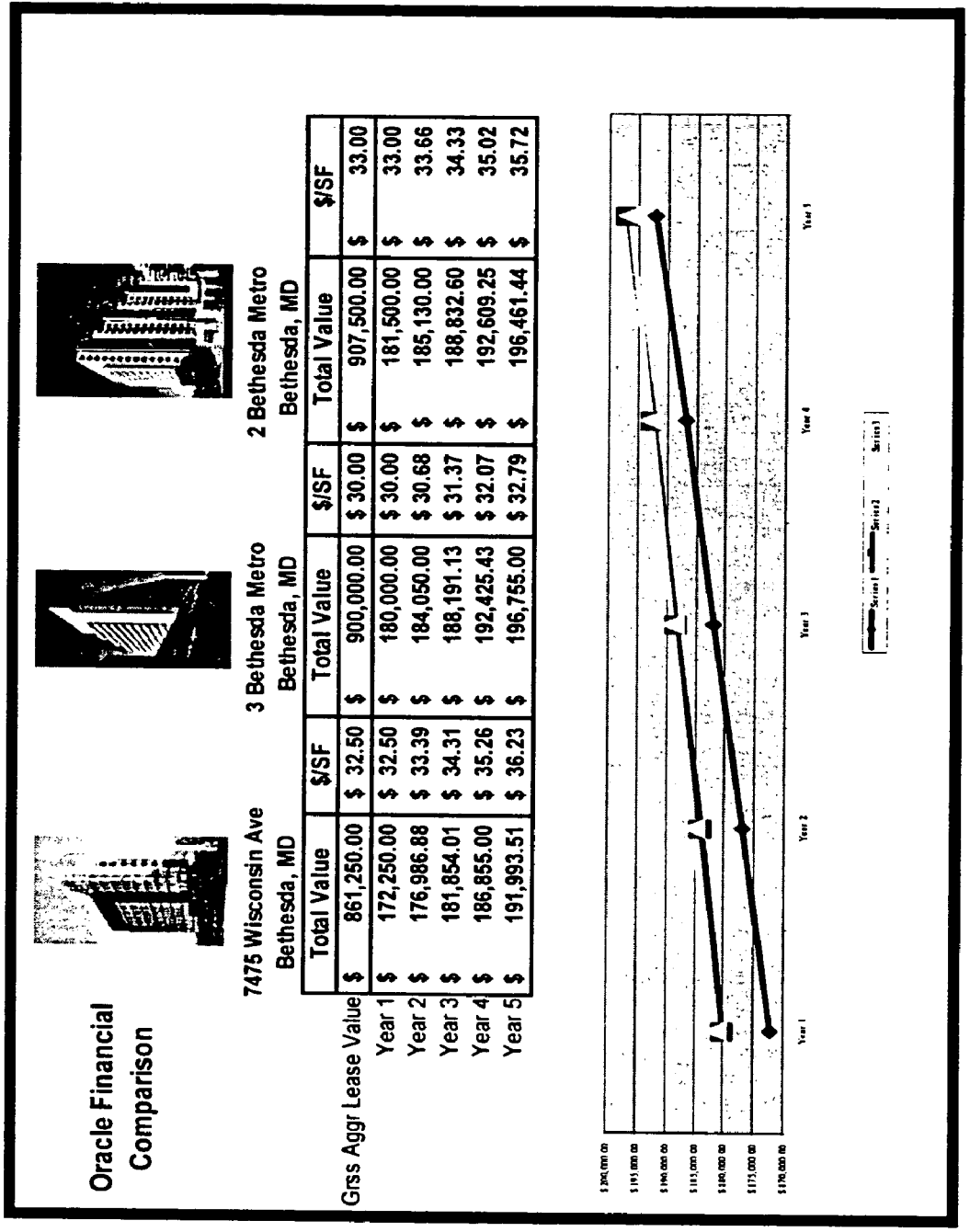

After the tenant-broker receives all of the proposals, the transaction tool provides a comparison of the proposals, as shown in the exemplary pages of FIGS. 93 and 94. As shown in FIG. 93, the proposals are automatically integrated into a grid that objectively compares the properties. The comparison can also include financial and graphical studies as shown in FIG. 94.

Figure 95:
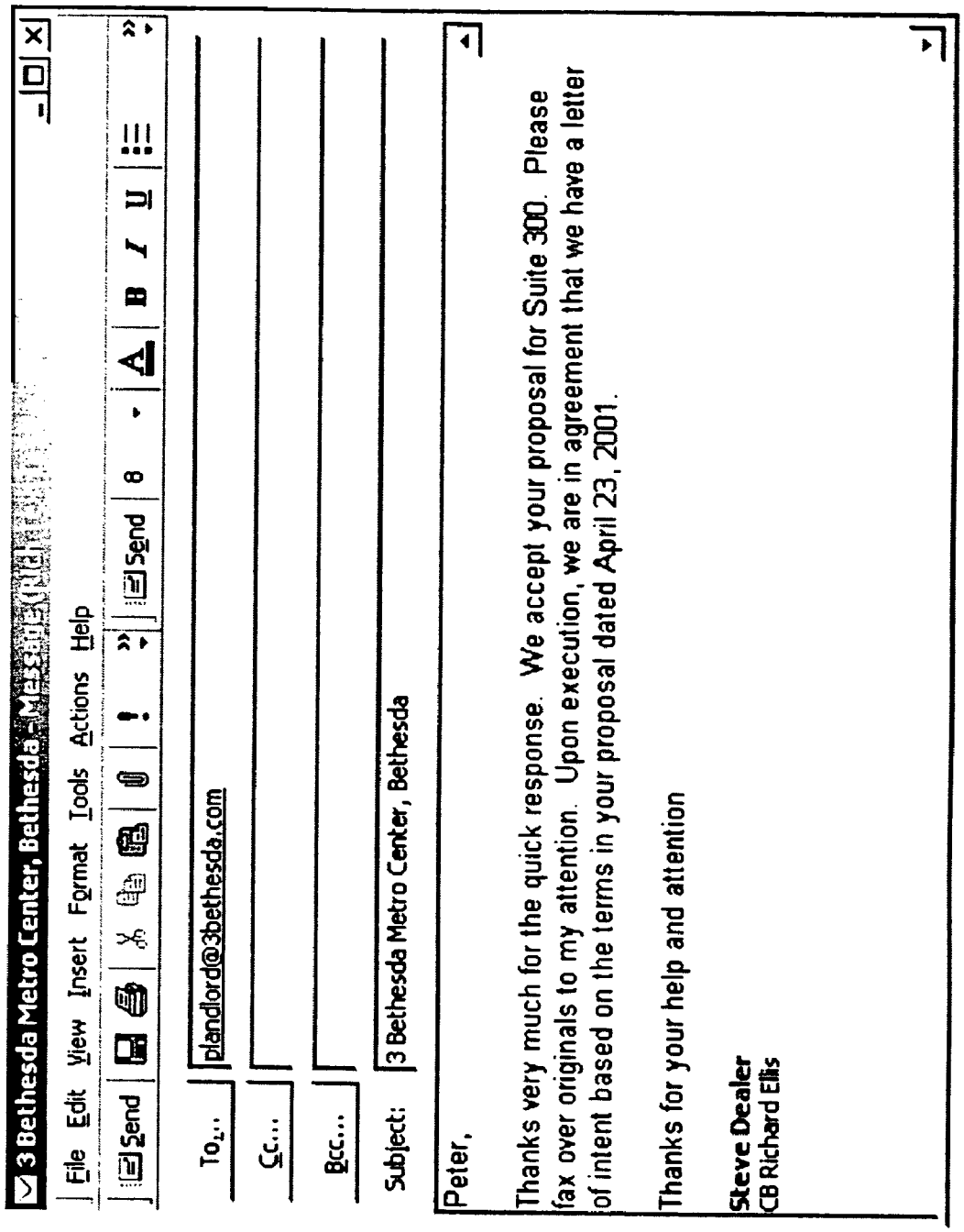

After reviewing the comparison, the tenant-broker can respond individually to the owner/brokers using the respond buttons 9302 in FIG. 93. In response to clicking a respond button 9302, the transaction tool automatically opens an e-mail message to the respective owner/broker. The tenant-broker can then enter a desired message in the e-mail and send it to the owner/broker. The response can be, for example, a counter-proposal or an acceptance of the proposal. FIG. 95 illustrates an e-mail message in which the tenant-broker accepts the proposal of the owner/broker.

Tour Scheduling Tool

An embodiment of the present invention provides a tour scheduling tool that coordinates visits to selected properties by the tenant and the tenant-broker. The tour scheduling tool delivers automated and/or user-defined tour schedules to the tenant and tenant-broker, and coordinates communications between them. To set and confirm times for building tours, the tour scheduling tool supports instant messaging and email communication between the tenant, tenant-broker, and owners/brokers. Upon confirmation of building tour times, the tour scheduling tool sends email communications containing all of the building information to all involved parties.

In addition to facilitating communication, the tour scheduling tool includes integrated mapping features that give the tenant and tenant-broker a better understanding of the travel time to the subject properties. The integrated mapping features provide, for example, a map route on which the buildings to be toured are plotted. The tenant and tenant-broker can click on the buildings to drill down for information and images related to the particular building. The tour scheduling tool can operate as a module within the transaction tool described above (e.g., in conjunction with FIG. 90), or can operate separately as a stand-alone scheduling tool.

FIGS. 96–99 illustrate the tour scheduling tool, according to an embodiment of the present invention. In FIGS. 96–99, a tenant-broker coordinates with the tenant and the owner/brokers to devise a tour of the properties in which the tenant is interested. In the context of the process described above for the transaction tool, the tour would typically take place after the tenant-broker has received space confirmations (FIG. 89) and before request for proposals are distributed to a final short list of owners/brokers (FIG. 90). To start the tour scheduling process, the tenant-broker submits to the tour scheduling tool a list of properties that have confirmed space available and that the tenant would like to visit.

In response to the list of properties, the tour scheduling tool presents to the tenant-broker a proposed tour schedule page, such as page 9600 shown in FIG. 96. Page 9600 prompts the tenant-broker to enter the starting time and location of the tour in data fields 9602, and to specify the order in which the properties are to be visited and the anticipated time to be spent at each property in field 9604. Based on this input, the tour scheduling tool calculates directions and travel times to each property, and plots a tour route 9606 on a map 9608. The travel times 9610 are listed in field 9604. Page 9600 also includes property information 9612 for each tour site including, for example, a picture 9614 of the property. The tenant-broker can toggle through the tour sites by clicking on the next button 9616.

The tour scheduling tool is able to plot the buildings on map 9608 because the property information in the commercial real estate database is geographically-coded. Thus, based on the order designated by the tenant-broker, the tour scheduling tool calculates the most efficient path from building to building, taking into account, for example, traffic lights and traffic congestion. Alternatively, instead of following the tenant-broker's order of buildings to be visited, the tour scheduling tool can determine the order based on, for example, the least amount of time or the least amount of distance traveled.

In an embodiment of the present invention, map 9608 includes interactive features through which the tenant-broker can access more detailed information about the buildings to be visited. For example, the tenant-broker could click on a building plotted on map 9608 to access data corresponding to that property, which is stored in the commercial real estate database. This data could include details and pictures of the available space.

If the tenant-broker approves of the proposed tour, the tenant-broker clicks on the "save tour" button 9618. The tenant-broker can also print out an itinerary for the tour, which includes a schedule of the tour showing tour and travel times, the map with the plots of the route and buildings, and summary property information for each of the buildings to be visited.

Figure 97:
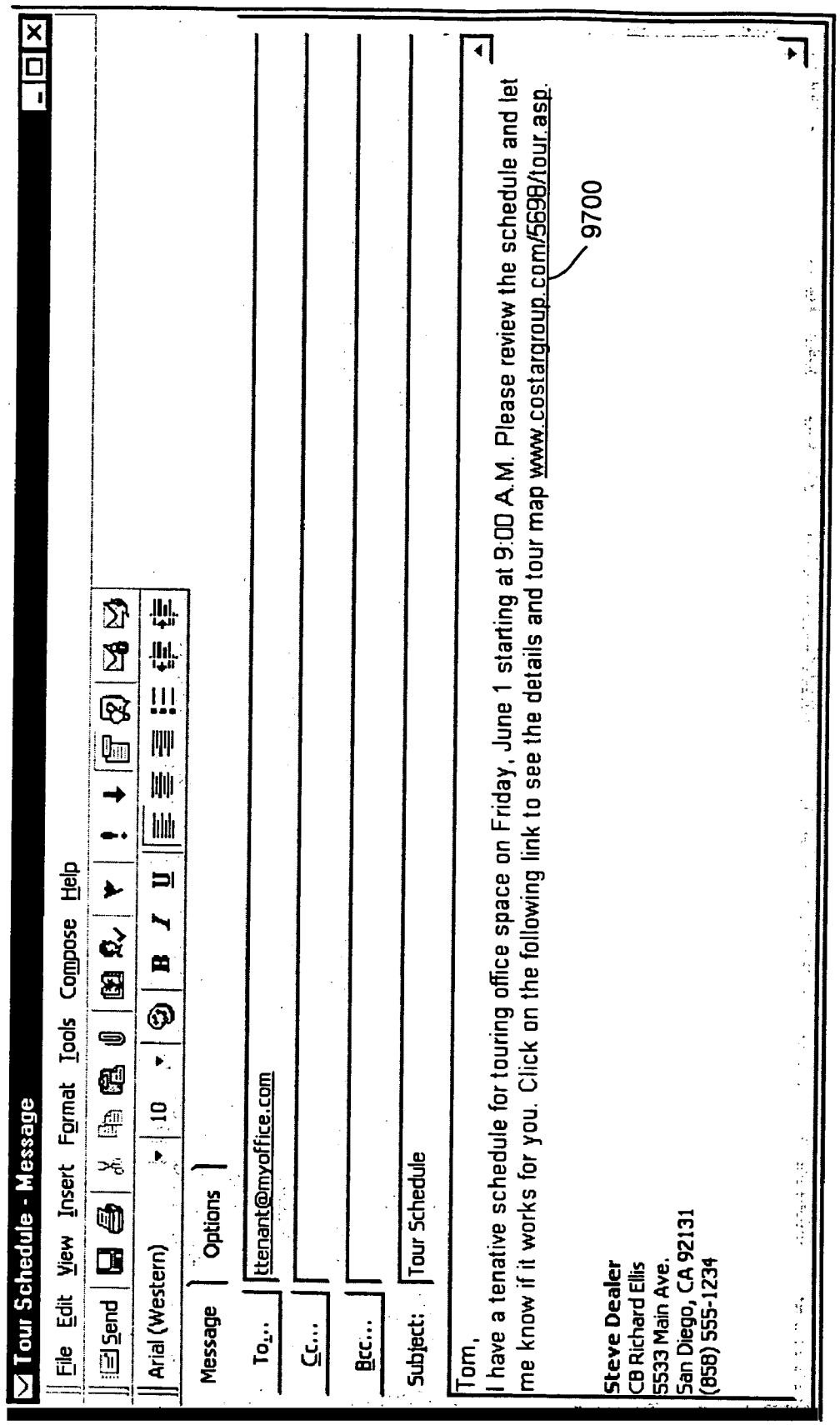

In creating and finalizing the tour, the tenant-broker can contact the tenant and owners/brokers to set and confirm times of building tours. The tour scheduling tool supports communication applications, such as email and instant messaging, to complete these tasks. Thus, for example, the tenant-broker can instant message with the owners/brokers on the tour, come up with a tentative tour schedule, and email that tour schedule to the tenant for approval. The "send to tenant" button 9620 on FIG. 96 provides this functionality, launching the email application of the tenant-broker and pre-populating an email to the tenant with a link to the tour schedule. The tenant-broker can, of course, customize the email message. FIG. 97 illustrates an exemplary email message to a tenant with a link 9700 to the tour schedule. In another embodiment, the tour scheduling tour enables the tenant-broker to forward the email message to multiple representatives of the tenant, if, for example, more than one person from the tenant will be attending the tour.

In response to the tenant's clicking link 9700 of FIG. 97, the tour scheduling tool launches the tenant's web browser and takes the tenant to a space tour page, such as page 9800 shown in FIG. 98. As shown, page 9800 includes a list of the buildings that will be visited on the tour, along with the date and times of the tours and property data corresponding to each building. To access additional information about a building, the tenant can click on the building image, in response to which the tour scheduling tool displays a detailed data page for the property, such as page 9900 shown in FIG. 99. This detailed data page 9900 includes information such as floor plans, lobby shots, and amenities and tenants associated with the building. Returning to FIG. 98, if the tenant wants to view a map of the tour with the route and buildings plotted on the map, the tenant clicks on the "map it" button 9802.

Optionally, in place of or in addition to pages 9800 and 9900, the tour scheduling tool could display page 9600 to the tenant, which provides the same tour schedule and building information in a different format.

If the tenant approves of the tour schedule, the tenant informs the tenant-broker of the approval by, for example, telephone, instant messaging, or e-mail. Although not shown, the tour scheduling tool could provide an approval button on pages 9600 or 9800, which would communicate the approval of the tenant to the tenant-broker. After the tenant approves of the tour schedule, the tenant could, like the tenant-broker, print out an itinerary for the tour. With the tour finalized and the itinerary in hand, the tenant and tenant-broker would then go on the tour, after which the tenant and tenant-broker would participate in the request for proposal process as described above under the heading, "Commercial Real Estate Transaction Tool."

Activity Summary Tool

An embodiment of the present invention provides an activity summary tool that enables a broker to capture and report the tasks that the broker has completed. The tool can summarize all of the tasks completed by a broker or, alternatively, only a subset of the tasks completed by a broker on behalf of a particular client. Thus, for example, an owner-broker can use the activity summary tool to report to an owner the number of inquiries that the owner-broker has received for the owner's property, the number of tours that the owner-broker has given on the property, the number of requests for proposals that the owner-broker has received for the property, and the number of proposals that the owner-broker has delivered to prospective tenants of the property.

In a further embodiment, the activity summary tool displays tasks according to the person that completed them, to indicate, for example, the tasks completed by an individual employee of the broker. In this manner, a head broker or chief financial officer of a brokerage firm can review the activities of a particular agent of the broker along with the overall activities of the firm. These summaries can help streamline revenue forecasting, staffing needs, and other management functions.

The activity summary tool operates transparently while the users interact with the transaction and tour scheduling tools, described above. Specifically, the activity summary tool records each discrete event in the commercial real estate transaction process. These records include the activities of the parties on both sides of the transaction, i.e., the tenant and tenant-broker and the owner and owner-broker. With each event logged, the activity summary tool can create activity reports that summarize the overall transaction process or particular breakdowns of that process. These breakdowns could focus on, for example, the activities of the tenant-broker or the owner-broker, the activities of a particular agent of the tenant-broker or the owner-broker, or all of the activities relating to a particular property regardless of the party completing them.

As an example of the archiving function of the activity summary tool, and in reference to the processes described above for the transaction and tour scheduling tools, the activity summary tool could archive an event at the following points in the commercial real estate transaction process: 1) searches conducted for a tenant's space requirement (FIG. 85); 2) requests for space confirmation for spaces meeting the search criteria (FIGS. 86–87); 3) replies to the requests for space confirmation (FIGS. 88–89); 4) building tours (FIGS. 96–99); 5) requests for proposals (FIGS. 90–91); 6) proposals (FIGS. 92–94); and 7) proposal acceptances (FIG. 95). For each of the events, the activity summary tool could record the specific data related to the event, such as the specific terms of a proposal. The activity summary tool would also associate each activity with the party that completed it, to enable reports broken down according to party. Thus, for example, when an owner-broker replies to a request for space confirmation (as in FIGS. 88–89), that event could be fed back to a status page of the tenant-broker to show that a reply was received on the request for space confirmation for a tenant client's space requirement. Similarly, on the landlord side, the event could also be fed back to a status page of the owner-broker to show that an inquiry was made on the property. This inquiry event could then be reported on a monthly report to the owner, which summarizes the activities completed by the owner-broker on behalf of the owner.

Thus, the activity summary tool of the present invention provides important archiving and reporting functions for all parties to the commercial real estate transaction process, whether on the tenant or owner side. The activity summary tool is also a valuable management tool for brokers, giving them the ability to track activities completed by individual agents or by the firm as a whole, and to summarize and report the activities to their clients. Typically, in the past, brokers have created monthly owner reports by reviewing their calendars and typing the events into a separate document. With the activity summary tool, however, the events are automatically captured as they occur. Then, at the end of the month, the broker need only request a monthly report, which the activity summary tool then automatically generates from the recorded events.

Figure 100:
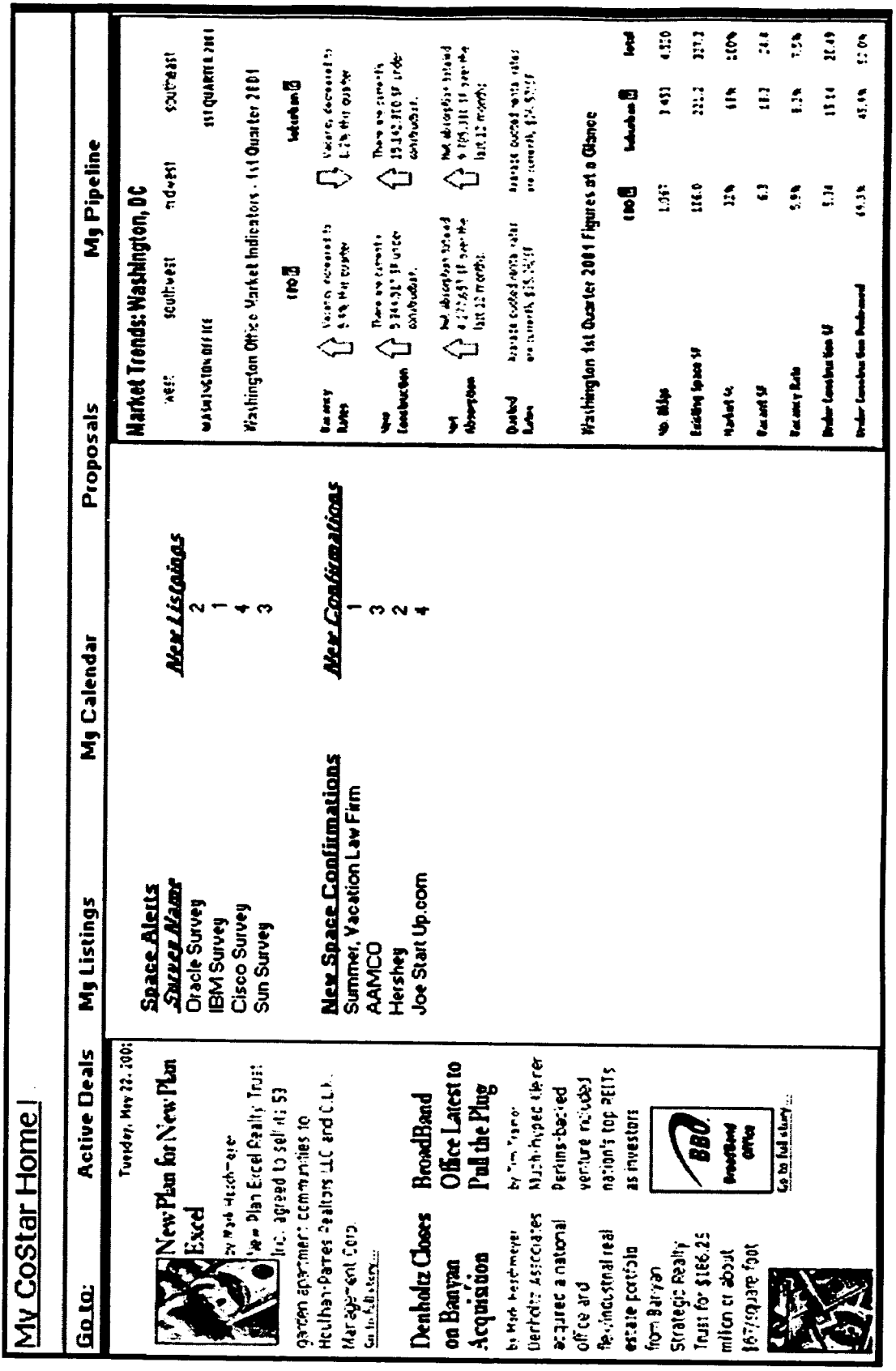
FIG. 100 is a screen shot that depicts an exemplary tenant-broker status page, according to an embodiment of the present invention.

FIG. 100 illustrates an exemplary tenant-broker status page, according to an embodiment of the present invention. As shown, the status page includes a list of current surveys and new space confirmations. The surveys are listed according to the tenant client, and indicate the number of new listings (space requirements) for each survey. The new space confirmations are also listed according to the tenant client, and indicate the number of space confirmations received for each survey. The tenant-broker can click on any of the survey or space confirmation listings to access more details. In addition to the current surveys and new space confirmations, the status page of FIG. 100 could include a summary of all active deals, proposals, and tour appointments.

A status page for an owner-broker would be similar to the page shown in FIG. 100. The owner-broker status page could also include other information, such as active deals, pending proposals, and tour appointments. In addition, the status page could provide a building calendar that shows past and planned events for a particular property.

In a further embodiment of the activity summary tool, brokers can share access to status pages with their clients. Thus, as the broker plans and completes activities on behalf of the client, the client can monitor those activities through the shared status page. Thus, for example, a tenant could see what types of responses the tenant-broker received on a survey requesting space confirmations. In addition, a broker could provide access to the status page to one or more designated members of the client, such as a facilities manager and chief financial officer. In this manner, many people can use the status page to monitor and participate in the transaction process. For example, several members of the client could check the status page to determine the time and schedule of building tours.

Analytical Tool

An embodiment of the present invention provides an analytical tool that enables a user to better understand and analyze commercial real estate market conditions.

Specifically, the analytical tool facilitates the comparison of properties to other similarly situated properties. For example, the analytical tool can compare a single building or group of buildings against a preset or user-defined list of buildings (e.g., against the entire market or submarket of Class A buildings or the user's own selection of its competitors or comparators) based on a user defined selection of certain building characteristics. The analytical tool can plot the result set along a graph or chart.

In analyzing market conditions, the analytical tool also presents historical trends and forecasts of market statistics. For example, the analytical tool can show the historical trends of absorption or vacancy, and can forecast the statistics based on "future" information stored in the commercial real estate database, such as building deliverables (new construction) or lease expiration. The analytical tool can also customize this forecasting function to report statistics pertinent to a specific type of property, such as industrial properties. The analytical tool can also factor in a user's independent judgment of the market to further customize the forecasted statistics.

FIGS. 101–113 illustrate exemplary screen shots of the analytical tool, according to an embodiment of the present invention. In this example, to illustrate market conditions, the analytical tool generates statistics, charts, and graphs based on a user-defined custom set of buildings.

Figure 101:
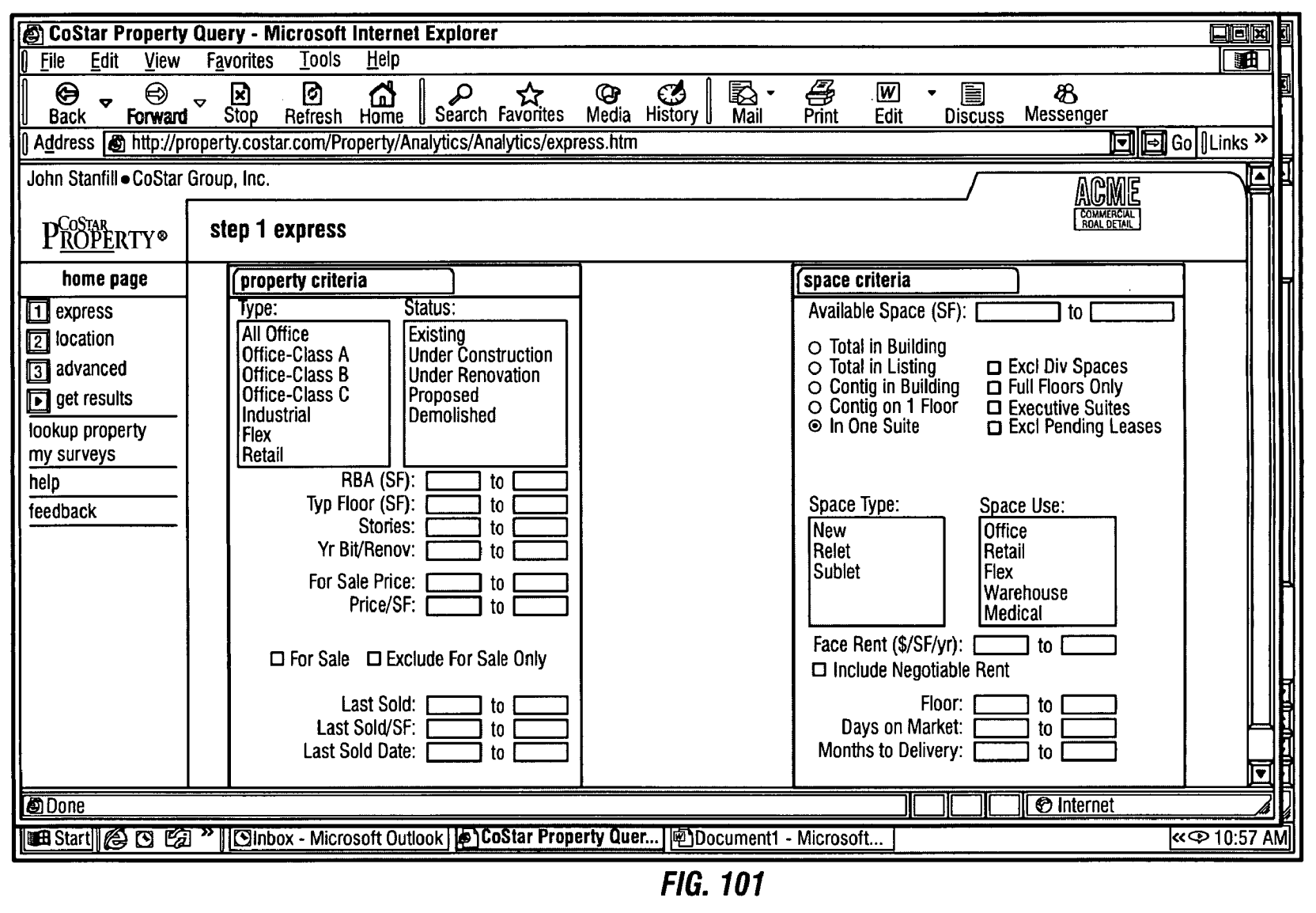
Figure 102:
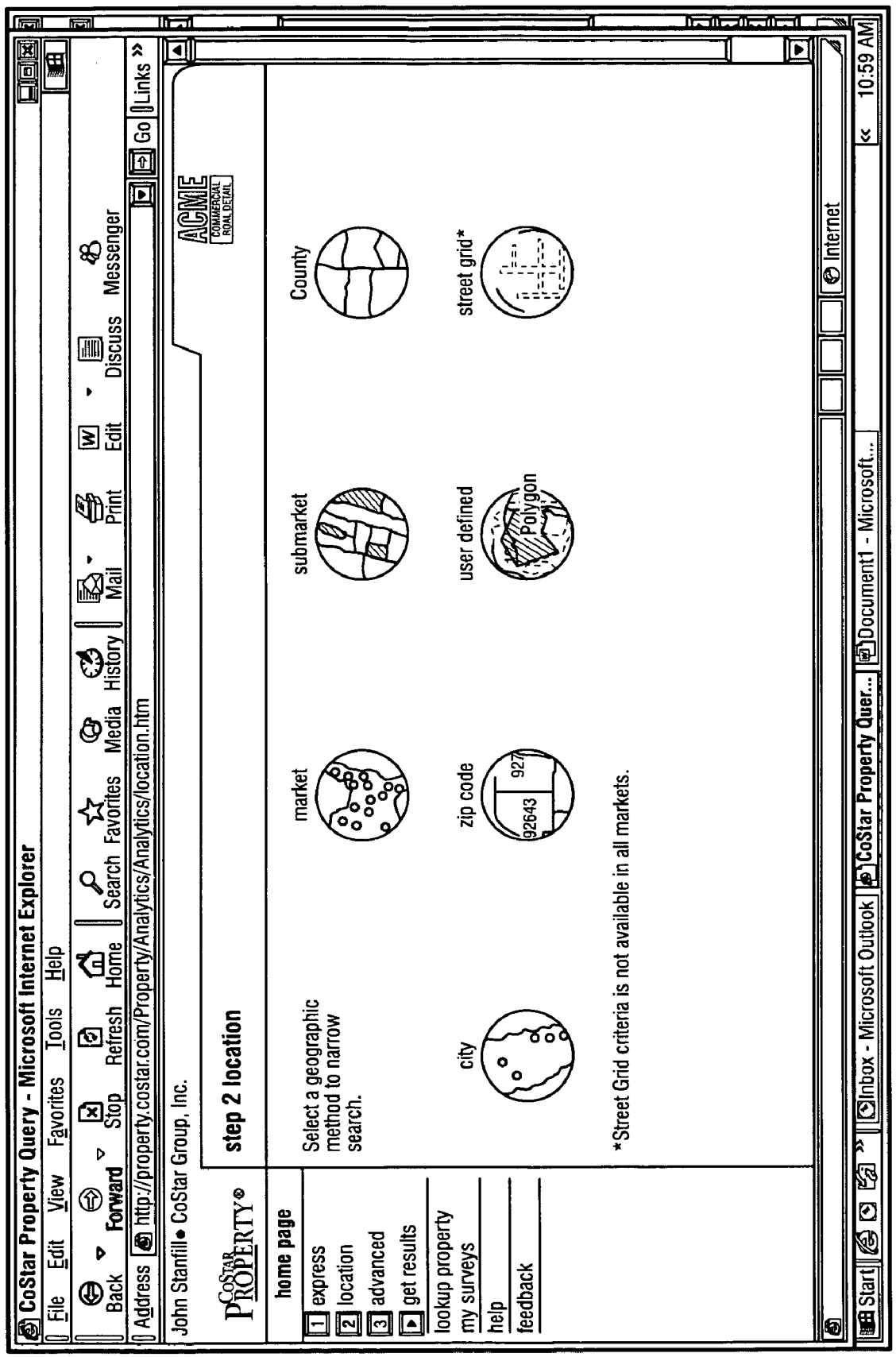
Figure 103:
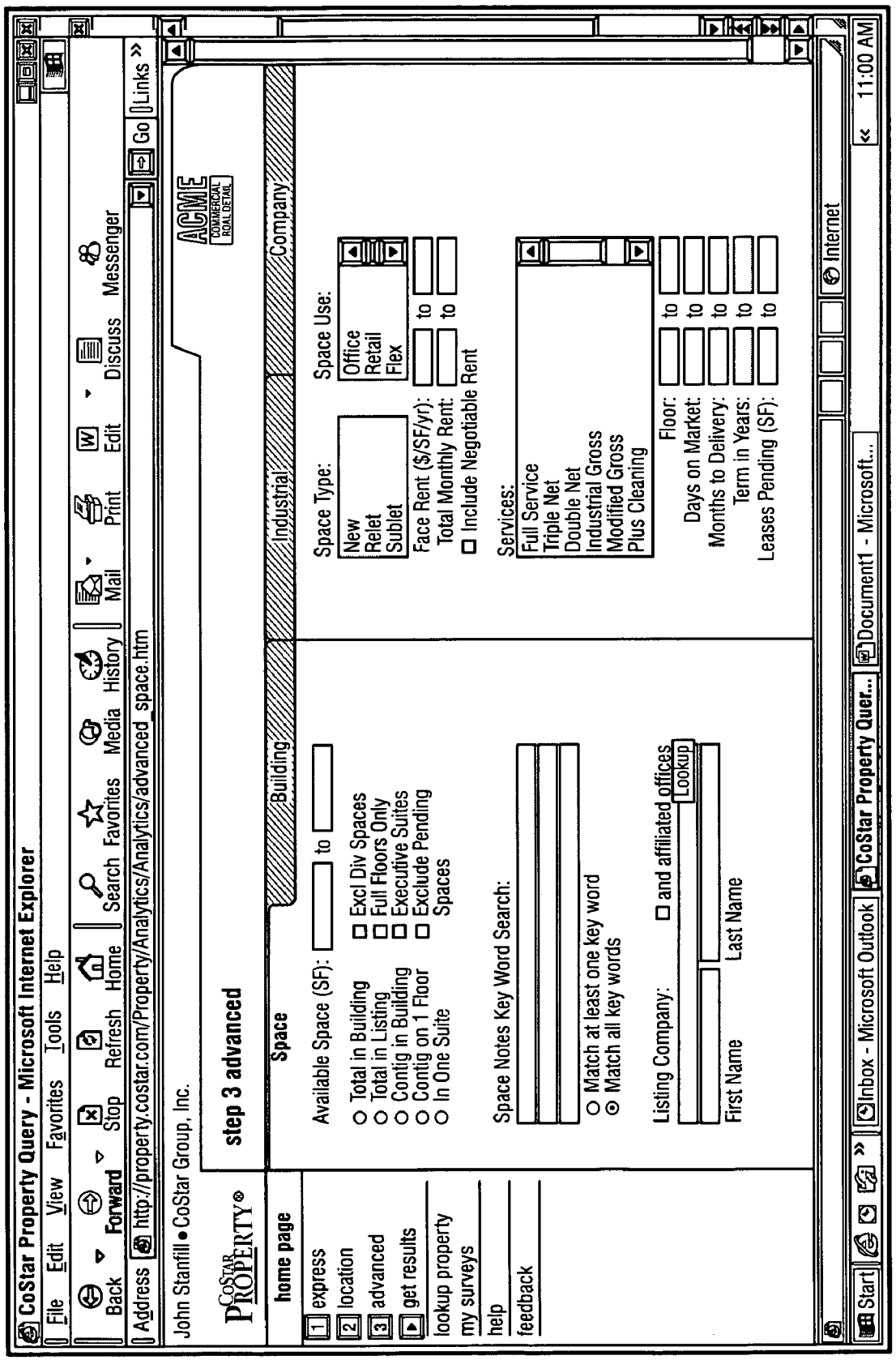

As shown in FIG. 101, the analytical tool first prompts the user for property and space criteria. Then, as shown in FIG. 102, the analytical tool prompts the user for a geographic region in which to search for properties meeting the criteria. The user can define the geographic region by, for example, market, submarket, county, city, zip code, user defined boundaries (e.g., using the map search tools described herein), or street grid. In the next step, as shown in FIG. 103, the user can define more detailed search criteria, such as key words in the space listing, the listing company, and services related to the space.

Figure 104:
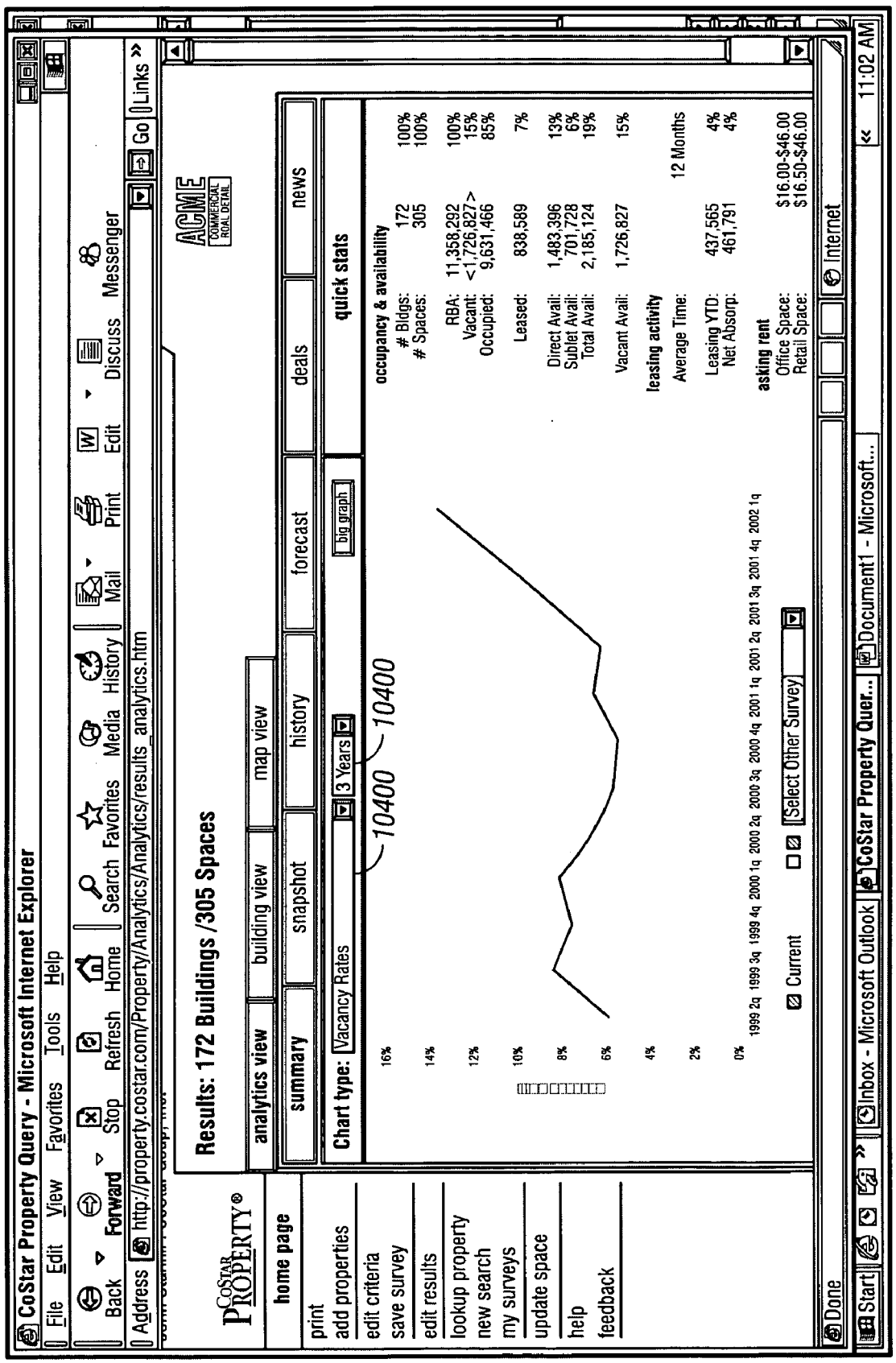
Figure 105:
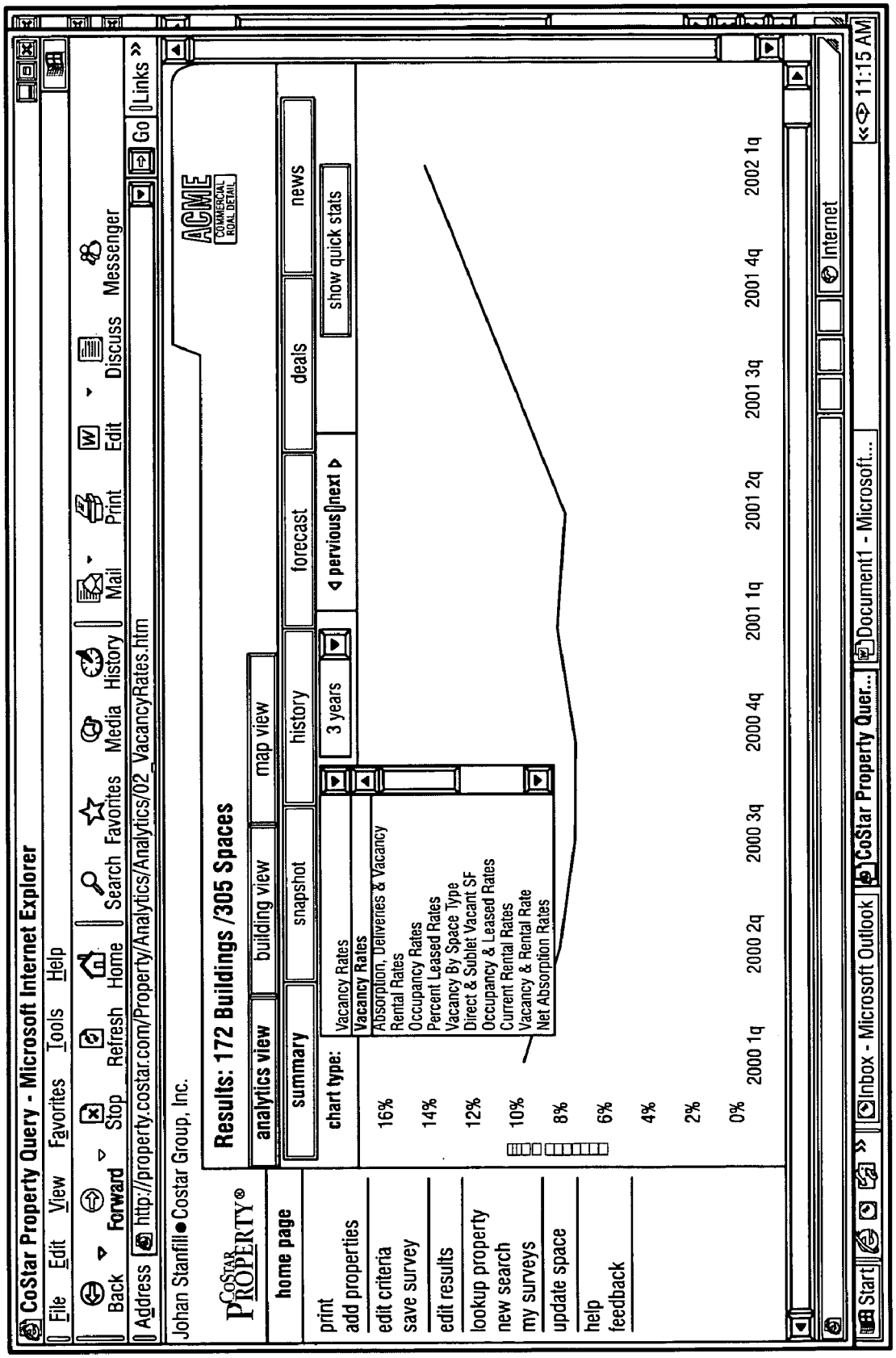
Figure 106:
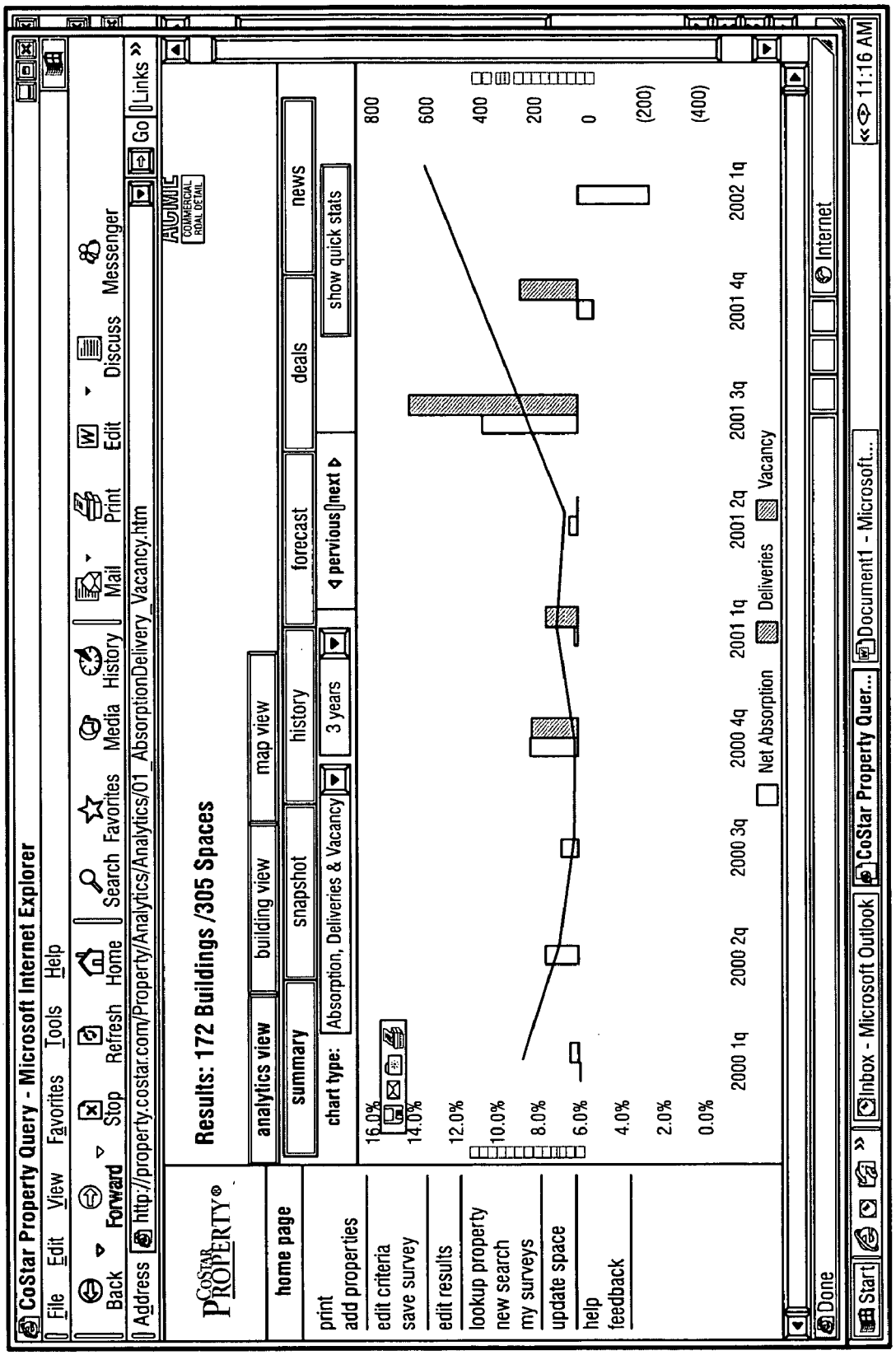

With the search criteria defined by the user, the analytical tool conducts the search and reports the results, as shown in FIG. 104. This initial reporting screen includes the number of buildings and spaces meeting the search criteria (which, in the example shown, is 172 buildings and 305 spaces), a graph plotting three-year vacancy rates for the properties meeting the search criteria, and a summary of statistics relating to occupancy and availability, leasing activity, and asking rent. From the summary screen of FIG. 104, the user can access additional charts and graphs of other market statistics from the chart type fields 10400. As shown in FIG. 105, these other charts and graphs could include, for example: 1) absorption, deliveries, and vacancy; 2) rental rates; 3) occupancy rates; 4) percent leased rates; 5) vacancy by space type; 6) direct and sublet vacant square footage; 7) occupancy and leased rates; 8) current rental rates; 9) vacancy and rental rates; and 10) net absorption rates. The analytical tool pulls all of these statistics from the commercial real estate database. FIG. 106 illustrates a graph of absorption, deliveries, and vacancy plotted over a three year period, for properties meeting the search criteria specified in the screens of FIGS. 101–103.

Figure 107:
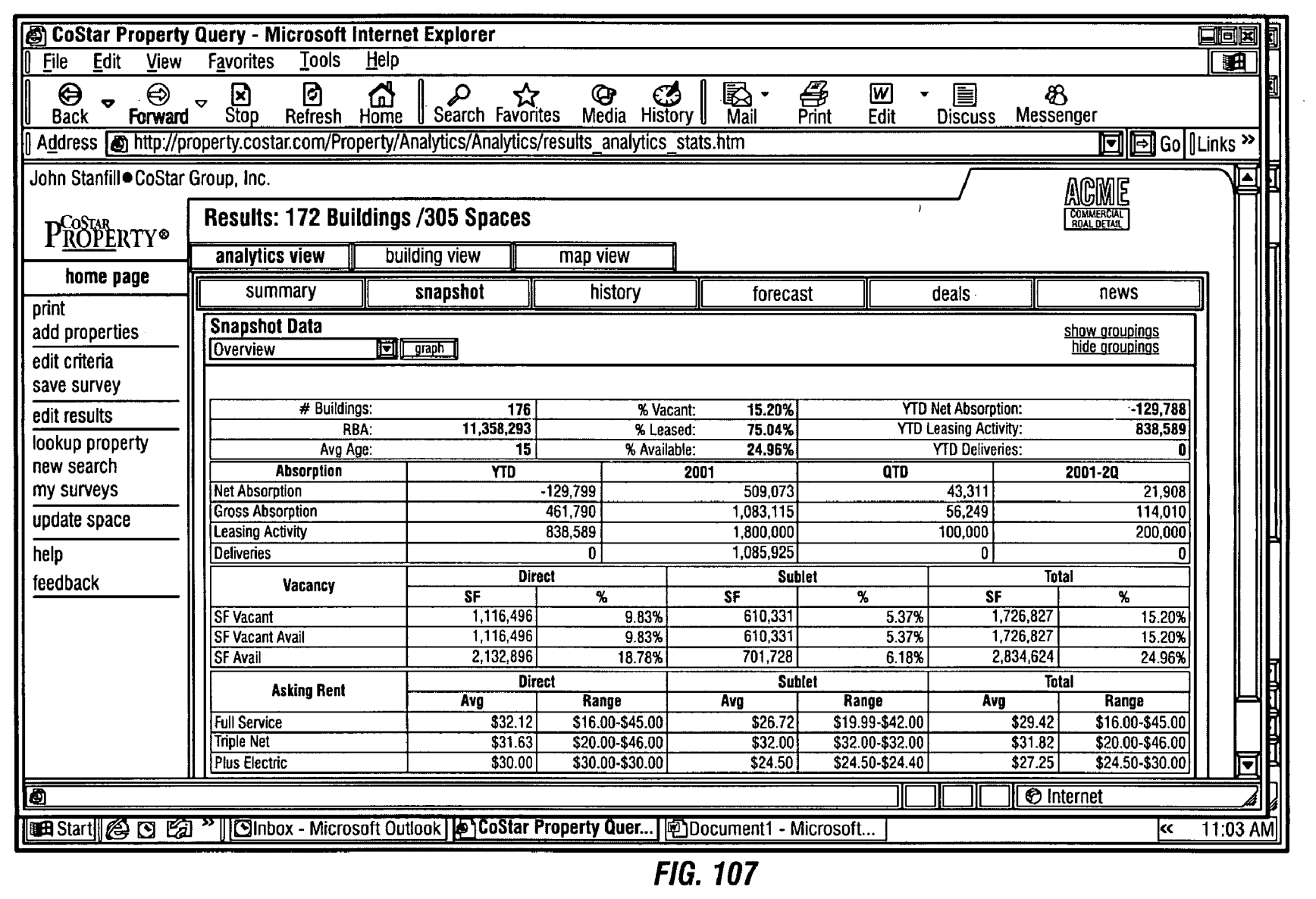
Figure 108:
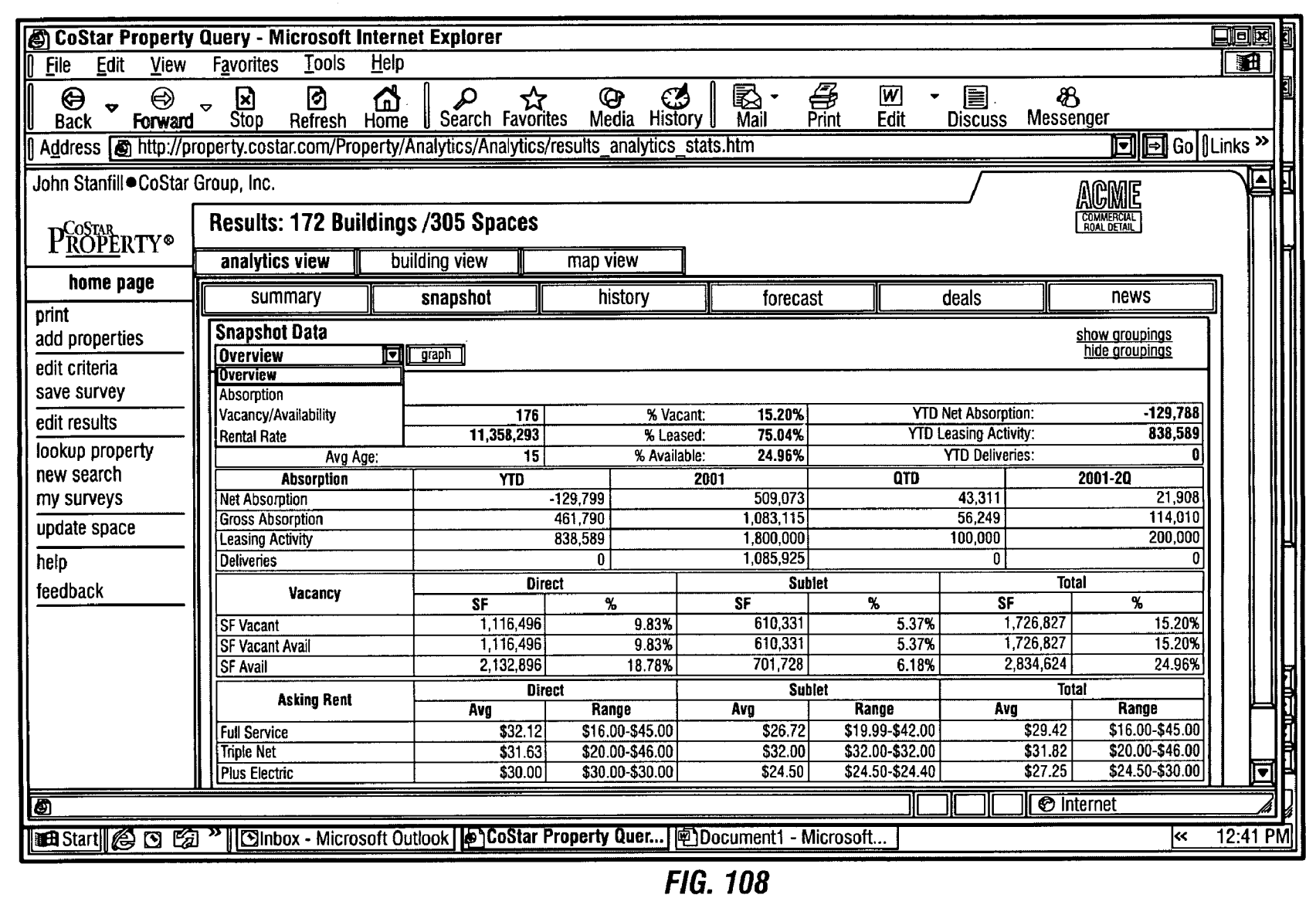

In addition to charts and graphs, the analytical tool can present historical data in snapshot spreadsheets, as shown in FIGS. 107–109. FIG. 107 shows an overview of the historical data. In addition to an overview, the data in the snapshot can be organized as a specific look at absorption, vacancy/availability, or rental rate, as shown by the drop-down menu options in FIG. 108. As another example for presenting historical data, FIG. 109 illustrates a table listing quarterly statistics.

Figure 110:
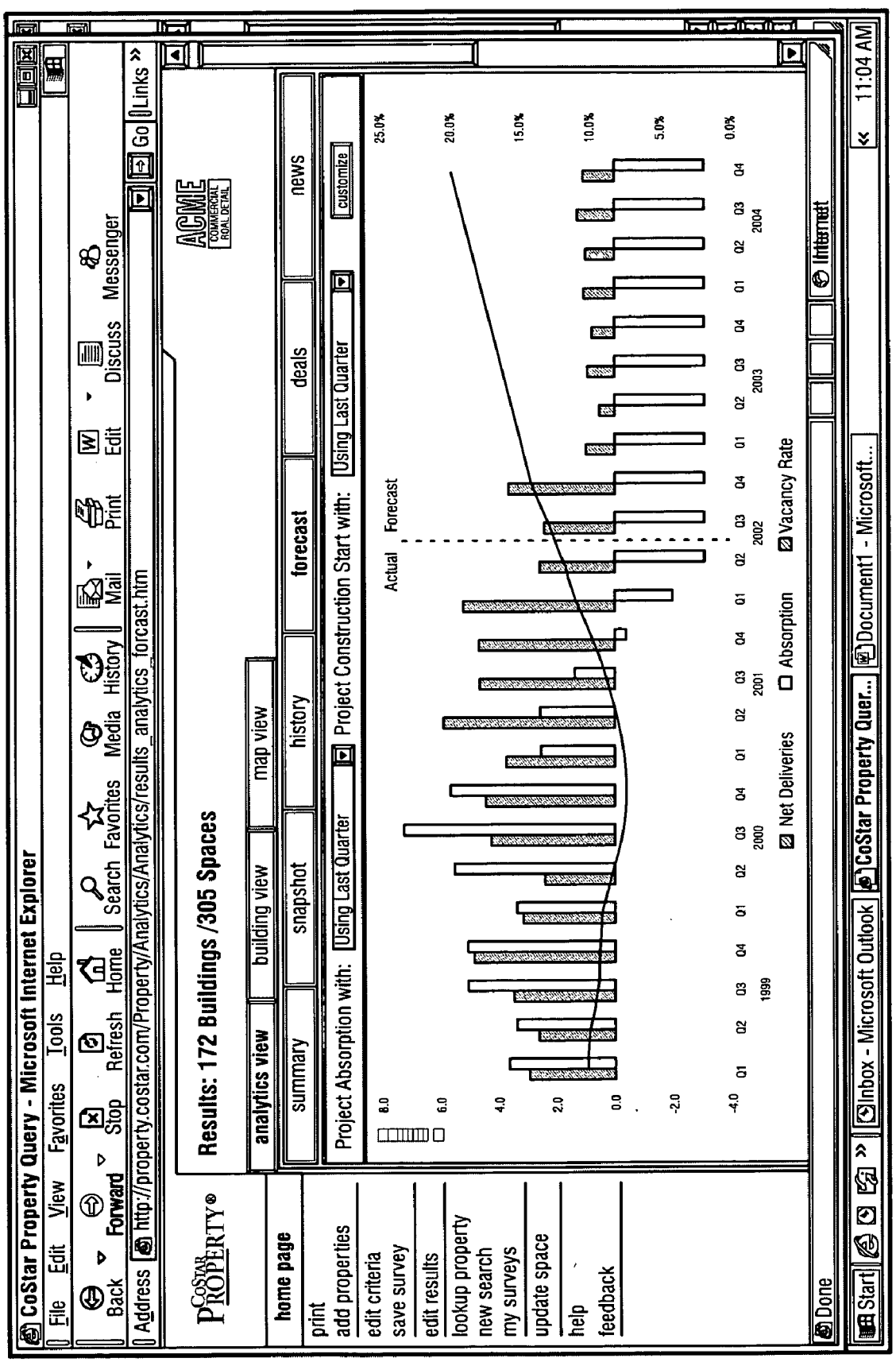
Figure 111:
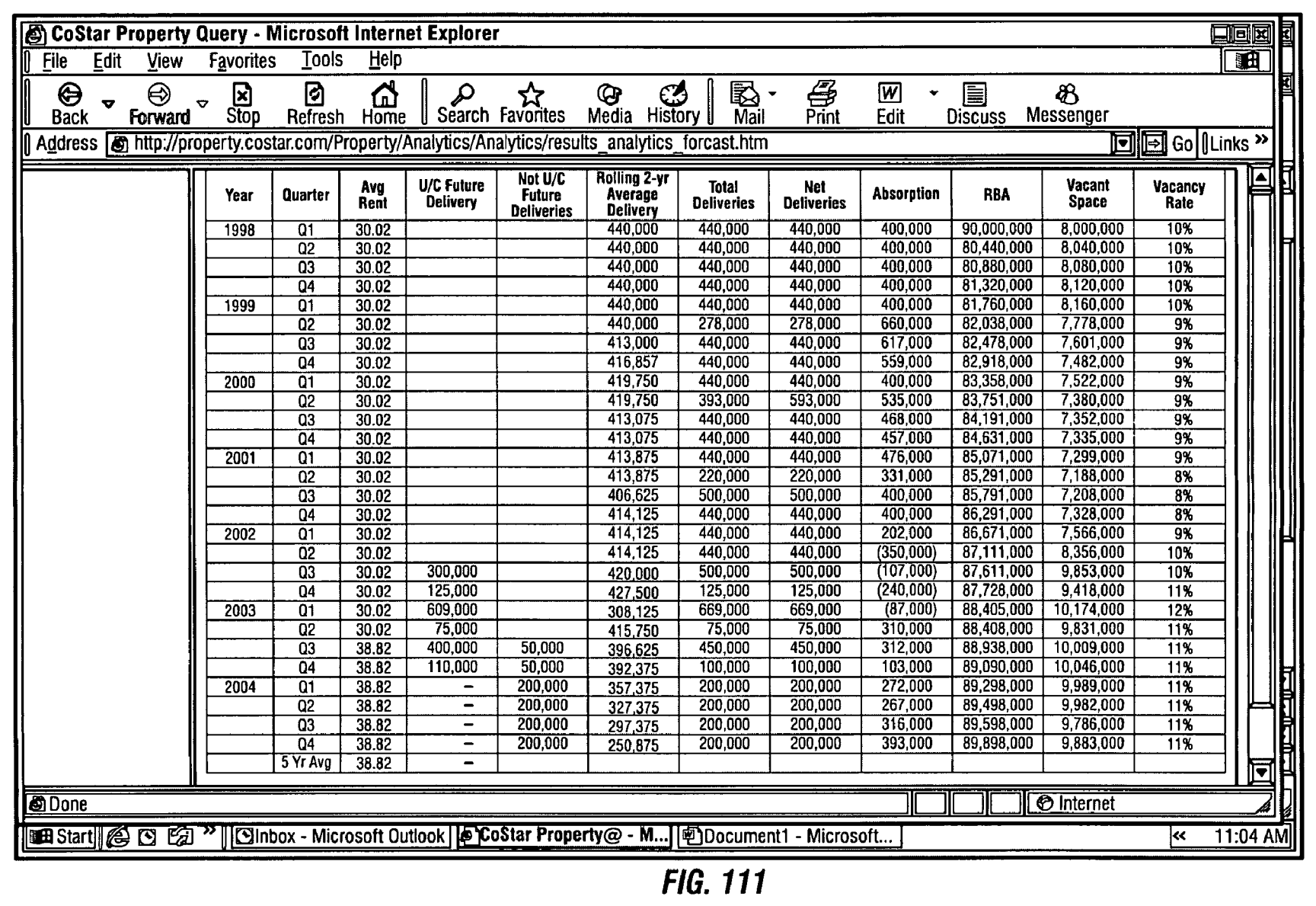
Figure 112:
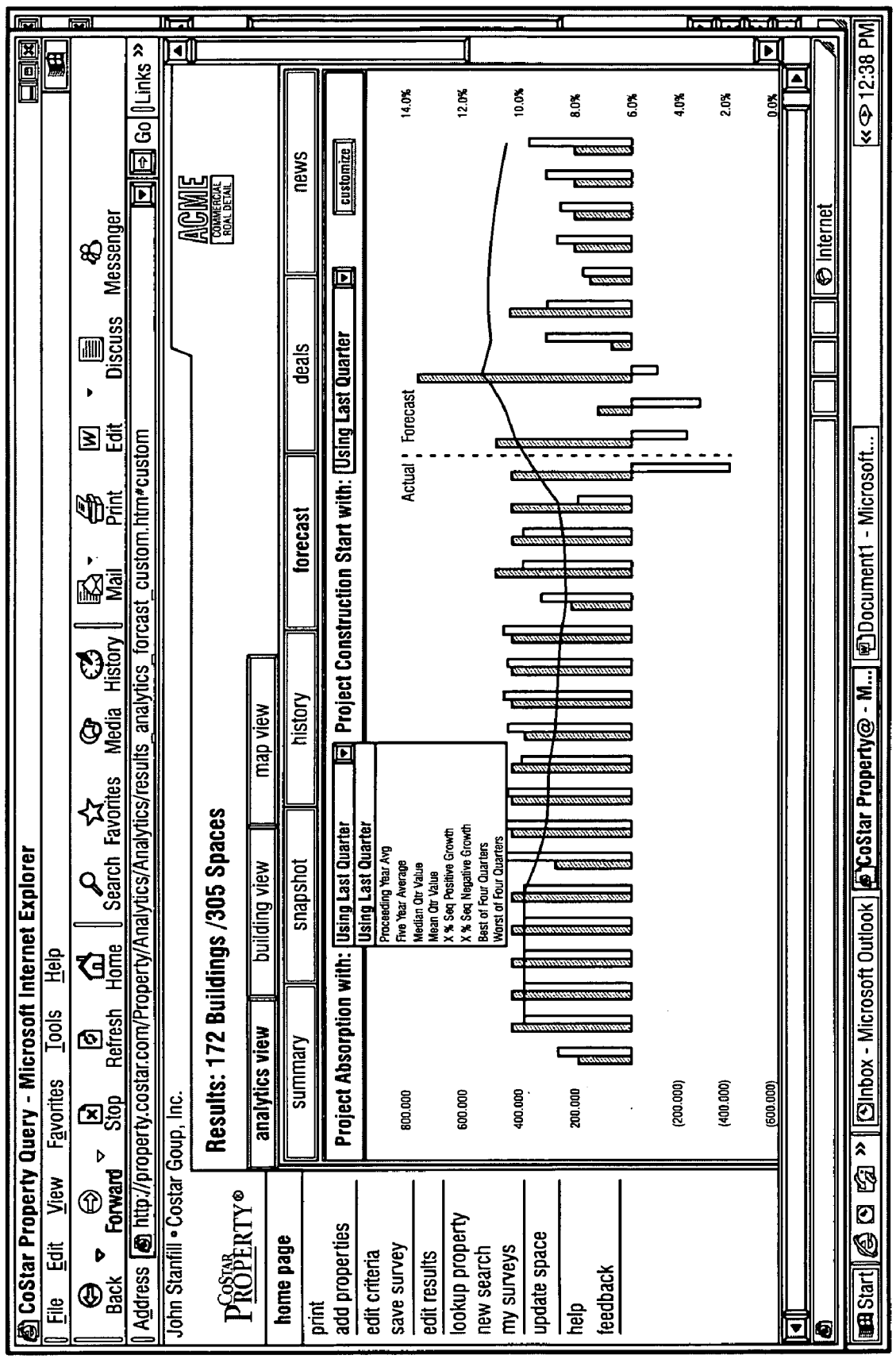
Figure 113:
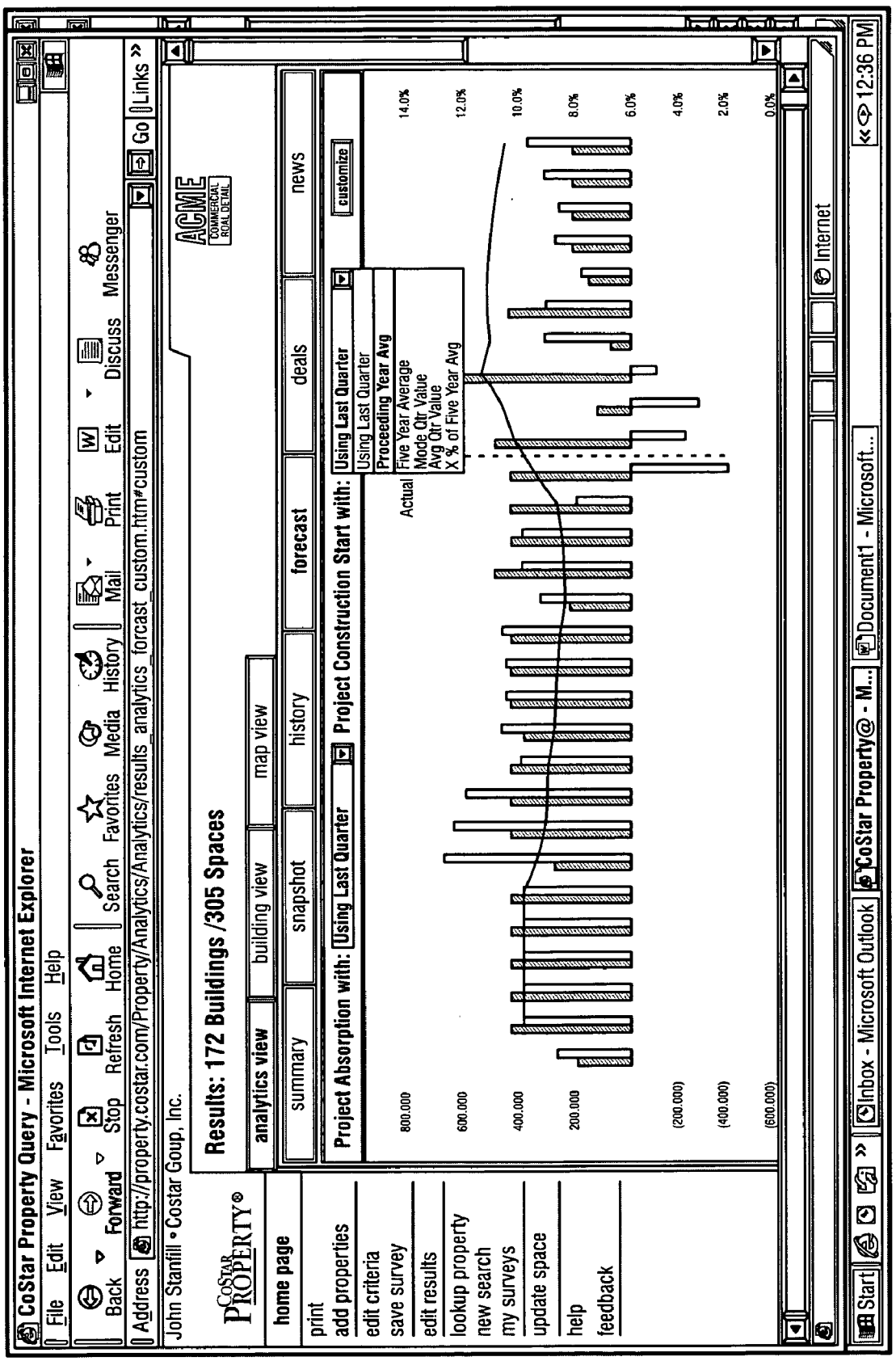

FIGS. 110–113 illustrate the forecast function of the analytical tool. FIGS. 110 and 111 show a graph and table, respectively, of actual historical statistics and predicted future statistics. In this example, the analytical tool projects the future absorption rates and construction starts using the statistics from the most recently reported quarter. The user can change the bases for these projections as shown in FIGS. 112 and 113. As shown in FIG. 112, the projected absorption can be based on other factors such as: 1) preceding year average; 2) five year average; 3) median quarter value; 4) mean quarter value; 5) % seq positive growth; 6) % seq negative growth; 7) best of four quarters; or 8) worst of four quarters. As shown in FIG. 113, the projected construction starts can be based on other factors such as: 1) preceding year average; 2) five year average; 3) mode quarter value; 4) average quarter value; and 5) % of five year average.

Figure 114:
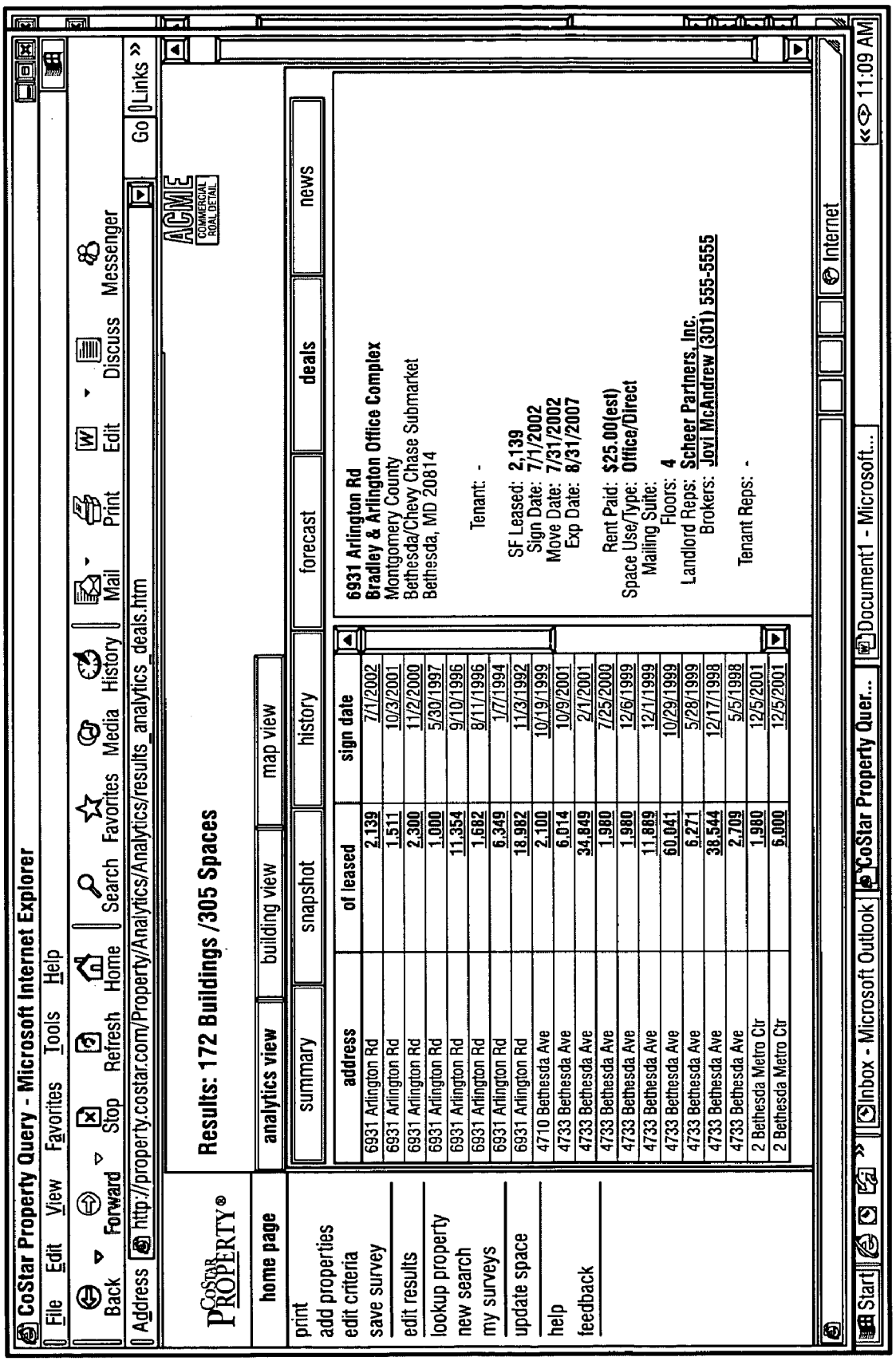
Figure 115:
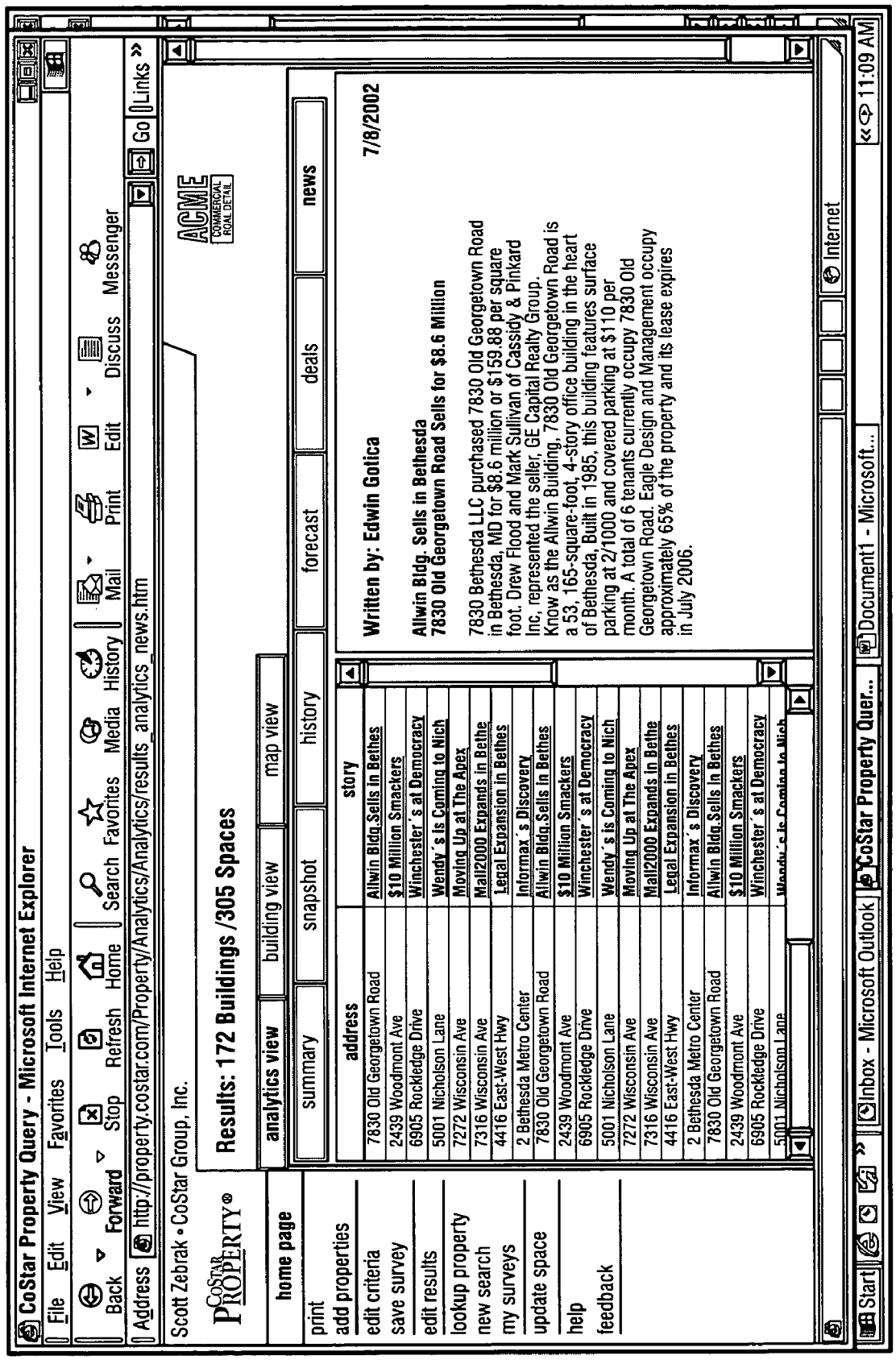
Figure 116:
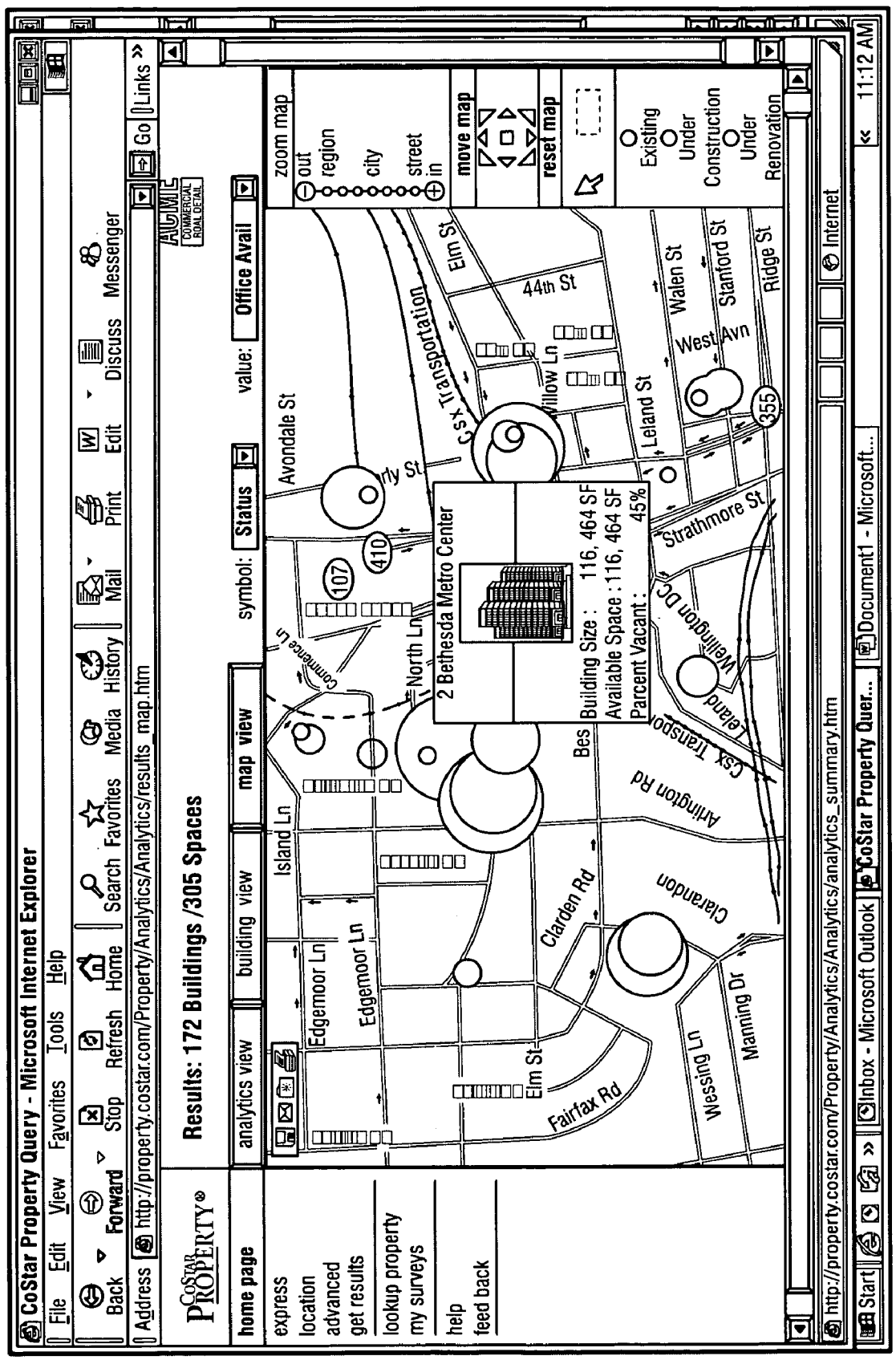

To further enhance the user's understanding of market conditions, an embodiment of the analytical tool can provide summaries of deals completed on properties that met the search criteria (FIG. 114), recent news relating the properties (FIG. 115), and plots of the properties on a map to reveal any regional trends (FIG. 116). The data included in these screens is retrieved from the commercial real estate database.

Map Search Tool

FIGS. 117–123 illustrate an exemplary map search tool, according to an embodiment of the present invention. This map search tool allows a user to specify one or more areas as geographical search criteria. This map search tool is a part of the overall search process that is described above. This search process includes, for example, choosing a type of property to search (e.g., office, industrial, or retail), specifying a location in which to search, and identifying attributes or criteria that the search results must satisfy (e.g., sale price parameter). The map search tool of the present invention is a part of the second step of this process, helping to pinpoint a location in which to search for properties.

Figure 117:
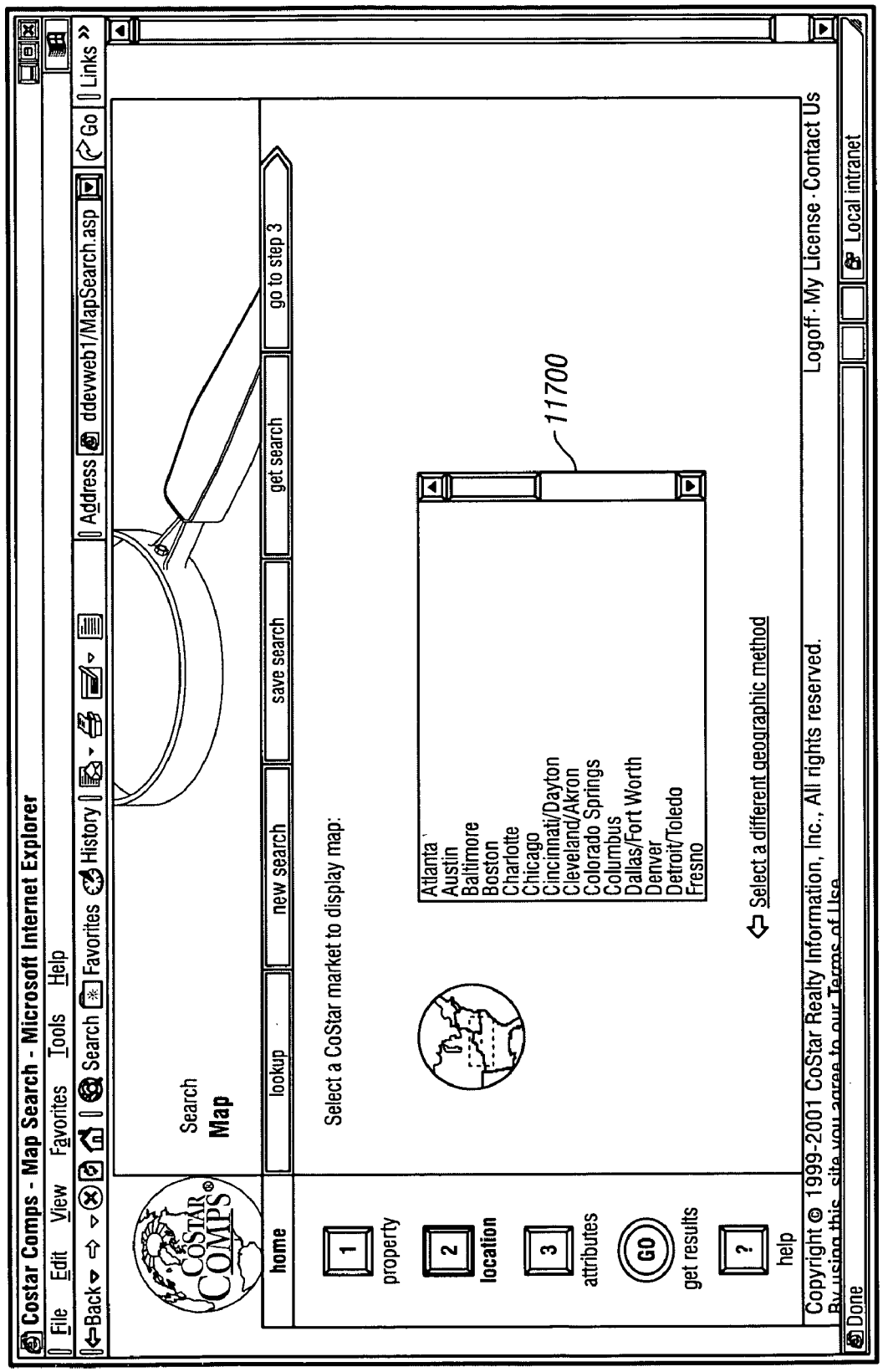
FIGS. 117–124 are screen shots that depict an exemplary map search tool, according to an embodiment of the present invention.

As shown in FIG. 117, the system displays a list 11700 of market areas. The user selects a market to view a map of the area in which the user wishes to create a custom area search.

Figure 118:
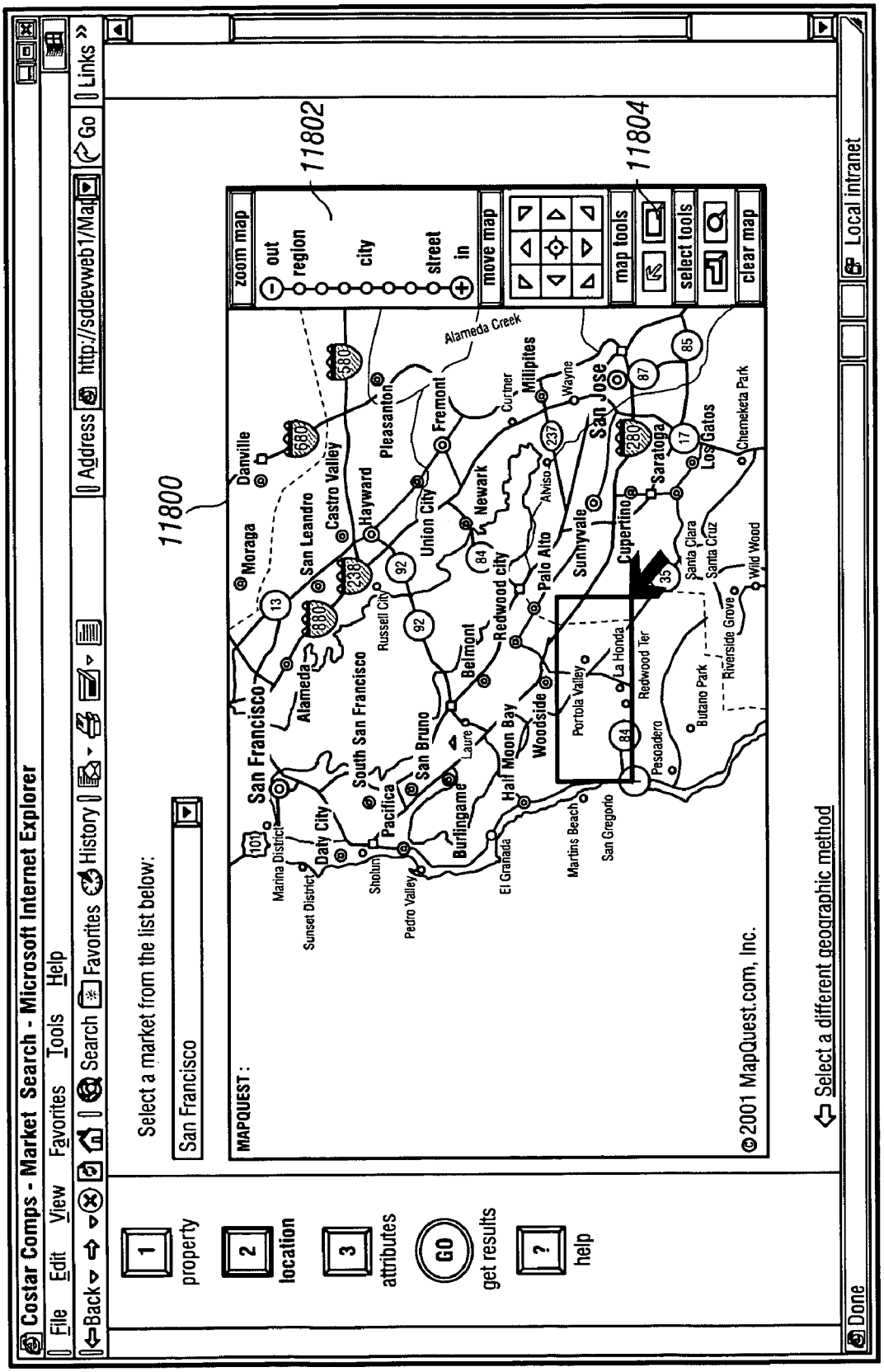

The system then displays a map 11800 corresponding to the selected market, as shown in FIG. 118. The user can zoom in on the market area map by clicking on the zoom button 11802. Alternatively, the user can click and drag a rectangle anywhere on the map using the rectangle button 11804. The system redraws the map by zooming in on the rectangle.

Figure 119:
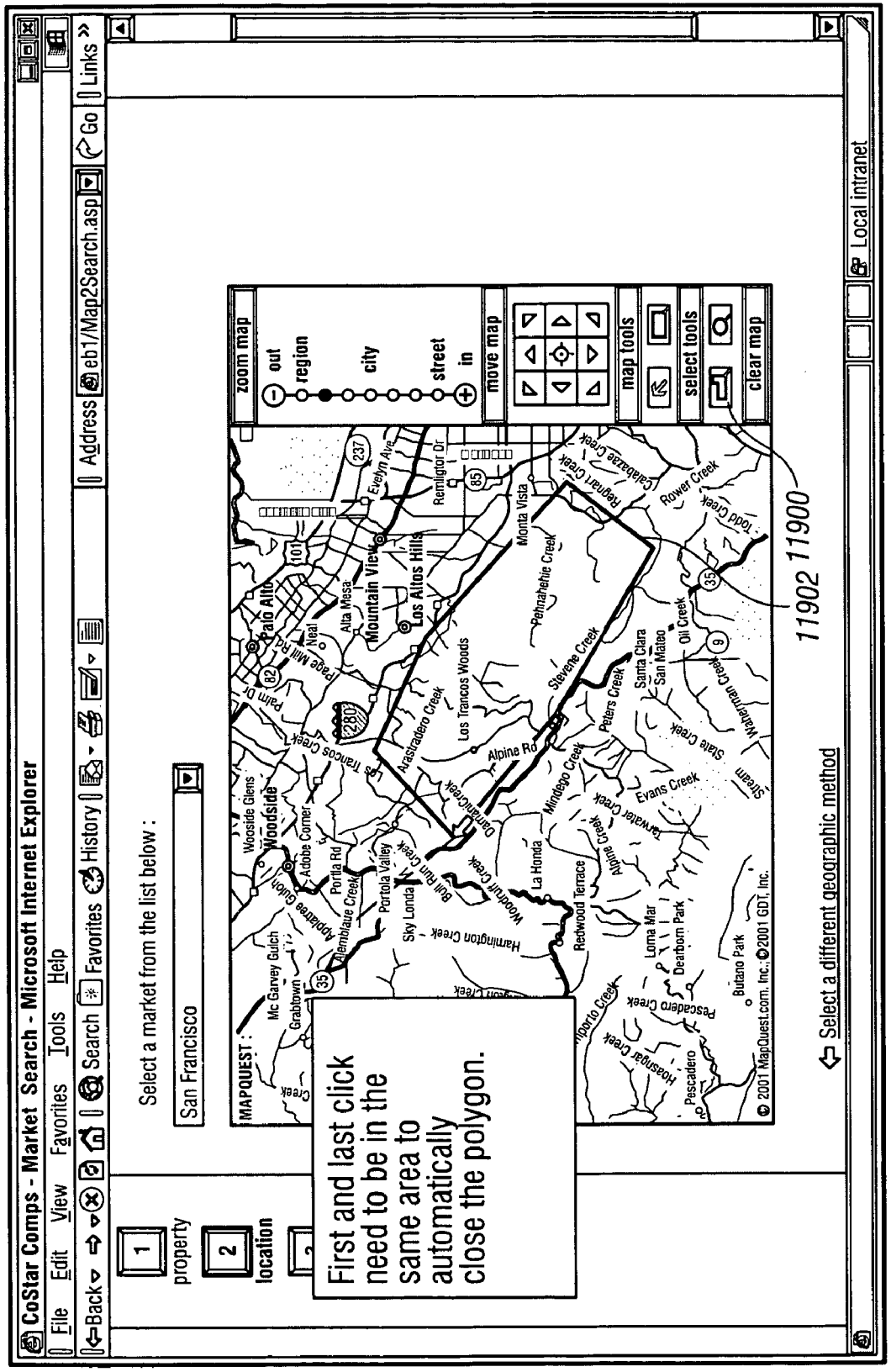

As shown in FIG. 119, the user can create a submarket using the digitize button 11900, which enables free-form polygon searching (e.g., defining irregular polygon search areas). After clicking digitize button 11900, the user clicks on any location on the map to begin defining a polygon 11902. The user then clicks other points to create the boundaries of the polygon 11902 that define the custom submarket. The system automatically closes the polygon 11902 when the user clicks close to the first point of the polygon 11902.

In an embodiment of the map search tool, the system allows the user to name the polygon search area for future reference and future searching. The system enables the user to save multiple search areas, if desired.

Figure 120:
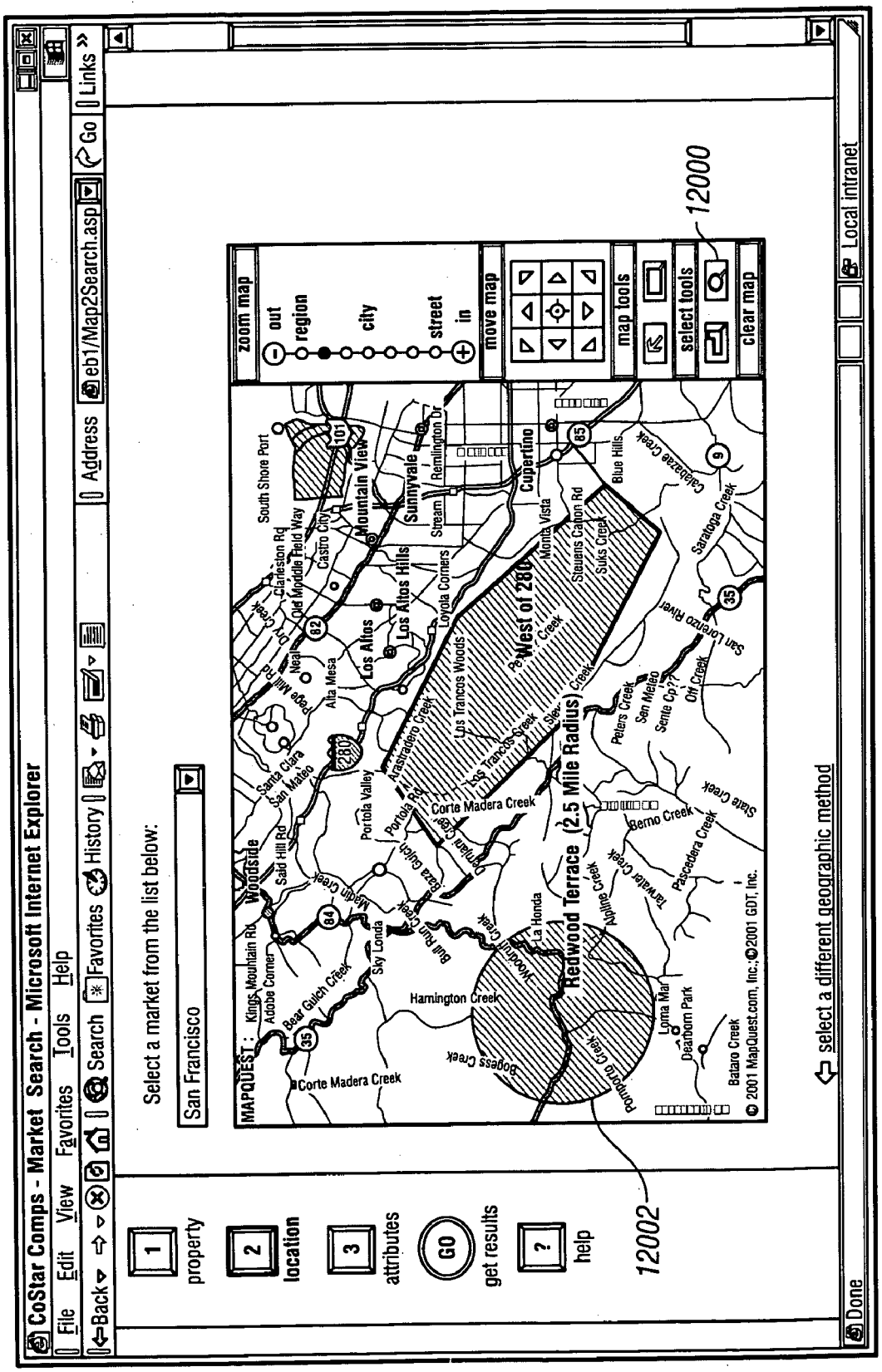

FIG. 120 illustrates an alternative method for defining a search area. In this embodiment, the user creates a radius 12002 using a radius button 12000. The user can click and drag the radius 12002 to any location on the map. The user can also re-size the radius 12002 as needed. The system preferably displays the distance of the radius 12002 on a bottom status bar of the map. Like the polygon, the system allows the user to name the radius search are for future reference and future searching. The system enables the user to save multiple search areas, including combinations of radius and polygon search areas.

The polygon search tool and the click-and-drag radius search tool can be used independently or in combination with one another. These geographic-based map queries can also be used with or without an accompanying traditional text-based search. These interactive map search tools are widely applicable for searching geographic-based data. In the specific context of commercial real estate, the map search tools can be used to search, for example, sales transaction data, space availability for lease and/or sale, and information regarding tenants in commercial real estate.

As shown in FIGS. 118–120, the map search tool of the present invention allows a user to specify one or multiple radii or custom submarket areas as geographical search criteria. The user can click and drag a rectangle or radius anywhere on a map. In addition, the user can click on the corners of a polygon to create an outer boundary of a custom submarket. The user can save the designated search areas and can retrieve the areas for future and/or periodic searches.

Figure 121:
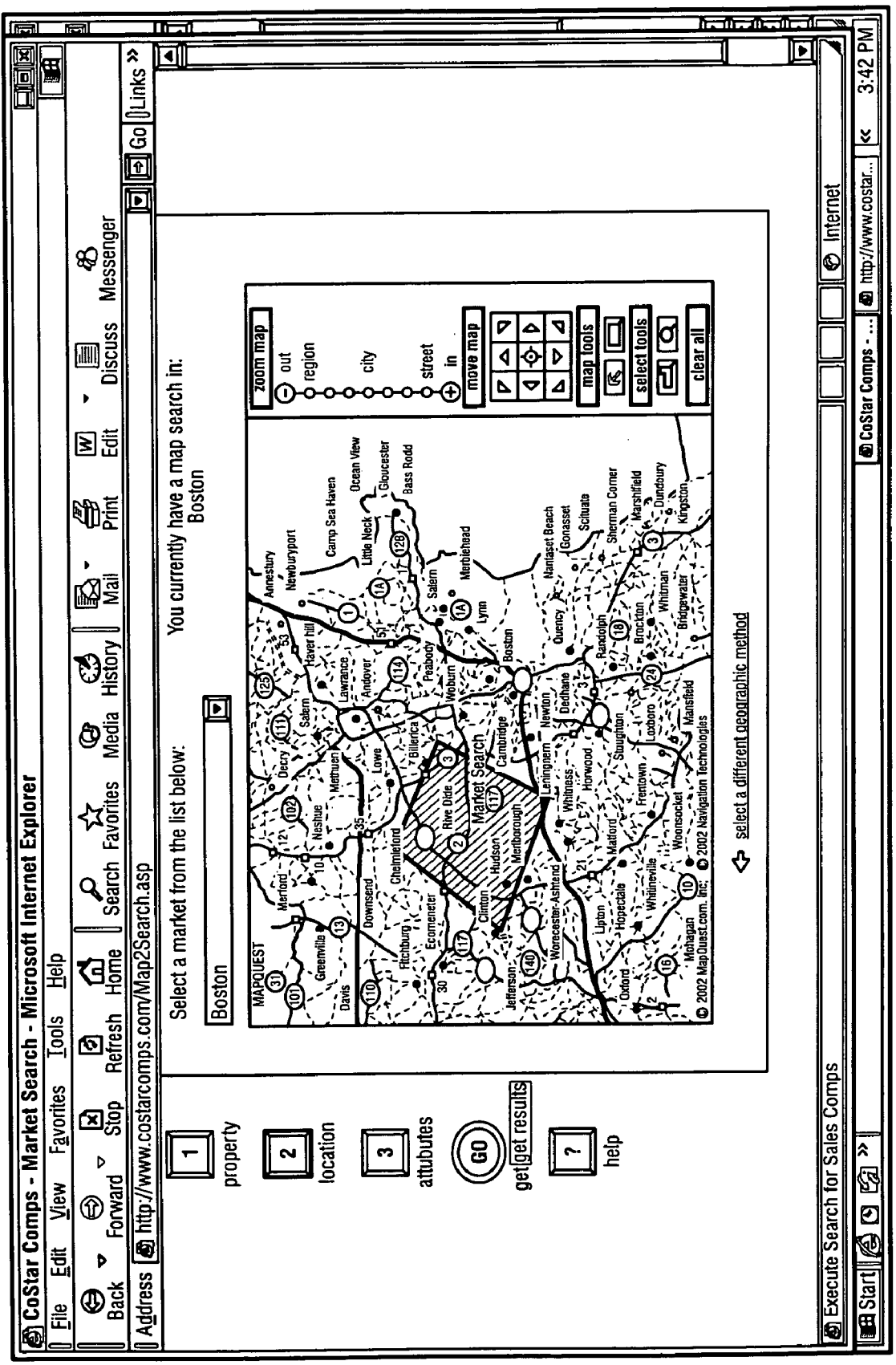
Figure 122:
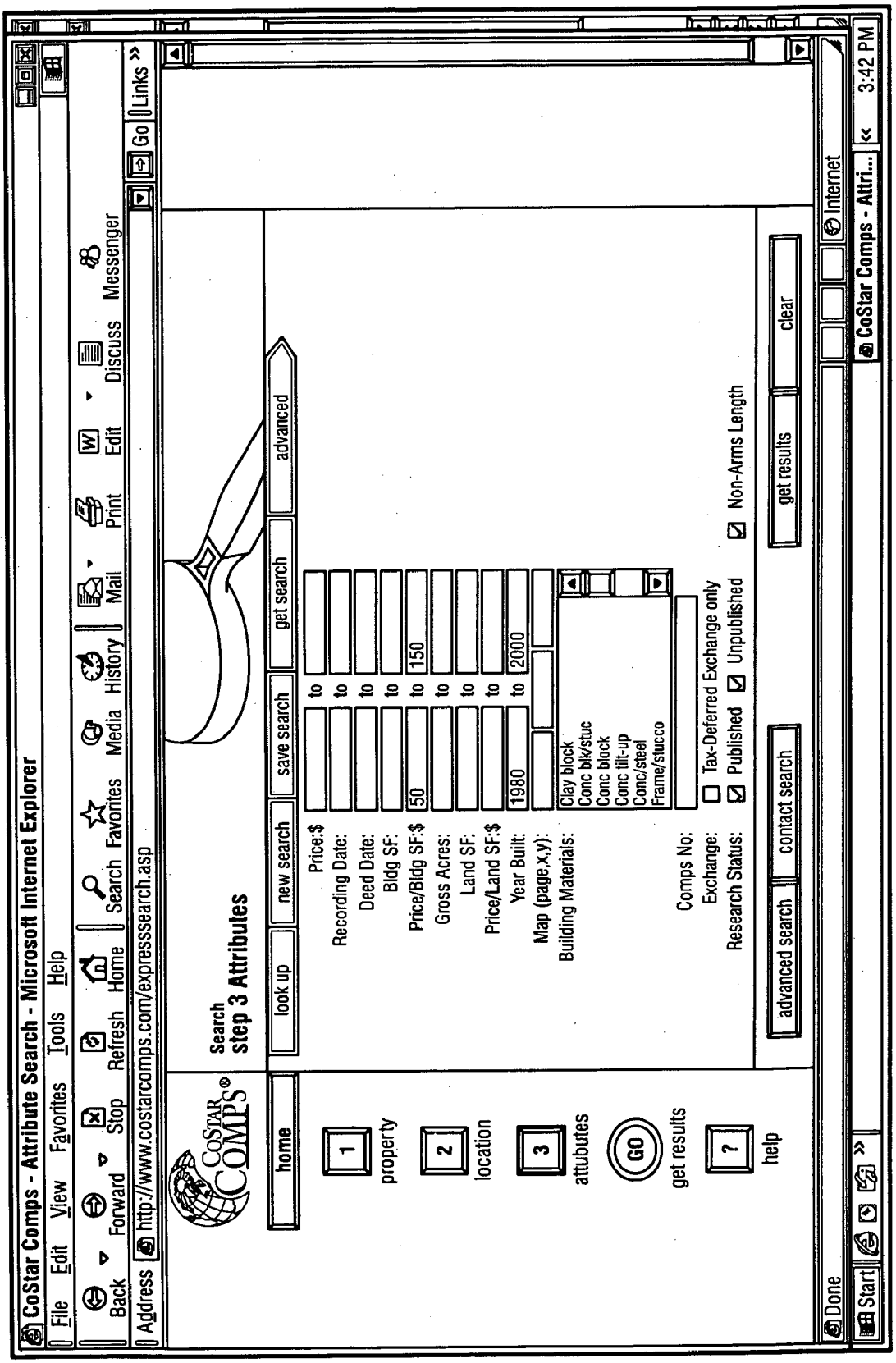
Figure 123:
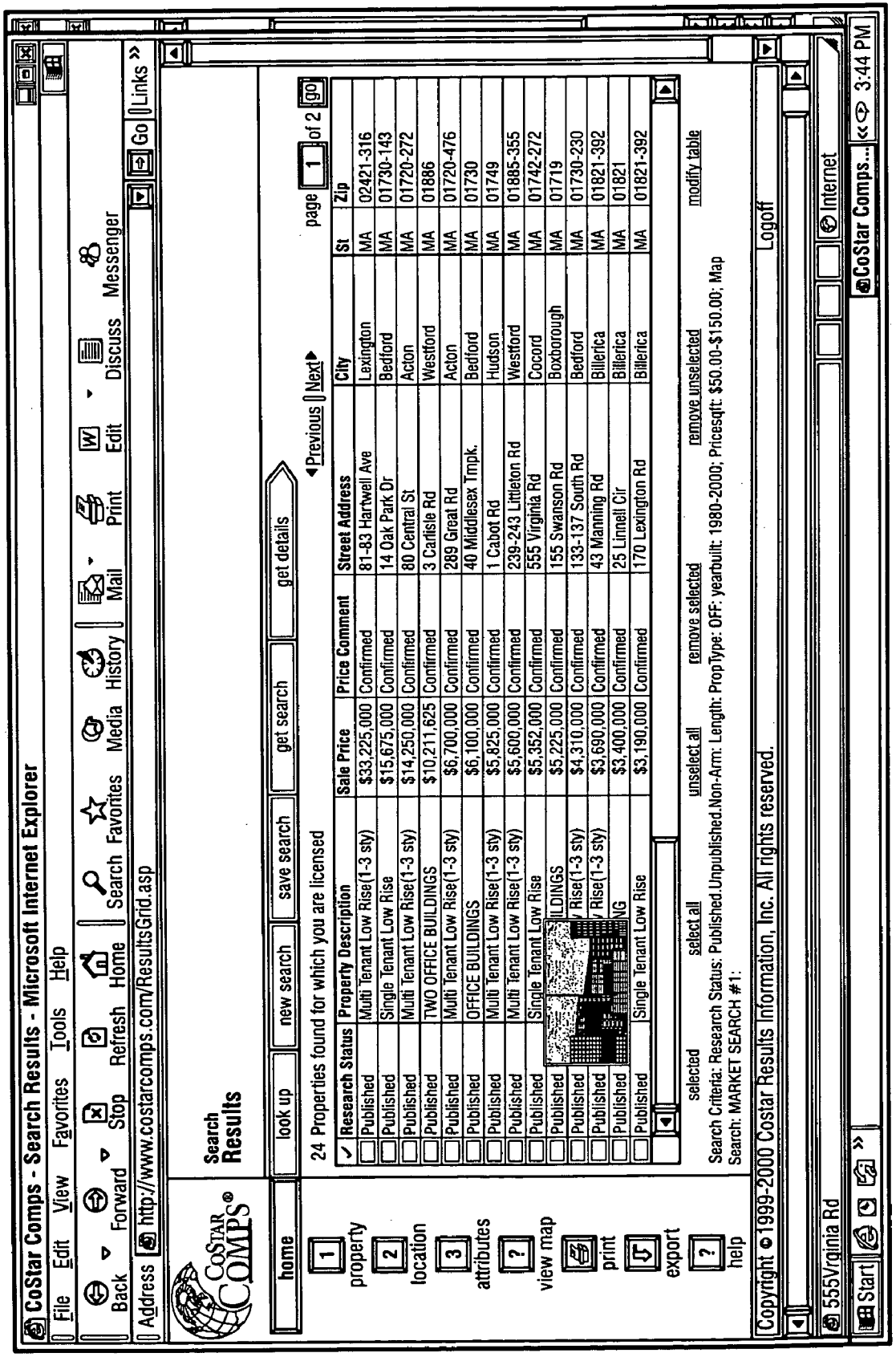
Figure 124:
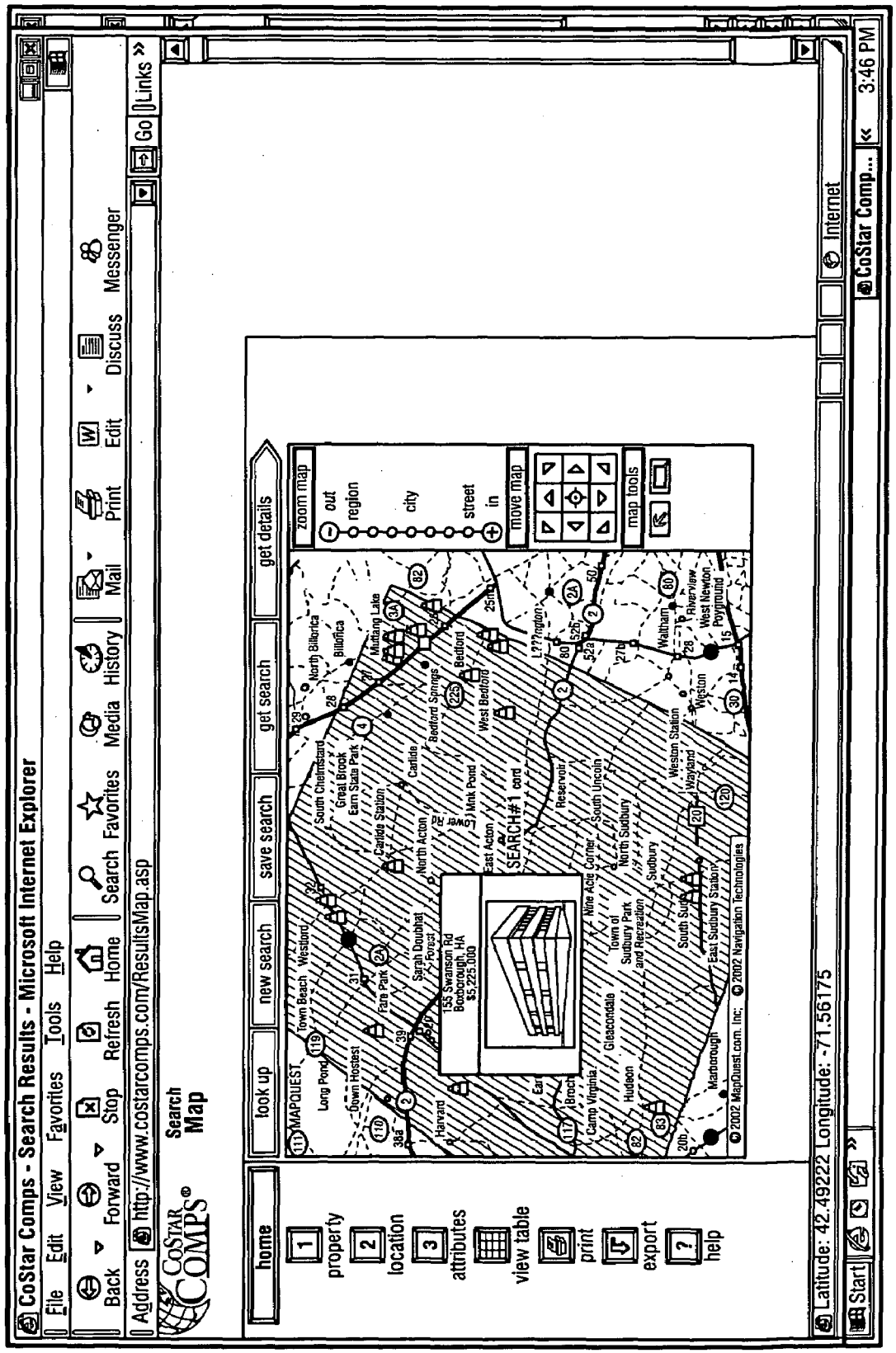

FIGS. 121–124 provide screen shots showing the operation of an exemplary map search tool of the present invention. As shown in FIG. 121, the user has defined a search area using the polygon search tool. In FIG. 122, the user defines attributes or search criteria for properties within the defined search area. In a particular implementation, these attributes are specific to properties for lease. In FIG. 123, the system returns a list of properties within the search area that meet the attributes. As also shown in FIG. 123, the system can also display a pop-up window with a photograph of the property corresponding to the listing over which the mouse pointer is positioned. In FIG. 124, the system plots the search results over the defined polygon search area, indicating each result with a building icon. As also shown in FIG. 124, the system can also display a pop-up window with a photograph of the property corresponding to the icon over which the mouse pointer is positioned.

Figure 125:
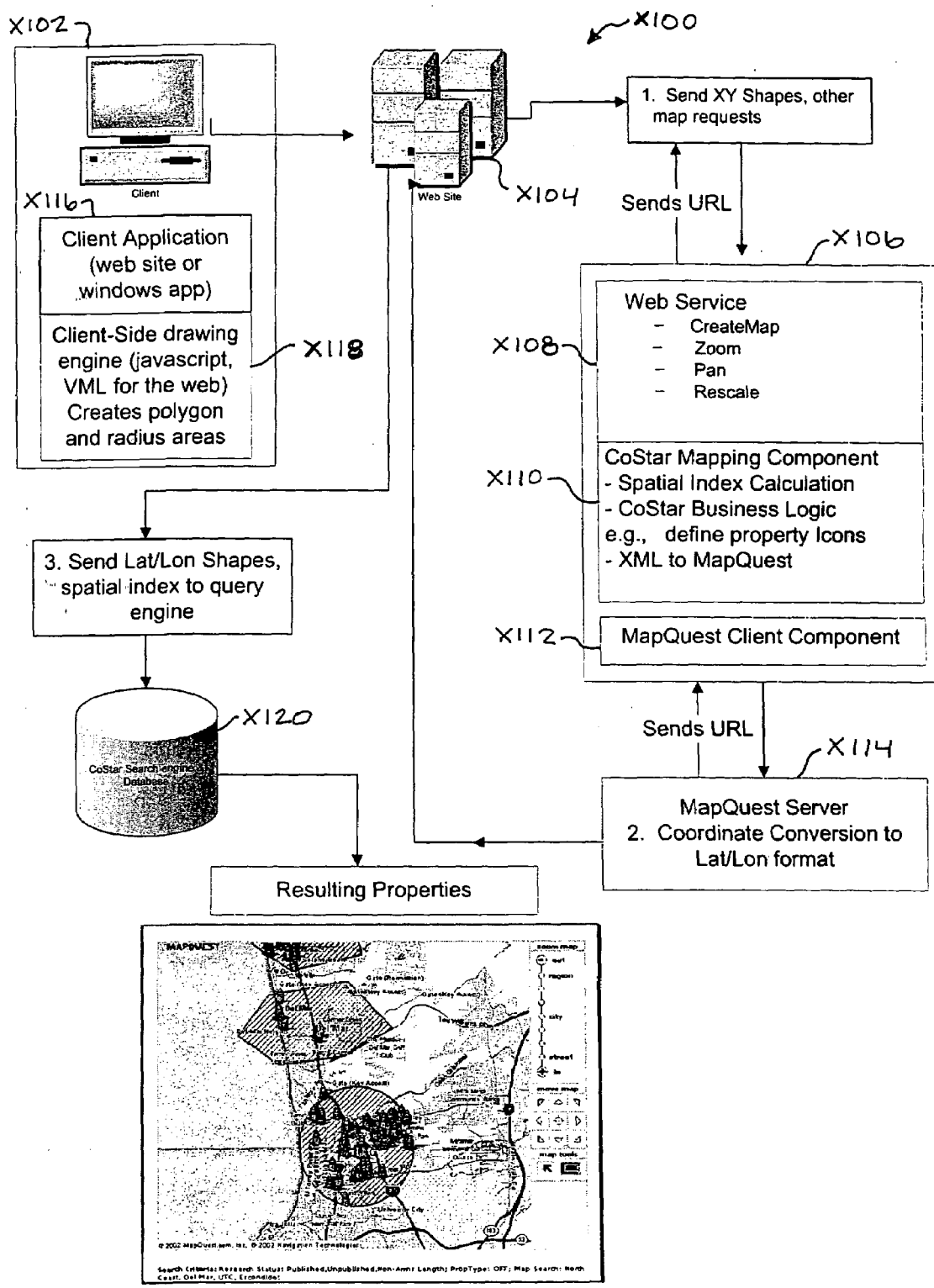

FIGS. 125 and 126 illustrate an exemplary system and method for executing the map-based search functions described and shown above. On a broad level, the map-based search tool of the present invention receives a radius, rectangular, or polygonal area drawn over a map by a user, divides the area into a plurality of pixels, determines latitude and longitude coordinates corresponding to the pixels, calculates a spatial index based on the coordinates, and retrieves data associated with the coordinates and the spatial index. In an embodiment of the present invention, the latitude and longitude coordinates are determined by sending an XML message to a mapping application, such as MapQuest™. FIG. 126 lists an example of an XML message generated from polygon and radius searches, to which a mapping application would respond with latitude and longitude coordinates.

As shown in FIG. 125, a system X100 according to the present invention includes a client X102 in communication through a computer network (not shown) with a web site X104. Client X102 is provisioned with a client application X116 (e.g., a web site or MS Windows application) that is cooperative with web site X104. Client X102 is also provisioned with a client-side drawing engine X118 (e.g., Javascript or VML for the web) for drawing search areas (e.g., polygon and radii search areas) over a map.

Web site X104 provides the user interface through which client X102 accesses the map search functions of the present invention. The pages of web site X104 are served by a service provider server X106, which includes a web service X108, a map calculation application X110, and a client mapping component X112.

Web service X108 provides map functions such as map creation, zooming, panning, and rescaling.

Map calculation application X110 converts the search areas drawn by client X102 into pixels, calculates the spatial index corresponding to the pixels, and generates XML query messages requesting latitude and longitude coordinates corresponding to the pixels.

Client mapping component X112 provides means for communicating with a mapping server X114. Mapping server X114 receives the XML query message generated by map calculation application X110 and converts the pixels into latitude and longitude coordinates. Mapping server X114 is in communication with web site X104, to which mapping server X114 sends the latitude and longitude coordinates.

Web site X104 is also in communication with a search engine and database X120. Given the latitude and longitude coordinates provided by mapping server X114 and the spatial index calculated by map calculation application X110, search engine and database X120 retrieves data associated with the coordinates and spatial indexing. Search engine and database X120 corresponds approximately to core data warehouse A16, database processes A18, and Internet integration application A20 of FIG. 1.

With continuing reference to system X100, FIG. 126 illustrates an exemplary method for retrieving geographic-based data using areas defined by the drawing of client X102, which in this example is either a radius or a polygon. In step X200, the method begins by converting the drawn area into pixels (e.g., squares in this case). For a radius search, the circular area is converted into a bounding box defined by the length of the radius. For a polygon search, the polygon area is converted into multiple quadrangles based on the polygon definition. In reference to FIG. X1, map calculation application X110 performs this conversion of the drawn area.

After pixelating the drawn area, in step X202, XY shapes of the converted areas are converted to latitude and longitude coordinates. In reference to FIG. 1, mapping server X114 performs this conversion.

In step X204, the method continues by calculating the spatial index based on the latitude and longitude coordinates. In this example, map calculation application X110 performs this calculation.

In step X206, the latitude and longitude coordinates and the spatial index are used as criteria in performing a search. In addition to these search criteria, other attributes can be used to retrieve certain data. In reference to FIG. X1, search engine and database X120 performs this search. In a particular implementation, these additional attributes are specific to properties for lease.

Finally, in step X208, the data satisfying the given coordinates and spatial index, along with any other attributes, is returned. Thus, for example, in the context of commercial real estate, the data would include properties located within the drawn search area (thereby associated with the given coordinates and spatial index) and having the specified attributes (e.g., price per building square foot, gross acres, and year built).

As shown in FIGS. 125 and 126, a significant benefit of the present invention is its ability to calculate spatial indexing on the fly, rather than storing spatial indexing in the database that holds the geographic-based data (e.g., database X120 of FIG. 125). Consequently, it is unnecessary to modify the database, no software or local controls are needed, and, because the present invention is purely web-based, the mapping server does not need to interact with the database containing the geographic-based data.

In an alternative embodiment of the present invention, the map search tool uses an aerial photograph as the map. In this manner, a user can view the actual appearance of an area and define geographic areas (e.g., radius, rectangle, or polygon) over the photograph. The system displays the search area and the search results over the photograph in the same manner described above for pictorial maps.

FIGS. 127–132 illustrate an exemplary method for spatial indexing, according to an embodiment of the present invention. A goal of this method is to build an XML document that contains a list of quadrangles (latitude/longitude boxes), which cover the polygon as accurately as possible with as few quadrangles as possible. These quadrangles can be used in SQL Server to quickly retrieve latitude/longitude location values.

Figure 127:
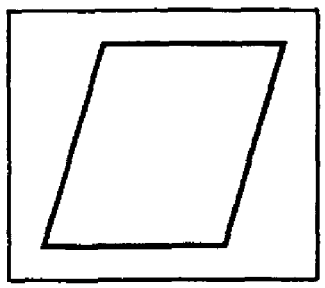
FIGS. 127–132 are schematic diagrams that illustrate an exemplary method for spatial indexing, according to an embodiment of the present invention.
Figure 128:
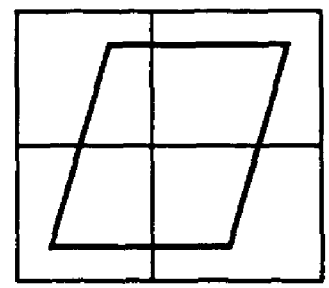
Figure 129:
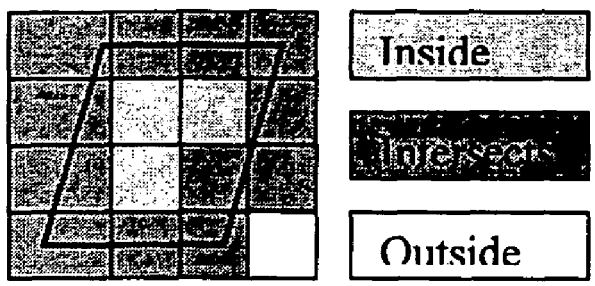

As shown in FIG. 127, the first step is to build a bounding "box" around the polygon. Then, a recursive method is used to tessellate the polygon. Specifically, each box is divided into four quarters, as shown in FIG. 128. The boxes are then categorized according to whether they are inside, outside, or intersecting the polygon, as shown in FIG. 129. The analysis continues on the boxes that are inside or intersecting. The outside boxes are ignored. The previous steps are then repeated for any of the boxes categorized as intersecting. This process is repeated only to a certain predefined and configurable level (e.g., 3 or 4 iterations). The process keeps track of which level produced each box. Any boxes that are categorized as inside need no further processing, so they are added to the list of quadrangles.

The method continues by recombining the quadrangles using a recursive method to minimize the number of quadrangles. This recursive method proceeds as follows:

(1) For each level starting with the most detailed level to the least detailed level:
  (a) For each row within a level, combine any two quadrangles that have matching edges and are categorized with the same status (Inside or Intersecting);
  (b) Repeat for each column within a level.
(2) Repeat for each level;
(3) Repeat the entire process until no more recombinations are found.

Figure 130:
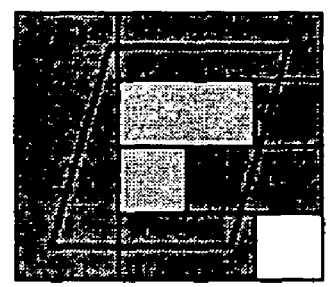
Figure 131:
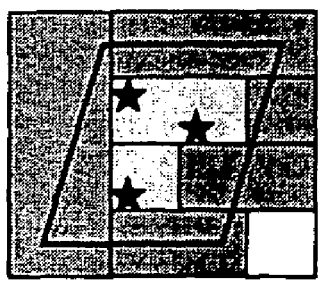

Optionally, additional recombination methods can be applied. For example, quadrangles can be combined where one side of one quadrangle is equal to the sum of sides of two or more quadrangles. FIG. 130 illustrates a recombined set of quadrangles.

According to this embodiment, the spatial index is then used by a SQL Server as follows. The quadrangles and polygon boundary are loaded from XML into temporary tables. The spatial query is combined with other query criteria such as minimum building square footage and property type. A query is performed to retrieve all of the building locations that meet the query criteria and are within the inside or intersecting quadrangles. The locations that are in the inside quadrangles are added to the result set first, as shown by the stars in FIG. 131.

Figure 132:
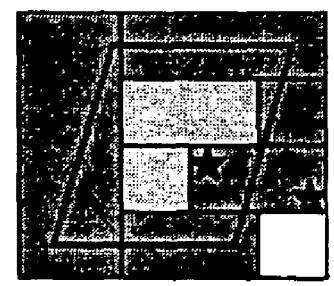

If the result set is not larger than the maximum number of locations to return, the radius areas are queried using a bounding box and a circle distance algorithm. If this still does not return more than the maximum number of rows for the query, the locations that are inside the intersecting quadrangles are filtered with a point-in-polygon algorithm. The locations that are inside the polygon are added to the final result set, as shown in FIG. 132. For example, as shown in FIG. 132, the location (star) to the left passes the point-in-polygon test and is inside, while the star to the right does not.

Detailed Description of Derivative Embodiments

According to another aspect of the present invention, the system includes a method and system for listing and brokering a commodity and its financial derivatives. The method begins by identifying a plurality of characteristics of a particular commodity such as commercial real estate, and then entering those characteristics into a data processing system using a real-time clock. Once the commodity characteristics are entered, an exchange market for the commodity is established based upon a pre-selected set of the commodity's characteristics. After market price for each commodity listed in the database has been set, a class or classes of financial derivatives can be established. Then, with the establishment of derivative classes, a financial exchange market for those derivatives can be established.

The characteristics of the commodity to be listed, and subsequently traded, would preferably include: a geographic location; a lease term start date range and a lease term end date range; a building class (e.g., class A, B, C); a volume; and a cost. These characteristics generally describe commercial real estate, which is the broad class of commodity to be traded in the preferred embodiment of the present invention.

The entry of the commodity into the data processing system comprises several steps, these include: determining whether or not the commodity is being identified to the data processing system for the first time; and, storing the commodity characteristics in a commodity database if the entry is indeed a first time entry. If the entry is not a first time entry, then the status of the entry with respect to being a candidate for purchase, sale, or trade would need to be determined.

The description or characteristics of the derivatives would be more general in context than that of the commodity itself and could be described by a series of broad categories. These categories might include: all commercial real estate available during a particular time period in a particular region; all commercial real estate of a certain class or cost; or, a combination of categories. The broad characteristics of the derivatives would comprise a Lease Space Equivalent Unit, or LSEU.

The LSEU comprises a: common descriptive link between varied commodity types; a time period (contract length) that runs from the date of the contract to the performance date of the commodity; and, a contract price. When entering the characteristics of the LSEU into the data processing system, the system determines whether the entry is being made for the first time. If so, then the characteristics are entered into the derivatives database and an identifier is issued. If the described derivative has been previously entered into the system, then the system determines the status of the derivative, with respect to whether or not that derivative is being exchanged, sold, or traded.

The system which employs the method of the subject invention comprises a number of elements that include: data processing means for accepting and storing the parameters of the commodity available for sale or exchange; data processing means for entering a description of the commodity desired for purchase or exchange; means for determining whether a match exists based upon a comparison of the commodity offered for sale and that requested for purchase or exchange; means for displaying the matched entry to a system operator; means for selecting the matched entry for purchase and/or exchange; means for determining a class of financial derivatives based upon a pre-determined set of characteristics resident in the commodity descriptions stored in the database; and means for selecting a class of derivatives for purchase and/or exchange.

The data processing means of the system, in turn, further comprises a system controller. The system controller is comprised of a number of elements, which include: a data processing system and programs for the management of data; data entry means for entering data into the data processing system; memory means for storing data; and, communication means for communicating data between the system controller and a plurality of input and output points. The input and output points, for the input and output of data, comprise: one or more commodity input points; one or more commodity receiver points; one or more commodity brokerage points; and, one or more derivative exchange points.

Figure 72:
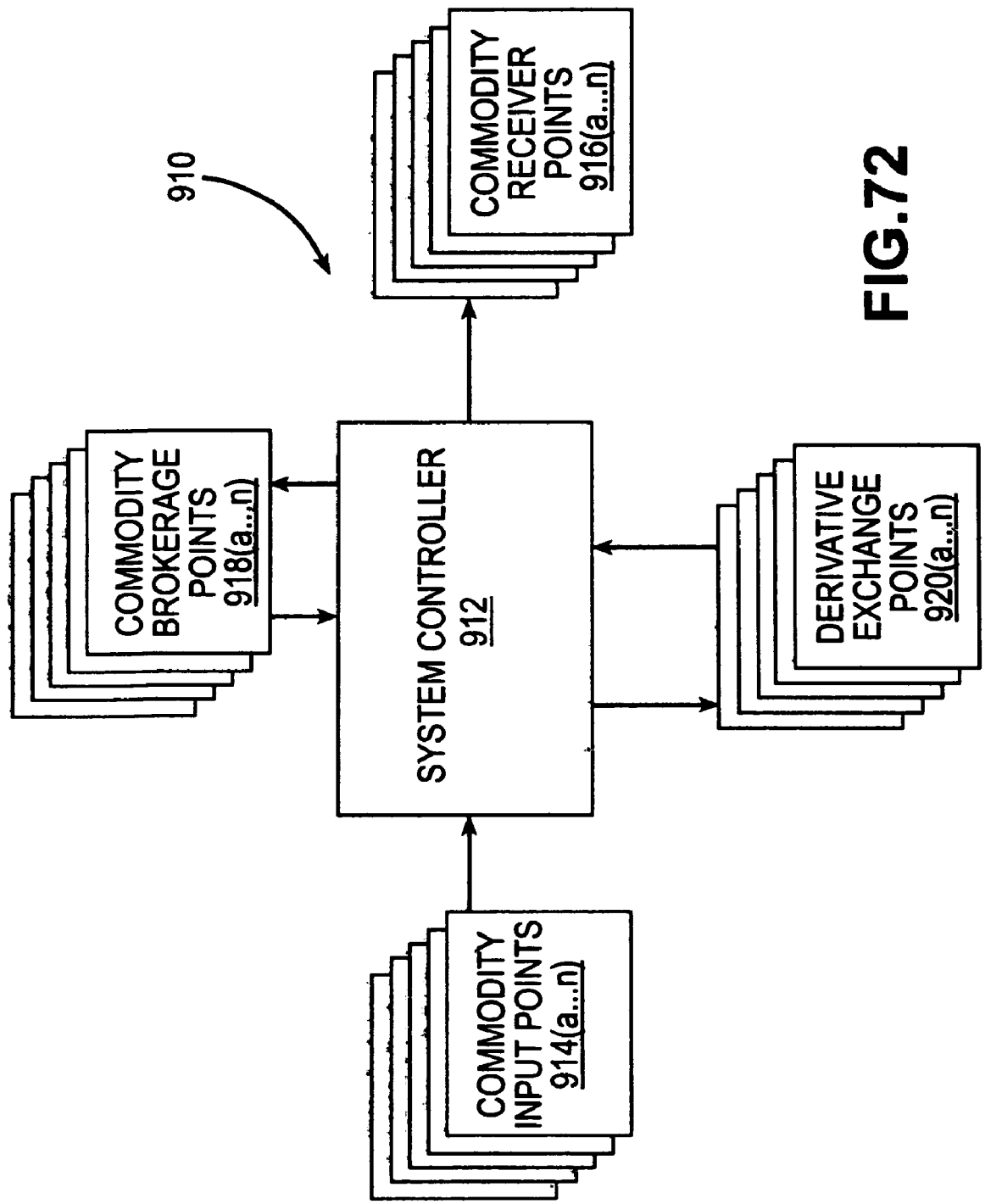
FIG. 72 is a high level overview of the proposed method and system for listing, brokering, and exchanging carrier capacity, according to a preferred embodiment of the present invention.
Figure 73:
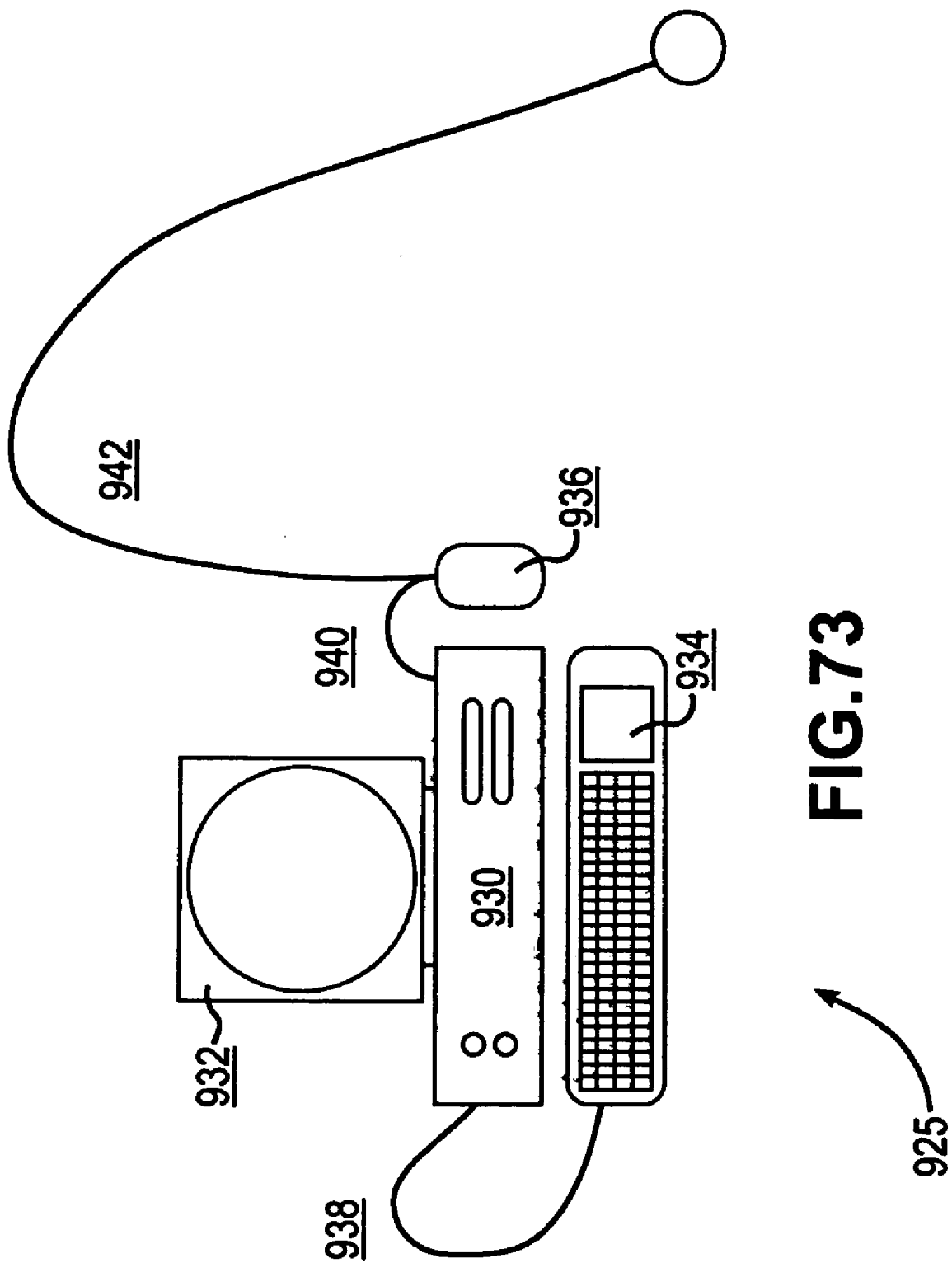
FIG. 73 is a drawing of the apparatus that can be used as an entry point into the system to utilize the method, according to a preferred embodiment of the present invention.

The system for implementing this aspect of the present invention can be a known system, such as that shown in FIG. 72 and FIG. 73, applied to this new area and taking advantage of the unique unified data model of the present invention. To begin with, as shown in FIG. 72, a high level flowchart of the overall system of the subject invention is designated as system 910. System 910 comprises a central hub in the form of a system controller 912 which can be a computer or a data processing system for processing data entered by the system operator. System controller 912 has a number of input and output points which allow nodes located at the input and output points to utilize this known method in a new context, i.e., commercial real estate.

Commodity input point 914 can exist as a single point or as multiple points. At commodity input point 914, the description of a commodity to be traded or purchased is entered into system 910 and resides within system controller 912. In a preferred embodiment of the invention, the commodity to be entered is commercial real estate. Entry of the commodity into system 910 must include enough information so as to identify the commodity in time, place, volume, and class. In an alternative embodiment of the subject invention, system controller 912 resides within each of the input and output points 914, 916, 918, and 920 so that the database of each is redundant to the others with respect to storing commodity data.

Commodity receiver point 916 can exist as a single point or as multiple points. At commodity receiver point 916, the description of a commodity that has been purchased is confirmed to the purchaser by a confirmation transmitted from system controller 912. The confirmation will include an identification of the commodity purchased and a market value for the commodity that will be debited from an account of the purchaser and credited to an account of the carrier listing the commodity.

Commodity brokerage point 918 can exist as a single point or as multiple points. At commodity brokerage point 918, the trading of a commodity between a commodity owner and a secondary purchaser is entered into system 910. A secondary purchaser is defined as a purchaser who did not purchase the commodity to be traded directly from the carrier who introduced the commodity to the market. A request to purchase or trade a particular commodity is entered into system controller 912, which will attempt to seek a match between the commodity requested and commodities available for sale or trade. Alternatively, a listing of commodities available for sale or trade, within certain parameters, can be displayed prior so that a sale or trade request can be subsequently entered.

Derivative exchange point 920 can exist as a single point or as multiple points. At derivative exchange point 920, the trading of a derivative between a derivative owner and a derivative purchaser is entered into system 910. A derivative is defined as a financial instrument whose value is based on the perceived future collective value of a breadbasket of primary instruments. For example, a derivative could be based on the value of all commercial real estate leases of a specified class in a specified area for a period ending on a particular date some time in the future (i.e., 90, 120, 180 days forward). A request to purchase or trade a particular derivative is entered into system controller 912, which will attempt to seek a match between the derivative requested and derivatives available for sale or trade. Alternatively, a listing of derivatives available for sale or trade, within certain parameters, can be displayed prior so that a sale or trade request can be subsequently entered.

Turning to FIG. 73, there is shown subsystem 925, which represents an input/output point that is porting data to system controller 912 shown in FIG. 72. Subsystem 925 comprises: microprocessor 930 for processing data entered by the system operator; microprocessor 930 operatively connected to monitor 932 where the system operator can view entries made to the system, matches available, or receive notification of a match; keyboard 934, which is used to make data entries to the system connected to microprocessor 930 by interface cable 938; and, modem 936, which can transmit data entries to, or receive data entries from, system controller 912, connected to microprocessor 930 by interface cable 942.

Description of a Representative Embodiment

As described above, the system and method of the present invention provide the unified data model required to complete the development of a digital marketplace for the commercial real estate and related business community. The marketplace contains a wealth of information that can be used to provide an array of new services.

The currently preferred embodiment of the database of the present invention tracks over 15 billion square feet of U.S. commercial properties, and is one of the largest in existence. Over 700 researchers make daily updates to the database. This highly complex database is comprised of hundreds of data fields, tracking such categories as: location; site and zoning information; building characteristics; space availability; tax assessments; ownership; sales comparables; mortgage and deed information; for-sale information; income and expense histories; tenant names; lease expirations; contact information; and historical trends.

The database includes over 660,000 high-resolution digital images, including building photographs, aerial photographs, and floor plans. The database tracks approximately 900,000 tenants occupying office and industrial space in 54 U.S. markets.

The currently preferred embodiment also employs a sophisticated data collection organization, made up of a combination of researchers, management systems, computer and communications hardware, and software systems. To begin with, over 700 researchers collect and analyze office and industrial real estate information through hundreds of thousands of phone calls, e-mails, Internet updates, and faxes a year, in addition to e-mails, field inspections, news monitoring, and direct mail. Moreover, because of the importance commercial real estate professionals place on the data, they frequently take the initiative to report transactions to our researchers.

In addition, the system includes management and quality control systems. Both automated and non-automated controls are used to ensure the integrity of the data collection process. A large number of automated data quality tests check for potential errors including occupancy date conflicts, available square footage greater than building area, typical floor greater than land area, and expired leases. Non-automated quality control procedures include: calling our information sources on recently-updated properties to re-verify information; reviewing commercial real estate periodicals for transactions to cross-check our research; and performing field checks to ensure the correct canvassing of all building. Finally, one of the most important and effective quality control measures is feedback, garnered through regular client surveys taken from the commercial real estate professionals using the data of the present invention every day.

With regard to computer and communications hardware, the system maintains Windows NT servers in support of the database and a national internal frame relay network to allow remote researchers real-time access to the database. Full data back-ups are stored off-site.

The system uses client-server software to manage internal data collection. In addition, the system uses custom software systems for four primary functions: collection of building-specific data; tracking of commercial real estate companies and individuals; facilitating operations; and distribution of data.

The currently preferred embodiments of various services that can be provided with the unified data model will now be described in detail in the following paragraphs.

CoStar Property: This is a database of more that 15.3 billion feet of commercial space in the United States (mostly office and industrial), combining hundreds of data fields such as space availability, sales comps, properties for sale, ownership, photos, size, location, and characteristics. CoStar Property has fostered the development of the digital leasing marketplace. Clients use CoStar Property to research leasing options, analyze market conditions and competitive property positions, and produce multimedia client presentations. Members of the broader commercial real estate community, including non-CoStar Property subscribers, Use CoStar Property extensively to market their properties. The subscriber can query CoStar Property with any combination of pertinent criteria, combining any of approximately one hundred data fields from categories such as building size, location, building characteristics, space, availability, ownership, or sales comparables. CoStar Property's search engine scans through hundreds of millions of square feet of space in a specified market in seconds to find all the properties meeting the search criteria. The user can select from over 50 customizable reports, presenting space availability, comparable sales, tenant activity, market statistics, photographs, and floor plans. The user can export and edit reports, photos, and floor plans to help determine feasibility of a specific space. Clients also use CoStar Property to analyze market conditions by calculating current vacancy rates, absorption rates, or average rental rates.

CoStar Tenant: This is a database of some 900,000 tenants and their lease terms, including all building information, rents, lease terms, commissions and broker, tenant type or business, and other data. A key service feature is accurate lease expiration information. Clients use CoStar Tenant to: find information about particular tenants; identify and target the most likely tenants to lease space; identify all tenants in a particular building; understand trends and the underlying demand for commercial real estate; identify and target the tenants most likely to need representation for their real estate requirements; and identify and target the tenants most likely to buy a particular vendors' goods and services.

COSTAR EXCHANGE™: Allows property owners to list their properties for sale (and list extensive information about their properties) on the system operator's website at no cost. The generation of the product is from the company's database, incorporating much of the data in Tenant and Property but emphasizing the sale process as opposed to the listing process. Emphasized information will include tenant information, leasing information, and income and expense data. These listings allow sellers to reach a very large audience. There are currently over 38,000 buildings for sale in the CoStar/Comps database, representing in excess of some $40 billion in aggregate value. The system is sold on a subscription basis into the existing client base and can also create on-off revenue. The exchange is a web-based marketplace to more efficiently and securely facilitate the buying and selling of commercial properties. Information is distributed through a secure web service, known as COSTAR EXCHANGE™. The site affords an efficient means for these sellers to reach a large universe of potential buyers. Potential buyers pay a subscription fee to access the system. Sellers of investment-grade properties have the additional option of selecting limited, secure distribution of their properties in order to address confidentiality requirements.

CoStar Analytic: This service is a web-based analytical tool based on the tenant and property databases. The tool is designed to allow users to analyze underlying trends in the covered markets. The types of inquiries that can be made are nearly limitless and are based on combinations of fields in the database. A typical inquiry might be to analyze leases rolling over in a submarket over a forward 36-month period to try to determine the leasing success of a potential new development. CoStar Advisory is sold both on a subscriber basis and on a per-search basis. Users can analyze the important changing trends in market metrics such as vacancy rates, tenant movements, supply, rental rates, tenant demographics, new construction, and absorption rates. This web-based analytic tool allows users to perform more sophisticated analyses of underlying market conditions and trends when making investment, leasing, purchase, sale, construction, and marketing decisions involving commercial real estate. These tools provide strategic insight into the changing trends in vacancy rates, tenant movements, supply, new construction, absorption rates, and other important market metrics. The system also provides fee-based customized reports and advisory services.

CoStar Comps: This service is an enhanced web-based service providing confirmed commercial real estate sales information on properties that have recently sold. This web-based service enables clients to track and analyze sales comparables in a more timely and comprehensive manner than is currently possible. This service covers 47 national markets, including information on comparable sales such as sale prices, income and expenses, capitalization rates, loan data and other details. Clients can search the proprietary database of comparable sales information by multiple search parameters, including location, property type, square footage, price range, and number of units. Clients receive a report of all relevant properties in the database matching their search criteria, including photographs.

CoStar Marketplace: The participants in the CoStar marketplace directly influence approximately $100 billion in leasing and sales each year. The system allows the system operator to provide digital marketing opportunities to reach this audience through premium high-exposure banner ads on CoStar and on the website. The Marketplace provides an online means for the commercial real estate and related business community to direct advertising to the appropriate decision-makers. The service benefits clients by providing increased distribution, higher visibility, and a more cost effective way to reach an audience targeted for their advertising material.

CoStar News: This service provides website, CoStar, and e-mail news dispatches that keep clients informed of late-breaking commercial real estate news such as deals signed, acquisitions, ground breakings and other features. Web banner ads are prominently displayed on the site, generating significant revenues. The system also allows the system operator to deliver a free e-mail system built around customized client profiles, with highly-targeted banner advertising attached.

The present invention thus provides a digital marketplace in which the members of the commercial real estate and related business community can continuously interact and can facilitate transactions by efficiently exchanging accurate and standardized information. In addition, the system operator is capable of providing the depth and breadth of the following services:

Digital leasing marketplace—provides the information required to efficiently conduct commercial real estate leasing transactions, both between brokers and between owners and brokers. The system operator delivers this service through CoStar Property and CoStar Tenant, which benefit clients by providing a more comprehensive solution with much higher data quality, at substantially less time and cost than otherwise available.

Digital selling marketplace: This service provides the information required to efficiently and securely conduct commercial real estate buy and sell transactions. The system operator can deliver this service through CoStar and enhance this service through COSTAR EXCHANGE™. This service benefits clients by allowing purchasers to make more-informed investments and sellers to maximize realized property values.

On-line decision support services: These services allows members of the community to perform analysis of underlying market conditions and trends when making investment, leasing, purchase, sale, build, and marketing decisions involving commercial real estate. The system operator can deliver these services through CoStar Analytic and CoStar Comps. These services benefit clients by providing powerful, flexible, time-efficient, and accurate analytic capabilities.

Tenant information services: These services enable members of the commercial real estate and related business community to identify and market to the tenants who are the most likely prospects for their goods and services. The system operator delivers these services primarily through CoStar Tenant. These services benefit clients by more precisely identifying and capturing viable prospects at a lower cost.

On-line property marketing: This service provides a targeted on-line means for the commercial real estate and related business community to direct advertising to the appropriate decision-makers. The system operator can deliver this service through CoStar and via the website. This service benefits clients by providing them increased distribution, higher visibility, and a more cost-effective way to reach their targeted audience than otherwise available.

On-line industry news: This service allows members of the commercial real estate and related business community to remain current with developments in the industry. The system operator delivers these services through CoStar, www.costargroup.com, which benefit clients by providing more timely and in-depth news.

The increased availability of the services from a web-based platform will allow the commercial real estate and related business community real-time access to the CoStar marketplace data and provide the opportunity for increased interaction among community members. This will lead to the development of a more efficient commercial real estate marketplace.

The preferred embodiment of the present invention relates to a system and method for collecting, standardizing, and distributing information pertaining to commercial real estate. The information falls into three conceptual camps: Information about the leasing of commercial space (which itself is divided into tenant data and space-for-lease data); Information about the listing and sale of buildings; and Market research.

The commercial real estate brokerage community supplies the first two types of information. As a broker in a local market gets a listing, the space for sale or rent is listed in the CoStar system and the information enters the database. For example, if a user wanted 10,000 feet in downtown Los Angeles, the CoStar system would allow the tenant representative broker to search suitable locations in that market based on up to 100 data fields. Listing brokers that represent the property owner would have provided the actual data.

The present invention achieves significant network effect benefits to the extent nearly every major brokerage company in the United States submits its data and uses the system. If a large brokerage does not use the system, its clients do not get the best and widest market for lease or sale transactions. Imagine a stockbroker that maintains an internal market in a select group of stocks, but the market is highly illiquid and inactive. Meanwhile, all the other brokers share information and liquidity in a centralized digital exchange. If a customer happens to want to sell a particular stock and no one in the small broker's office is familiar with what is going on with that stock, the customer would be out of luck. This is the conundrum the real estate brokers face, as network effects cause the system to become even more important.

In all cases, the information is scrubbed, verified, and systemized to conform to the database so it is digitally accessible. In the case of market data, some is digitally culled from the 1.5 terabytes of historical real estate data that already exists in CoStar's computers, supplemented by on-going field research. Field researchers using mobile vehicles and other tools compile digital images, location information, and site-specific data, both verifying data already entered by the brokerage community and completing the market research function. The system standardizes information across source and market.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. In a system comprising a real estate database containing information regarding commercial real estate properties, a method for disseminating information contained in the real estate database comprising:
   receiving from a user a series of points on a map that define a polygonal search area;
   bounding the polygonal search area in a box;
   subdividing the box into latitude/longitude sub-boxes;
   identifying the sub-boxes as one of inside, outside, and intersecting;
   further subdividing the intersecting sub-boxes into further latitude/longitude sub-boxes and identifying the further sub-boxes as one of inside, outside, and intersecting, up to a predefined number of iterations, resulting in identified inside sub-boxes and remaining intersecting sub-boxes;
   receiving search attributes from the user;
   searching the real estate database for properties within the identified inside sub-boxes and the remaining intersecting sub-boxes that meet the search attributes; and
   displaying, to the user on a screen, information about the properties within the identified inside sub-boxes and the remaining intersecting sub-boxes that meet the search attributes.

2. The method of claim 1, wherein the search attributes are specific to properties for lease.

3. The method of claim 1, wherein displaying comprises plotting an icon on the map a location corresponding to a property within the identified inside sub-boxes and the remaining intersecting sub-boxes that meets the search attributes.

4. The method of claim 3, further comprising displaying a photograph of the property when a mouse pointer is positioned over the icon.

5. The method of claim 1, wherein displaying comprises displaying a list of the properties within the identified inside sub-boxes and the remaining intersecting sub-boxes that meet the search attributes, wherein the list provides property descriptions, property addresses, and property prices.

6. The method of claim 1, wherein the polygonal search area is irregular.

7. The method of claim 1, wherein the map is an aerial photograph.

8. A method for retrieving geographic-based commercial real estate data comprising:
   receiving a polygonal area drawn on a map;
   converting the drawn area into pixels by bounding the drawn area in a box and subdividing the box into pixels;
   converting the pixels into latitude and longitude coordinates;
   calculating a spatial index based on the latitude and longitude coordinates by:
      identifying the pixels as one of inside, outside, and intersecting; and
      further subdividing the intersecting pixels into sub-pixels and in the sub-pixels as one of inside, outside, and intersecting, up to a predefined number of iterations, resulting in one or more of identified inside pixels, identified inside sub-pixels, and remaining intersecting sub-pixels;

searching the commercial real estate database for properties having latitude and longitude coordinates within the identified inside pixels, the identified inside sub-pixels, and the remaining intersecting sub-pixels; and displaying, on a screen, the properties having latitude and longitude coordinates within the identified inside pixels, the identified inside sub-pixels, and the remaining intersecting sub-pixels.

9. The method of claim 8, wherein the pixels comprise multiple quadrangles.

10. The method of claim 8, wherein the pixels are converted into latitude and longitude coordinates by sending an XML message to a mapping application.

11. The method of claim 8, further comprising receiving additional search attributes, and wherein searching comprises searching the commercial real estate database for properties having latitude and longitude coordinates within the identified inside pixels, the identified inside sub-pixels, and the remaining intersecting sub-pixels and matching the search attributes.

12. The method of claim 11, wherein the search attributes are specific to properties for lease.

13. The method of claim 11, wherein the search attributes include price per building square foot, gross acres, and year built.

14. The method of claim 1, further comprising recombining the identified inside sub-boxes and the remaining intersecting sub-boxes.

15. The method of claim 14, the recombining comprising:
monitoring which iteration of subdividing and identifying produced each sub-box;
for each iteration starting with the most detailed iteration to the least detailed iteration,
combining, for each row within an iteration, any two sub-boxes that have matching edges and are identified the same as between inside and intersecting, and
combining, for each column within an iteration, any two sub-boxes that have matching edges and are identified the same as between inside and intersecting; and
repeating the combining until no more recombinations are found,
the searching comprising searching for properties within combined inside sub-boxes and combined intersecting sub-boxes.

16. The method of claim 1, further comprising filtering the properties within the intersecting sub-boxes using a point-in-polygon algorithm.

17. The method of claim 8, wherein calculating the spatial index further comprises recombining the identified inside pixels, the identified inside sub-pixels, and the remaining intersecting sub-pixels.

18. The method of claim 17, the recombining comprising:
monitoring which iteration of subdividing and identifying produced each pixel or sub-pixel;
for each iteration starting with the most detailed iteration to the least detailed iteration,
combining, for each row within an iteration, any two pixels or sub-pixels that have matching edges and are identified the same as between inside and intersecting, and
combining, for each column within an iteration, any two pixels or sub-pixels that have matching edges and are identified the same as between inside and intersecting; and
repeating the combining until no more recombinations are found,
the searching comprising searching for properties within combined inside pixels or sub-pixels and combined intersecting sub-pixels.

19. The method of claim 8, the spatial index comprising an XML document listing the identified inside pixels, the identified inside sub-pixels, and the remaining intersecting sub-pixels, and the method further comprising submitting the XML document to an SQL server to retrieve latitude and longitude coordinates of the identified inside pixels, the identified inside sub-pixels, and the remaining intersecting sub-pixels.

20. The method of claim 8, wherein calculating the spatial index further comprises ignoring the outside pixels and the outside sub-pixels.

* * * * *